US012699747B2

(12) United States Patent
Ould-Ahmed-Vall

(10) Patent No.: US 12,699,747 B2
(45) Date of Patent: Aug. 4, 2026

(54) PROCESSORS, METHODS, SYSTEMS, AND INSTRUCTIONS TO SELECT AND STORE DATA ELEMENTS FROM TWO SOURCE TWO-DIMENSIONAL ARRAYS INDICATED BY PERMUTE CONTROL ELEMENTS IN A RESULT TWO-DIMENSIONAL ARRAY

(71) Applicant: Intel Corporation, Santa Clara, CA (US)

(72) Inventor: ElMoustapha Ould-Ahmed-Vall, Chandler, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/131,736

(22) Filed: Dec. 22, 2020

(65) Prior Publication Data

US 2022/0197974 A1 Jun. 23, 2022

(51) Int. Cl.
G06F 9/30 (2018.01)
G06F 7/544 (2006.01)
(Continued)

(52) U.S. Cl.
CPC ............ G06F 17/16 (2013.01); G06F 7/5443 (2013.01); G06F 9/30109 (2013.01);
(Continued)

(58) Field of Classification Search
CPC .... G06F 17/16; G06F 7/5443; G06F 9/30109; G06F 9/3818; G06F 13/1668; G06F 13/4027; G06F 13/4282; G06F 2213/0026
See application file for complete search history.

(56) References Cited

U.S. PATENT DOCUMENTS

| 5,247,632 A | 9/1993 | Newman |
| 5,475,822 A | 12/1995 | Sibigtroth et al. |

(Continued)

FOREIGN PATENT DOCUMENTS

| GB | 2592087 A | 8/2021 |
| KR | 10-2011-0079495 A | 7/2011 |

(Continued)

OTHER PUBLICATIONS

European Search Report and Search Opinion, EP App. No. 20209449. 6, May 21, 2021, 10 pages.

(Continued)

*Primary Examiner* — Cheng Yuan Tseng
(74) *Attorney, Agent, or Firm* — Nicholson De Vos Webster & Elliott LLP

(57) ABSTRACT

Techniques for permuting two source two dimensional (2D) arrays are described. A processor of an aspect includes a decoder circuitry to decode an instruction having an opcode. The instruction may indicate a first source 2D array, a second source 2D array, and permute control elements. Execution circuitry is coupled with the decoder circuitry. The execution circuitry is to execute the decoded instruction to select data elements, from among any data elements of the first source 2D array, and any data elements of the second source 2D array, that are each indicated by a different corresponding one of the permute control elements. The execution circuitry is also to store the selected data elements in data element positions of a result 2D array that each correspond to a different one of the permute control elements. Other processors, methods, systems, and instructions are disclosed.

20 Claims, 63 Drawing Sheets

(51) Int. Cl.

| | |
|---|---|
| *G06F 9/38* | (2018.01) |
| *G06F 13/16* | (2006.01) |
| *G06F 13/40* | (2006.01) |
| *G06F 13/42* | (2006.01) |
| *G06F 17/16* | (2006.01) |

(52) U.S. Cl.
CPC ........ *G06F 9/3818* (2013.01); *G06F 13/1668* (2013.01); *G06F 13/4027* (2013.01); *G06F 13/4282* (2013.01); *G06F 2213/0026* (2013.01)

(56) References Cited

U.S. PATENT DOCUMENTS

| | | | |
|---|---|---|---|
| 5,552,825 A | 9/1996 | Talluri et al. | |
| 5,892,962 A | 4/1999 | Cloutier | |
| 6,119,224 A | 9/2000 | Roth | |
| 6,161,219 A | 12/2000 | Ramkumar et al. | |
| 6,212,112 B1 | 4/2001 | Naura et al. | |
| 6,332,186 B1 | 12/2001 | Elwood et al. | |
| 6,877,020 B1 | 4/2005 | Bratt et al. | |
| 7,003,542 B2 | 2/2006 | Devir | |
| 7,031,994 B2 | 4/2006 | Lao et al. | |
| 7,209,939 B2 | 4/2007 | Castrapel et al. | |
| 7,467,288 B2 | 12/2008 | Glossner et al. | |
| 7,725,521 B2 | 5/2010 | Chen et al. | |
| 7,792,895 B1 | 9/2010 | Juffa et al. | |
| 7,873,812 B1 | 1/2011 | Mimar | |
| 7,912,889 B1 | 3/2011 | Juffa et al. | |
| 7,932,910 B2 | 4/2011 | Hansen et al. | |
| 8,214,626 B2 | 7/2012 | Macy et al. | |
| 8,392,487 B1 | 3/2013 | Mesh et al. | |
| 8,984,043 B2 | 3/2015 | Ginzburg et al. | |
| 9,442,723 B2 | 9/2016 | Yang et al. | |
| 9,495,724 B2 * | 11/2016 | Mejdrich ............ G06F 9/30018 | |
| 9,575,304 B2 | 2/2017 | Dixon | |
| 9,748,974 B2 * | 8/2017 | Vakilinia ................. G06F 11/10 | |
| 9,906,359 B2 | 2/2018 | Gueron | |
| 9,959,247 B1 | 5/2018 | Woo et al. | |
| 9,960,907 B2 | 5/2018 | Gueron | |
| 10,404,426 B2 | 9/2019 | Kerhuel et al. | |
| 10,535,114 B2 | 1/2020 | Bolz | |
| 10,649,775 B2 | 5/2020 | Zbiciak | |
| 10,866,786 B2 | 12/2020 | Sade et al. | |
| 10,896,043 B2 | 1/2021 | Toll et al. | |
| 10,956,537 B2 * | 3/2021 | Woo .......................... G06F 7/76 | |
| 10,963,256 B2 | 3/2021 | Sade et al. | |
| 10,970,076 B2 | 4/2021 | Ould-Ahmed-Vall et al. | |
| 11,347,503 B2 * | 5/2022 | Bhardwaj ........... G06F 7/49915 | |
| 11,507,376 B2 | 11/2022 | Toll et al. | |
| 11,544,191 B2 | 1/2023 | Vengallur et al. | |
| 11,687,341 B2 | 6/2023 | Garegrat et al. | |
| 11,755,474 B2 | 9/2023 | Murrin et al. | |
| 2002/0027552 A1 | 3/2002 | Lee | |
| 2002/0198911 A1 | 12/2002 | Blomgren et al. | |
| 2003/0126176 A1 | 7/2003 | Devir | |
| 2004/0111587 A1 | 6/2004 | Nair et al. | |
| 2005/0193050 A1 | 9/2005 | Sazegari | |
| 2006/0101245 A1 | 5/2006 | Nair et al. | |
| 2006/0190517 A1 | 8/2006 | Guerrero | |
| 2007/0186210 A1 | 8/2007 | Hussain et al. | |
| 2008/0071851 A1 | 3/2008 | Zohar et al. | |
| 2008/0140994 A1 | 6/2008 | Khailany et al. | |
| 2008/0208942 A1 | 8/2008 | Won et al. | |
| 2009/0043836 A1 | 2/2009 | Dupaquis et al. | |
| 2009/0063607 A1 | 3/2009 | Gustavson et al. | |
| 2009/0292758 A1 | 11/2009 | Brokenshire et al. | |
| 2009/0300091 A1 | 12/2009 | Brokenshire et al. | |
| 2009/0300249 A1 | 12/2009 | Moyer et al. | |
| 2010/0180100 A1 | 7/2010 | Lu et al. | |
| 2010/0325187 A1 | 12/2010 | Juffa et al. | |
| 2011/0055517 A1 | 3/2011 | Eichenberger et al. | |
| 2012/0079252 A1 | 3/2012 | Sprangle | |
| 2012/0113133 A1 | 5/2012 | Shpigelblat | |
| 2012/0137074 A1 | 5/2012 | Kim et al. | |
| 2012/0254588 A1 | 10/2012 | Adrian et al. | |
| 2012/0314774 A1 | 12/2012 | Yang et al. | |
| 2013/0275729 A1 | 10/2013 | Abraham et al. | |
| 2013/0290687 A1 | 10/2013 | Ould-Ahmed-Vall et al. | |
| 2013/0305020 A1 | 11/2013 | Valentine et al. | |
| 2014/0149480 A1 | 5/2014 | Catanzaro et al. | |
| 2015/0067302 A1 | 3/2015 | Gueron | |
| 2015/0199266 A1 | 7/2015 | Franchetti et al. | |
| 2017/0177346 A1 | 6/2017 | Gokhale et al. | |
| 2017/0308383 A1 | 10/2017 | Espasa et al. | |
| 2017/0337156 A1 | 11/2017 | Yadavalli | |
| 2018/0004510 A1 | 1/2018 | Grochowski et al. | |
| 2018/0113708 A1 | 4/2018 | Corbal et al. | |
| 2018/0189239 A1 | 7/2018 | Nurvitadhi et al. | |
| 2018/0253402 A1 | 9/2018 | Redfern et al. | |
| 2018/0365819 A1 | 12/2018 | Green | |
| 2019/0004801 A1 | 1/2019 | Haber et al. | |
| 2019/0042202 A1 | 2/2019 | Sade et al. | |
| 2019/0042245 A1 | 2/2019 | Toll et al. | |
| 2019/0042248 A1 | 2/2019 | Bradford et al. | |
| 2019/0042260 A1 | 2/2019 | Ould-Ahmed-Vall et al. | |
| 2019/0102196 A1 | 4/2019 | Sade et al. | |
| 2019/0138494 A1 | 5/2019 | Inoue | |
| 2019/0236442 A1 | 8/2019 | Chen et al. | |
| 2019/0391811 A1 | 12/2019 | Garegrat et al. | |
| 2020/0097291 A1 | 3/2020 | Hughes et al. | |
| 2020/0127684 A1 | 4/2020 | Park et al. | |
| 2020/0210187 A1 | 7/2020 | Alexander et al. | |
| 2020/0210188 A1 * | 7/2020 | Ould-Ahmed-Vall ...................... G06F 9/30145 |
| 2020/0233803 A1 | 7/2020 | Vengallur et al. | |
| 2020/0249947 A1 | 8/2020 | Valentine et al. | |
| 2020/0249955 A1 | 8/2020 | Kravitz et al. | |
| 2022/0197652 A1 | 6/2022 | Ould-Ahmed-Vall | |
| 2022/0197974 A1 * | 6/2022 | Ould-Ahmed-Vall ...................... G06F 13/4027 |
| 2023/0229588 A1 * | 7/2023 | Aggarwal ............... G06F 8/443 711/200 |
| 2024/0028256 A1 | 1/2024 | Mnes et al. | |

FOREIGN PATENT DOCUMENTS

| | | | |
|---|---|---|---|
| WO | 2004/053841 A2 | 6/2004 | |
| WO | WO-2005006183 A2 * | 1/2005 | ............... G06F 7/76 |
| WO | 2016/003740 A1 | 1/2016 | |
| WO | 2016/105727 A1 | 6/2016 | |
| WO | 2017/105713 A1 | 6/2017 | |
| WO | 2018/125250 A1 | 7/2018 | |
| WO | 2020/014783 A1 | 1/2020 | |

OTHER PUBLICATIONS

International Preliminary Report on Patentability, PCT App. No. PCT/US2017/040546, Oct. 3, 2019, 10 pages.

International Search Report and Written Opinion, PCT App. No. PCT/US2017/040546, Jan. 24, 2018, 15 pages.

Communication pursuant to Article 94(3) EPC, EP App. No. 20209449. 6, Mar. 13, 2023, 04 pages.

Elmoustapha et al., published U.S. Appl. No. 16/233,546, filed Dec. 27, 2018, 43 pages.

Hughes et al., published U.S. Appl. No. 16/914,321, filed Jun. 27, 2020, 76 pages.

Non-Final Office Action, U.S. Appl. No. 16/914,321, Jul. 27, 2023, 10 pages.

Office Action, EP App. No. 21197302.9, Jan. 25, 2023, 8 pages.

Corrected Notice of Allowability, U.S. Appl. No. 15/201,442, Jan. 22, 2019, 5 pages.

Corrected Notice of Allowability, U.S. Appl. No. 15/201,442, Mar. 11, 2019, 2 pages.

Final Office Action, U.S. Appl. No. 16/233,546, Dec. 7, 2020, 11 pages.

Hughes et al., Unpublished U.S. Appl. No. 16/914,321, filed Jun. 27, 2020, entitled "Matrix Data Scatter and Gather By Row", 76 pages.

Intel, "Intel(registered) Architecture Instruction Set Extensions and Future Features Programming Reference", Ref. No. 319433-040, Jun. 2020, 31 pages.

(56) References Cited

OTHER PUBLICATIONS

Lahr Dave, "Timing Matrix Multiplication in SciDB and Setting the Number of Worker Instances in SciDB and Running Matrix Multiplication Piecemeal", Available Online at <http://dllahr.blogspot.com/2012/11/timing-matrix-multiplication-in-scidb.html>, Nov. 13, 2012, 8 pages.

Lee, Ruby B., "Subword Permutation Instructions for Two-Dimensional Multimedia Processing in MicroSIMD Architectures", In: Proceedings of the IEEE 11th International Conference on Application-Specific Systems, Architectures and Processor, Jul. 10-12, 2000, 12 pages.

Non-Final Office Action, U.S. Appl. No. 15/201,442, May 4, 2018, 11 pages.

Non-Final Office Action, U.S. Appl. No. 16/233,546, May 22, 2020, 8 pages.

Non-Final Office Action, U.S. Appl. No. 16/398,200, Jul. 28, 2020, 17 pages.

Notice of Allowance, U.S. Appl. No. 15/201,442, Dec. 14, 2018, 5 pages.

European Search Report and Search Opinion, EP App. No. 21197302.9, Feb. 22, 2022, 10 pages.

Final Office Action, U.S. Appl. No. 16/233,546, Mar. 15, 2022, 13 pages.

Non-Final Office Action, U.S. Appl. No. 16/233,546, Jun. 18, 2021, 13 pages.

Final Office Action, U.S. Appl. No. 16/914,321, Dec. 11, 2023, 7 pages.

Non-Final Office Action, U.S. Appl. No. 17/131,733, Mar. 22, 2024, 21 pages.

Office Action, EP App. No. 20209449.6, Mar. 20, 2024, 4 pages.

Office Action, EP App. No. 21197302.9, Dec. 15, 2023, 10 pages.

'An Easy-to-Use Multi-Source Recording and Synchronization Software for Experimental Trials' by Merino-Monge et al., Article in IEEE Access, Oct. 2020. (Year: 2020).

'Chaotic Block Interleaver Design for Bit-interleaved Coded Modulation with Iterative Decoding' by Xuelan Zou and Xiaolan Qian, Published in: 2012 International Conference on Image Analysis and Signal Processing, Date of Conference: Nov. 9-11, 2012, Date Added to IEEE Xplore: Jan. 31, 2013. (Year: 2013).

'Dyadic transpose: A B' by Kruger, archived on Aug. 27, 2022. (Year: 2022).

'Systematic Methods for Designing Stride Permutation Interconnections' Thesis by Tuomas Jarvinen, 2004. (Year: 2004).

Non-Final Office Action, U.S. Appl. No. 17/131,741, Apr. 1, 2024, 30 pages.

Notice of Allowance, U.S. Appl. No. 16/914,321, Jun. 14, 2024, 8 pages.

Office Action, EP App. No. 20209449.6, Sep. 20, 2024, 4 pages.

'Stride Permutation Access in Interleaved Memory Systems' by Jarmo Takala et al., Copyright 2000 by Marcel Dekker, Inc. (Year: 2000).

MATLAB Answers 'How do I split a color image into its 3 RGB channels?' 2013-2023. (Year: 2013).

Non-Final Office Action, U.S. Appl. No. 17/131,741, Dec. 6, 2024, 31 pages.

Arm, "Coding for Neon", Issue 04 102159, 2020, 46 Pages.

Notice of Allowance, U.S. Appl. No. 17/131,741, Jul. 16, 2025, 9 pages.

Office Action, EP App. No. 20209449.6, Feb. 14, 2025, 04 pages.

Office Action, EP App. No. 21197302.9, Sep. 3, 2025, 08 pages.

Notice of Allowance, U.S. Appl. No. 17/131,741, Oct. 21, 2025, 5 pages.

Office Action, EP App. No. 21197302.9, Jan. 15, 2026, 07 pages.

* cited by examiner

ACCUMULATOR 2X INPUT SIZES 1101

| SOURCES | BITS | ACCUMULATOR | BITS |
|---------|------|-------------|------|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 1103

| SOURCES | BITS | ACCUMULATOR | BITS |
|---------|------|-------------|------|
| BYTE | 8 | INT32/SPFP | 32 |
| WORD | 16 | INT64/DPFP | 64 |

ACCUMULATOR 8X INPUT SIZES 1105

| SOURCES | BITS | ACCUMULATOR | BITS |
|---------|------|-------------|------|
| BYTE | 8 | INT64/DPFP | 64 |

FIG. 11

$$A = \begin{bmatrix} A_{11} & A_{12} & A_{13} \\ A_{21} & A_{22} & A_{23} \end{bmatrix}$$

| ADDR | VALUE |
|------|-------|
| 0 | $A_{11}$ |
| 1 | $A_{12}$ |
| 2 | $A_{13}$ |
| 3 | $A_{21}$ |
| 4 | $A_{22}$ |
| 5 | $A_{23}$ |

ROW MAJOR

| ADDR | VALUE |
|------|-------|
| 0 | $A_{11}$ |
| 1 | $A_{21}$ |
| 2 | $A_{12}$ |
| 3 | $A_{22}$ |
| 4 | $A_{13}$ |
| 5 | $A_{23}$ |

COLUMN MAJOR

FIG. 15

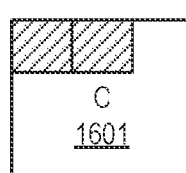 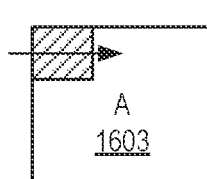 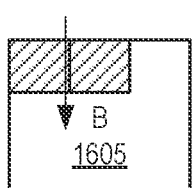

```
TILECONFIG [RAX]
// ASSUME SOME OUTER LOOPS DRIVING THE CACHE TILING (NOT SHOWN)
{
TILELOAD TMM0, RSI+RDI // SRCDST, RSI POINTS TO C, RDI HAS
TILELOAD TMM1, RSI+RDI+N // SECOND TILE OF C, UNROLLING IN SIMD DIMENSION N
MOV KK, 0
LOOP:
TILELOAD TMM2, R8+R9 // SRC2 IS STRIDED LOAD OF A, REUSED FOR 2 TMMA INSTR.
TILELOAD TMM3, R10+R11 // SRC1 IS STRIDED LOAD OF B
TILEMUL TMM0, TMM2, TMM3 // UPDATE LEFT TILE OF C
TILELOAD TMM3, R10+R11+N // SRC1 LOADED WITH B FROM NEXT RIGHTMOST TILE
TILEMUL TMM1, TMM2, TMM3 // UPDATE RIGHT TILE OF C
ADD R8, K // UPDATE POINTERS BY CONSTANTS KNOWN OUTSIDE OF LOOP
ADD R10, K*R11
ADD KK, K
CMP KK, LIMIT
JNE LOOP
TILESTORE RSI+RDI, TMM0 // UPDATE THE C MATRIX IN MEMORY
TILESTORE RSI+RDI+M, TMM1
} // END OF OUTER LOOP
TILERELEASE // RETURN TILES TO INIT STATE
```

FIG. 16

| PALETTE ID 1901 | STARTM 1903 |
|---|---|
| STARTP 1905 | PAIR INDICATORS 1907 |
| 0 | 0 |
| 0 | 0 |

. . .

| | |
|---|---|
| 0 | 0 |
| TMM0 ROWS 1913 | TMM0 COLUMNS 1915 |
| TMM1 ROWS | TMM1 COLUMNS |
| ▪ ▪ ▪ | |
| TMM15 ROWS | TMM15 COLUMNS |
| 0 | |

FIG. 19

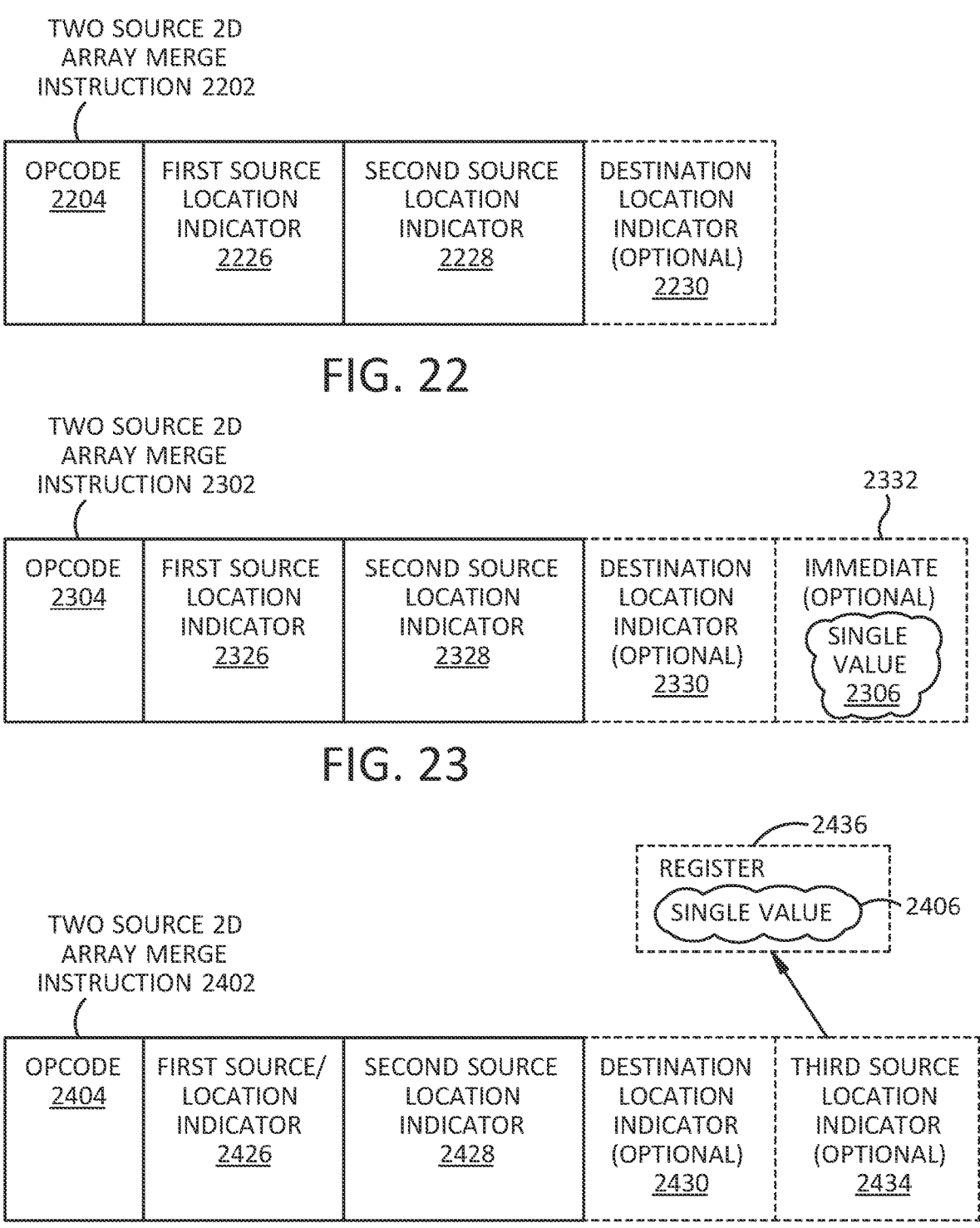

TWO SOURCE 2D
ARRAY MERGE
INSTRUCTION 2202

| OPCODE 2204 | FIRST SOURCE LOCATION INDICATOR 2226 | SECOND SOURCE LOCATION INDICATOR 2228 | DESTINATION LOCATION INDICATOR (OPTIONAL) 2230 |
| --- | --- | --- | --- |

FIG. 22

TWO SOURCE 2D
ARRAY MERGE
INSTRUCTION 2302

2332

| OPCODE 2304 | FIRST SOURCE LOCATION INDICATOR 2326 | SECOND SOURCE LOCATION INDICATOR 2328 | DESTINATION LOCATION INDICATOR (OPTIONAL) 2330 | IMMEDIATE (OPTIONAL) SINGLE VALUE 2306 |
| --- | --- | --- | --- | --- |

REGISTER
SINGLE VALUE          2406

TWO SOURCE 2D
ARRAY MERGE
INSTRUCTION 2402

| OPCODE 2404 | FIRST SOURCE/ LOCATION INDICATOR 2426 | SECOND SOURCE LOCATION INDICATOR 2428 | DESTINATION LOCATION INDICATOR (OPTIONAL) 2430 | THIRD SOURCE LOCATION INDICATOR (OPTIONAL) 2434 |
| --- | --- | --- | --- | --- |

FIG. 24

FIRST SOURCE 2D ARRAY 2714

SECOND SOURCE 2D ARRAY 2716

ODD COLUMNS

A0 A1 A2 A3 A4 A5 A6 A7

B0 B1 B2 B3 B4 B5 B6 B7

ODD COLUMNS

TWO SOURCE 2D ARRAY MERGE INSTRUCTION 2702

2709

2708

EXECUTION CIRCUITRY 2710

PROCESSOR 2700

A0 B0 A2 B2 A4 B4 A6 B6

RESULT 2D ARRAY 2718

C0 C1 C2 C3 C4 C5 C6 C7

FIRST SOURCE 2D ARRAY 2814

SECOND SOURCE 2D ARRAY 2816

A0 A1 A2 A3 A4 A5 A6 A7

B0 B1 B2 B3 B4 B5 B6 B7

EVEN COLUMNS

EVEN COLUMNS

TWO SOURCE 2D ARRAY MERGE INSTRUCTION 2802

2809

2808

EXECUTION CIRCUITRY 2810

PROCESSOR 2800

A1 B1 A3 B3 A5 B5 A7 B7

RESULT 2D ARRAY 2818

C0 C1 C2 C3 C4 C5 C6 C7

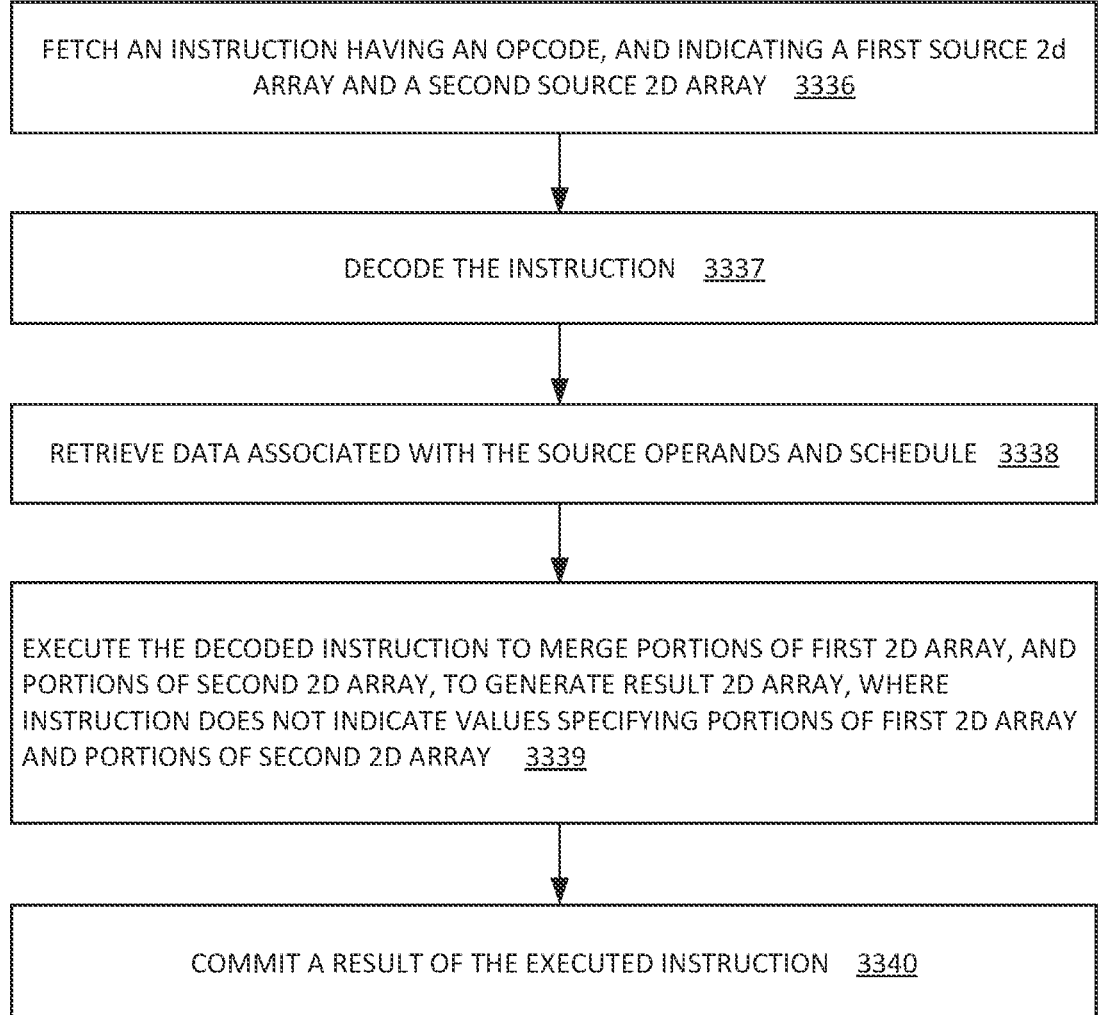

FETCH AN INSTRUCTION HAVING AN OPCODE, AND INDICATING A FIRST SOURCE 2d ARRAY AND A SECOND SOURCE 2D ARRAY   3336

DECODE THE INSTRUCTION   3337

RETRIEVE DATA ASSOCIATED WITH THE SOURCE OPERANDS AND SCHEDULE   3338

EXECUTE THE DECODED INSTRUCTION TO MERGE PORTIONS OF FIRST 2D ARRAY, AND PORTIONS OF SECOND 2D ARRAY, TO GENERATE RESULT 2D ARRAY, WHERE INSTRUCTION DOES NOT INDICATE VALUES SPECIFYING PORTIONS OF FIRST 2D ARRAY AND PORTIONS OF SECOND 2D ARRAY   3339

COMMIT A RESULT OF THE EXECUTED INSTRUCTION   3340

FIG. 33

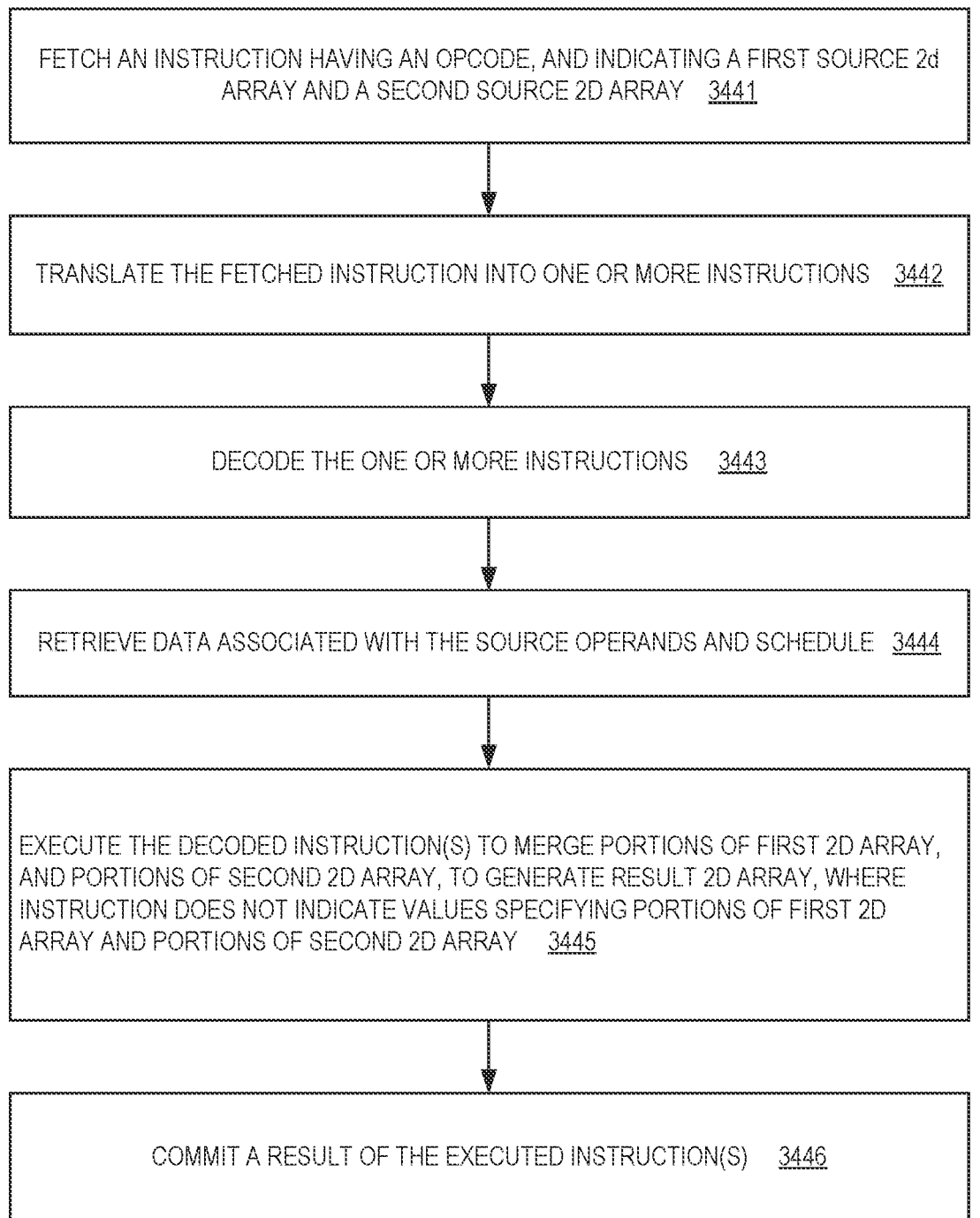

FETCH AN INSTRUCTION HAVING AN OPCODE, AND INDICATING A FIRST SOURCE 2d ARRAY AND A SECOND SOURCE 2D ARRAY   3441

TRANSLATE THE FETCHED INSTRUCTION INTO ONE OR MORE INSTRUCTIONS   3442

DECODE THE ONE OR MORE INSTRUCTIONS   3443

RETRIEVE DATA ASSOCIATED WITH THE SOURCE OPERANDS AND SCHEDULE   3444

EXECUTE THE DECODED INSTRUCTION(S) TO MERGE PORTIONS OF FIRST 2D ARRAY, AND PORTIONS OF SECOND 2D ARRAY, TO GENERATE RESULT 2D ARRAY, WHERE INSTRUCTION DOES NOT INDICATE VALUES SPECIFYING PORTIONS OF FIRST 2D ARRAY AND PORTIONS OF SECOND 2D ARRAY   3445

COMMIT A RESULT OF THE EXECUTED INSTRUCTION(S)   3446

FIG. 34

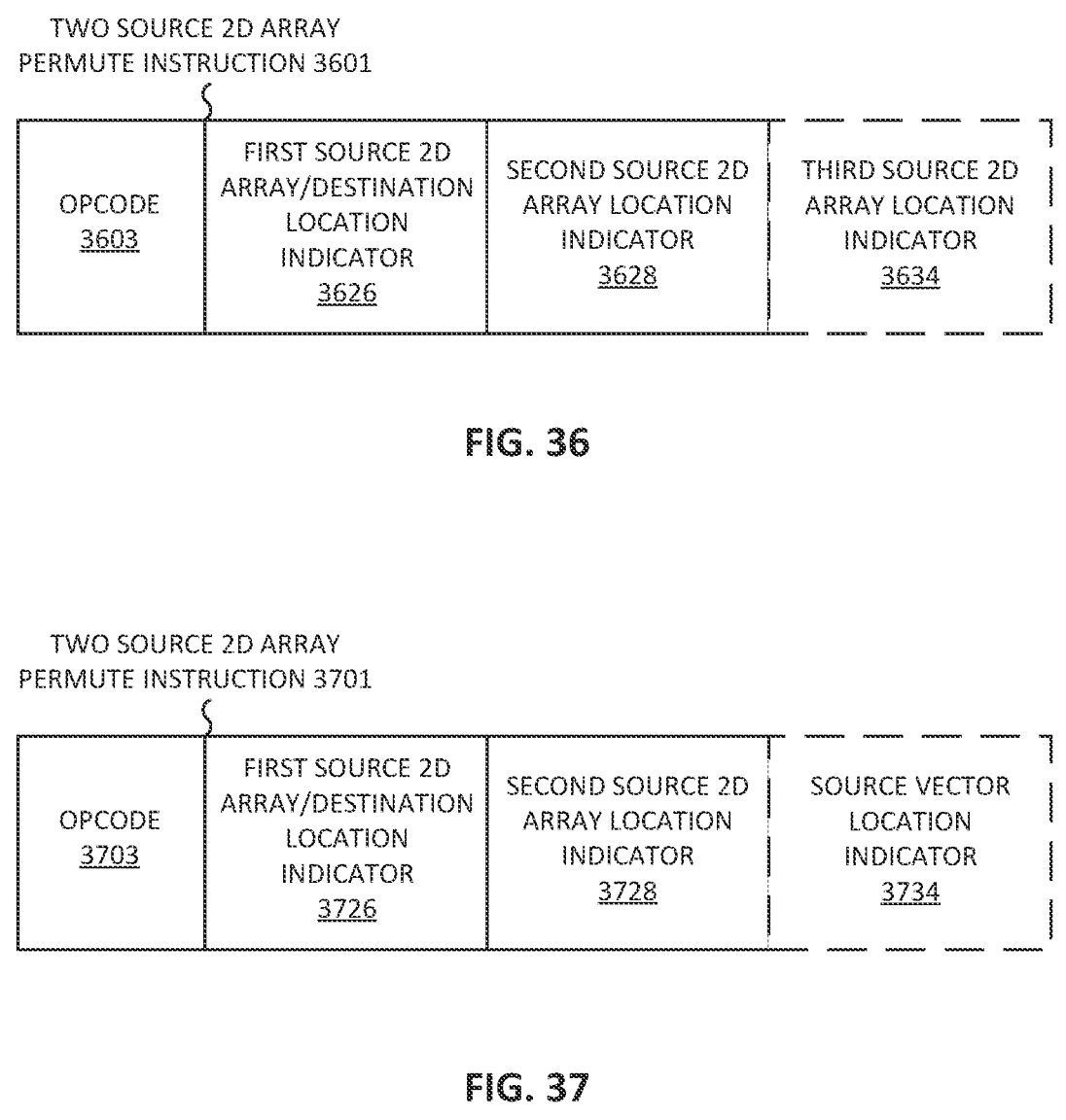

TWO SOURCE 2D ARRAY
PERMUTE INSTRUCTION 3601

| OPCODE 3603 | FIRST SOURCE 2D ARRAY/DESTINATION LOCATION INDICATOR 3626 | SECOND SOURCE 2D ARRAY LOCATION INDICATOR 3628 | THIRD SOURCE 2D ARRAY LOCATION INDICATOR 3634 |
|---|---|---|---|

FIG. 36

TWO SOURCE 2D ARRAY
PERMUTE INSTRUCTION 3701

| OPCODE 3703 | FIRST SOURCE 2D ARRAY/DESTINATION LOCATION INDICATOR 3726 | SECOND SOURCE 2D ARRAY LOCATION INDICATOR 3728 | SOURCE VECTOR LOCATION INDICATOR 3734 |
|---|---|---|---|

FIG. 37

THREE SOURCE 2D ARRAY STRIDED
EXTRACT INSTRUCTION
4156

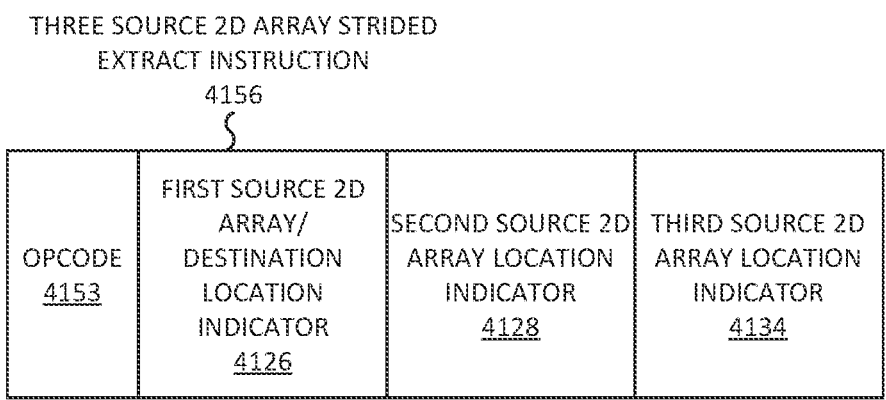

| OPCODE 4153 | FIRST SOURCE 2D ARRAY/ DESTINATION LOCATION INDICATOR 4126 | SECOND SOURCE 2D ARRAY LOCATION INDICATOR 4128 | THIRD SOURCE 2D ARRAY LOCATION INDICATOR 4134 |
|---|---|---|---|

FIG. 41

THREE SOURCE 2D ARRAY STRIDED
EXTRACT INSTRUCTION
4256

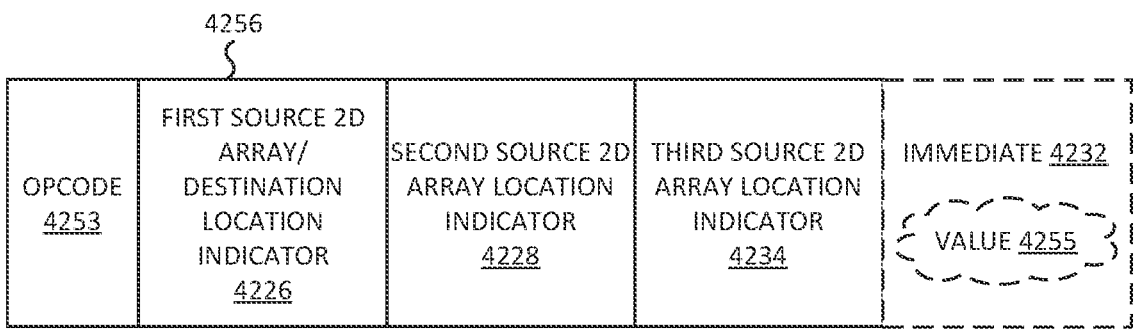

| OPCODE 4253 | FIRST SOURCE 2D ARRAY/ DESTINATION LOCATION INDICATOR 4226 | SECOND SOURCE 2D ARRAY LOCATION INDICATOR 4228 | THIRD SOURCE 2D ARRAY LOCATION INDICATOR 4234 | IMMEDIATE 4232  VALUE 4255 |
|---|---|---|---|---|

FIG. 42A

THREE SOURCE 2D ARRAY STRIDED
EXTRACT INSTRUCTION
4256

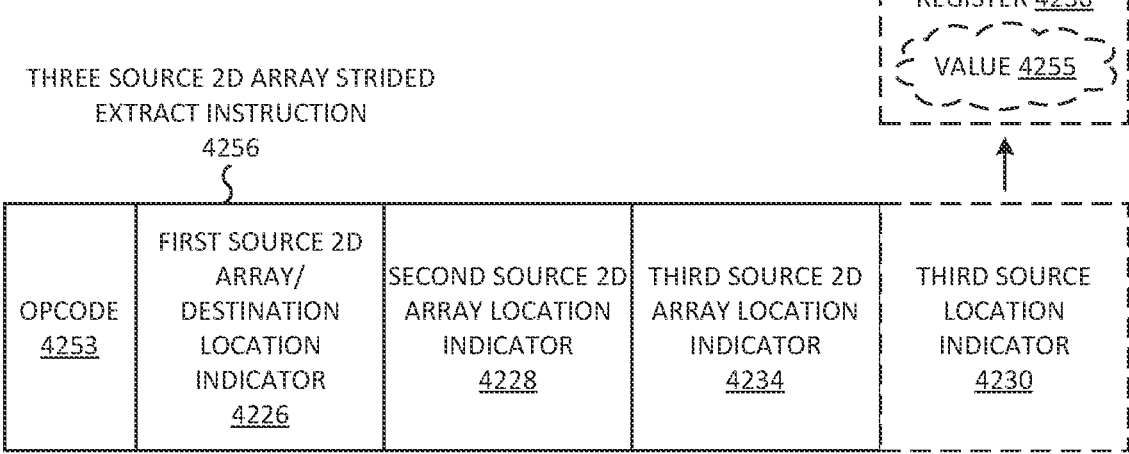

REGISTER 4236
VALUE 4255

| OPCODE 4253 | FIRST SOURCE 2D ARRAY/ DESTINATION LOCATION INDICATOR 4226 | SECOND SOURCE 2D ARRAY LOCATION INDICATOR 4228 | THIRD SOURCE 2D ARRAY LOCATION INDICATOR 4234 | THIRD SOURCE LOCATION INDICATOR 4230 |
|---|---|---|---|---|

SPECIFIC VECTOR FRIENDLY INSTRUCTION FORMAT 5700

FIG. 57C

PROCESSOR WITH AT LEAST ONE X86 INSTRUCTION SET CORE 6616

PROCESSOR WITHOUT AN X86 INSTRUCTION SET CORE 6614

HARDWARE

SOFTWARE

X86 BINARY CODE 6606

X86 COMPILER 6604

INSTRUCTION CONVERTER 6612

HIGH LEVEL LANGUAGE 6602

ALTERNATIVE INSTRUCTION SET BINARY CODE 6610

ALTERNATIVE INSTRUCTION SET COMPILER 6608

1

PROCESSORS, METHODS, SYSTEMS, AND INSTRUCTIONS TO SELECT AND STORE DATA ELEMENTS FROM TWO SOURCE TWO-DIMENSIONAL ARRAYS INDICATED BY PERMUTE CONTROL ELEMENTS IN A RESULT TWO-DIMENSIONAL ARRAY

BACKGROUND

Technical Field

Embodiments described herein generally relate to computer processor architecture, and more specifically to processing matrices.

Background Information

Matrices are increasingly important in many computing tasks such as machine learning and other bulk data processing. Deep Learning is a class of machine learning algorithms. Deep learning architectures, such as deep neural networks, have been applied to fields including computer vision, speech recognition, natural language processing, audio recognition, social network filtering, machine translation, bioinformatics, and drug design.

BRIEF DESCRIPTION OF THE DRAWINGS

The invention may best be understood by referring to the following description and accompanying drawings that are used to illustrate embodiments. In the drawings:

FIG. 11 illustrates power-of-two sized SIMD implementations wherein the accumulators use input sizes that are larger than the inputs to the multipliers according to an embodiment.

FIG. 15 illustrates an example of a matrix expressed in row major format and column major format.

FIG. 16 illustrates an example of usage of matrices (tiles).

2

Figure 18:
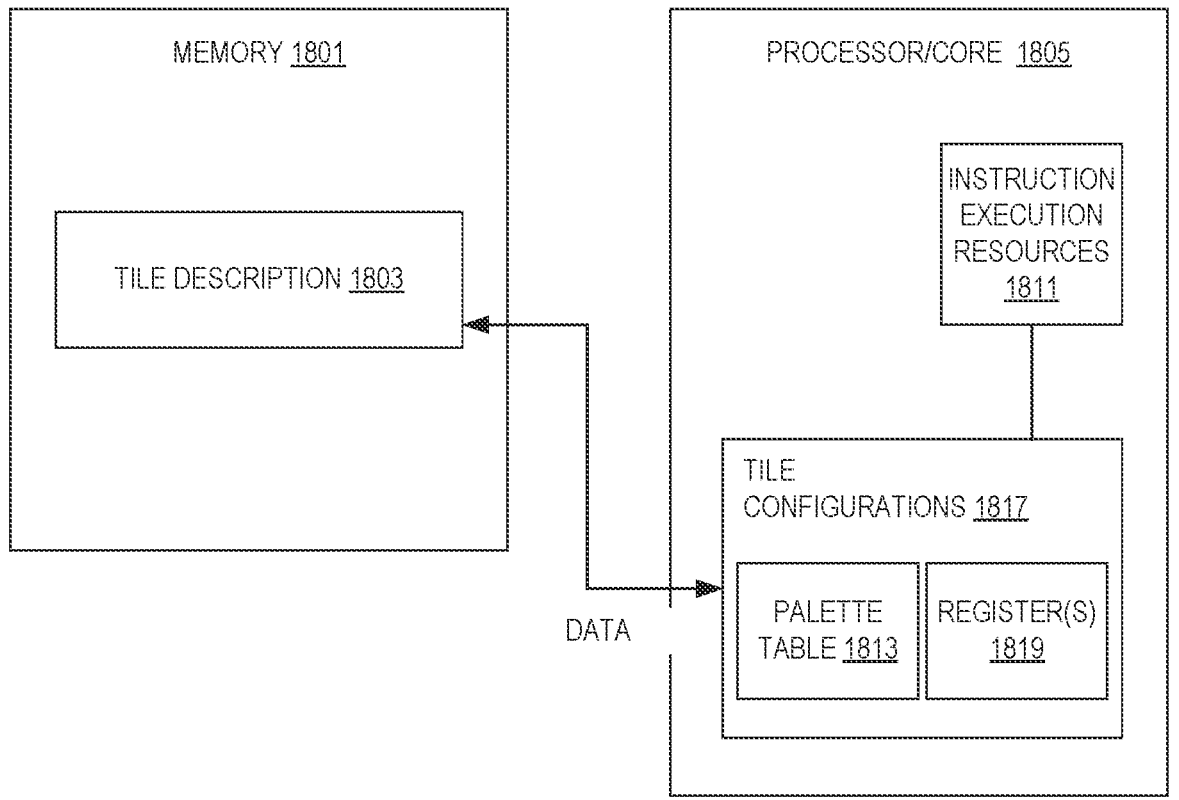

FIG. 18 illustrates support for configuration of the usage of tiles according to an embodiment.

FIG. 19 illustrates an embodiment of a description of the matrices (tiles) to be supported.

FIGS. 20(A)-(D) illustrate examples of register(s).

Figure 21:
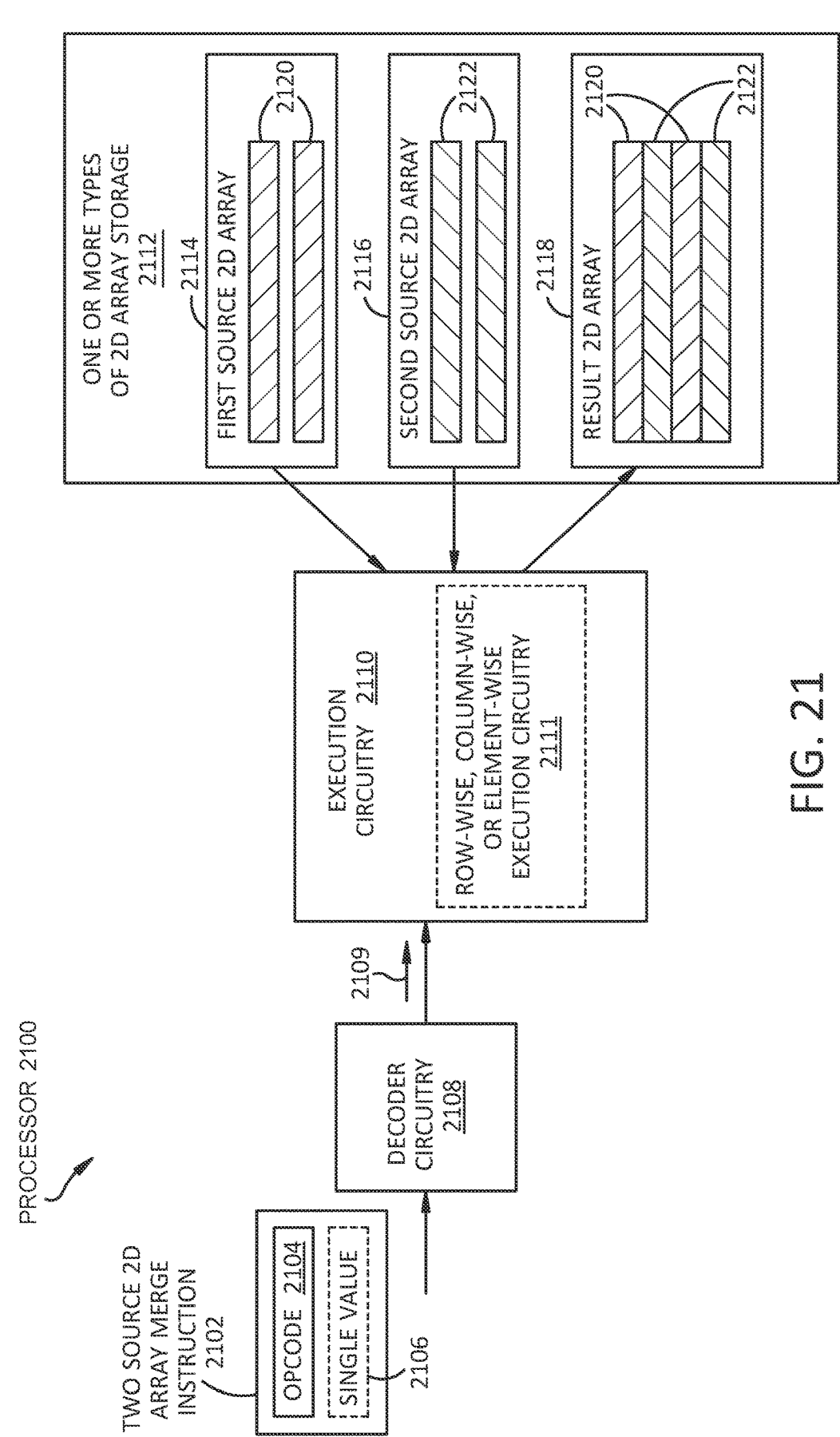

FIG. 21 is a block diagram of an embodiment of a processor that is operative to perform an embodiment of a two-dimensional (2D) array merge instruction.

FIG. 22 is a block diagram of a first example embodiment of a two source 2D array merge instruction.

FIG. 23 is a block diagram of a second example embodiment of a two source 2D array merge instruction.

FIG. 24 is a block diagram of a third example embodiment of a two source 2D array merge instruction.

FIGS. 25-32 are block diagrams of several illustrative example embodiments of processors that are operative to perform several illustrative example embodiments of 2D array merge instructions.

FIG. 33 illustrates an embodiment of method performed by a processor to process a two source 2D array merge instruction.

FIG. 34 illustrates an embodiment of method performed by a processor to process a two source 2D array merge instruction using emulation or binary translation.

Figure 35:
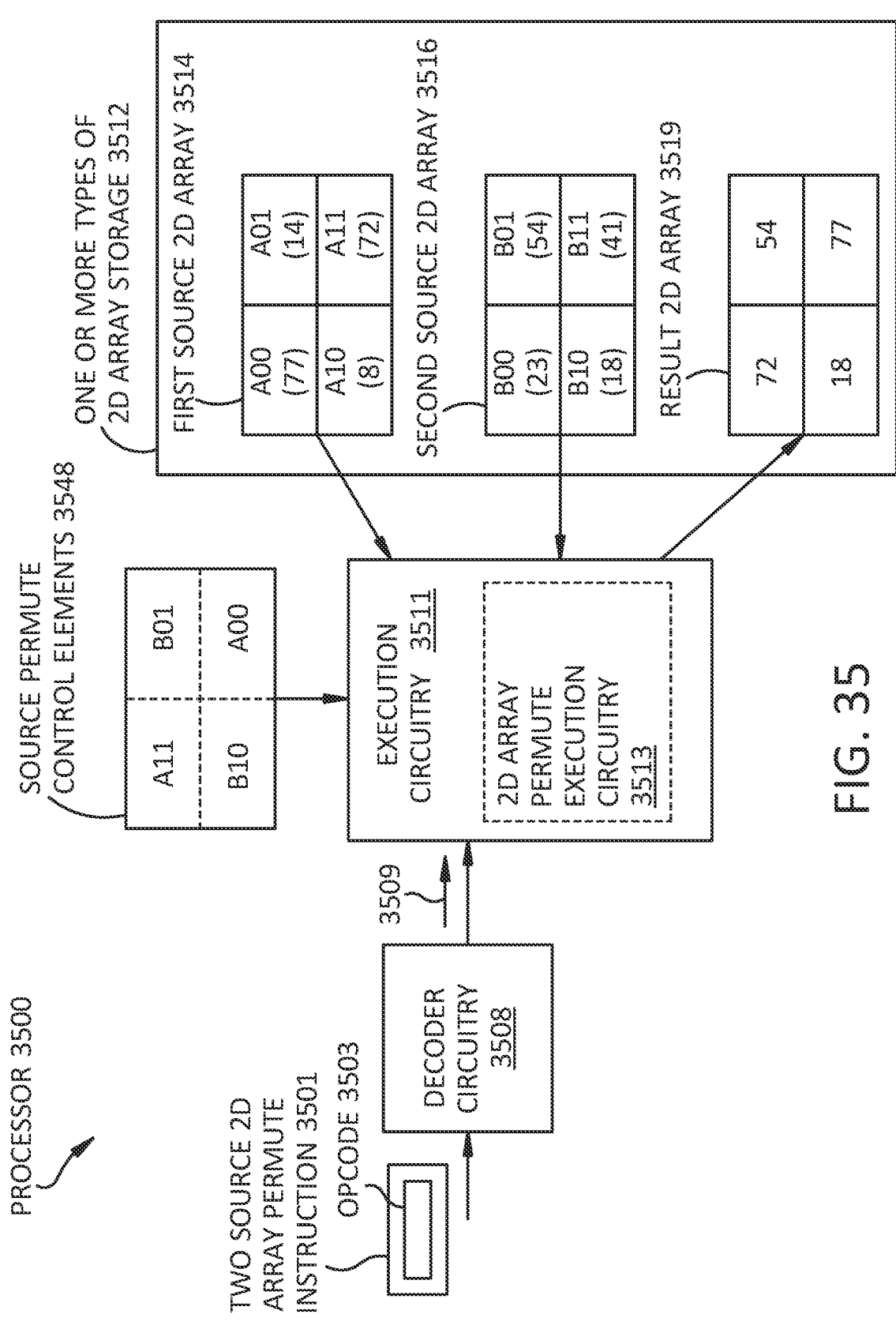

FIG. 35 is a block diagram of an embodiment of a processor that is operative to perform an embodiment of a two source 2D array permute instruction.

FIG. 36 is a block diagram of a first example embodiment of a two source 2D array permute instruction.

FIG. 37 is a block diagram of a second example embodiment of a two source 2D array permute instruction.

Figure 38:
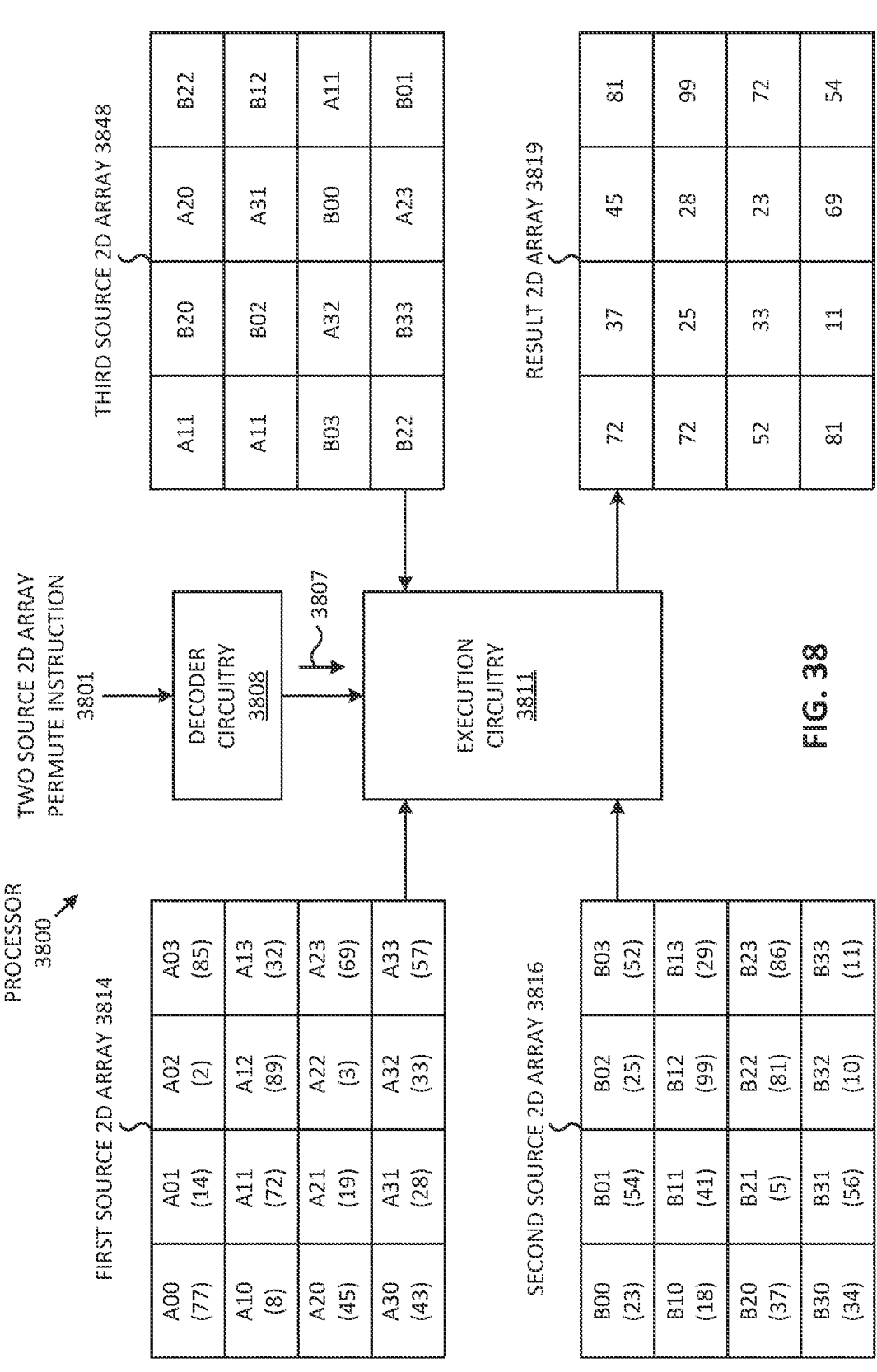
Figure 39:
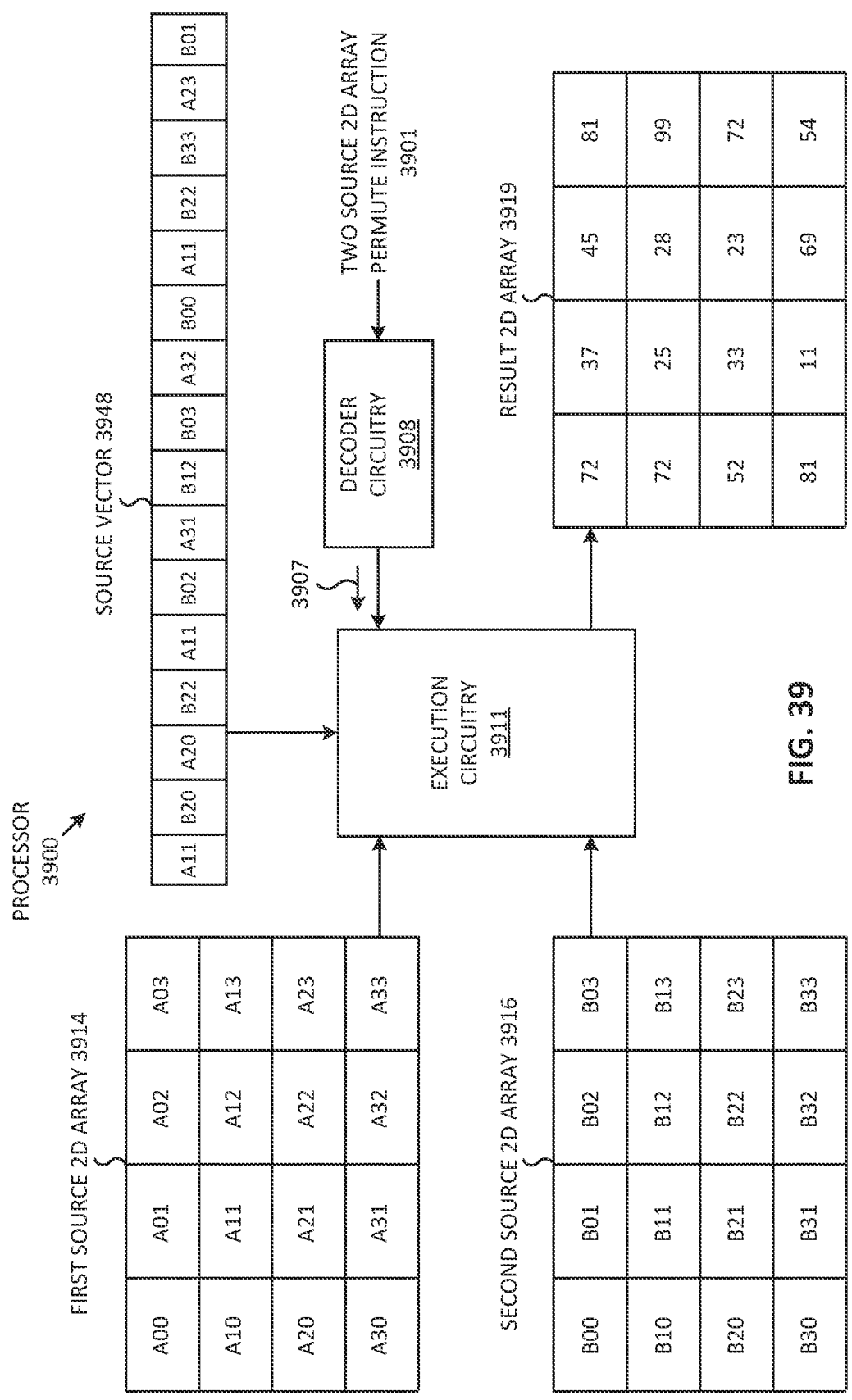

FIGS. 38-39 are block diagrams of several illustrative example embodiments of processors that are operative to perform several illustrative example embodiments of two source 2D array permute instructions.

Figure 40:
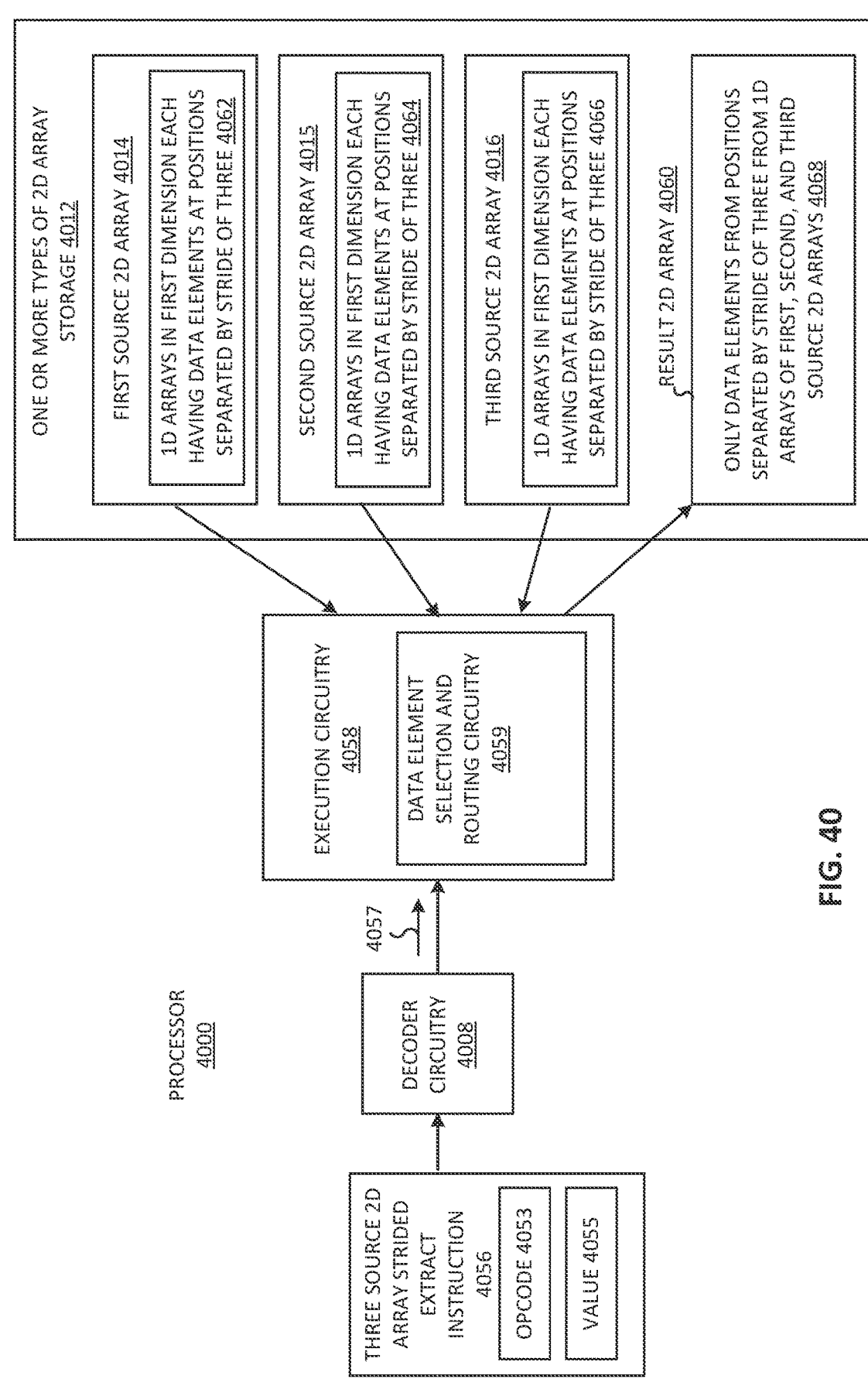

FIG. 40 is a block diagram of an embodiment of a processor that is operative to perform an embodiment of a three source 2D array strided extract instruction.

FIG. 41 is a block diagram of a first example embodiment of a three source 2D array strided extract instruction.

FIG. 42A is a block diagram of a second example embodiment of a three source 2D array strided extract instruction.

FIG. 42B is a block diagram of a third example embodiment of a three source 2D array strided extract instruction.

FIGS. 43-54 are block diagrams of several illustrative example embodiments of processors that are operative to perform several illustrative example embodiments of three source 2D array strided extract instructions.

Figures 55A, 55B, 55C:
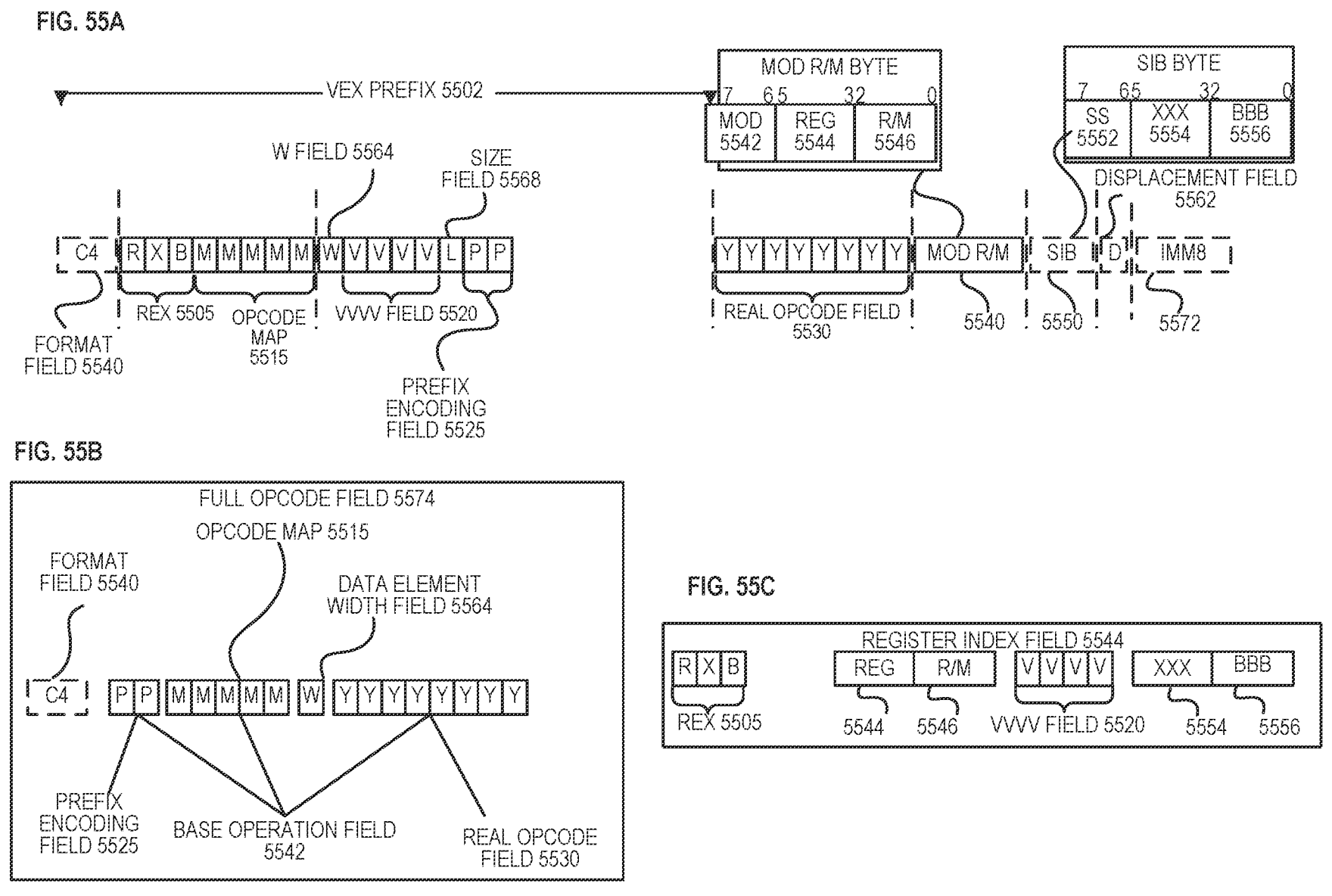

FIGS. 55A-55C are block diagrams illustrating a generic vector friendly instruction format and instruction templates thereof, according to embodiments of the invention.

Figure 56A:
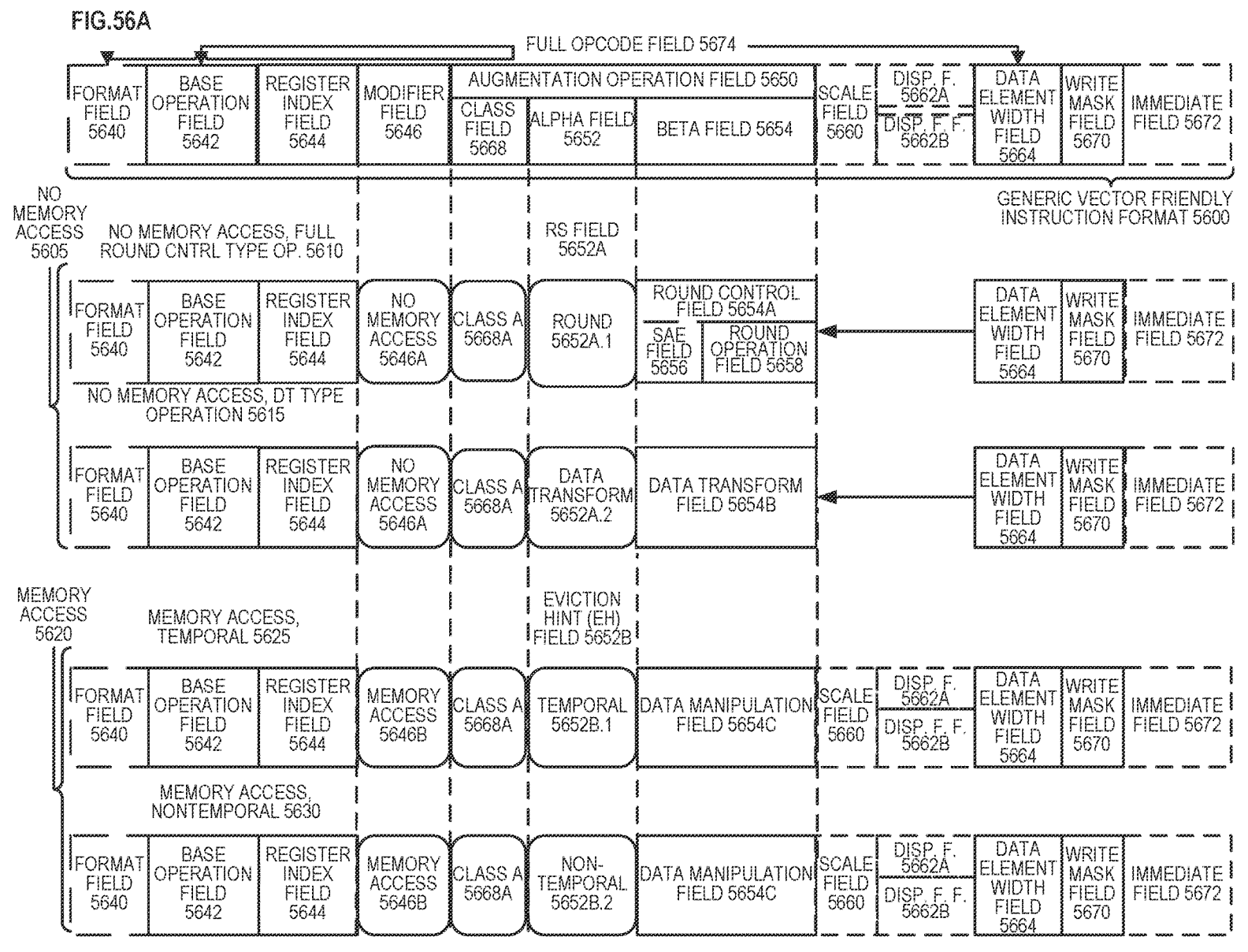
Figure 56B:
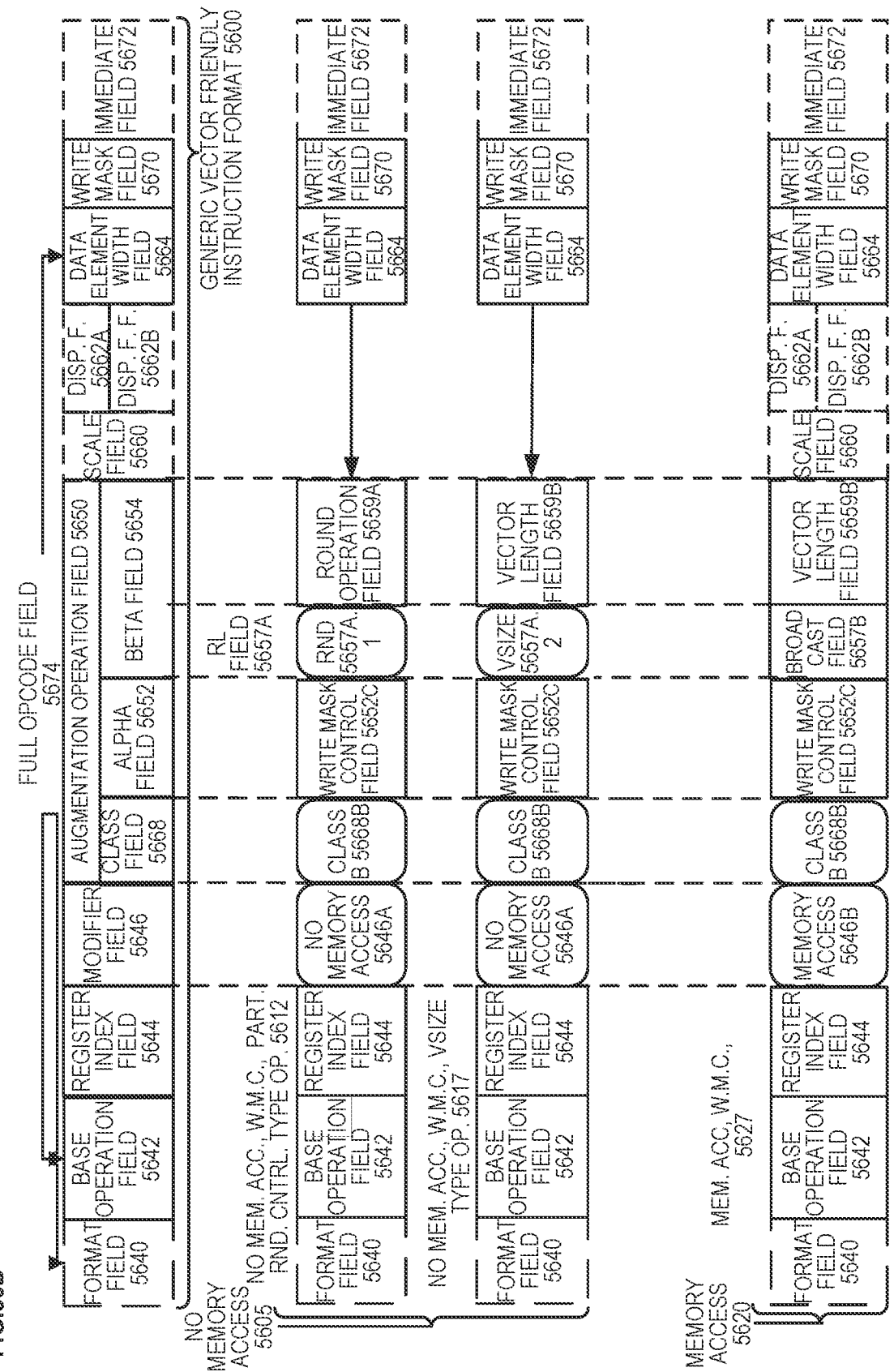

FIG. 56A-B is a block diagram illustrating an exemplary specific vector friendly instruction format and an opcode field, according to embodiments of the invention.

FIG. 57A-D is a block diagram illustrating an exemplary specific vector friendly instruction format and fields thereof, according to embodiments of the invention.

Figure 58:
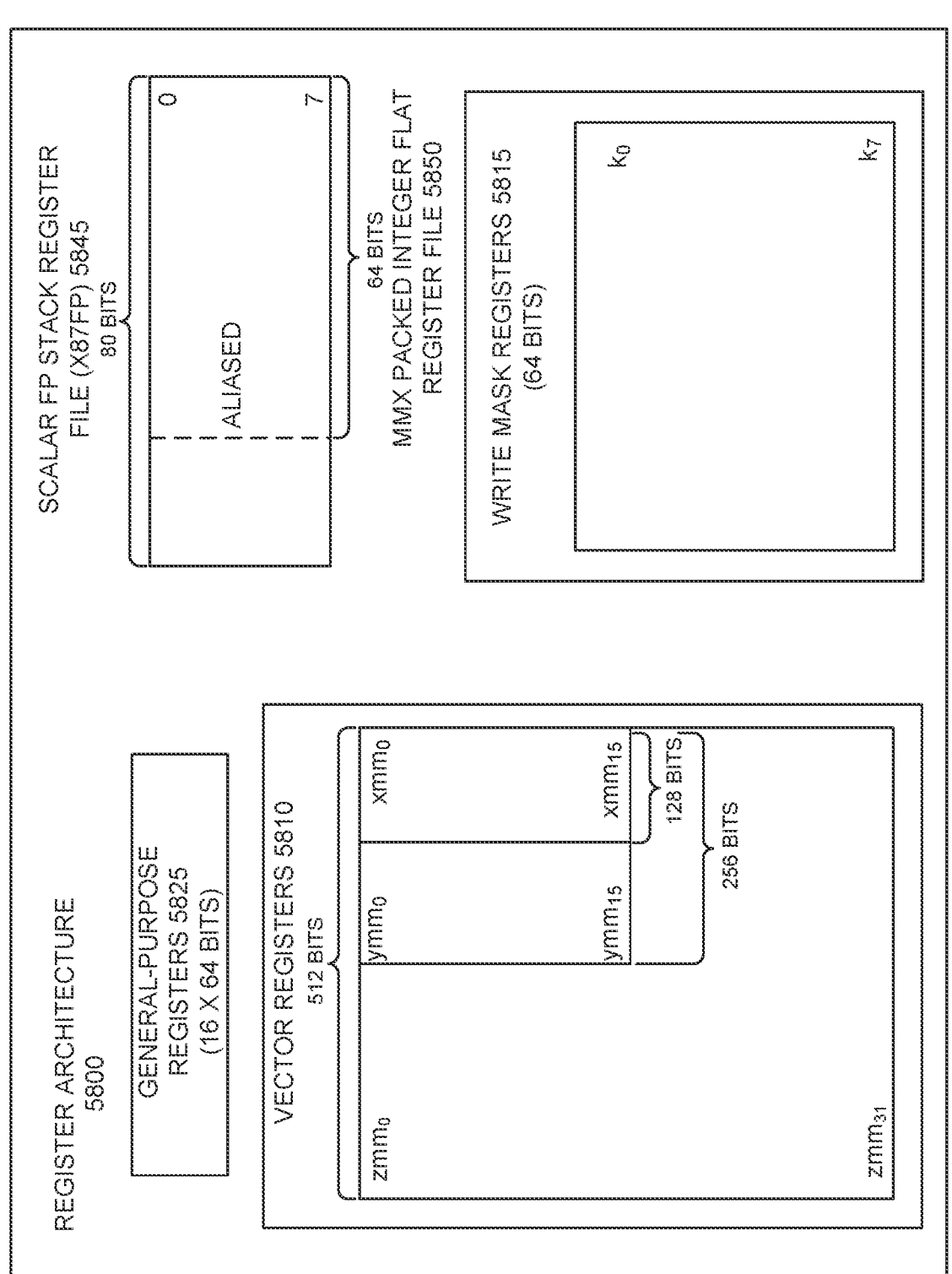

FIG. 58 is a block diagram of an embodiment of a register architecture.

Figures 59A, 59B:
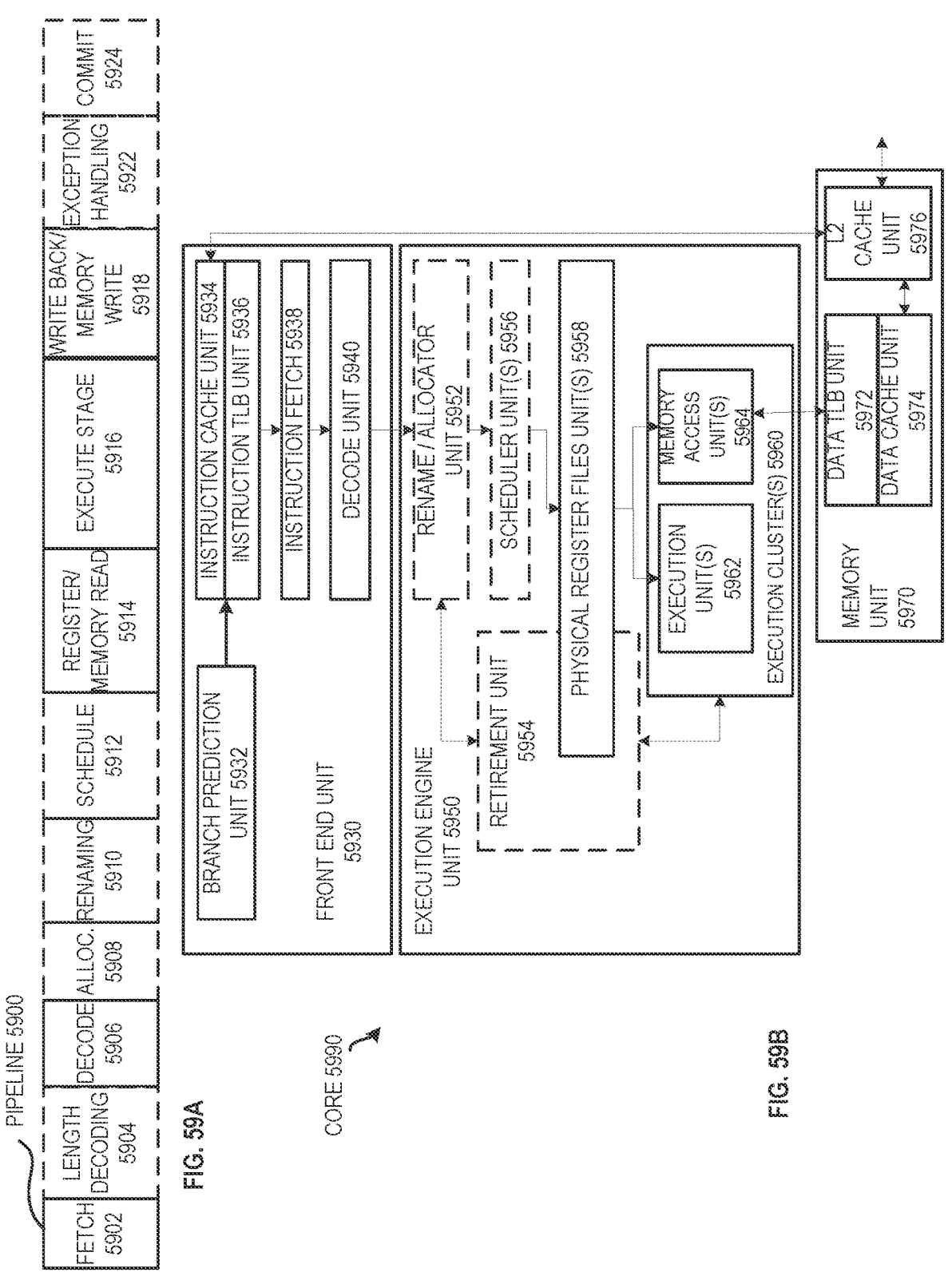

FIG. 59A is a block diagram illustrating an embodiment of an in-order pipeline and an embodiment of a register renaming out-of-order issue/execution pipeline.

FIG. 59B is a block diagram of an embodiment of processor core including a front end unit coupled to an execution engine unit and both coupled to a memory unit.

Figure 60B:
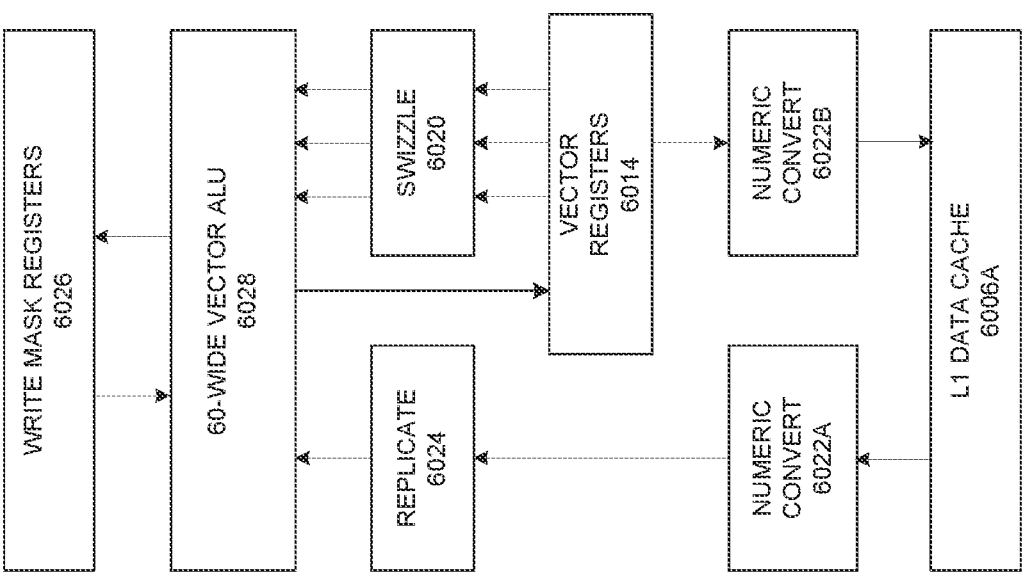
Figure 60A:
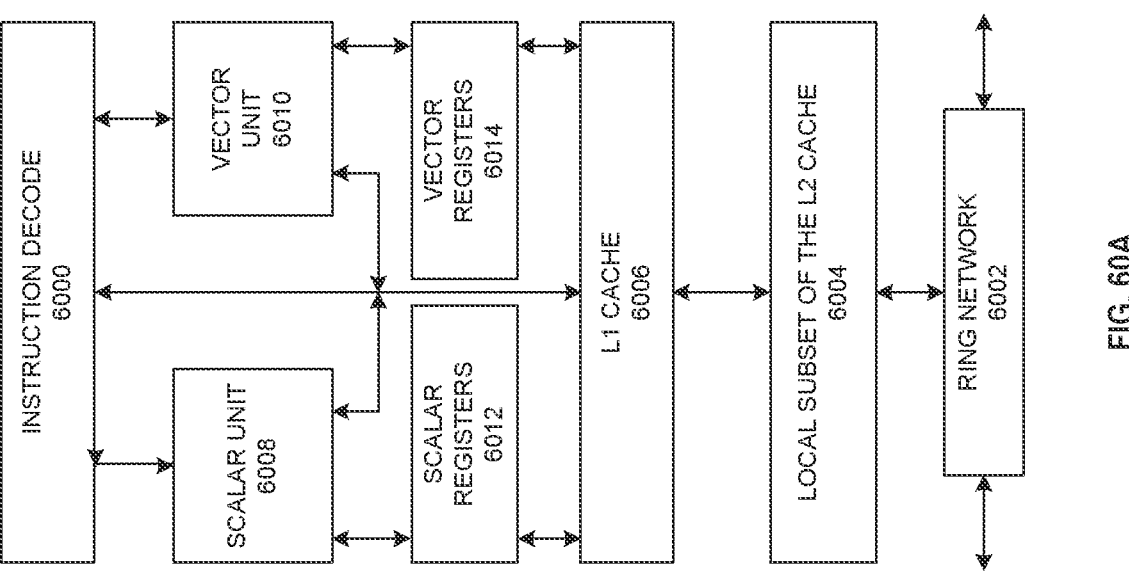

FIG. 60A is a block diagram of an embodiment of a single processor core, along with its connection to the on-die interconnect network, and with its local subset of the Level 2 (L2) cache.

FIG. 60B is a block diagram of an embodiment of an expanded view of part of the processor core of FIG. 60A.

Figure 61:
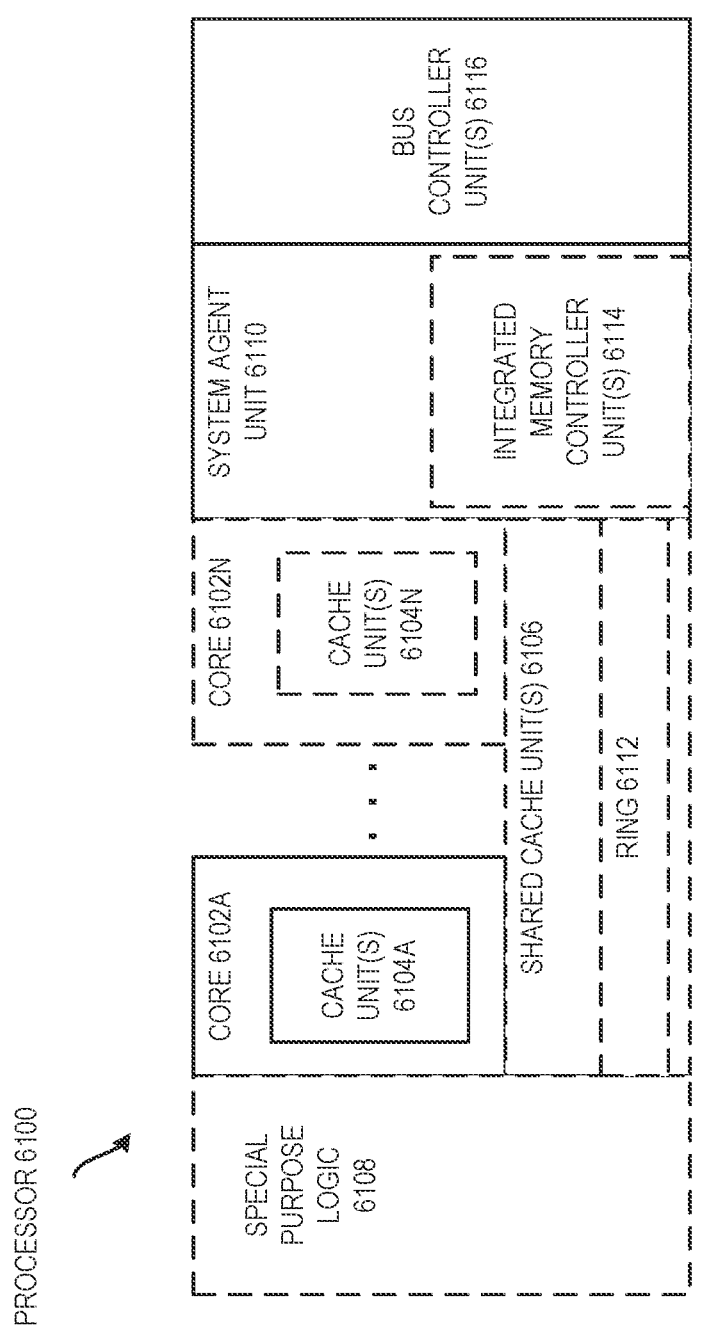

FIG. 61 is a block diagram of an embodiment of a processor that may have more than one core, may have an integrated memory controller, and may have integrated graphics.

Figure 62:
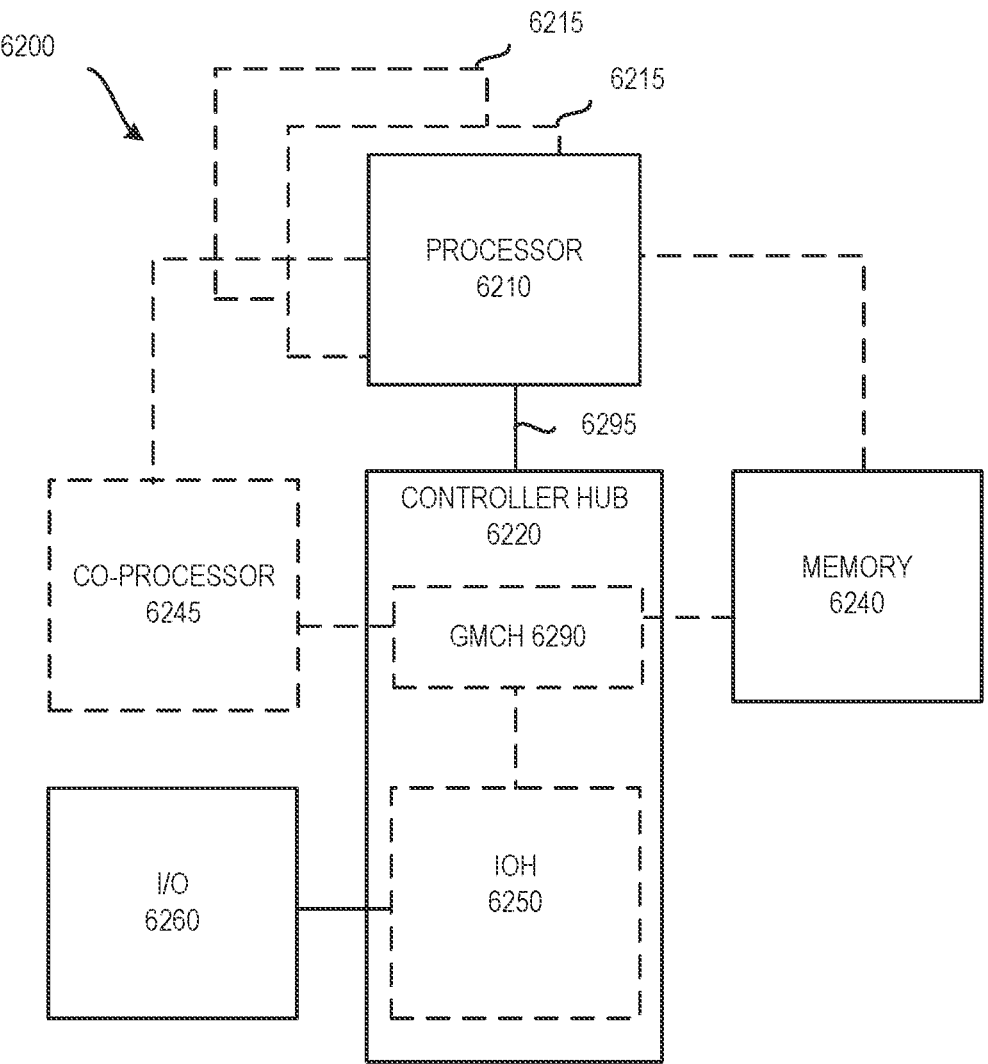

FIG. 62 is a block diagram of a first embodiment of a computer architecture.

Figure 63:
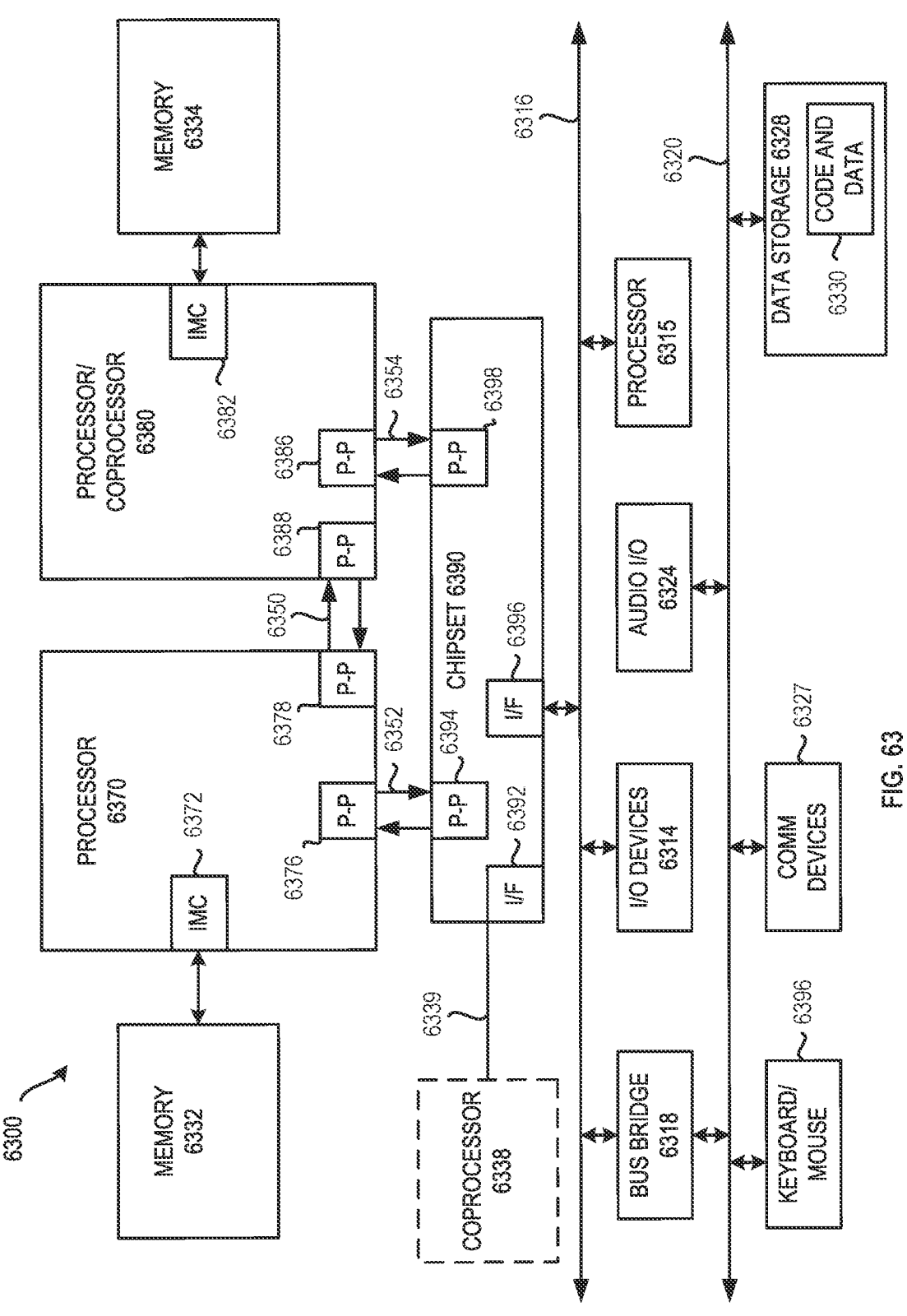

FIG. 63 is a block diagram of a second embodiment of a computer architecture.

Figure 64:
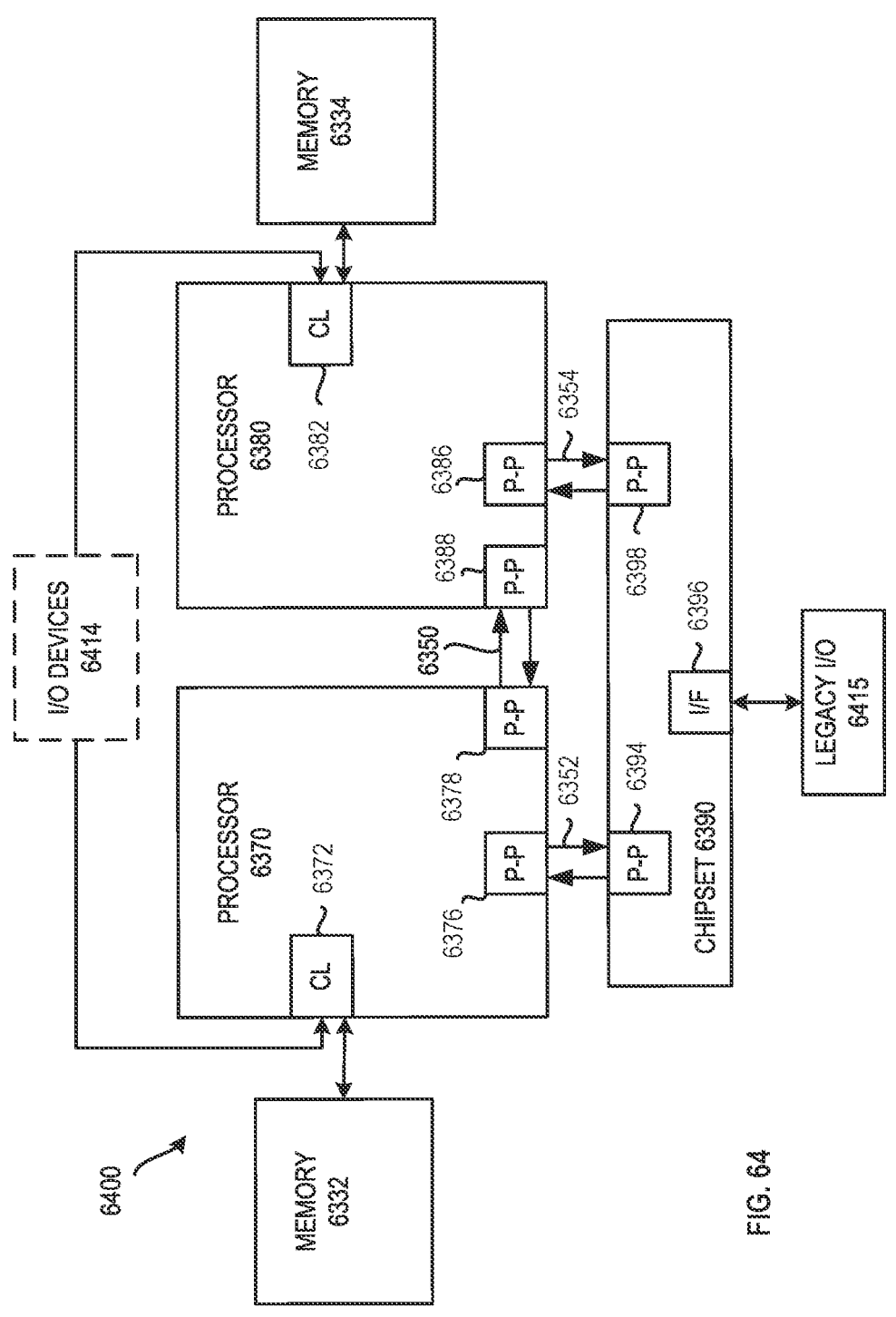

FIG. 64 is a block diagram of a third embodiment of a computer architecture.

Figure 65:
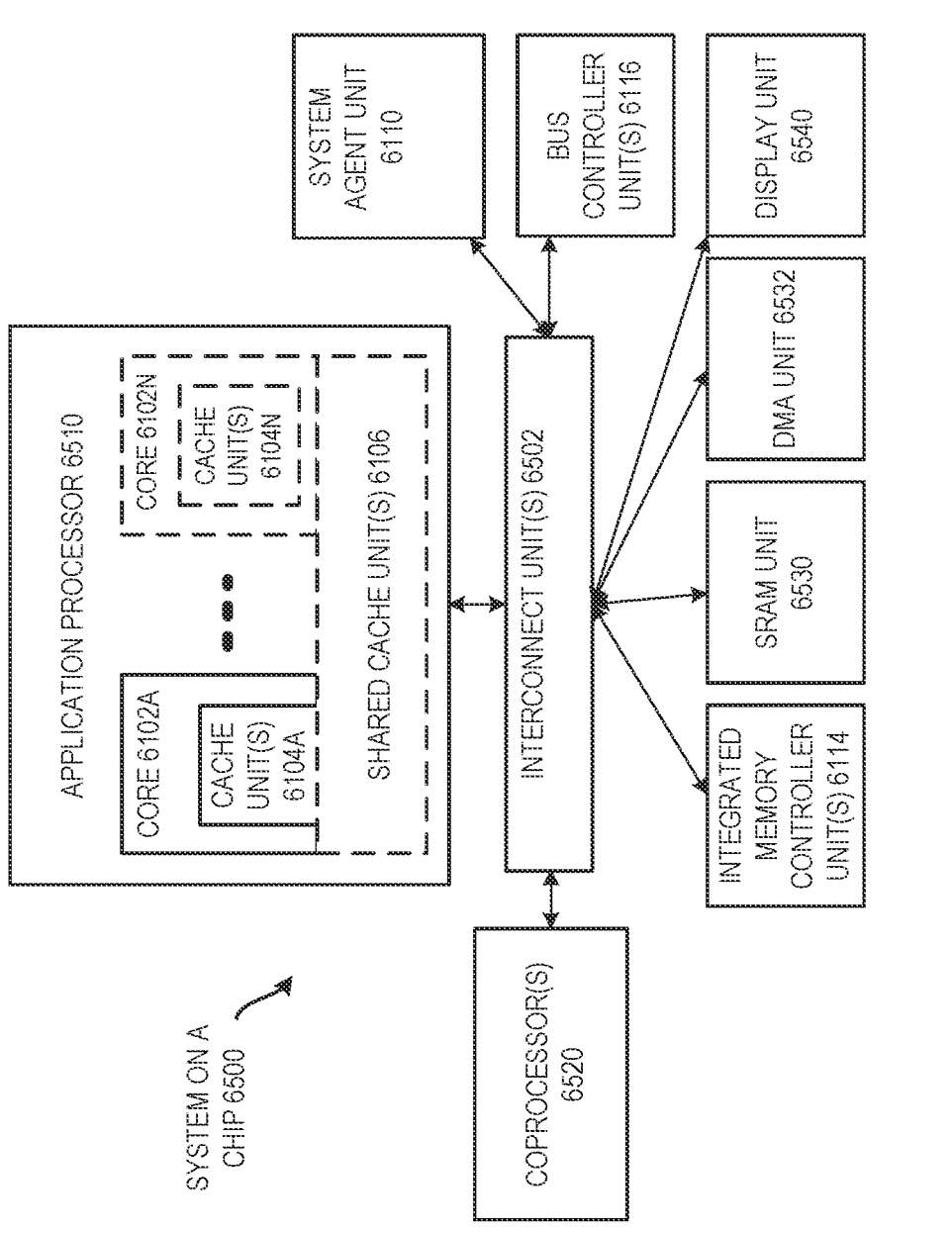

FIG. 65 is a block diagram of a fourth embodiment of a computer architecture.

Figure 66:
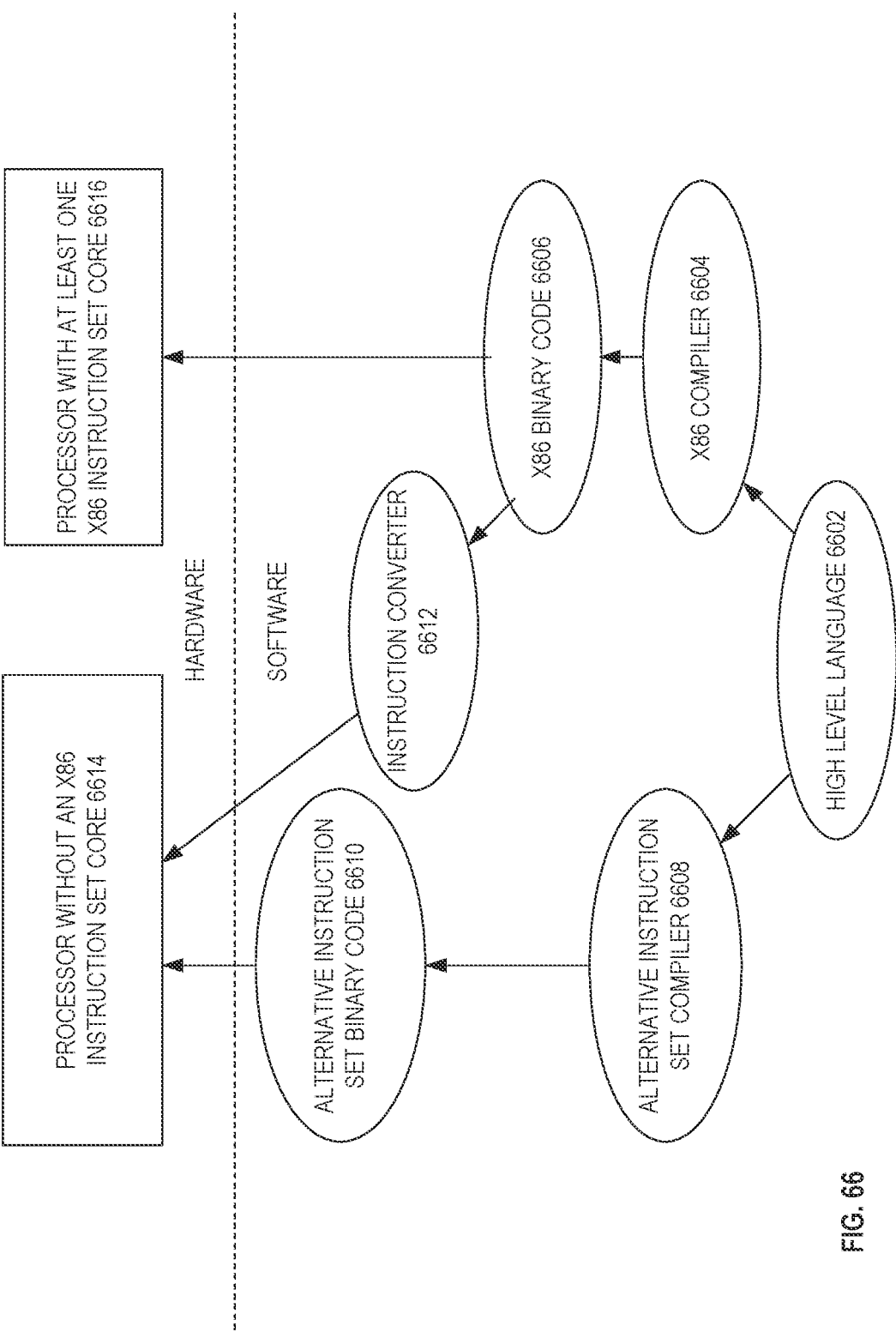

FIG. 66 is a block diagram of use of a software instruction converter to convert binary instructions in a source instruction set to binary instructions in a target instruction set, according to embodiments of the invention.

DETAILED DESCRIPTION OF EMBODIMENTS

The present disclosure relates to methods, apparatus, systems, instructions, and non-transitory computer-readable storage media to merge portions of two two-dimensional (2D) arrays to generate a result 2D array without values to explicitly specify the individual portions (e.g., per-portion control values). In the following description, numerous specific details are set forth (e.g., specific instruction operations, data formats, processor configurations, microarchitectural details, sequences of operations, etc.). However, embodiments may be practiced without these specific details. In other instances, well-known circuits, structures, and techniques have not been shown in detail to avoid obscuring the understanding of the description.

In many mainstream processors, handling matrices is a difficult and/or instruction intensive task. For example, rows of a matrix could be put into a plurality of packed data (e.g., SIMD or vector) registers and then operated on individually. For example, an add two 8×2 matrices may require a load or gather into four packed data registers depending upon data sizes. Then a first add of packed data registers corresponding to a first row from each matrix is performed and a second add of packed data registers corresponding to a second row from each matrix is performed. Then the resulting packed data registers are scattered back to memory. While for small matrices this scenario may be acceptable, it is often not acceptable with larger matrices.

Discussion

Described herein are mechanisms to support matrix operations in computer hardware such as central processing units (CPUs), graphic processing units (GPUs), and accelerators. The matrix operations utilize 2-dimensional (2-D) data structures representing one or more packed regions of memory such as registers. Throughout this description, these 2-D data structures are also sometimes referred to as tiles. Note that a matrix may be smaller than a tile (use less than all of a tile) or utilize a plurality of tiles (the matrix is larger than the size of any one tile). Throughout the description, matrix (tile) language is used to indicate operations performed using tiles that impact a matrix; whether or not that matrix is larger than any one tile is not typically relevant.

Each tile may be acted upon by different operations such as those that are detailed herein and include, but are not limited to: matrix (tile) multiplication, tile add, tile subtract, tile diagonal, tile zero, tile transform, tile dot product, tile broadcast, tile row broadcast, tile column broadcast, tile multiplication, tile multiplication and accumulation, tile move, etc. Additionally, support for operators such as the use of a scale and/or bias may be used with these operations or in support of non-numeric applications in the future, for instance, OpenCL "local memory," data compression/decompression, etc.

Portions of storage (such as memory (non-volatile and volatile), registers, cache, etc.) are arranged into tiles of different horizontal and vertical dimensions. For example, a tile may have horizontal dimension of 4 (e.g., four rows of a matrix) and a vertical dimension of 8 (e.g., 8 columns of the matrix). Typically, the horizontal dimension is related to element sizes (e.g., 2-, 4-, 8-, 16-, 32-, 64-, 128-bit, etc.). Multiple datatypes (single precision floating-point, double precision floating-point, integer, etc.) may be supported.

Exemplary Usage of Configured Tiles

In some embodiments, tile parameters can be configured. For example, a given tile may be configured to provide tile options. Exemplary tile options include but are not limited to: a number of rows of the tile, a number of columns of the tile, whether the tile is VALID, and whether the tile consists of a PAIR of equal-sized tiles.

Figure 1A:
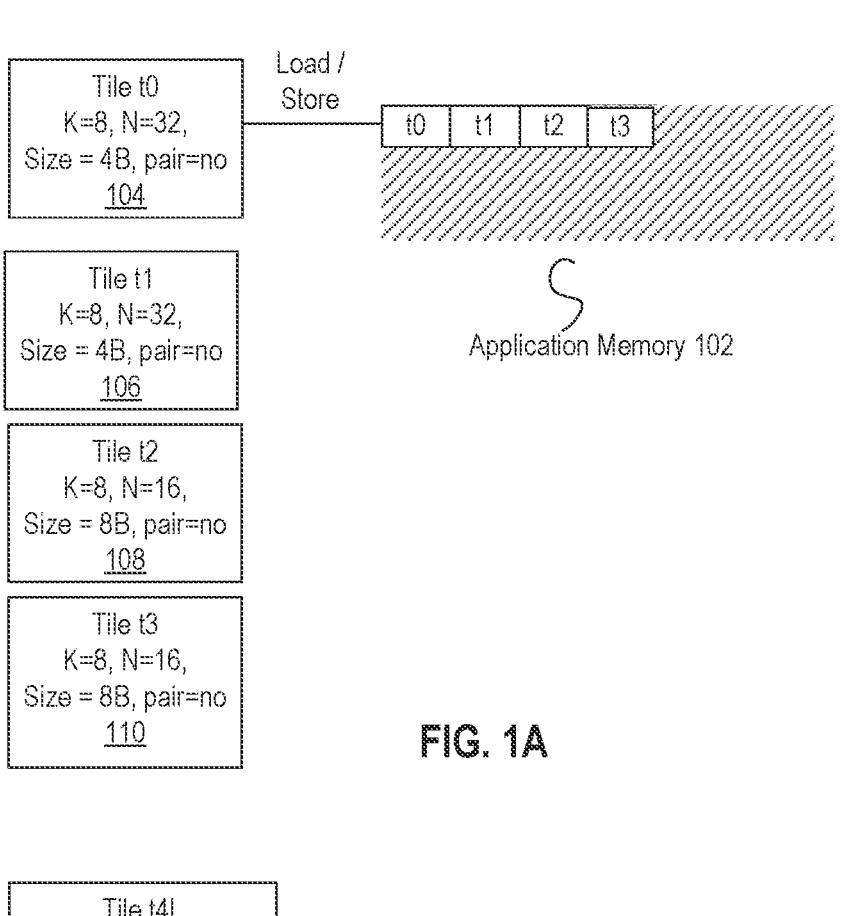
FIG. 1A illustrates an embodiment of configured tiles.

FIG. 1A illustrates an embodiment of configured tiles. As shown, 4 kB of application memory 102 have stored thereon 4 1 kB titles, tile t0 104, tile t1 106, tile t2 108, and tile t3 110. In this example, the 4 tiles do not consist of pairs, and each have elements arranged in rows and columns. Tile t0 104 and tile t1 106 have K rows and N columns of 4-byte elements (e.g., single precision data), where K equals 8 and N=32. Tile t2 108 and tile t3 110 have K rows and N/2 columns of 8-byte elements (e.g., double precision data). As the double precision operands are twice the width of single precision, this configuration is consistent with a palette, used to provide tile options, supplying at least 4 names with total storage of at least 4 kB. In operation, the tiles can be loaded from and stored to memory using load and store operations. Depending upon the instruction encoding scheme used, the amount of available application memory, as well as the size, number, and configuration of available tiles varies.

Figure 1B:
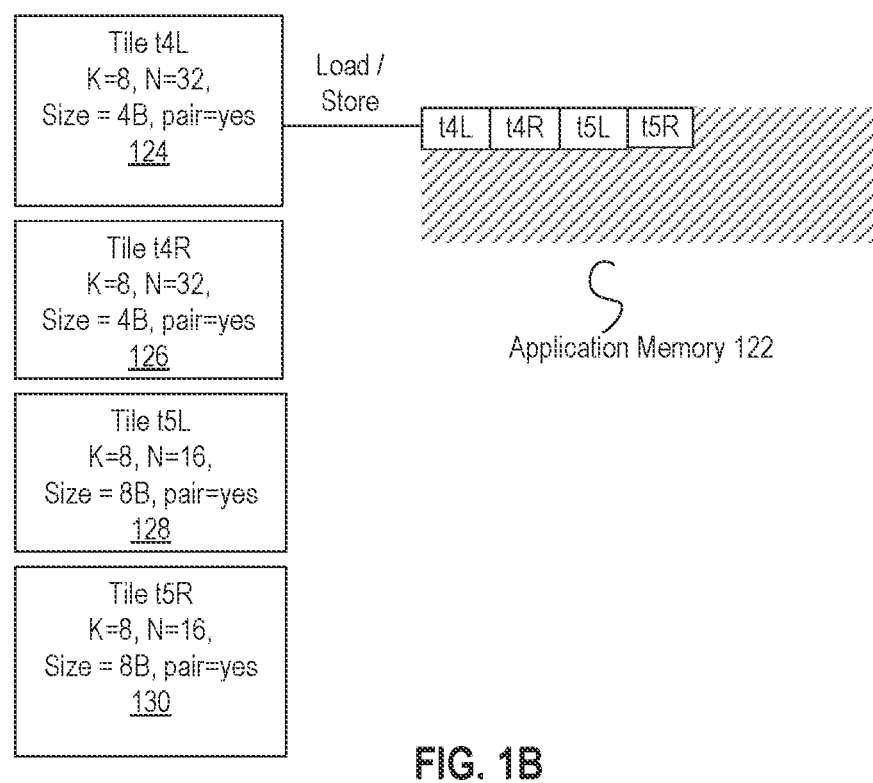
FIG. 1B illustrates an embodiment of configured tiles.

FIG. 1B illustrates an embodiment of configured tiles. As shown, 4 kB of application memory 122 have stored thereon 2 pairs of 1 kB-titles, the first pair being tile t4L 124 and tile t4R 126, and the second pair being tile t5L 128 and tile t5R 130. As shown the pairs of tiles are divided into a left tile and a right tile. In other embodiments, the pair of tiles are divided into an even tile and an odd tile. In this example, the 4 tiles each have elements arranged in rows and columns. Tile t4L 124 and tile t4R 126 have K rows and N columns of 4-byte elements (e.g., single precision floating-point data), where K equals 8 and N equals 32. Tile t5L 128 and tile t5R 130 have K rows and N/2 columns of 8-byte elements (e.g., double precision floating-point data). As the double precision operands are twice the width of single precision, this configuration is consistent with a palette, used to provide tile options, supplying at least 2 names with total storage of at least 4 kB. The four tiles of FIG. 1A use 4 names, each naming a 1 kB tile, whereas the 2 pairs of tiles in FIG. 1B can use 2 names to specify the paired tiles. In some embodiments, tile instructions accept a name of a paired tile as an operand. In operation, the tiles can be loaded from and stored to memory using load and store operations. Depending upon the instruction encoding scheme used, the amount of available application memory, as well as the size, number, and configuration of available tiles varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as:

$$\text{Tile Max Rows=Architected Storage/(The Number of Palette Names*The Number of Bytes per row)}.$$

As such, an application can be written such that a fixed usage of names will be able to take advantage of different storage sizes across implementations.

Configuration of tiles is done using a matrix (tile) configuration ("TILECONFIG") instruction, where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

Exemplary Tile Storage Types

Figure 2:
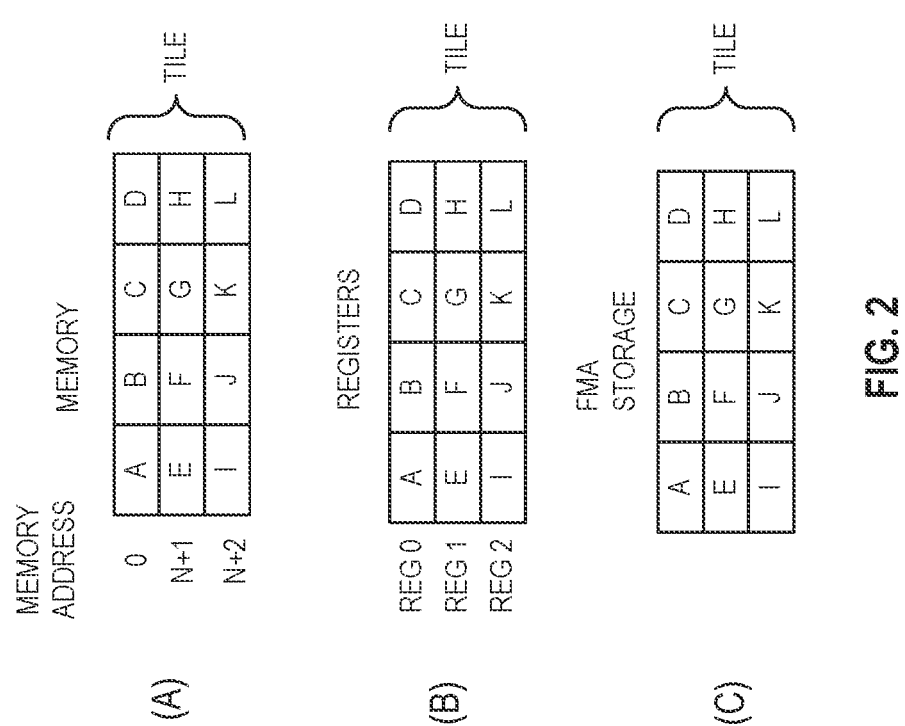
FIG. 2 illustrates several examples of matrix storage.

FIG. 2 illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILE-STORE instructions, or other instruction references to application memory as a TILE operand in load-op instructions, are, in some embodiments, restartable to handle (up to) 2*rows of page faults, unmasked floating-point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiple accumulate (FMA) circuit used in tile operations. This storage may be inside of an FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCR0 bits are used in XSAVE, one for TILECONFIG metadata and one bit corresponding to actual tile payload data. TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64-byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64-byte rows, there would be 16 rows, so in this example, the last 6 rows would also be zeroed.

In some embodiments, a context restore instruction (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating-point operations also allow for unmasked floating-point exceptions, with the masking of the exceptions controlled by a control and/or status register.

To support restarting instructions after these events, the instructions store information in the start registers detailed below.

Matrix (Tile) Operation Systems

Exemplary Hardware Support

Figure 3:
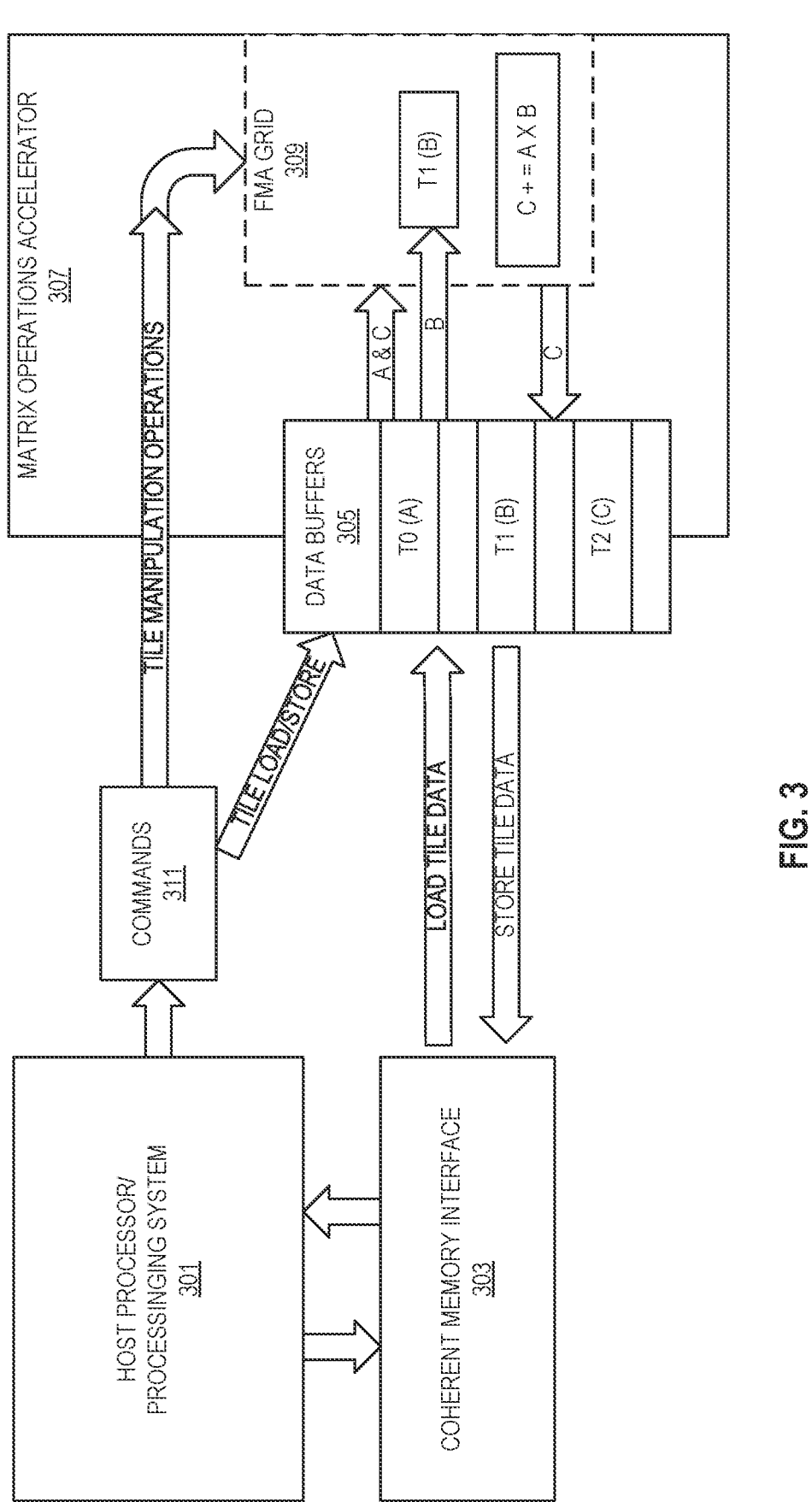
FIG. 3 illustrates an embodiment of a system utilizing a matrix (tile) operations accelerator.

FIG. 3 illustrates an embodiment of a system utilizing a matrix (tile) operations accelerator. In this illustration, a host processor/processing system 301 communicates commands 311 (e.g., matrix manipulation operations such as arithmetic or matrix manipulation operations, or load and store operations) to a matrix operations accelerator 307. However, this is shown this way for discussion purposes only. As detailed later, this accelerator 307 may be a part of a processing core. Typically, commands 311 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 307 to handle.

Figure 4:
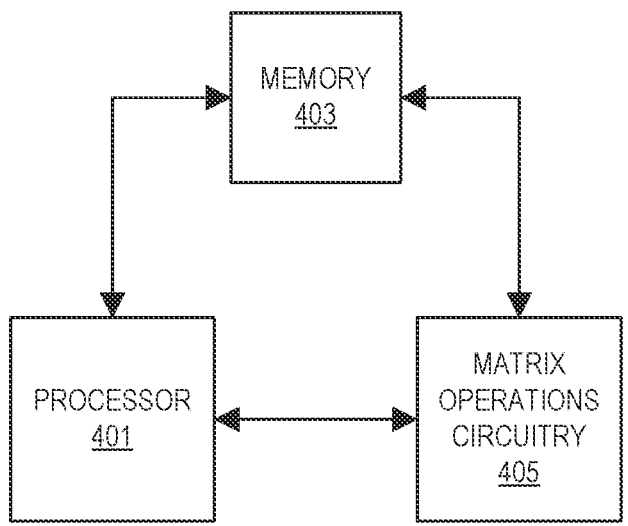
FIGS. 4 and 5 show different embodiments of how memory is shared using a matrix operations accelerator.
Figure 5:
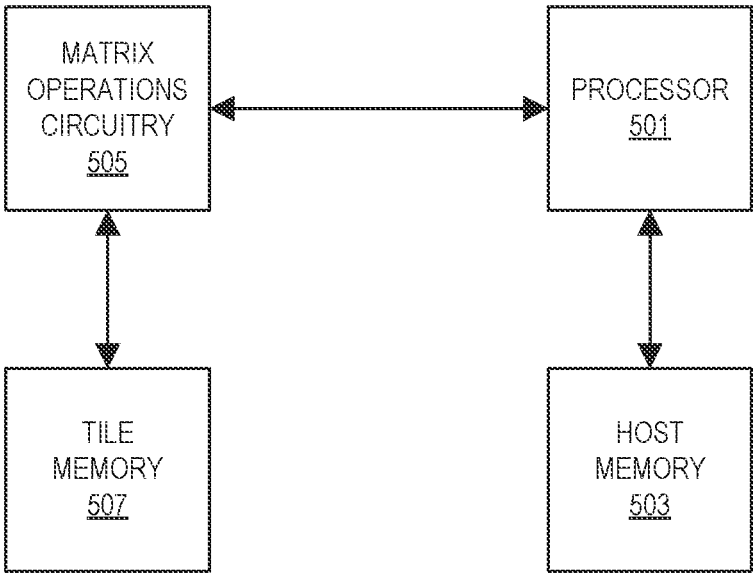

In this example, a coherent memory interface 303 is coupled to the host processor/processing system 301 and matrix operations accelerator 307 such that they can share memory. FIGS. 4 and 5 show different embodiments of how memory is shared using a matrix operations accelerator. As shown in FIG. 4, the host processor 401 and matrix operations accelerator circuitry 405 share the same memory 403. FIG. 5 illustrates an embodiment where the host processor 501 and matrix operations accelerator 505 do not share memory but can access each other's memory. For example, processor 501 can access tile memory 507 and utilize its host memory 503 as normal. Similarly, the matrix operations accelerator 505 can access host memory 503, but more typically uses its own memory 507. Note these memories may be of different types.

In some embodiments, tiles are supported using an overlay over physical registers. For example, a tile may utilize 16 1,024-bit registers, 32 512-bit registers, etc. depending on the implementation. In some embodiments, the matrix operations utilize 2-dimensional (2-D) data structures representing one or more packed regions of memory such as registers. Throughout this description, these 2-D data structures are sometimes referred to as tiles or tile registers.

In some embodiments, the matrix operations accelerator 307 includes a plurality of FMAs 309 coupled to data buffers 305 (in some implementations, one or more of these buffers 305 are stored in the FMAs of the grid as shown). The data buffers 305 buffer tiles loaded from memory and/or tiles to be stored to memory (e.g., using a tileload or tilestore instruction). Data buffers may be, for example, a plurality of registers. Typically, these FMAs are arranged as a grid of chained FMAs 309 which are able to read and write tiles. In this example, the matrix operations accelerator 307 is to perform a matrix multiply operation using tiles T0, T1, and T2. At least one of tiles is housed in the FMA grid 309. In some embodiments, all tiles in an operation are stored in the FMA grid 309. In other embodiments, only a subset is stored in the FMA grid 309. As shown, T1 is housed and T0 and T2 are not. Note that A, B, and C refer to the matrices of these tiles which may or may not take up the entire space of the tile.

Figure 6:
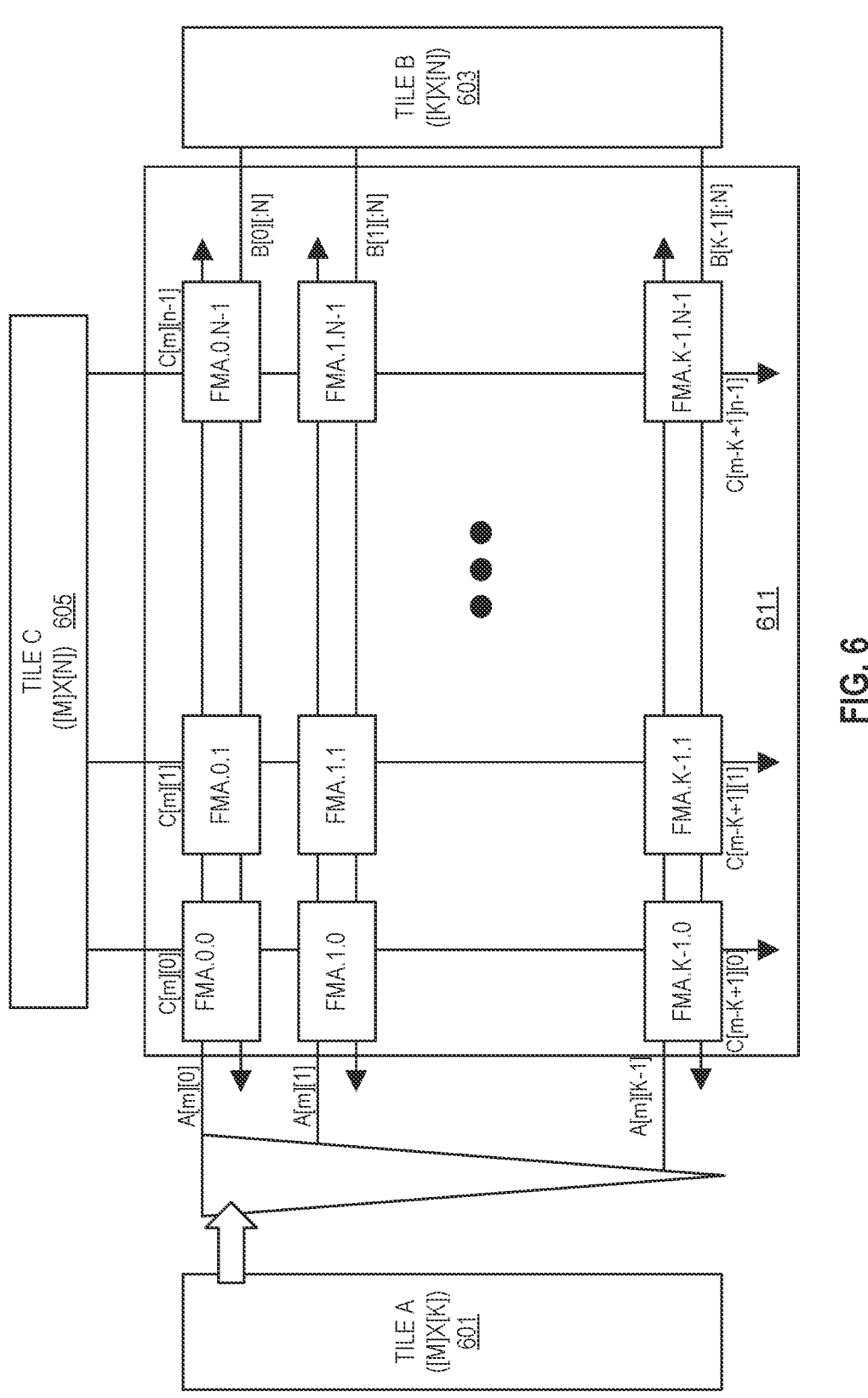
FIG. 6 illustrates an embodiment of matrix multiply accumulate operation using tiles ("TMMA").

FIG. 6 illustrates an embodiment of matrix multiply accumulate operation using tiles ("TMMA").

The number of rows in the matrix (TILE A 601) matches the number of serial (chained) FMAs comprising the computation's latency. An implementation is free to recirculate on a grid of smaller height, but the computation remains the same.

The source/destination vector comes from a tile of N rows (TILE C 605) and the grid of FMAs 611 performs N vector-matrix operations resulting in a complete instruction performing a matrix multiplication of tiles. Tile B 603 is the other vector source and supplies "broadcast" terms to the FMAs in each stage.

In operation, in some embodiments, the elements of matrix B (stored in a tile B 603) are spread across the rectangular grid of FMAs. Matrix B (stored in tile A 601) has its elements of a row transformed to match up with the columnar dimension of the rectangular grid of FMAs. At each FMA in the grid, an element of A and B are multiplied and added to the incoming summand (from above in the Figure) and the outgoing sum is passed to the next row of FMAs (or the final output).

The latency of a single step is proportional to K (row height of matrix B) and dependent TMMAs typically have enough source-destination rows (either in a single tile or across tile) to hide that latency. An implementation may also split the SIMD (packed data element) dimension M (row height of matrix A) across time steps, but this simply changes the constant that K is multiplied by. When a program specifies a smaller K than the maximum enumerated by the TMACC, an implementation is free to implement this with "masking" or "early outs."

The latency of an entire TMMA is proportional to N*K. The repeat rate is proportional to N. The number of MACs per TMMA instruction is N*K*M.

Figure 7:
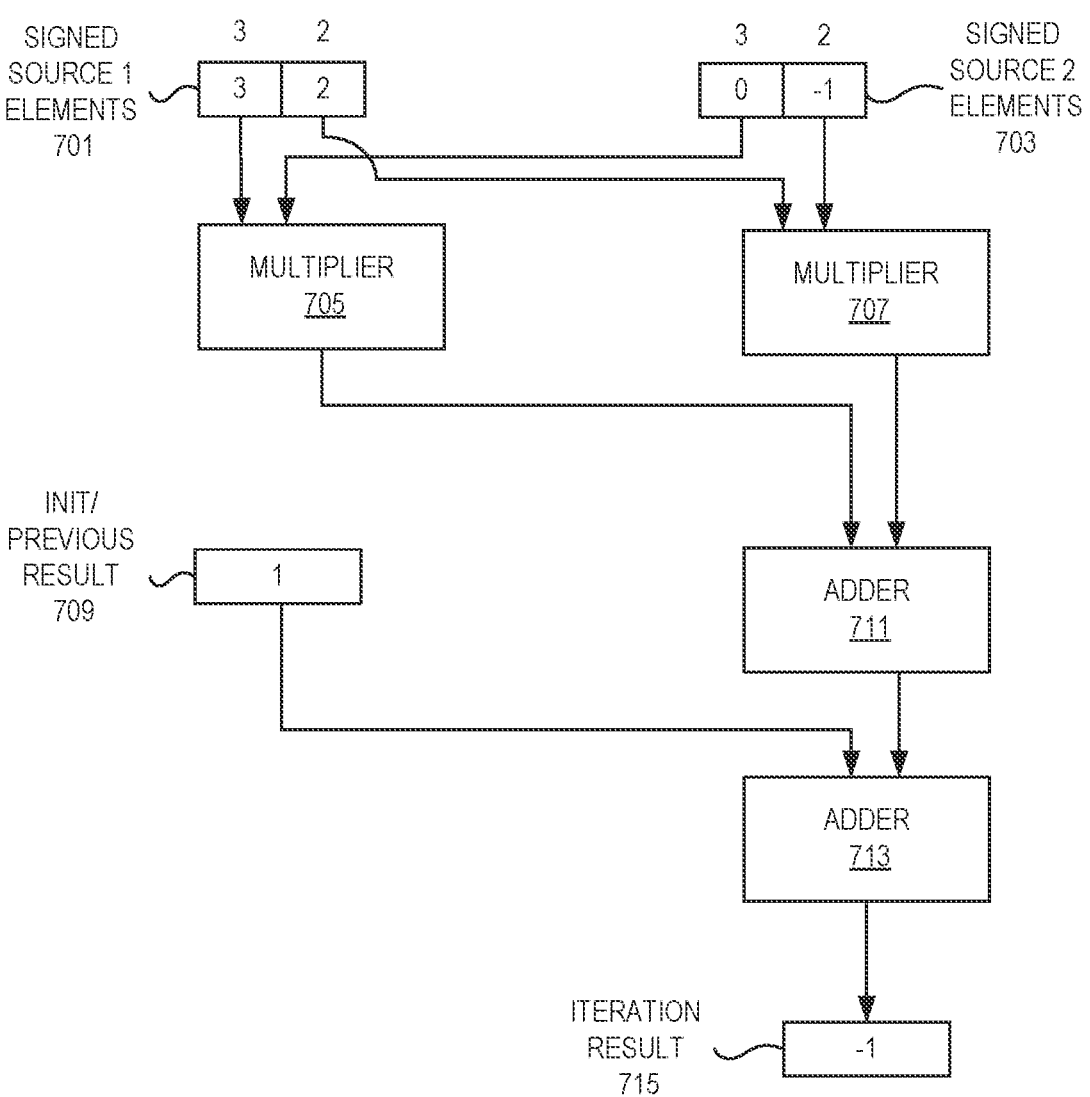
FIG. 7 illustrates an embodiment of a subset of the execution of an iteration of a chained fused multiply accumulate instruction.

FIG. 7 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 701) and a second signed source (source 2 703) each have four packed data elements. Each of these packed data elements stores signed data such as floating-point data. A third signed source (source 3 709) has two packed data elements, each of which stores signed data. The sizes of the first and second signed sources 701 and 703 are half that of the third signed source (initial value or previous result) 709. For example, the first and second signed sources 701 and 703 could have 32-bit packed data elements (e.g., single precision floating-point) while the third signed source 709 could have 64-bit packed data elements (e.g., double precision floating-point).

In this illustration, only the two most significant packed data element positions of the first and second signed sources 701 and 703 and the most significant packed data element position of the third signed source 709 are shown. Of course, the other packed data element positions would also be processed.

As illustrated, packed data elements are processed in pairs. For example, the data of the most significant packed data element positions of the first and second signed sources 701 and 703 are multiplied using a multiplier circuit 705, and the data from second most significant packed data element positions of the first and second signed sources 701 and 703 are multiplied using a multiplier circuit 707. In some embodiments, these multiplier circuits 705 and 707 are reused for other packed data elements positions. In other embodiments, additional multiplier circuits are used so that the packed data elements are processed in parallel. In some contexts, parallel execution is done using lanes that are the size of the signed third source 709. The results of each of the multiplications are added using addition circuitry 711.

The result of the addition of the results of the multiplications is added to the data from most significant packed data element position of the signed source 3 709 (using a different adder 713 or the same adder 711).

Finally, the result of the second addition is either stored into the signed destination 715 in a packed data element position that corresponds to the packed data element position used from the signed third source 709 or passed on to the next iteration if there is one. In some embodiments, a writemask is applied to this storage such that if a corresponding writemask (bit) is set, the storage happens, and, if not set, the storage does not happen.

Figure 8:
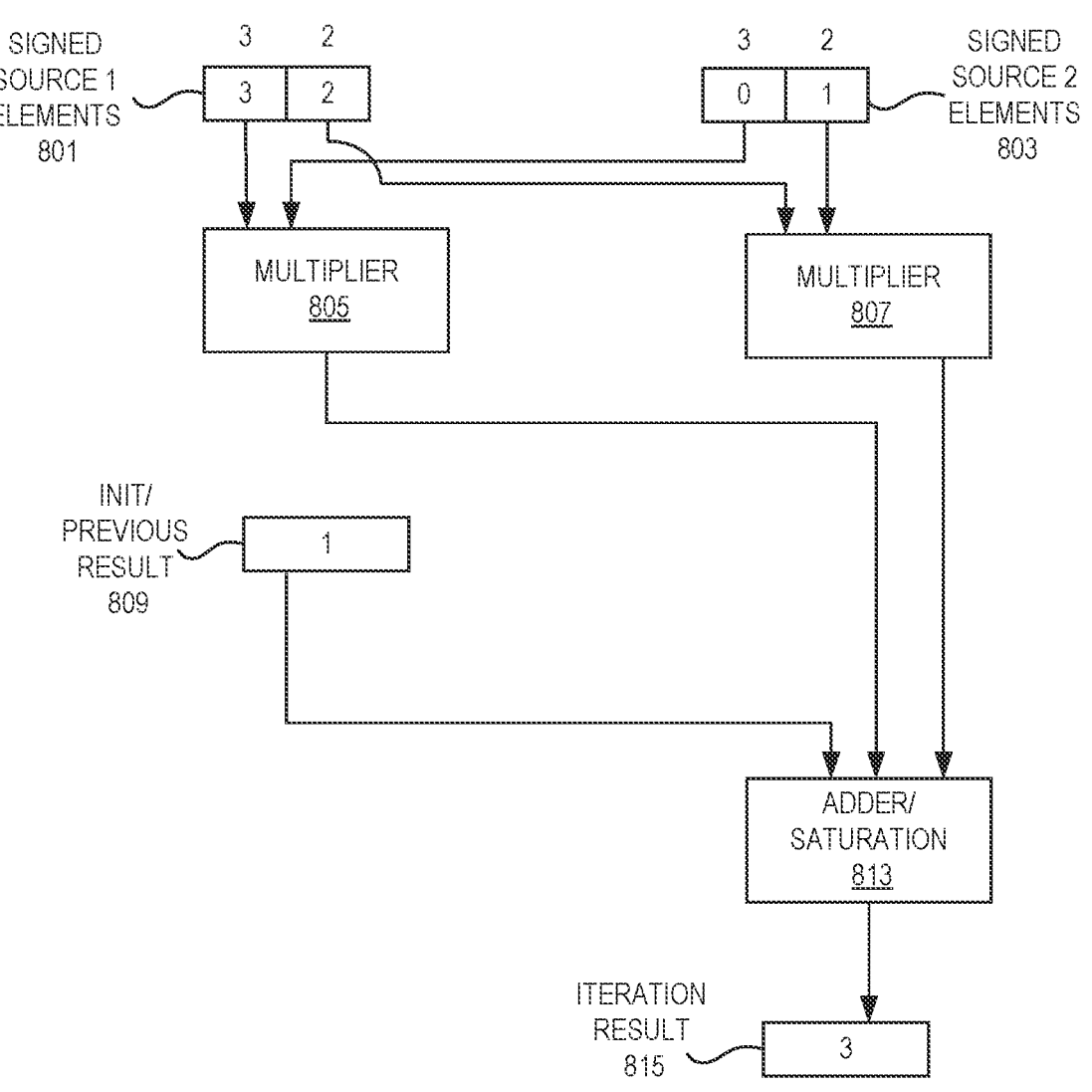
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2× the input data size.

A first signed source (source 1 801) and a second signed source (source 2 803) each have four packed data elements. Each of these packed data elements stores signed data such as integer data. A third signed source (source 3 809) has two packed data elements, each of which stores signed data. The sizes of the first and second signed sources 801 and 803 are half that of the third signed source 809. For example, the first and second signed sources 801 and 803 could have 32-bit packed data elements (e.g., single precision floating-point) the third signed source 809 could have 64-bit packed data elements (e.g., double precision floating-point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, multiplier circuits 805 and 807 perform the multiplications with infinite precision without saturation and use adder/saturation circuitry 813 to saturate the results of the accumulation to plus or minus infinity in case of an overflow and to zero in case of any underflow. In other embodiments, multiplier circuits 805 and 807 perform the saturation themselves. In some embodiments, these multiplier circuits 805 and 807 are reused for other packed data element positions. In other embodiments, additional multiplier circuits are used so that the packed data elements are processed in parallel. In some contexts, parallel execution is done using lanes that are the size of the signed third source (initial value or previous iteration result) 809. The results of each of the multiplications are added to the signed third source 809 using addition/saturation circuitry 813.

Addition/saturation (accumulator) circuitry 813 preserves a sign of an operand when the addition results in a value that is too big. In particular, saturation evaluation occurs on the infinite precision result between the multi-way-add and the write to the destination or next iteration. When the accumulator 813 is floating-point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

Unsigned saturation means the output values are limited to a maximum unsigned number for that element width (all 1 s). Signed saturation means a value is limited to the be in the range between a minimum negative number and a max positive number for that element width (for bytes for example, the range is from $-128$ ($=-2^7$) to $127(=2^7-1)$).

The result of the addition and saturation check is stored into the signed result 815 in a packed data element position that corresponds to the packed data element position used from the signed third source 809 or passed on to the next iteration if there is one. In some embodiments, a writemask is applied to this storage such that if a corresponding writemask (bit) is set, the storage happens, and, if not set, the storage does not happen.

Figure 9:
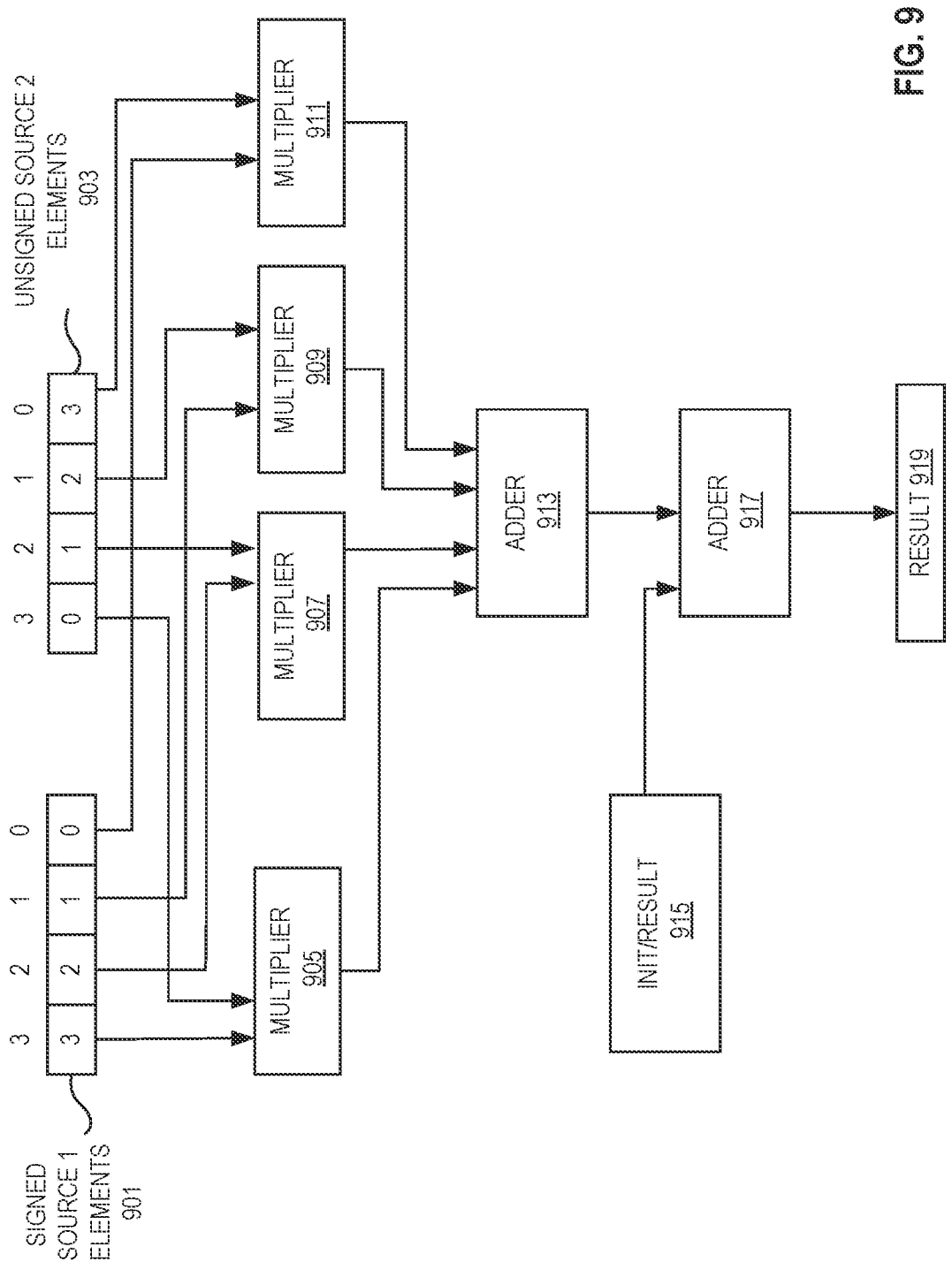
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source (source 1 901) and a second unsigned source (source 2 903) each have four packed data elements. Each of these packed data elements has data such as floating-point or integer data. A third signed source (initial value or result 915) has a packed data element of which stores signed data. The sizes of the first and second sources 901 and 903 are a quarter of the third signed source 915. For example, the first and second sources 901 and 903 could have 16-bit packed data elements (e.g., word) and the third signed source 915 could have 64-bit packed data elements (e.g., double precision floating-point or 64-bit integer).

In this illustration, the four most significant packed data element positions of the first and second sources 901 and 903 and the most significant packed data element position of the third signed source 915 are shown. Of course, other packed data element positions would also be processed if there are any.

As illustrated, packed data elements are processed in quadruplets. For example, the data of the most significant packed data element positions of the first and second sources 901 and 903 are multiplied using a multiplier circuit 905, data from second most significant packed data element positions of the first and second sources 901 and 903 are multiplied using a multiplier circuit 907, data from third most significant packed data element positions of the first and second sources 901 and 903 are multiplied using a multiplier circuit 909, and data from the least significant packed data element positions of the first and second sources 901 and 903 are multiplied using a multiplier circuit 911. In some embodiments, the signed packed data elements of the first source 901 are sign extended and the unsigned packed data elements of the second source 903 are zero extended prior to the multiplications.

In some embodiments, these multiplier circuits 905-911 are reused for other packed data elements positions. In other embodiments, additional multiplier circuits are used so that the packed data elements are processed in parallel. In some contexts, parallel execution is done using lanes that are the size of the signed third source 915. The results of each of the multiplications are added using addition circuitry 913.

The result of the addition of the results of the multiplications is added to the data from most significant packed data element position of the signed source 3 915 (using a different adder 917 or the same adder 913).

Finally, the result 919 of the second addition is either stored into the signed destination in a packed data element position that corresponds to the packed data element position used from the signed third source 915 or passed to the next iteration. In some embodiments, a writemask is applied to this storage such that if a corresponding writemask (bit) is set, the storage happens, and, if not set, the storage does not happen.

Figure 10:
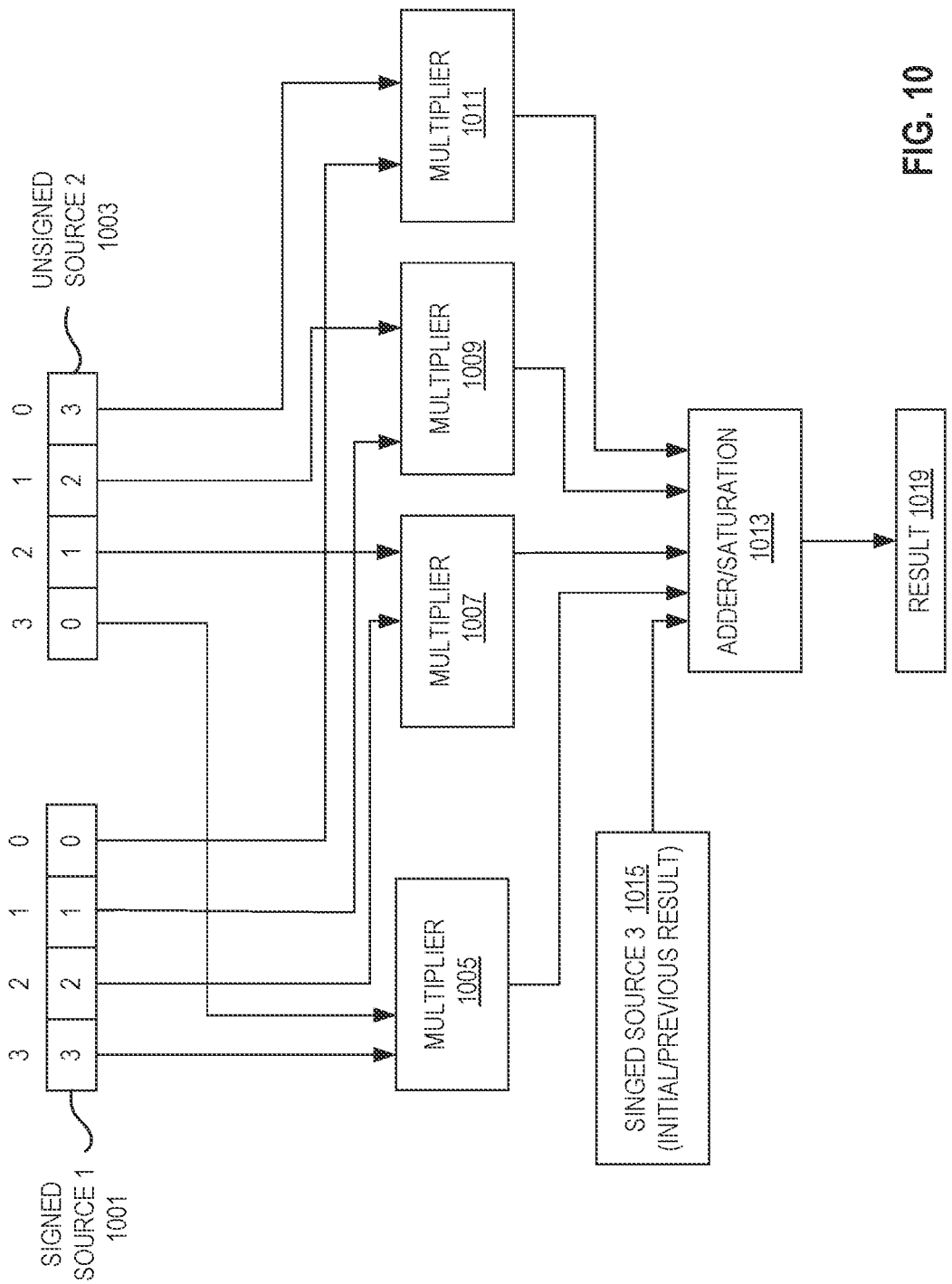
FIG. 10 illustrates an embodiment of a subset of the execution of an iteration of chained fused multiply accumulate instruction.

FIG. 10 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4× the input data size.

A first signed source 1001 and a second unsigned source 1003 each have four packed data elements. Each of these packed data elements stores data such as floating-point or integer data. A third signed source 1015 (initial or previous result) has a packed data element of which stores signed data. The sizes of the first and second sources are a quarter of the third signed source 1015 (initial or previous result). For example, the first and second sources could have 16-bit packed data elements (e.g., word) and the third signed source 1015 (initial or previous result) could have 64-bit packed data elements (e.g., double precision floating-point or 64-bit integer).

In this illustration, the four most significant packed data element positions of the first signed source 1001 and the second unsigned source 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first signed source 1001 and the second unsigned source 1003 are multiplied using a multiplier circuit 1005, data from second most significant packed data element positions of the first signed source 1001 and the second unsigned source 1003 are multiplied using a multiplier circuit 1007, data from third most significant packed data element positions of the first signed source 1001 and the second unsigned source 1003 are multiplied using a multiplier circuit 1009, and data from the least significant packed data element positions of the first signed source 1001 and the second unsigned source 1003 are multiplied using a multiplier circuit 1011. In some embodiments, the signed packed data elements of the first signed source 1001 are sign extended and the unsigned packed data elements of the second unsigned source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of third signed source 1015 (initial or previous result). The result of the addition of the results of the multiplications is added to the data from most significant packed data element position of third signed source 1015 (initial or previous result) using adder/saturation 1013 circuitry.

Addition/saturation (accumulator) circuitry 1013 preserves a sign of an operand when the addition results in a value that is too big or too small for signed saturation. In particular, saturation evaluation occurs on the infinite precision result between the multi-way-add and the write to the destination. When the accumulator 1013 is floating-point and the input terms are integer, the sum of products and the floating-point accumulator input value are turned into infinite precision values (fixed point numbers of hundreds of bits), the addition of the multiplication results and the third input is performed, and a single rounding to the actual accumulator type is performed.

The result 1019 of the addition and saturation check is stored into the signed destination in a packed data element position that corresponds to the packed data element position used from third signed source 1015 (initial or previous result) or passed to the next iteration. In some embodiments, a writemask is applied to this storage such that if a corresponding writemask (bit) is set, the storage happens, and, if not set, the storage does not happen.

FIG. 11 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2× input sizes (in other words, the accumulator input value is twice the size of the packed data element sizes of the sources), table 1101 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-intenger or double-precision floating-point (DPFP) values that are 64-bit in size.

For an accumulator having 4× input sizes (in other words, the accumulator input value is four times the size of the packed data element sizes of the sources), table 1103 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size in some embodiments.

For an accumulator having 8× input sizes (in other words, the accumulator input value is eight times the size of the packed data element sizes of the sources), table 1105 illustrates a configuration. For byte sized sources, the accumulator uses 64-bit integer.

Figure 12:
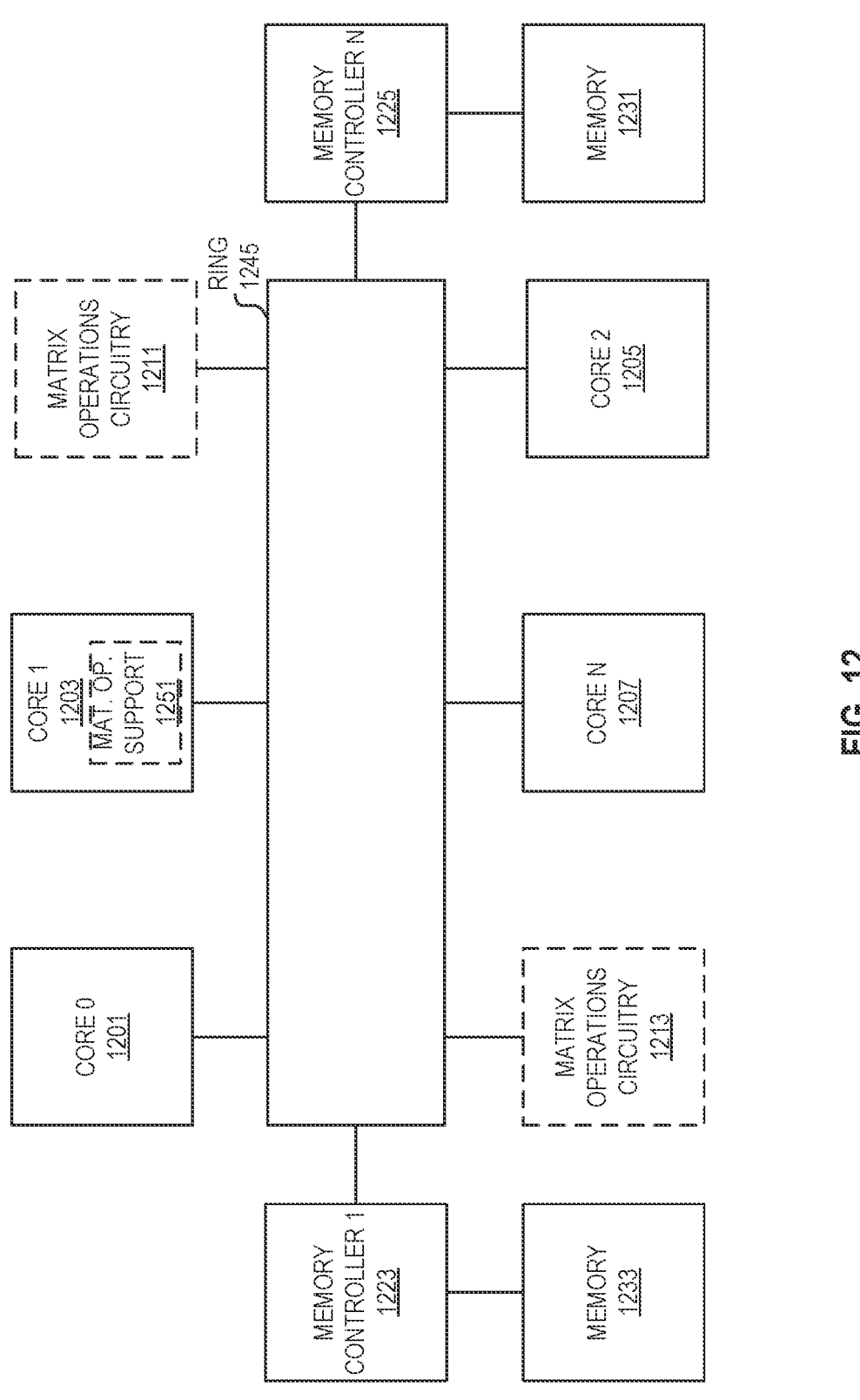
FIG. 12 illustrates an embodiment of a system utilizing matrix operations circuitry.

As hinted at earlier, matrix operations circuitry may be included in a core, or as an external accelerator. FIG. 12 illustrates an embodiment of a system utilizing matrix operations circuitry. In this illustration, multiple entities are coupled with a ring interconnect 1245.

A plurality of cores, core 0 1201, core 1 1203, core 2 1205, and core N 1207 provide non-tile-based instruction support. In some embodiments, matrix operations circuitry 1251 is provided in a core 1203, and in other embodiments matrix operations circuitry 1211 and 1213 are accessible on the ring interconnect 1245.

Additionally, one or more memory controllers 1223-1225 are provided to communicate with memory 1233 and 1231 on behalf of the cores and/or matrix operations circuitry.

Figure 13:
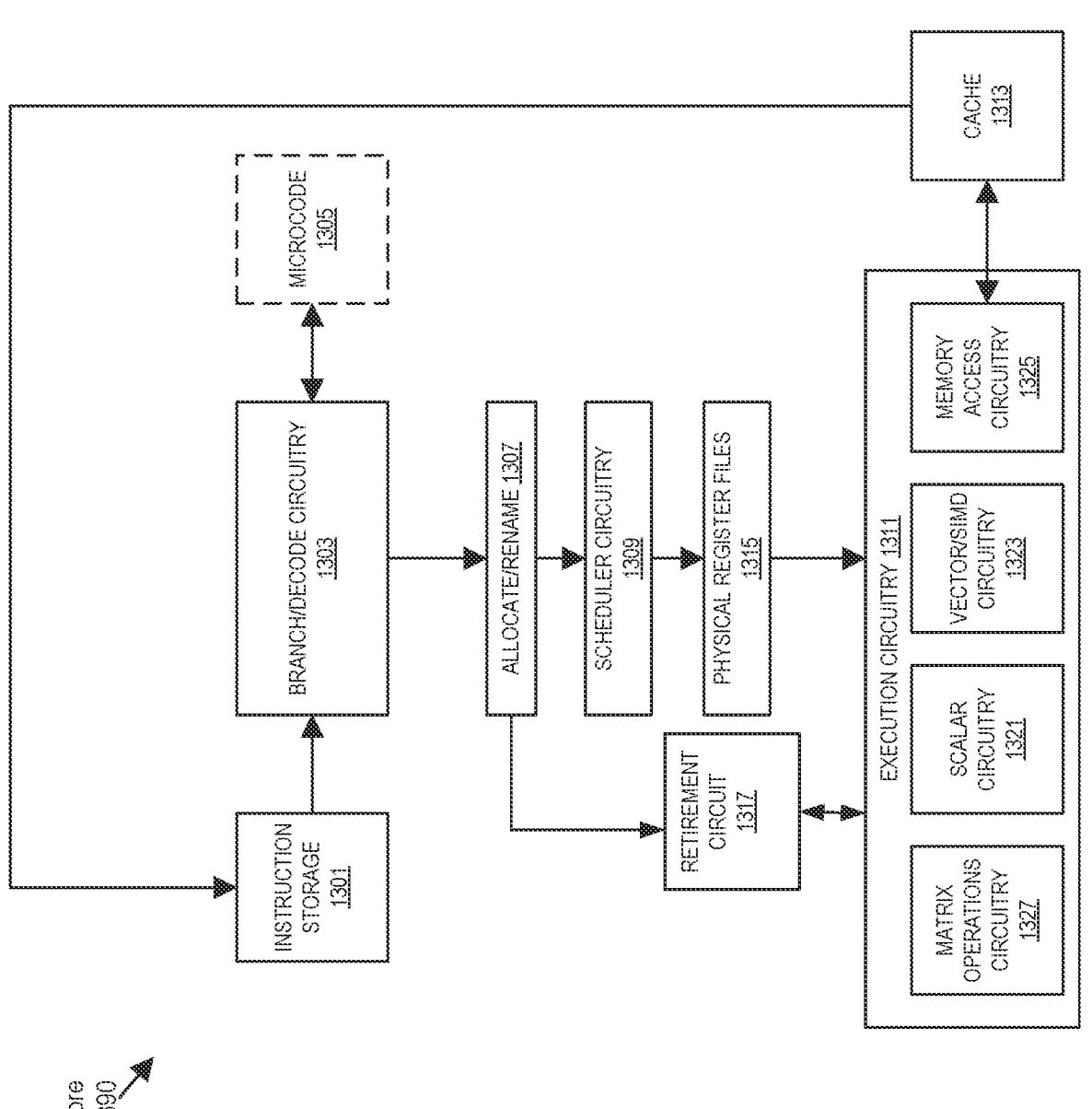
FIG. 13 illustrates an embodiment of a processor core pipeline supporting matrix operations using tiles.

FIG. 13 illustrates an embodiment of a processor core pipeline supporting matrix operations using tiles. Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to allocate/rename 1307 circuitry which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler circuitry 1309 is coupled to, or includes, physical register file(s) 1315. Each of the physical register file(s) 1315 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general-purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuitry 1311.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1311 is a set of one or more execution circuits, including scalar circuitry 1321, vector/SIMD circuitry 1323, and matrix operations circuitry 1327, as well as memory access circuitry 1325 to access cache 1313. The execution circuits perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and matrix operations circuitry 1327 performs matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the allocate/rename 1307 circuitry performs an allocation stage and renaming stage; 4) the scheduler circuitry 1309 performs a schedule stage; 5) physical register file(s) (coupled to, or included in, the scheduler circuitry 1309 and allocate/rename 1307 circuitry and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 14:
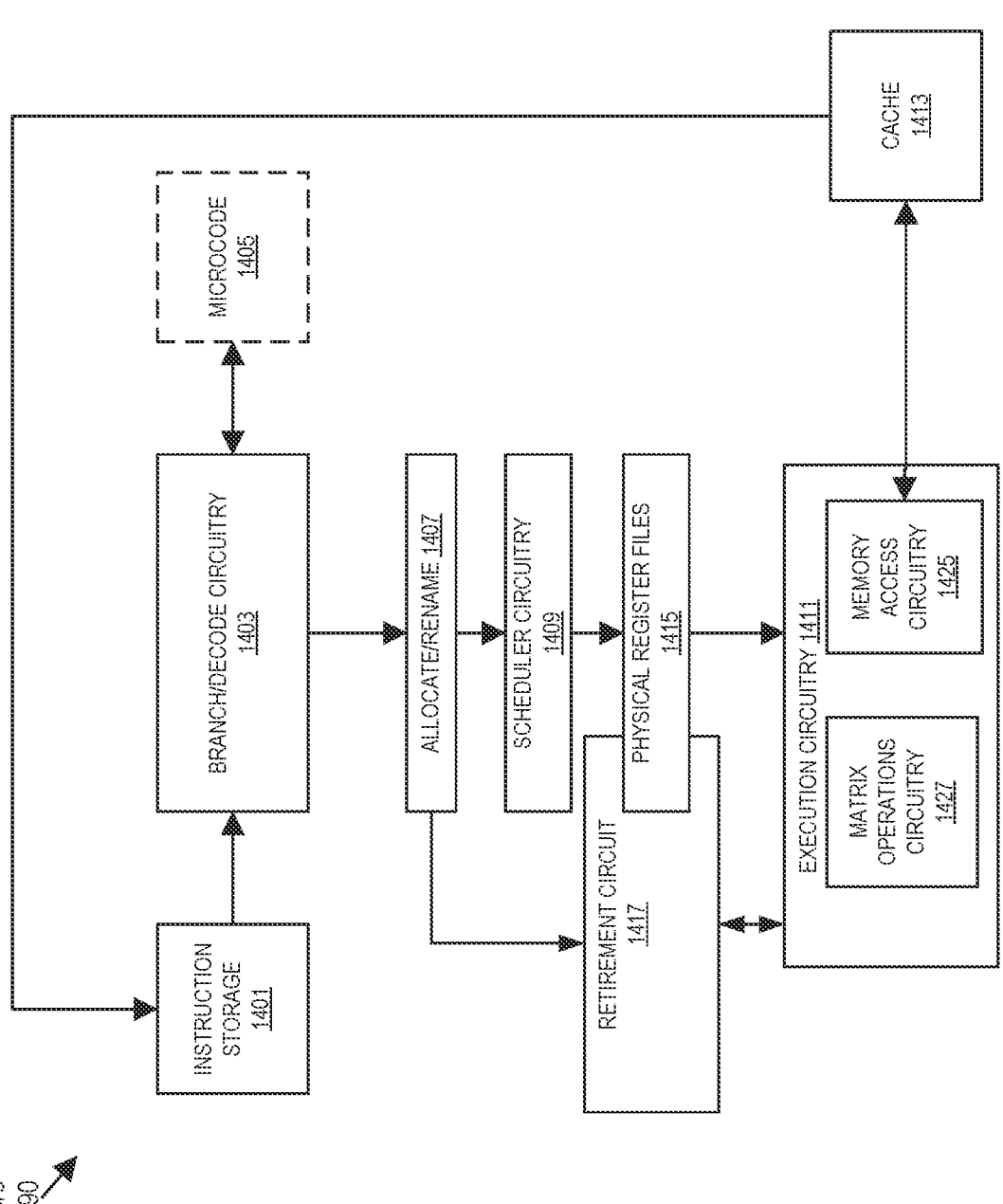
FIG. 14 illustrates an embodiment of a processor core pipeline supporting matrix operations using tiles.

FIG. 14 illustrates an embodiment of a processor core pipeline supporting matrix operations using tiles. Branch prediction and decode circuitry 1403 performs branch predicting of instructions, decoding of instructions, and/or both from instructions stored in instruction storage 1401. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1405. The branch prediction and decode circuitry 1403 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1403 is coupled to allocate/rename 1407 circuitry which is coupled, in some embodiments, to scheduler circuitry 1409. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1409 represents any number of different schedulers, including reservations stations, central instruction window, etc. The scheduler unit(s) scheduler circuitry 1409 is coupled to, or includes, physical register file(s) 1415. Each of the physical register file(s) 1415 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), tiles, etc. In one embodiment, the physical register file(s) 1415 comprises vector registers circuitry, write mask registers circuitry, and scalar registers circuitry. These register circuits may provide architectural vector registers, vector mask registers, and general-purpose registers. The physical register file(s) 1415 is overlapped by a retirement circuit 1417 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1417 and the physical register file(s) 1415 are coupled to the execution circuitry 1411.

While register renaming is described in the context of out-of-order execution, it should be understood that register renaming may be used in an in-order architecture. While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

The execution circuitry 1411 a set of one or more execution circuits 1427 and a set of one or more memory access circuits 1425 to access cache 1413. The execution circuits 1427 perform matrix (tile) operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1403 performs a decode stage; 3) the allocate/rename 1407 circuitry performs an allocation stage and renaming stage; 4) the scheduler circuitry 1409 performs a schedule stage; 5) physical register file(s) (coupled to, or included in, the scheduler circuitry 1409 and allocate/rename 1407 circuitry and a memory unit perform a register read/memory read stage; the execution circuitry 1411 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Throughout this description, data is expressed using row major data layout. Column major users should translate the terms according to their orientation. FIG. 15 illustrates an example of a matrix expressed in row major format and column major format. As shown, matrix A is a 2×3 matrix. When this matrix is stored in row major format, the data elements of a row are consecutive. When this matrix is stored in column major format, the data elements of a column are consecutive. It is a well-known property of matrices that AT*BT=(BA) T, where superscript T means transform. Reading column major data as row major data results in the matrix looking like the transform matrix.

In some embodiments, row-major semantics are utilized in hardware, and column major data is to swap the operand order with the result being transforms of matrix, but for subsequent column-major reads from memory it is the correct, non-transformed matrix. For example, if there are two column-major matrices to multiply:

| a b | g i k | ag + bh ai + bj ak + bl |
|---|---|---|
| c d * | h j l = | cg + dh ci + dj ck + dl |
| e f | | eg + fh ei + fj ek + fl |
| (3 × 2) | (2 × 3) | (3 × 3) |

The input matrices would be stored in linear memory (column-major) as:

a c e b d f and g h i j k l.

Reading those matrices as row-major with dimensions 2×3 and 3×2, they would appear as:

| a c e | and | g h |
|---|---|---|
| b d f | | i j |
| k l | | |

Swapping the order and matrix multiplying:

| g h | a c e | ag + bh cg + dh eg + fh |
|---|---|---|
| i j | * b d f = | ai + bj ci + dj ei + fj |
| k l | | ak + bl ck + dl ek + fl |

The transform matrix is out and can then be stored in row-major order:

*ag+bh cg+dh eg+fh ai+bj ci+dj ei+fj ak+bl ck+dl ek+fl* and used in subsequent column major computations, it is the correct un-transformed matrix:

| ag + bh | ai + bj | ak + bl |
|---|---|---|
| cg + dh | ci + dj | ck + dl |
| eg + fh | ei + fj | ek + fl |

Exemplary Usage

FIG. 16 illustrates an example of usage of matrices (tiles). In this example, matrix C 1601 includes two tiles, matrix A 1603 includes one tile, and matrix B 1605 includes two tiles. This figure shows an example of the inner loop of an algorithm to compute a matrix multiplication. In this example, two result tiles, tmm0 and tmm1, from matrix C 1601 are used to accumulate the intermediate results. One tile from the matrix A 1603 (tmm2) is re-used twice as it multiplied by two tiles from matrix B 1605. Pointers to load a new A matrix (tile) and two new B matrices (tiles) from the directions indicated by the arrows. An outer loop, not shown, adjusts the pointers for the C tiles.

The exemplary code as shown includes the usage of a tile configuration instruction and is executed to configure tile usage, load tiles, a loop to process the tiles, store tiles to memory, and release tile usage.

Figure 17:
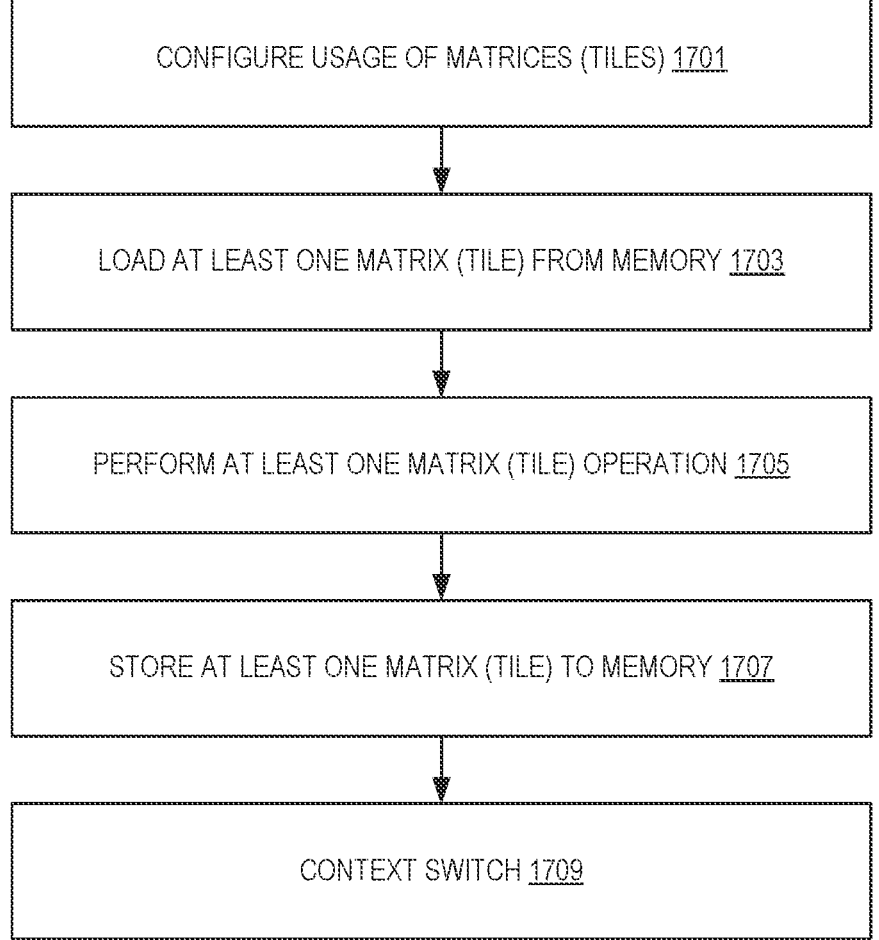
FIG. 17 illustrates an embodiment a method of usage of matrices (tiles).

FIG. 17 illustrates an embodiment of usage of matrices (tiles). At 1701, tile usage is configured. For example, a TILECONFIG instruction is executed to configure tile usage including setting a number of rows and columns per tile. Typically, at least one matrix (tile) is loaded from memory at 1703. At least one matrix (tile) operation is performed at 1705 using the matrices (tiles). At 1707, at least one matrix (tile) is stored out to memory and a context switch can occur at 1709.

Exemplary Configuration

Tile Configuration Hardware Support

As discussed above, tile usage typically needs to be configured prior to use. For example, full usage of all rows and columns may not be needed. Not only does not config-uring these rows and columns save power in some embodi-ments, but the configuration may be used to determine if an operation will generate an error. For example, a matrix multiplication of the form (N×M)*(L×N) will typically not work if M and L are not the same.

Prior to using matrices using tiles, in some embodiments, tile support is to be configured. For example, how many rows and columns per tile, tiles that are to be used, etc. are configured. A TILECONFIG instruction is an improvement to a computer itself as it provides for support to configure the computer to use a matrix accelerator (either as a part of a processor core, or as an external device). In particular, an execution of the TILECONFIG instruction causes a con-figuration to be retrieved from memory and applied to matrix (tile) settings within a matrix accelerator.

Tile Usage Configuration

FIG. 18 illustrates support for configuration of the usage of tiles according to an embodiment. A memory 1801 contains the tile description 1803 of the matrices (tiles) to be supported.

Instruction execution resources 1811 of a processor/core 1805 stores aspects of a tile description 1803 into tile configurations 1817. The tile configurations 1817 include palette table 1813 to detail what tiles for a palette are configured (the number of rows and columns in each tile) and a marking that matrix support is in use. In particular, instruction execution resources 1811 are configured to use tiles as specified by the tile configurations 1817. The instruc-tion execution resources 1811 may also include a machine specific register or configuration register to indicate tile usage. Additional values such as in-use and start values are also set. The tile configurations 1817 utilize register(s) 1819 to store tile usage and configuration information.

FIG. 19 illustrates an embodiment of a description of the matrices (tiles) to be supported. This is the description that is to be stored upon an execution of a STTILECFG instruc-tion. In this example, each field is a byte. In byte [0], a palette ID 1901 is stored. The palette ID is used to index a palette table 1813 which stores, per palette ID, a number of bytes in a tile, and bytes per row of the tiles that are associated with this ID as defined by the configuration.

Byte 1 stores a value to be stored in a "startRow" register 1903 and byte 2 stores a value to be stored in a register, startP 1905. To support restarting instructions after these events, the instructions store information these registers. To support restarting instructions after break events such as those detailed above, the instructions store information in these registers. The startRow value indicates the row that should be used for restart. The startP value indicates the position within the row for store operations when pairs are used and, in some embodiments, indicates the lower half of the row (in the lower tile of a pair) or higher half of the row (in the higher tile of a pair). Generally, the position in the row (the column) is not needed.

With the exception of TILECONFIG and STTILECFG, successfully executing matrix (tile) instructions will set both startRow and startP to zero.

Any time an interrupted matrix (tile) instruction is not restarted, it is the responsibility of software to zero the startRow and startP values. For example, unmasked float-ing-point exception handlers might decide to finish the operation in software and change the program counter value to another instruction, usually the next instruction. In this case the software exception handler must zero the startRow and startP values in the exception presented to it by the operating system before resuming the program. The oper-ating system will subsequently reload those values using a restore instruction.

Byte 3 stores an indication of pairs (1 b per tile) of tiles 1907.

Bytes 16-17 store the number of rows 1913 and columns 1915 for tile 0, bytes 18-19 store the number of rows and columns for tile 1, etc. In other words, each 2-byte group specifies a number of rows and columns for a tile. If a group of 2 bytes is not used to specify tile parameters, they should have the value zero. Specifying tile parameters for more tiles than the implementation limit or the palette limit results in a fault. Unconfigured tiles are set to an initial state with 0 rows, 0 columns.

Finally, the configuration in memory typically ends with an ending delineation such as all zeros for several consecu-tive bytes.

Exemplary Tile and Tile Configuration Storage

Figure 20A:

FIGS. 20(A)-(D) illustrate examples of register(s) 1819. FIG. 20(A) illustrates a plurality of registers 1819. As shown each tile (TMM0 2001 . . . TMMN 2003) has a separate register with each register storing a row and column size for that particular tile. StartP 2011 and StartRow 2013 are stored in separate registers. One or more status registers 2015 are set (e.g., TILES_CONFIGURED=1) to indicate tiles are configured for use.

Figure 20B:
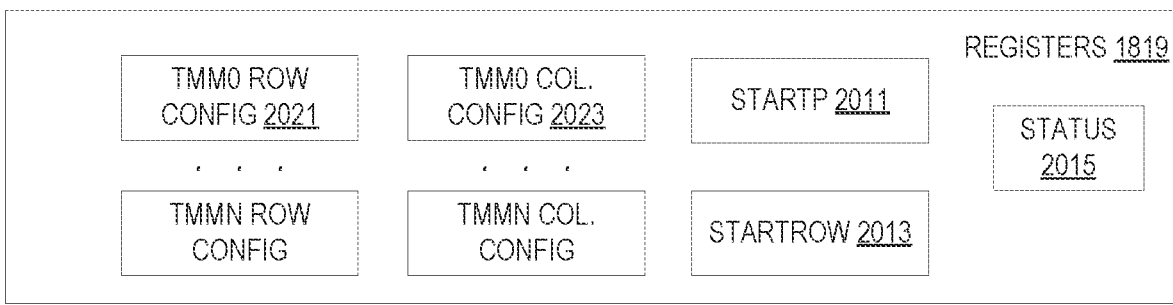

FIG. 20(B) illustrates a plurality of registers 1819. As shown each tile has separate registers for its rows and columns. For example, TMM0 rows configuration 2021, TMM0 columns configuration 2023, StartP 2011 and Star-tRow 2013 are stored in separate registers. One or more status registers 2015 are set (e.g., TILES_CONFIG-URED=1) to indicate tiles are configured for use.

Figure 20C:

FIG. 20(C) illustrates a single register 1819. As shown, this register stores tile configurations (rows and columns per tile) 2031, StartP 2011, and StartRow 2013 are stored in single register as packed data registers. One or more status registers 2015 are set (e.g., TILES_CONFIGURED=1) to indicate tiles are configured for use.

Figure 20D:

FIG. 20(D) illustrates a plurality of registers 1819. As shown, a single register stores tile configuration (rows and columns per tile) 2031. StartP and StartRow are stored in separate registers 2011 and 2013. One or more status reg-isters 2015 are set (e.g., TILECONFIGURED=1) to indicate tiles are configured for use.

Other combinations are contemplated such as combining the start registers into a single register where they are shown separately, etc.

Two Source 2D Array Merge Instructions, Processors, and Methods

FIG. 21 is a block diagram of an embodiment of a processor 2100 that is operative to perform an embodiment of a two source two-dimensional (2D) array merge instruction 2102. In some embodiments, the processor may be a general-purpose processor (e.g., a general-purpose microprocessor or central processing unit (CPU) of the type used in server, desktop, laptop, smartphone, or other computers). Alternatively, the processor may be a special-purpose processor. Examples of suitable special-purpose processors include, but are not limited to, network processors, communications processors, cryptographic processors, graphics processors, co-processors, embedded processors, and digital signal processors (DSPs). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures). In some embodiments, the processor may include (e.g., be disposed on) at least one integrated circuit or semiconductor die. In some embodiments, the processor may include at least some hardware (e.g., transistors, capacitors, diodes, circuitry, non-volatile memory storing circuit-level instructions/control signals, or the like).

The processor 2100 may be coupled to receive the two source 2D array merge instruction 2102. For example, the instruction may be received from memory via an interconnect. The two source 2D array merge instruction may represent a macroinstruction, machine code instruction, or other instruction or control signal of an instruction set of the processor. The two source 2D array merge instruction may have an opcode (e.g., an operation code) 2104. The opcode may prescribe or indicate the operation that is to be performed (e.g., an operation to merge portions of two source 2D arrays to generate a result 2D array). In some embodiments, the two source 2D array merge instruction may optionally indicate a single additional value 2106 (e.g., have an immediate to provide the single additional value or indicate a register that is to store the single additional value). In some embodiments, the two source 2D array merge instruction may have one of the instruction formats described further below, although other embodiments are not limited to these particular instruction formats.

The two source 2D array merge instruction 2102 may explicitly specify (e.g., through one or more fields or sets of bits), or otherwise indicate (e.g., implicitly indicate) a first source matrix, tile or other matrix portion, or other 2D array 2114, and a second source matrix, tile or other matrix portion, or other 2D array 2116. As shown, in some embodiments, the first source 2D array 2114 and the second source 2D array 2116 may be stored in one or more types of 2D array storage 2112. Examples of suitable types of 2D array storage include, but are not limited to, packed, vector, or SIMD registers in a register file, 2D registers (e.g., comprising an overly over physical registers), tile storage in a non-register, memory locations, as well as other types of storage used for tiles and matrices, and combinations thereof. In some cases, the instruction may optionally have one or more fields or sets of bits to specify such a storage location where a source 2D array is stored. In other cases, such a storage location where a source 2D arrays is stored may optionally be implicit to the instruction (e.g., implicit to an opcode of the instruction). A combination of these approaches may also be used.

The first source 2D array 2114 and the second source 2D array 2116 may each include a 2D array of data elements that are at least logically arranged in multiple rows and multiple columns. The various sizes mentioned elsewhere herein for tiles and/or matrices are suitable. Typically, there may be at least four or at least eight rows and at least four or at least eight columns, and optionally many more of each. In some embodiments, the first and second 2D arrays may each have a single fixed size. Any of the various different sizes disclosed herein are suitable. In other embodiments, the first and second 2D arrays may have a selectable one of a plurality of possible fixed sizes (e.g., a first fixed size, a second fixed size, and a third fixed size), and the instruction or control data (e.g., in a control and/or configuration register) may select or specify one of the plurality of possible sizes (e.g., the second fixed size). In still other embodiments, the first and second source 2D arrays may have more flexible or configurable sizes, which may be more flexibly configurable in both a first dimension (e.g., a configurable number of rows) and in a second dimension (e.g., a configurable number of columns). For example, the processor may have control and/or configuration registers (e.g., control registers, model specific registers) to store configuration information to configure or specify the first and second dimensions. This may optionally be done as described elsewhere herein (e.g., based on a palette, configuration information stored according to a tile configuration instruction, etc.).

Referring again to FIG. 21, the processor includes a decode unit, decoder, or decoder circuitry 2108. The decode unit or decoder circuitry may be coupled to receive the two source 2D array merge instruction 2102. For example, the decode unit may receive the two source 2D array merge instruction from an instruction fetch unit (e.g., fetch circuitry) which may fetch the two source 2D array merge instruction from an instruction cache or memory. The decoder unit or decoder circuitry may be operative to decode the two source 2D array merge instruction into one or more operations. The decode unit or decoder circuitry may output one or more relatively lower-level instructions, control signals, or other operations (e.g., one or more microinstructions, micro-operations, micro-code entry points, decoded instructions or control signals, etc.), which reflect, represent, and/or are derived from the relatively higher-level 2D array merge instruction. In some embodiments, the decode unit or decoder circuitry may include at least one input structure (e.g., a port, interconnect, or interface) coupled to receive the two source 2D array merge instruction, an instruction recognition and decode logic coupled therewith to recognize and decode the two source 2D array merge instruction, and at least one output structure (e.g., a port, interconnect, or interface) coupled therewith to output the lower-level operations. The decode unit or decoder circuitry and/or its instruction recognition and decode logic may be implemented using various instruction decode mechanisms including, but not limited to, microcode read only memories (ROMs), look-up tables, hardware implementations, programmable logic arrays (PLAs), other mechanisms suitable to implement decode units, and combinations thereof. In some embodiments, the decode unit may include at least some hardware (e.g., one or more of transistors, integrated circuitry, on-die read-only memory or other non-volatile memory storing microcode or other hardware-level instructions, etc.). In some embodiments, the decode unit may be included on a die, integrated circuit, or semiconductor substrate.

Referring again to FIG. 21, the execution unit or execution circuitry 2110 is coupled with the decode unit 2108. In some embodiments, the execution unit or execution circuitry may be coupled with the decode unit or decode circuitry through one or more intervening components, such as register renaming, register allocation, and/or scheduling circuitry. The execution unit or execution circuitry is also coupled to receive the first and second source 2D arrays (e.g., is coupled with the one or more types of 2D array storage 2112. In some embodiments, the execution unit or execution circuitry may be on a die or integrated circuit (e.g., on die or integrated circuit with the decode unit). The execution unit or execution circuitry may be coupled to receive the decoded 2D array merge instruction (e.g., one or more microinstructions, micro-operations, or other operations). The execution unit or execution circuitry may be operative to execute the decoded 2D array merge instruction.

In some embodiments, the execution unit or execution circuitry may execute the decoded instruction to interleave, permute, shuffle, comingle, combine, or otherwise merge a plurality of portions of the first 2D array, and a plurality of portions of the second 2D array, to generate a result 2D array. As shown in the illustrated simplistic example, a plurality of portions 2120 of the first source 2D array 2114 may be interleaved or otherwise merged with a plurality of portions 2122 of the second 2D array 2116 to generate the result 2D array 2118. In various aspects, the portions may be individual rows or groups of rows, individual columns or groups of columns, or individual data elements or groups of data elements. In various aspects, the merging of the portions may row-wise, column-wise, or individual data element-wise. The execution unit or execution circuitry may store the result 2D array 2118 in a destination storage location in the one or more types of 2D array storage 2112. In some embodiments, a storage location used for one of the first and second source 2D arrays may optionally be reused as the destination storage location (e.g., a source/destination storage location may be used). For example, initially one of the first and second source 2D arrays may be read from that storage location and then the result 2D array may be written to that same storage location overwriting the original source 2D array. In other embodiments, the destination storage location may be a third, additional 2D array storage location, and the instruction may specify or otherwise indicate the third, additional 2D array storage location. The types of 2D array storage locations previously mentioned for the source 2D arrays are suitable.

Various different portions of the first and second 2D arrays may be merged, and in various different ways, according to different embodiments. In some embodiments, the result 2D array may have the same size as the first and second source 2D arrays. In some such embodiments, about half of the first source 2D array may be merged with about half of the second source 2D array. As one example, only half of all rows (e.g., only same parity (meaning only even or only odd) rows) of the first 2D array may be merged with only half of all rows (e.g., only same parity (meaning only even or only odd) rows) of the second 2D array. As used herein, the term parity refers to the position of a portion, namely whether the position is an even position or an odd position. For example, positions 0, 2, 4, 6, are even parity positions, whereas positions 1, 3, 5, 7 are odd parity positions. As another example, only half of all columns (e.g., only same parity (meaning only even or only odd) columns) of the first 2D array may be merged with only half of all columns (e.g., only same parity (meaning only even or only odd) columns) of the second 2D array. As another example, only half of all data elements (e.g., only same parity (meaning only even or only odd) data elements in all rows) of the first 2D array may be merged with only half of all data elements (e.g., only same parity (meaning only even or only odd) data elements in all rows) of the second 2D array. By way of example, such same parity merging may be useful to de-interleave twotuple or paired data, such as, for example, pairs of real and imaginary numbers, as well as other paried data. Further details of specific example embodiments of various different portions of the first and second 2D arrays that may be merged, and the various different ways that they may be merged, will be shown and described further below for FIGS. 25-32.

In some embodiments, the instruction may not indicate a plurality of values to specify the plurality of portions of the first 2D array and the plurality of portions of the second 2D array that are merged to generate the result 2D array. Another possible approach would be for the instruction to indicate, and for the execution circuitry to use, a plurality of per-portion control indices or other values to explicitly specify individual ones of the portions (e.g., individual rows, individual columns, individual elements) of the first and second 2D arrays. In such an approach, often the position of these per-portion control indices or other values indicates where the explicitly specify individual portions of the first and second 2D arrays are to be positioned in the result 2D array. By way of example, with such an approach, a first per-portion control index may be included to explicitly specify a first portion (e.g., a first row) of the first 2D array and indicate where it is to be positioned in the result 2D array, a second per-portion control index may be included to explicitly specify a second portion (e.g., a second row) of the first 2D array and indicate where it is to be positioned in the result 2D array, and so on for all other portions of the first and second source 2D arrays to be merged. Such per-portion control indices or other values have usefulness in some situations (e.g., when a large number of different portions to be merged need to be supported, when the portions to be merged can be quite random, irregular, or situation specific, and so on), as will be discussed further below.

However, the generation of such per-portion control indices or other values can be computationally expensive and thereby consume a significant amount of processing time and power in their generation. For example, often from multiple to many instructions may be needed to generate such per-portion control indices or other values before they can be used. Executing these instructions tends to take additional processing time, utilize additional processor resources (e.g., instruction caches, execution units, etc.), reduce performance, take more system memory to store code, and contribute additional power consumption. This may be even more significant when the sizes of the arrays become large or even very large, since the number of per-portion control indices or other values increases as the number of portions to merge increases. Also, such per-portion control indices or other values generally need to be stored in registers, which can prevent the registers from being used for other purposes and thereby reduce performance, as well as consuming power.

Instead, in some embodiments, the plurality of portions of the first and second 2D arrays to be merged into the result 2D array, and the pattern or way in which they may be merged (e.g., the positions of these portions in the result 2D array), may be at least predominantly or entirely implicit to the two source 2D array merge instruction 2102 (e.g., the type of instruction not just the particular instance of the instruction) and/or the opcode 2104 of the two source 2D array merge instruction. For example, the decode unit or decoder circuitry upon identifying the two source 2D array merge instruction and/or its opcode may implicitly understand or know what portions of the first and second 2D arrays are to be merged into the result 2D array, as well as the pattern or way in which they are to be merged (e.g., the positions of these portions in the result 2D array), although unexpressed through explicit values. It may be implicit to the two source 2D array merge instruction and/or its opcode that the execution unit or execution circuitry, as part of the execution of the decoded 2D array merge instruction, is to merge these portions and in the pattern or way. No separate set of explicit per-portion control indices or other values are needed to explicitly tell this to the decode unit or decoder circuitry. The type of the two source 2D array merge instruction and/or its opcode may prescribe, fix, determine, or indicate these portions and how they are to be merged.

As a variation, in other embodiments, the plurality of portions of the first and second 2D arrays to be merged into the result 2D array, and the pattern or way in which they may be merged (e.g., the positions of these portions in the result 2D array), may be at least predominantly or entirely implicit to a combination of both the two source 2D array merge instruction 2102 (e.g., the type of instruction) or its opcode 2104 plus the single additional value 2106 indicated by the two source 2D array merge instruction. The processor and/or the execution unit or execution circuitry may implicitly understand or know based on the combination of both the two source 2D array merge instruction or its opcode plus the single additional value 2106 what portions of the first and second 2D arrays are to be merged into the result 2D array, as well as the pattern or way in which they are to be merged (e.g., the positions of these portions in the result 2D array). The two source 2D array merge instruction or its opcode in combination with the single additional value may prescribe, fix, determine, or indicate these portions, and how they are to be merged. No separate set of explicit per-portion control indices or other values are needed to explicitly tell this to the decode unit or decoder circuitry, as previously described.

In some such embodiments, the two source 2D array merge instruction or its opcode may allow at least two different patterns, ways, or other alternatives, and the single additional value may specify, select, or otherwise indicate one of the alternatives to be used to merge the first and second source 2D arrays into the result 2D array. In some cases, there may be three, four, five, six, seven, eight, nine, ten, or optionally more than ten different alternatives. Each of the alternatives may represent a predetermined pattern, way, option, or possibility for merging the two source 2D arrays that is different in some way (e.g., at least one portion merged or at least some difference in the way the portions are merged) from the other alternatives. The single additional value may thus indicate one of multiple different ways of merging the first and second source 2D arrays supported by the two source 2D array merge instruction or its opcode. The single additional value may be provided in different ways. In some such embodiments, the single additional value may be provided as a single value in an immediate or other field of the instruction. In other such embodiments, the single additional value may be provided as a single value in a register indicated by the instruction (e.g., a general-purpose register, scalar register, or optionally a packed or vector register).

Advantageously, the two source 2D array merge instruction may allow merging the plurality of portions of the first 2D array, and a plurality of portions of the second 2D array, within the confines of the execution of a single instruction, instead of needing to perform anywhere from two to many more instructions to accomplish such merging. This in turn may help to improve the functioning and functionality of the processor or a computer itself, such as, for example, allowing new functionality to be available through the execution of a single instruction, reducing the number of instructions and therefor processing time and power to accomplish the merging of the portions of two 2D arrays. The execution unit or execution circuitry and/or the processor may include specific or particular logic (e.g., transistors, integrated circuitry, or other hardware potentially combined with firmware (e.g., instructions stored in non-volatile memory) and/or software) that is operative to execute the decoded 2D array merge instruction. As shown, in some embodiments, the execution unit or execution circuitry 2110 may include one or more of row-wise execution circuitry (e.g., circuitry to merge rows of two 2D arrays) and/or column-wise execution circuitry (e.g., circuitry to merge columns of two 2D arrays) and/or element-wise execution circuitry (e.g., circuitry to merge data elements of two 2D arrays) 2111. Such circuitry may include hardwired lines to route portions, multiplexers to select portions, and the like.

To avoid obscuring the description, a relatively simple processor 2100 has been shown and described. However, the processor may optionally include other processor components. For example, the processor may include a register renaming, register allocation, and/or scheduling circuitry logically coupled between the decode circuitry and the execution circuitry that provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments). As another example, the processor may include retirement/write back circuitry that architecturally commits the result 2D array to architectural state (e.g., architectural registers or memory) and retires the two source 2D array merge instruction. All the components of the processor may be coupled together to allow them to operate as intended.

FIG. 22 is a block diagram of a first example embodiment of a two source 2D array merge instruction 2202. The two source 2D array merge instruction has an opcode 2204. The opcode may include one or more fields or sets of bits and may indicate the operation that is to be performed (e.g., a particular operation to merge particular portions of two source 2D arrays to generate a result 2D array). The two source 2D array merge instruction also has a first source storage location indicator 2226 to specify or otherwise indicate a first storage location storing a first source 2D array, and a second source storage location indicator 2228 to specify or otherwise indicate a second storage location storing a second source 2D array. In some embodiments, the two source 2D array merge instruction may also optionally have a destination storage location indicator 2230 to specify or otherwise indicate a destination storage location where a result 2D array is to be stored upon completion of the two source 2D array merge instruction. In other embodiments, the destination storage location indicator 2230 may optionally be omitted, and it may be implicit to reuse one of the first and second storage locations (e.g., initially used to store one of the first and second source 2D arrays) as the destination storage location. In fact, omitting the destination storage location is often favored since it may allow omitting one or more fields or sets of bits and thereby achieve a shorter encoding. The first source, second source, and destination location indicators may each represent one or more fields or sets of bits to indicate the storage locations according to various different approaches (e.g., in x86 processors ModRM type addressing, a VEX.vvvv field, and so on). The various different types of storage locations mentioned elsewhere herein are suitable.

The is just one example of a set of fields that may be included in an embodiment of a two source 2D array merge instruction. Alternate embodiments may include a subset of the illustrated fields and/or may add additional fields and/or may rearrange the fields variously. For example, the instruction may also optionally include one or more fields or sets of bits to specify a size of the source 2D arrays (e.g., an optional first field or set of bits to indicate a number of rows, and an optional second field or set of bits to indicate a number of columns). As another example, the instruction may also optionally include one or more fields or sets of bits to indicate a type of the data elements (e.g., an optional first field or set of bits to indicate a data element size, and an optional second field or set of bits to indicate a data element format such as integer, fixed point, etc.). Each of the fields or indictors may either consist of a contiguous set of bits or may include non-contiguous or separated bits that logically represent the field. In some embodiments, the instruction may have a VEX or EVEX encoding or format as described further below, although this is not required.

In this embodiment, the two source 2D array merge instruction 2202 only has the first source, second source, and destination location indicators 2226, 2228, 2230. The two source 2D array merge instruction does not have an immediate. Moreover, other than operands to indicate the first source storage location, the second source storage location, and the destination storage location (including potentially implicit memory addressing registers such as segment registers and so on when one of the locations is in memory), the instruction otherwise does not indicate any other operands or any other values in any other registers, memory, or other architecturally-visible storage locations. In particular, the two source 2D array merge instruction does not indicate an additional third source 2D array in a third source storage location having an array of per-portion merge control values, or an additional vector in a vector register having a vectors worth of per-portion merge control values, since such are not used by the two source 2D array merge instruction. Rather, for this embodiment of the two source 2D array merge instruction 2204, the plurality of portions of the first and second 2D arrays to be merged into the result 2D array, and the pattern or way in which they may be merged (e.g., the positions of these portions in the result 2D array), may be at least predominantly or entirely implicit to the two source 2D array merge instruction 2202 (e.g., the type of instruction not just the particular instance of the instruction) and/or the opcode 2204 of the two source 2D array merge instruction, as previously described. The type of the two source 2D array merge instruction and/or its opcode may prescribe, fix, determine, or indicate these portions and how they are to be merged.

Table 1 lists a few specific example embodiments two source 2D array merge instructions where the operations of the instructions (e.g., the portions to be merged and the way they are to be merged) are indicated by and implicit to the two source 2D array merge instructions and/or their opcodes. The table is arranged in rows and columns. Each row represents a different two source 2D array merge instruction (e.g., a different type of instruction, not just a different instance of the same instruction). The two source 2Da array merge instructions may have instruction formats like those described for FIG. 22. One column lists the instructions opcodes. The opcodes broadly represent different or unique binary values to uniquely identify the different instructions and their operations to the processor. The listed opcodes are merely examples and other opcodes of different values and numbers of bits may instead be used. Also shown alongside the opcodes are mnemonics (text) which are similarly different or unique text values to uniquely identify the different instructions and their operations to a human reader. Notice that each of the opcodes and mnemonics is different. There are also columns for a first source and destination storage location (SRC1/DST) and a second source storage location (SRC2). Alternatively, any of these instructions may instead have a separate destination storage location as previously described. The A1 and A2 may represent different 2D array storage as described elsewhere herein. There is also a column for the operation that the opcode indicates that the processor is to perform and that an execution unit or execution circuitry is to execute. The specific operations can be read from the table. In some embodiments, each of these operations (e.g., the portions to be merged and the way they are to be merged) may be at least predominantly or entirely implicit to the respective 2D array merge instruction of that row and/or the respective opcode of that row for the respective 2D array merge instruction, as previously described. The type of the two source 2D array merge instruction itself and/or its opcode may prescribe, fix, determine, or indicate these portions and how they are to be merged. In some embodiments, the two source 2D array merge instruction of a given row and/or its opcode in that row may only be capable of performing the respective operation of that row and only on the portions of the first and second source 2D arrays mentioned for that operation.

TABLE 1

| OPCODE (MNEMONIC) | SRC1/DST | SRC2 | OPERATION |
|---|---|---|---|
| 0 (2DArrayMergeOddRow) | A1 | A2 | Generate and store result in A1 having only every odd row of A1 interleaved with only every corresponding odd row of A2 |
| 1 (2DArrayMergeEvenRow) | A1 | A2 | Generate and store result in A1 having only every even row of A1 interleaved with only every corresponding even row of A2 |
| 10 (2DArrayMergeOddCol) | A1 | A2 | Generate and store result in A1 having only every odd column of A1 interleaved with only every corresponding odd column of A2 |
| 11 (2DArrayMergeEvenCol) | A1 | A2 | Generate and store result in A1 having only every even column of A1 interleaved with only every corresponding even column of A2 |
| 100 (2DArrayMergeOddElem) | A1 | A2 | Generate and store result in A1 having only every odd element of every row of A1 interleaved with only every corresponding odd element of every corresponding row of A2 |

TABLE 1-continued

| OPCODE (MNEMONIC) | SRC1/DST | SRC2 | OPERATION |
|---|---|---|---|
| 101 (2DArrayMergeEvenElem) | A1 | A2 | Generate and store result in A1 having only every even element of every row from A1 interleaved with only every corresponding even element of every corresponding row of A2 |
| 110 (2DArrayMergeFirstRow) | A1 | A2 | Generate and store result in A1 having only the first half of the rows of A1 interleaved with only corresponding ones of the first half of the rows of A2 |
| 111 (2DArrayMergeFirstCol) | A1 | A2 | Generate and store result in A1 having only the first half of the columns of A1 interleaved with only corresponding ones of the first half of the columns of A2 |

These are only a few example embodiments of two source 2D array merge instructions and operations. Other examples are also contemplated. For example, instead of interleaving the same parity (e.g., odd or even) portions (e.g., rows, columns, or elements) the same parity portions could instead be concatenated together in adjacent portions. For example, all odd rows of A1 could be concatenated together and appended to all odd rows of A2 concatenated together. Analogously this could be done for the even rows. As another example, all even columns of A1 could be concatenated together and appended to all even columns of A2 concatenated together. Analogously this could be done for odd columns. Analogously this could also be done for even or odd elements.

FIG. 23 is a block diagram of a second example embodiment of a two source 2D array merge instruction 2302. The two source 2D array merge instruction has an opcode 2304, a first source storage location indicator 2326 to specify or otherwise indicate a first storage location storing a first source 2D array, a second source storage location indicator 2328 to specify or otherwise indicate a second storage location storing a second source 2D array, and optionally a destination storage location indicator 2330 to specify or otherwise indicate a destination storage location where a result 2D array is to be stored upon completion of the two source 2D array merge instruction. The first source, second source, and destination storage location identifiers may be the same or similar to those described elsewhere herein, and have the same variations and alternatives. In the embodiment of FIG. 23, the two source 2D array merge instruction also has an immediate 2332 to provide or otherwise indicate a single additional value 2306. The immediate may represent a portion of the instruction encoding (e.g., typically a single field or set of contiguous bits) other than the opcode. The immediate may have different lengths, such as, for example, 2-bits, 3-bits, 4-bits, 5-bits, 6-bits, 7-bits, 8-bits, 12-bits, or 16-bits. The single additional value may be stored or provisioned in the immediate at compile time and/or by a compiler. As another option there could be a field of the instruction, which is not considered an immediate, and which is not considered or described as being part of the opcode, that could select among different options (e.g., a 2-bit, 3-bit, 4-bit, 5-bit, or 6-bit field).

FIG. 24 is a block diagram of a third example embodiment of a two source 2D array merge instruction 2402. The two source 2D array merge instruction has an opcode 2404, a first source storage location indicator 2426 to specify or otherwise indicate a first storage location storing a first source 2D array, a second source storage location indicator 2428 to specify or otherwise indicate a second storage location storing a second source 2D array, and optionally a destination storage location indicator 2430 to specify or otherwise indicate a destination storage location where a result 2D array is to be stored upon completion of the two source 2D array merge instruction. The first source, second source, and destination storage location identifiers may be the same or similar to those described elsewhere herein and may have the same variations and alternatives. In the embodiment of FIG. 24, the two source 2D array merge instruction also has an optional third source location indicator 2434 (e.g., a register specifier, field to specify a register, etc.) to indicate a register 2436 storing or having a single additional value 2406. By way of example, the register may be a scalar register, a general purpose register, or a vector register (but the vector register only stores the single additional value not multiple per-portion merge control values). The single additional value may be stored or provisioned in the register at run time rather than needing to be done by a compiler or at compile time like the immediate.

FIGS. 23-24 are also just examples. Alternate embodiments may include a subset of the illustrated fields and/or may add additional fields and/or may rearrange the fields variously. For example, the instruction may also optionally include one or more fields or sets of bits to specify a size of the source 2D arrays (e.g., an optional first field or set of bits to indicate a number of rows, and an optional second field or set of bits to indicate a number of columns). As another example, the instruction may also optionally include one or more fields or sets of bits to indicate a type of the data elements. In some embodiments, the instruction may have a VEX or EVEX encoding or format as described further below, although this is not required.

In the embodiments of FIGS. 23-24, the opcodes 2304, 2404 do not predominantly indicate the operation to be performed as a single/particular operation to merge a single/particular set of portions of two source 2D arrays to generate a result 2D array. Rather, the opcodes 2304, 2404 may indicate a broad operation to be merge two source 2D arrays to generate the result 2D array, and the broad operation may encompass two or more (or optionally three, four, five, six, seven, eight, nine, ten, or optionally more than ten) alternate ways of merging the two source 2D arrays to generate the result 2D array. Each of the alternatives may be different in some way from the other alternatives (e.g., at least one different portion may be merged and/or there may be at least some difference in the way the portions are merged).

In such embodiments, the single additional values 2306, 2406 may specify, select, or otherwise indicate one of the alternatives supported by the two source 2D array merge instructions 2302, 2402 and/or their opcodes 2304, 2404. In combination, the two source 2D array merge instruction and/or its opcode plus the single additional value may indicate a single/particular operation to merge a single/ particular set of portions of two source 2D arrays to generate a result 2D array. In such embodiments, the plurality of portions of the first and second 2D arrays to be merged into the result 2D array, and the pattern or way in which they may be merged (e.g., the positions of these portions in the result 2D array), may be at least predominantly or entirely implicit to the combination of both the two source 2D array merge instruction and/or its opcode plus the single additional value, as previously described. No separate set of explicit per-portion control indices or other values are needed to explic-itly tell this to the decode unit or decoder circuitry, as previously described. The type of the two source 2D array merge instruction and/or its opcode plus the single addi-tional value may prescribe, fix, determine, or indicate these portions and how they are to be merged.

In the embodiments of FIGS. 23-24, the two source 2D array merge instructions 2302, 2402 only have the first source, second source, and destination location indicators 2326, 2328, 2330 or 2426, 2428, 2430 and either the immediate 2332 or the third source location indicator 2434. Moreover, other than operands to indicate the first source storage location, the second source storage location, and the destination storage location (including potentially implicit memory addressing registers such as segment registers and so on when the location(s) are in memory), and the imme-diate or other operand to indicate the single additional value, the instructions otherwise do not indicate any other operands or any other values in any other registers, memory, or other architecturally-visible storage locations. In particular, the instructions do not indicate per-portion merge control val-ues, as described elsewhere herein.

Table 2 lists a few specific example embodiments two source 2D array merge instructions where the operations of the instructions (e.g., the portions to be merged and the way they are to be merged) are indicated by and implicit to a combination of the two source 2D array merge instructions and/or their opcodes plus a single additional value indicated by the instructions. The two source 2D array merge instruc-tions may have instruction formats like those described for either of FIGS. 23-24. As before, there are columns for opcode (mnemonic), a SRC1/DST, a SRC2, and an opera-tion. Additionally, there is a column listing different values for a single value. In this embodiment, all rows have the same opcode (mnemonic) to indicate that the same opcode (mnemonic) supports all the operations listed in the opera-tions column. The specific listed opcode and mnemonic are merely examples and others could be used instead. The SRC1/DST and SRC2 columns may be similar to those previously described, and have the same variations and alternatives (e.g., there could instead be a separate destina-tion storage location).

Each row represents a different combination of an opcode (mnemonic) and a different value in the single value column. This is just one way of assigning the values of the single value to the operations, and various other ways could be used instead. Also, there can be more or less different operations and corresponding single values (e.g., as few as two, or optionally many more than the number shown). The operation column lists the operation that the processor is to perform, and that an execution unit or execution circuitry is to execute, for the combination of the opcode (mnemonic) plus the single value for that row. For example, the single value being equal to three may select the operation of the fourth row, the single value being equal to five may select the operation of the sixth row, and so on. In some embodi-ments, each of these operations (e.g., the portions to be merged and the way they are to be merged) may be at least predominantly or entirely implicit to the combination of the two source 2D array merge instruction and/or the opcode plus the single value, as previously described. The combi-nation of the type of the two source 2D array merge instruction itself and/or its opcode plus the single value may prescribe, fix, determine, or indicate these portions and how they are to be merged.

TABLE 2

| OPCODE/ MNEMONIC | SINGLE VALUE | SRC1/ DST | SRC2 | OPERATION |
|---|---|---|---|---|
| 110 (2DArrayMerge) | 0 | A1 | A2 | Generate and store result in A1 having only every odd row of A1 interleaved with only every corresponding odd row of A2 |
| 110 (2DArrayMerge) | 1 | A1 | A2 | Generate and store result in A1 having only every even row of A1 interleaved with only every corresponding even row of A2 |
| 110 (2DArrayMerge) | 2 | A1 | A2 | Generate and store result in A1 having only every odd column of A1 interleaved with only every corresponding odd column of A2 |
| 110 (2DArrayMerge) | 3 | A1 | A2 | Generate and store result in A1 having only every even column of A1 interleaved with only every corresponding even column of A2 |
| 110 (2DArrayMerge) | 4 | A1 | A2 | Generate and store result in A1 having only every odd element of every row of A1 interleaved with only every corresponding odd element of every corresponding row of A2 |
| 110 (2DArrayMerge) | 5 | A1 | A2 | Generate and store result in A1 having only every even element of every row of A1 interleaved with only every corresponding even element of every corresponding row of A2 |

TABLE 2-continued

| OPCODE/ MNEMONIC | SINGLE VALUE | SRC1/ DST | SRC2 | OPERATION |
|---|---|---|---|---|
| 110 (2DArrayMerge) | 6 | A1 | A2 | Generate and store result in A1 having only the first half of the rows of A1 interleaved with only corresponding ones of the first half of the rows of A2 |
| 110 (2DArrayMerge) | 7 | A1 | A2 | Generate and store result in A1 having only the first half of the columns of A1 interleaved with only corresponding ones of the first half of the columns of A2 |

These are only a few example embodiments of two source 2D array merge instructions and operations. Other examples are also contemplated. For example, instead of interleaving the same parity (e.g., odd or even) portions (e.g., rows, columns, or elements) the same parity portions could instead be concatenated together in adjacent portions. For example, all odd rows of A1 could be concatenated together and appended to all odd rows of A2 concatenated together. Analogously this could be done for the even rows. As another example, all even columns of A1 could be concatenated together and appended to all even columns of A2 concatenated together. Analogously this could be done for odd columns. Analogously this could also be done for even or odd elements.

In some embodiments, the alternatives supported by an opcode may include a plurality of different ways or alternatives to merge different sets of rows of the first and second source 2D arrays. In some embodiments, the alternatives supported by an opcode may include a plurality of different ways or alternatives to merge different sets of rows of the first and second source 2D arrays. In some embodiments, the alternatives supported by an opcode may include a plurality of different ways or alternatives to merge different sets of data elements of the first and second source 2D arrays. In some embodiments, the alternatives supported by an opcode may include both a plurality of different ways or alternatives to merge different sets of rows of the first and second source 2D arrays and a plurality of different ways or alternatives to merge different sets of rows of the first and second source 2D arrays. In some embodiments, the alternatives supported by an opcode may include all three of a plurality of different ways or alternatives to merge different sets of rows of the first and second source 2D arrays, and a plurality of different ways or alternatives to merge different sets of rows of the first and second source 2D arrays, and a plurality of different ways or alternatives to merge different sets of data elements of the first and second source 2D arrays.

In some embodiments, the alternatives supported by an opcode may include a plurality of different ways or alternatives to merge only half of the rows of the first source 2D array and only half of the rows of the second source 2D array. In some embodiments, the alternatives supported by an opcode may include a plurality of different ways or alternatives to merge only half of the columns of the first source 2D array and only half of the columns of the second source 2D array. In some embodiments, the alternatives supported by an opcode may include a plurality of different ways or alternatives to merge only half of the data elements of the first source 2D array and only half of the data elements of the second source 2D array. In some embodiments, the alternatives supported by an opcode may include both a plurality of different ways or alternatives to merge only half of the rows of the first source 2D array and only half of the rows of the second source 2D array and a plurality of different ways or alternatives to merge only half of the columns of the first source 2D array and only half of the columns of the second source 2D array. In some embodiments, the alternatives supported by an opcode may include all three of a plurality of different ways or alternatives to merge only half of the rows of the first source 2D array and only half of the rows of the second source 2D array, and a plurality of different ways or alternatives to merge only half of the columns of the first source 2D array and only half of the columns of the second source 2D array, and a plurality of different ways or alternatives to merge only half of the data elements of the first source 2D array and only half of the data elements of the second source 2D array.

FIGS. 25-32 are block diagrams of several illustrative example embodiments of processors that are operative to perform several illustrative example embodiments of 2D array merge instructions. Each of the processors has a decoder unit or decoder circuitry and an execution unit or execution circuitry. The processors, decoder units or decoder circuitry, and execution units or execution circuitry may be similar to or the same as the other ones described herein (e.g., the processor 2100, decoded unit or decoder circuitry 2108, and execution unit or execution circuitry 2110), and may have similar or the same characteristics, variations, and alternatives. The two source 2D array merge instructions may specify (e.g., explicitly specify) or otherwise indicate (e.g., implicitly indicate) storage locations having first and second source 2D arrays. The storage locations may be similar to or the same as the other storage locations for 2D arrays described herein, such as, for example, vector registers, 2D registers (e.g., comprising an overly over physical registers), 2D tile storage, memory locations, and combinations thereof. The processors operate on source 2D arrays to generate result 2D arrays. The result 2D arrays may be stored in a destination storage location. The destination storage location may either be a storage location used for one of the source 2D arrays, or a different storage location indicated by the instruction. The sizes of the source 2D arrays and the result 2D arrays may be similar to or the same as the other sizes for 2D arrays described herein, such as, for example, a single fixed size, a set or group of fixed sizes that can be selected, a flexible or configurable size (e.g., according to configuration data, a palette, data stored in control and/or configuration registers, a configuration stored by a tile configuration instruction of an instruction set).

Figure 25:
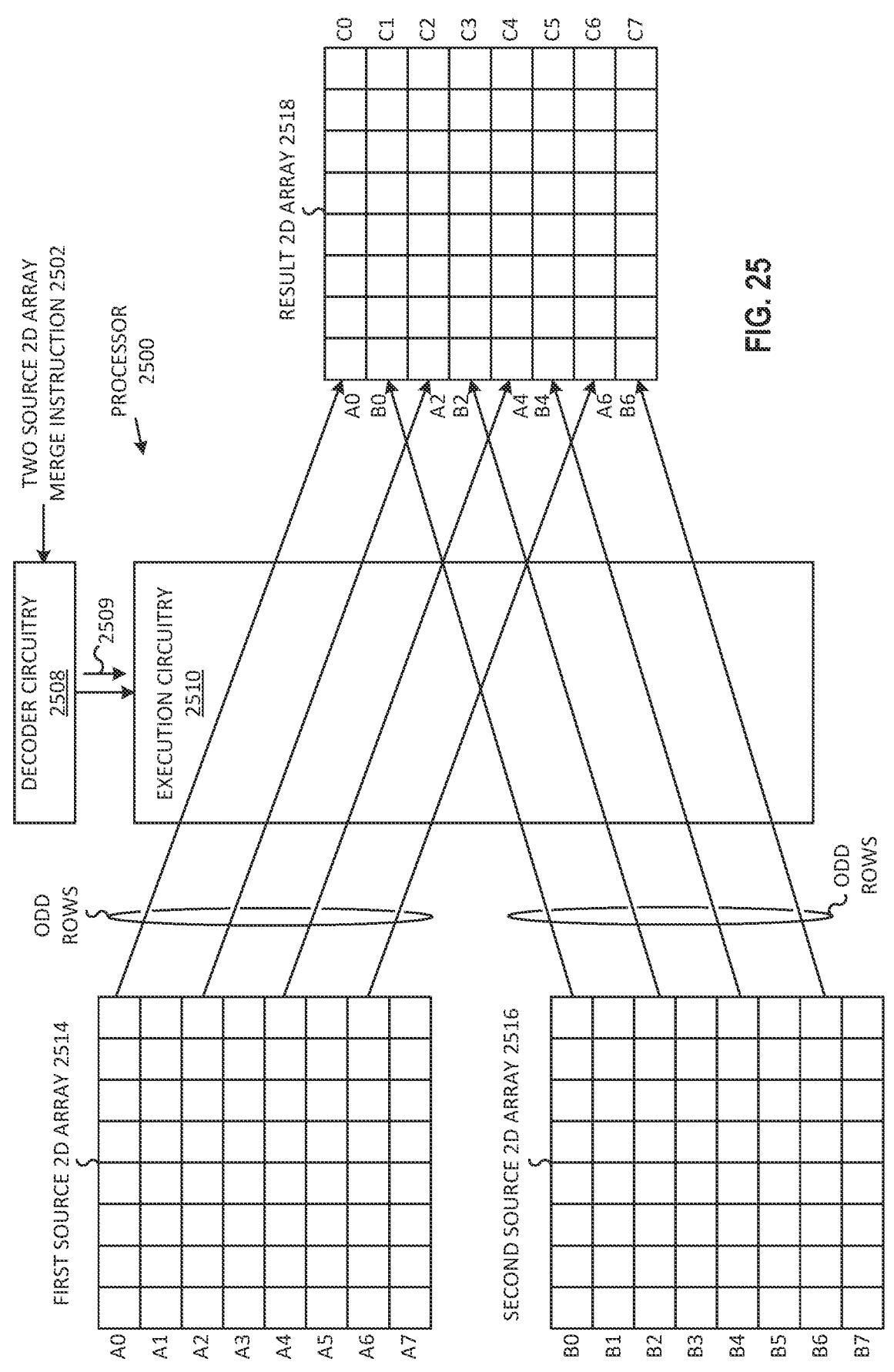

FIG. 25 is a block diagram of a first example embodiment of a processor 2500 that is operative to perform a first example embodiment of a two source 2D array merge instruction 2502. The processor includes a decoder circuitry 2508 to receive the two source 2D array merge instruction. The two source 2D array merge instruction may have an opcode, and may indicate a first source 2D array 2514 and a second source 2D array 2516. The decoder circuitry may decode the two source 2D array merge instruction 2502 into a decoded two source 2D array merge instruction 2509 (e.g., one or more operations). An execution circuitry 2510 of the processor is coupled with the decoder circuitry to receive the decoded two source 2D array merge instruction. The execution circuitry may execute the decoded two source 2D array merge instruction to generate a result 2D array 2518. In this first example embodiment, the execution circuitry may interleave only every odd (odd positioned) row (e.g., A0, A2, A4, and A6) of the first 2D array with only every corresponding odd (odd positioned) row (e.g., B0, B2, B4, and B6) of the second 2D array, to generate the result 2D array. A0, A2, A4, and A6 are the odd positioned rows because the numbering scheme starts with 0 (e.g., A0) instead of 1. The odd rows are one full set of same parity rows. Row C0 of the result 2D array may therefore store row A0 from the first source 2D array, row C1 of the result 2D array may therefore store row B0 from the second source 2D array, and so on. In some embodiments, the two source 2D array merge instruction may not indicate a plurality of values to explicitly specify the odd rows of the first 2D array and the odd rows of the second 2D arrays that are to be merged. Rather, in some embodiments, these odd rows, and the way that they are to be merged (e.g., interleaving the corresponding ones), may either be implicit to the opcode of the two source 2D array merge instruction, or a combination of the opcode of the two source 2D array merge instruction and a single value indicated by the two source 2D array merge instruction. The execution unit may store the result 2D array in a destination storage location.

Figure 26:
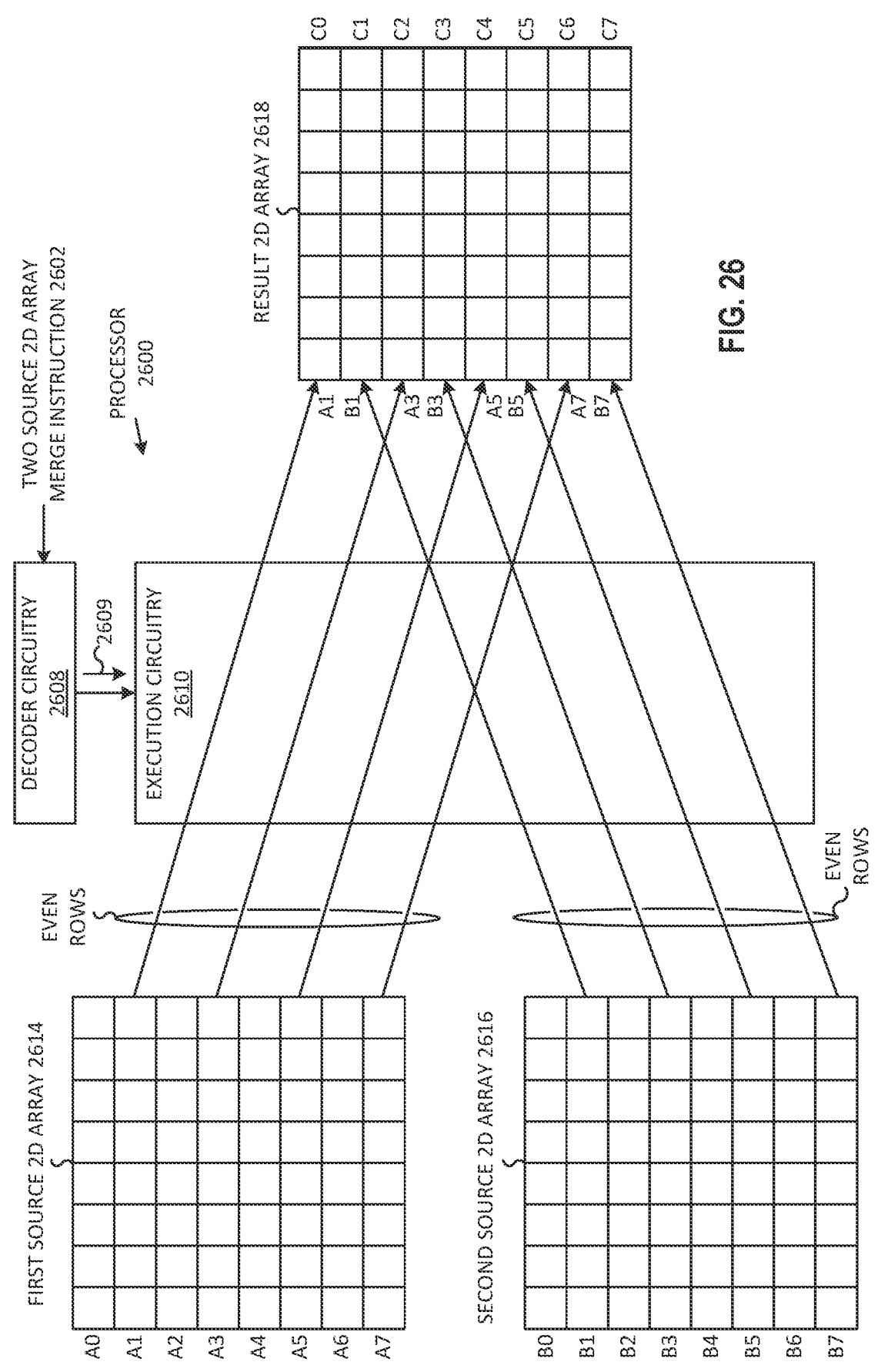

FIG. 26 is a block diagram of a second example embodiment of a processor 2600 that is operative to perform a second example embodiment of a two source 2D array merge instruction 2602. The processor includes a decoder circuitry 2608 to receive the two source 2D array merge instruction. The two source 2D array merge instruction may have an opcode, and may indicate a first source 2D array 2614 and a second source 2D array 2616. The decoder circuitry may decode the two source 2D array merge instruction 2602 into a decoded two source 2D array merge instruction 2609. An execution circuitry 2610 of the processor is coupled with the decoder circuitry to receive the decoded two source 2D array merge instruction. The execution circuitry may execute the decoded two source 2D array merge instruction to generate a result 2D array 2618. In this second example embodiment, the execution circuitry may interleave only every even (even positioned) row (e.g., A1, A3, A5, and A7) of the first 2D array with only every corresponding even (even positioned) row (e.g., B1, B3, B5, and B7) of the second 2D array, to generate the result 2D array. The even rows are another full set of same parity rows. Row C0 of the result 2D array may therefore store row A1, row C1 of the result 2D array may store row B1, and so on. In some embodiments, the two source 2D array merge instruction may not indicate a plurality of values to explicitly specify the even rows of the first 2D array and the even rows of the second 2D arrays that are to be merged. Rather, in some embodiments, these even rows, and the way that they are to be merged (e.g., interleaving the corresponding ones), may either be implicit to the opcode of the two source 2D array merge instruction, or a combination of the opcode of the two source 2D array merge instruction and a single value indicated by the two source 2D array merge instruction. The execution unit may store the result 2D array in a destination storage location.

Figure 27:
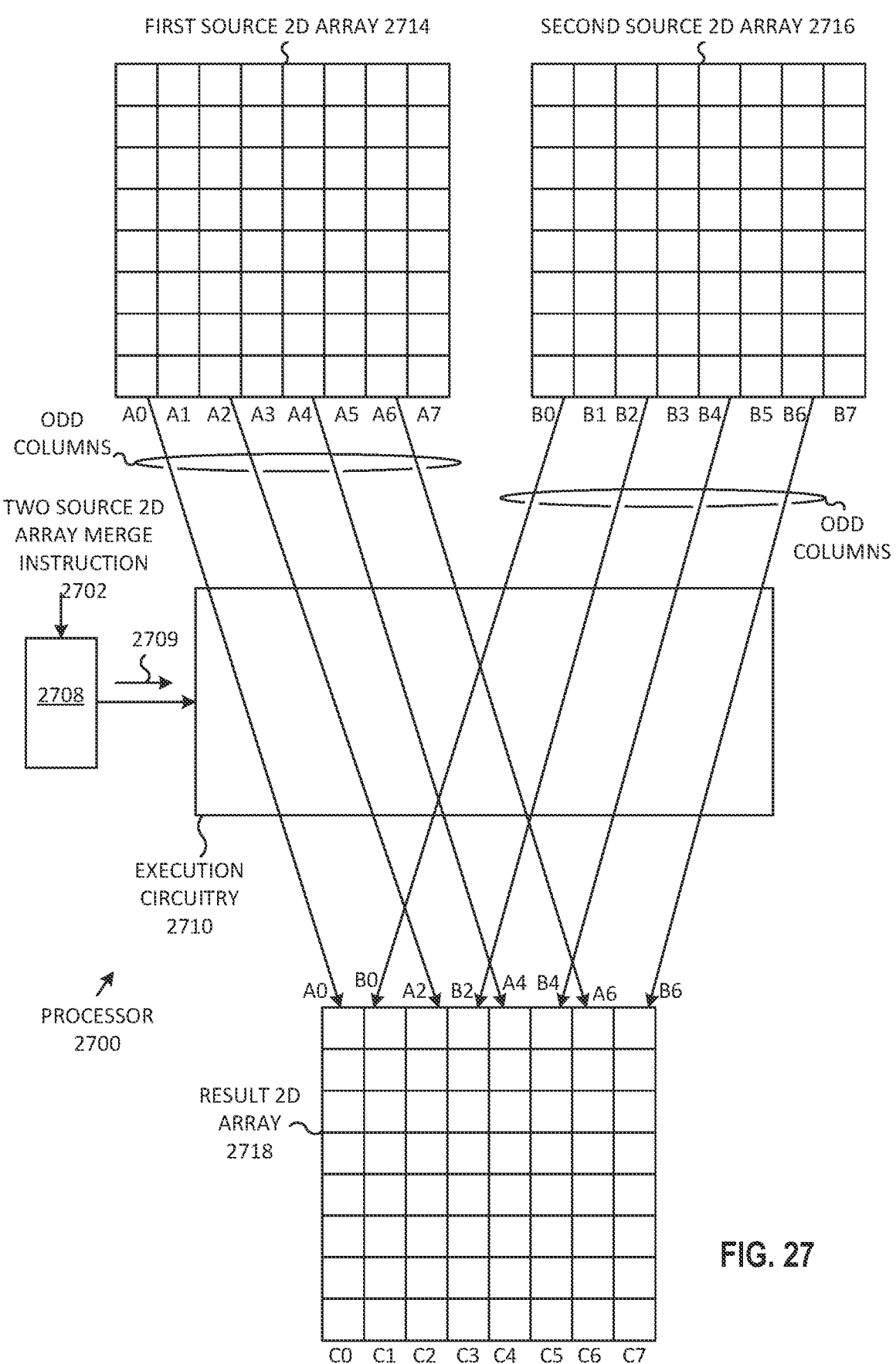

FIG. 27 is a block diagram of a third example embodiment of a processor 2700 that is operative to perform a third example embodiment of a two source 2D array merge instruction 2702. The processor includes a decoder circuitry 2708 to receive the two source 2D array merge instruction. The two source 2D array merge instruction may have an opcode, and may indicate a first source 2D array 2714 and a second source 2D array 2716. The decoder circuitry may decode the two source 2D array merge instruction 2702 into a decoded two source 2D array merge instruction 2709. An execution circuitry 2710 of the processor is coupled with the decoder circuitry to receive the decoded two source 2D array merge instruction. The execution circuitry may execute the decoded two source 2D array merge instruction to generate a result 2D array 2718. In this third example embodiment, the execution circuitry may interleave only every odd (odd positioned) column (e.g., A0, A2, A4, and A6) of the first 2D array with only every corresponding odd (odd positioned) column (e.g., B0, B2, B4, and B6) of the second 2D array, to generate the result 2D array. The odd columns are one full set of same parity columns. Column C0 of the result 2D array may therefore store column A0, column C1 of the result 2D array may store column B0, and so on. In some embodiments, the two source 2D array merge instruction may not indicate a plurality of values to explicitly specify the odd columns of the first 2D array and the odd columns of the second 2D arrays that are to be merged. Rather, in some embodiments, these odd columns, and the way that they are to be merged (e.g., interleaving the corresponding ones), may either be implicit to the opcode of the two source 2D array merge instruction, or a combination of the opcode of the two source 2D array merge instruction and a single value indicated by the two source 2D array merge instruction. The execution unit may store the result 2D array in a destination storage location.

Figure 28:
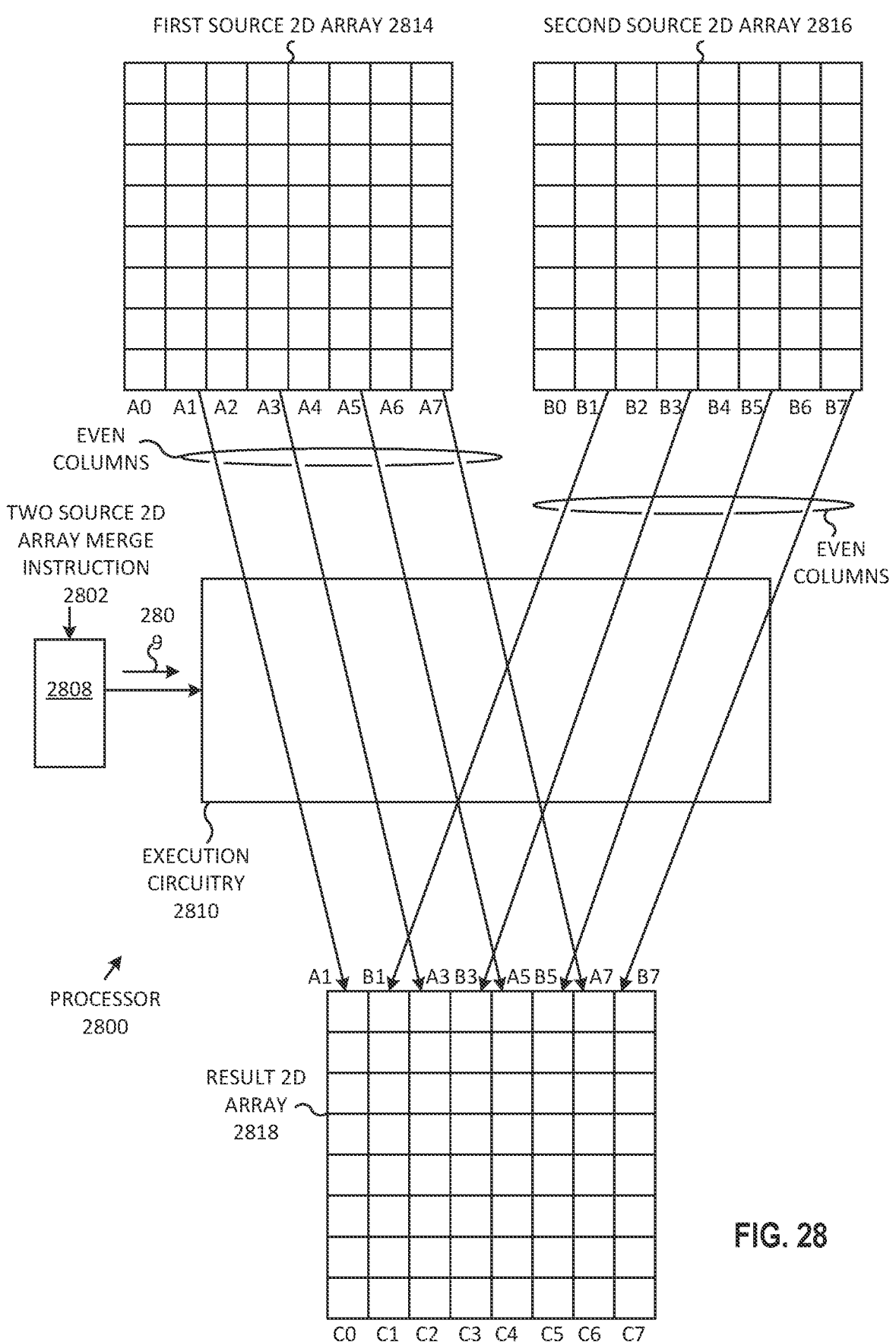

FIG. 28 is a block diagram of a fourth example embodiment of a processor 2800 that is operative to perform a fourth example embodiment of a two source 2D array merge instruction 2802. The processor includes a decoder circuitry 2808 to receive the two source 2D array merge instruction. The two source 2D array merge instruction may have an opcode, and may indicate a first source 2D array 2814 and a second source 2D array 2816. The decoder circuitry may decode the two source 2D array merge instruction 2802 into a decoded two source 2D array merge instruction 2809. An execution circuitry 2810 of the processor is coupled with the decoder circuitry to receive the decoded two source 2D array merge instruction. The execution circuitry may execute the decoded two source 2D array merge instruction to generate a result 2D array 2818. In this fourth example embodiment, the execution circuitry may interleave only every even (even positioned) column (e.g., A1, A3, A5, and A7) of the first 2D array with only every corresponding even (even positioned) column (e.g., B1, B3, B5, and B7) of the second 2D array, to generate the result 2D array. The even columns are one full set of same parity columns. Column C0 of the result 2D array may therefore store column A1, column C1 of the result 2D array may store column B1, and so on. In some embodiments, the two source 2D array merge instruction may not indicate a plurality of values to explicitly specify the even columns of the first 2D array and the even columns of the second 2D arrays that are to be merged. Rather, in some embodiments, these even columns, and the way that they are to be merged (e.g., interleaving the corresponding ones), may either be implicit to the opcode of the two source 2D array merge instruction, or a combination of the opcode of the two source 2D array merge instruction and a single value indicated by the two source 2D array merge instruction. The execution unit may store the result 2D array in a destination storage location.

Figure 29:
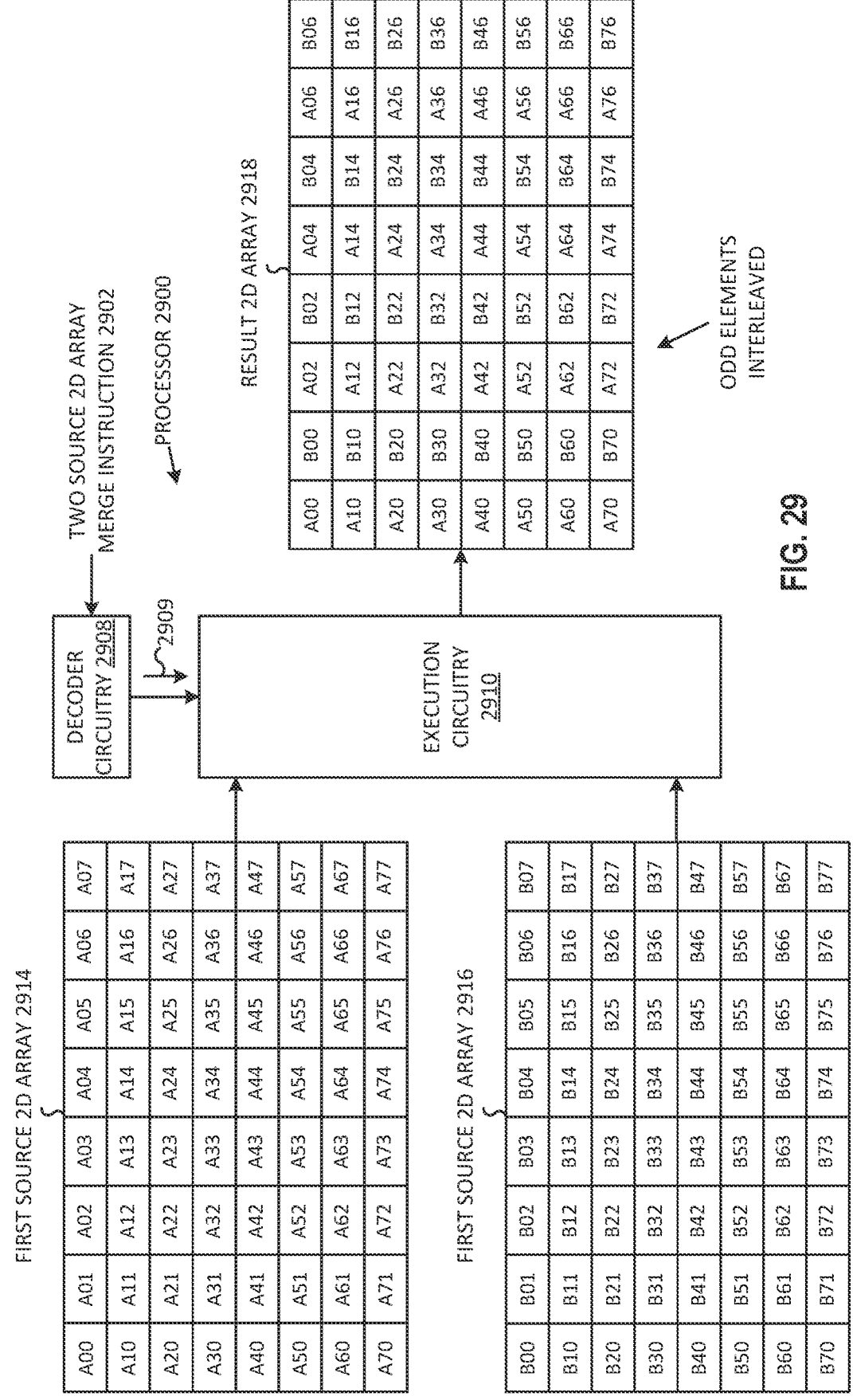

FIG. 29 is a block diagram of a fifth example embodiment of a processor 2900 that is operative to perform a fifth example embodiment of a two source 2D array merge instruction 2902. The processor includes a decoder circuitry 2908 to receive the two source 2D array merge instruction. The two source 2D array merge instruction may have an opcode, and may indicate a first source 2D array 2914 and a second source 2D array 2916. The decoder circuitry may decode the two source 2D array merge instruction 2902 into a decoded two source 2D array merge instruction 2909. An execution circuitry 2910 of the processor is coupled with the decoder circuitry to receive the decoded two source 2D array merge instruction. The execution circuitry may execute the decoded two source 2D array merge instruction to generate a result 2D array 2918. In this fifth example embodiment, the execution circuitry may interleave only every odd (odd positioned) data element from every row (e.g., A00, A02, A04, A06 from the first row, A10, A12, A14, A16 from the second row, and so on) of the first 2D array with only every corresponding odd (odd positioned) data element from every corresponding row (e.g., B00, B02, B04, B06 from the first row, B10, B12, B14, B16 from the second row, and so on) of the second 2D array, to generate the result 2D array. The specific data elements and how they are merged can be readily seen from the drawing. The odd data elements are one full set of same parity data elements. In some embodiments, the two source 2D array merge instruction may not indicate a plurality of values to explicitly specify the odd data elements of the first 2D array and the odd data elements of the second 2D arrays that are to be merged. Rather, in some embodiments, these odd data elements, and the way that they are to be merged (e.g., interleaving the corresponding ones from the corresponding rows), may either be implicit to the opcode of the two source 2D array merge instruction, or a combination of the opcode of the two source 2D array merge instruction and a single value indicated by the two source 2D array merge instruction. The execution unit may store the result 2D array in a destination storage location.

Figure 30:
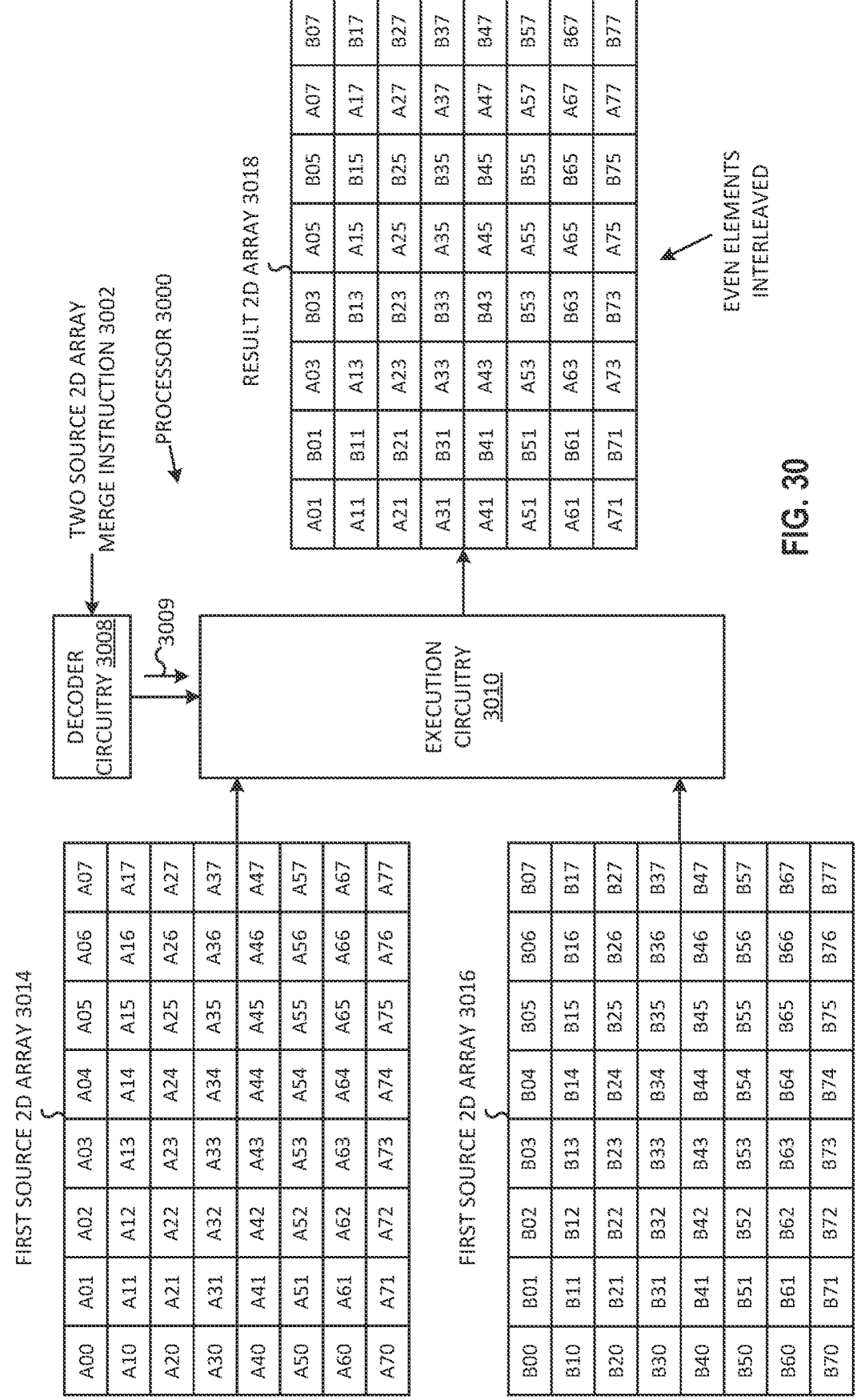

FIG. 30 is a block diagram of a sixth example embodiment of a processor 3000 that is operative to perform a sixth example embodiment of a two source 2D array merge instruction 3002. The processor includes a decoder circuitry 3008 to receive the two source 2D array merge instruction. The two source 2D array merge instruction may have an opcode, and may indicate a first source 2D array 3014 and a second source 2D array 3016. The decoder circuitry may decode the two source 2D array merge instruction 3002 into a decoded two source 2D array merge instruction 3009. An execution circuitry 3010 of the processor is coupled with the decoder circuitry to receive the decoded two source 2D array merge instruction. The execution circuitry may execute the decoded two source 2D array merge instruction to generate a result 2D array 3018. In this sixth example embodiment, the execution circuitry may interleave only every even (even positioned) data element from every row (e.g., A01, A03, A05, A07 from the first row, A11, A13, A15, A17 from the second row, and so on) of the first 2D array with only every corresponding even (even positioned) data element from every corresponding row (e.g., B01, B03, B05, B07 from the first row, B11, B13, B15, B17 from the second row, and so on) of the second 2D array, to generate the result 2D array. The specific data elements and how they are merged can be readily seen from the drawing. The even data elements are one full set of same parity data elements. In some embodiments, the two source 2D array merge instruction may not indicate a plurality of values to explicitly specify the even data elements of the first 2D array and the even data elements of the second 2D arrays that are to be merged. Rather, in some embodiments, these even data elements, and the way that they are to be merged (e.g., interleaving the corresponding ones from the corresponding rows), may either be implicit to the opcode of the two source 2D array merge instruction, or a combination of the opcode of the two source 2D array merge instruction and a single value indicated by the two source 2D array merge instruction. The execution unit may store the result 2D array in a destination storage location.

Figure 31:
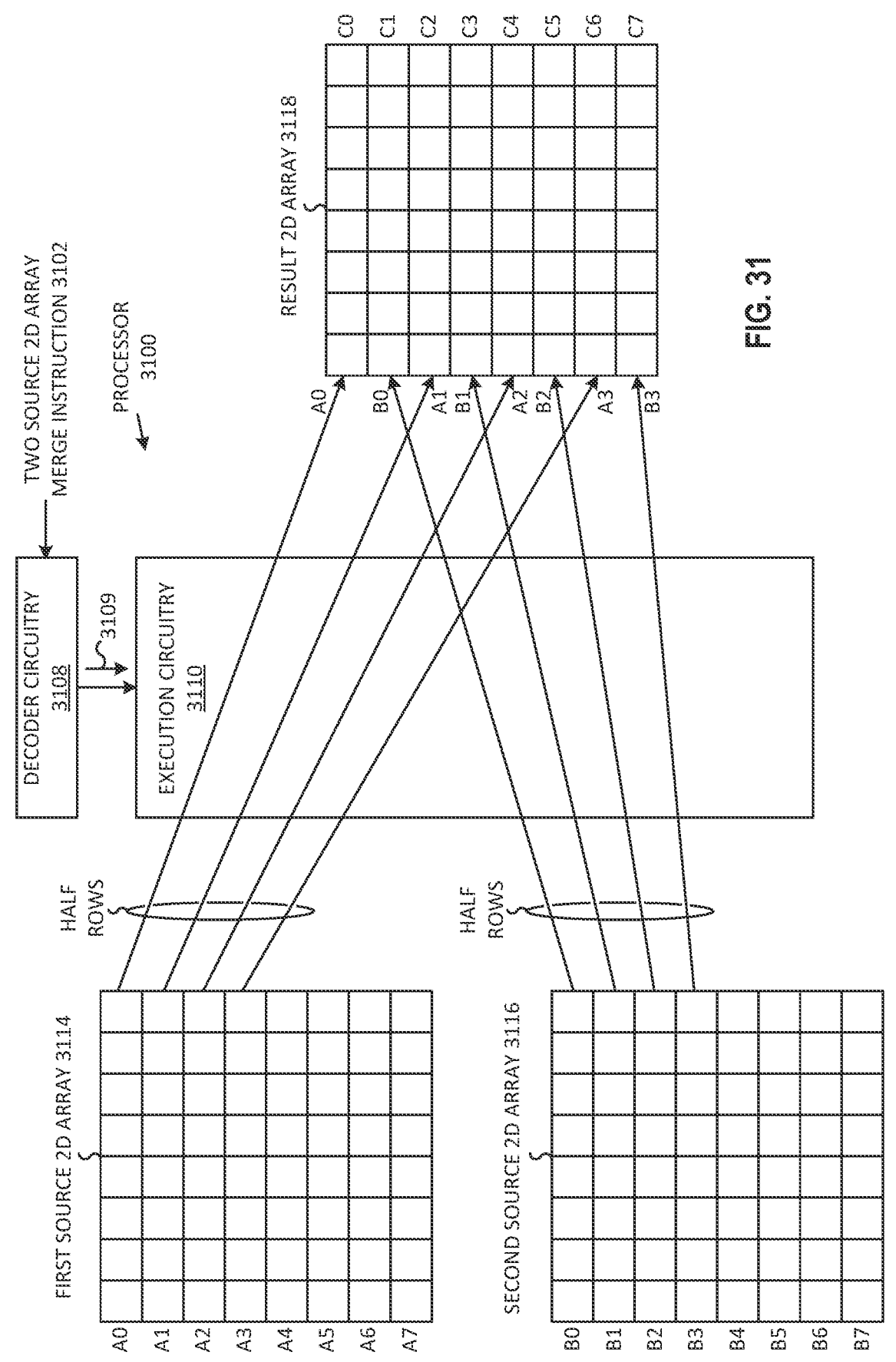

FIG. 31 is a block diagram of a seventh example embodiment of a processor 3100 that is operative to perform a seventh example embodiment of a two source 2D array merge instruction 3102. The processor includes a decoder circuitry 3108 to receive the two source 2D array merge instruction. The two source 2D array merge instruction may have an opcode, and may indicate a first source 2D array 3114 and a second source 2D array 3116. The decoder circuitry may decode the two source 2D array merge instruction 3102 into a decoded two source 2D array merge instruction 3109. An execution circuitry 3110 of the processor is coupled with the decoder circuitry to receive the decoded two source 2D array merge instruction. The execution circuitry may execute the decoded two source 2D array merge instruction to generate a result 2D array 3118. In this seventh example embodiment, the execution circuitry may interleave only the first lowest half of the rows (e.g., A0, A1, A2, and A3) of the first 2D array with only every corresponding one of the first lowest half of the rows (e.g., B0, B1, B2, and B3) of the second 2D array, to generate the result 2D array. In some embodiments, the two source 2D array merge instruction may not indicate a plurality of values to explicitly specify the first half of the rows of the first 2D array and the first half of the rows of the second 2D arrays that are to be merged. Rather, in some embodiments, these first halves of the rows, and the way that they are to be merged (e.g., interleaving the corresponding ones), may either be implicit to the opcode of the two source 2D array merge instruction, or a combination of the opcode of the two source 2D array merge instruction and a single value indicated by the two source 2D array merge instruction. The execution unit may store the result 2D array in a destination storage location.

Figure 32:
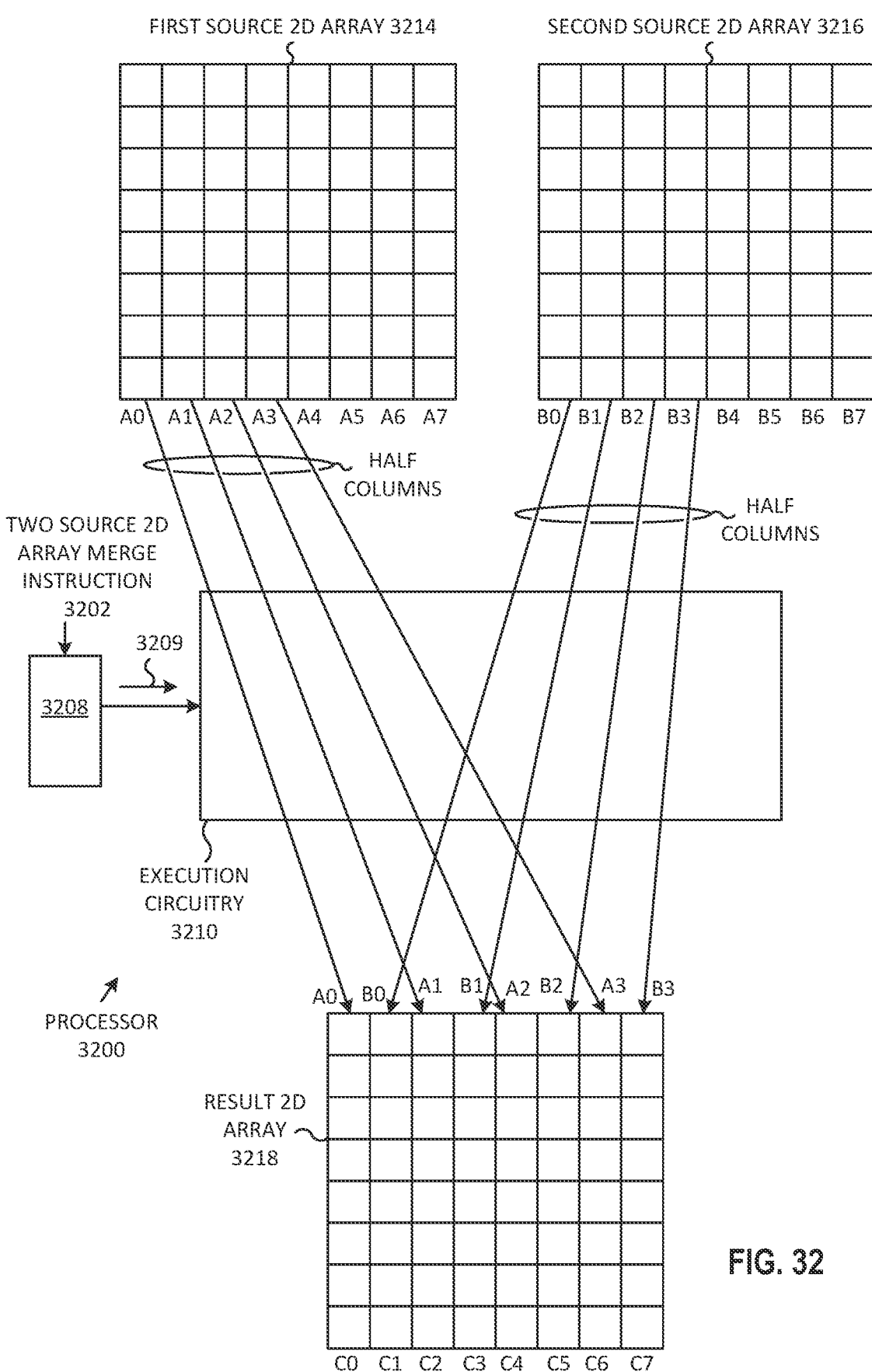

FIG. 32 is a block diagram of a seventh example embodiment of a processor 3200 that is operative to perform a seventh example embodiment of a two source 2D array merge instruction 3202. The processor includes a decoder circuitry 3208 to receive the two source 2D array merge instruction. The two source 2D array merge instruction may have an opcode, and may indicate a first source 2D array 3214 and a second source 2D array 3216. The decoder circuitry may decode the two source 2D array merge instruction 3202 into a decoded two source 2D array merge instruction 3209. An execution circuitry 3210 of the processor is coupled with the decoder circuitry to receive the decoded two source 2D array merge instruction. The execution circuitry may execute the decoded two source 2D array merge instruction to generate a result 2D array 3218. In this eighth example embodiment, the execution circuitry may interleave only the first lowest half of the columns (e.g., A0, A1, A2, and A3) of the first 2D array with only every corresponding one of the first lowest half of the columns (e.g., B0, B1, B2, and B3) of the second 2D array, to generate the result 2D array. In some embodiments, the two source 2D array merge instruction may not indicate a plurality of values to explicitly specify the first half of the columns of the first 2D array and the first half of the columns elements of the second 2D arrays that are to be merged. Rather, in some embodiments, these first halves of the columns, and the way that they are to be merged (e.g., interleaving the corresponding ones), may either be implicit to the opcode of the two source 2D array merge instruction, or a combination of the opcode of the two source 2D array merge instruction and a single value indicated by the two source 2D array merge instruction. The execution unit may store the result 2D array in a destination storage location.

In FIGS. 25-32, one half of the portions (e.g., rows, columns, or data elements) of the result 2D array are sourced from the first source 2D array whereas another half of the portions (e.g., rows, columns, or data elements) are sourced from the second source 2D array. In most cases, the portions have the same corresponding positions in the source 2D arrays (e.g., odd rows, even rows, odd columns, even columns, odd elements, even elements, etc.). However, these are just a few examples. Various other ways of merging portions of two source 2D arrays are also contemplated, such as those in which the same described portions of one source array are concatenated together and appended to the same described portions of the other source array, instead of the portions of the two source arrays being interleaved as described.

FIG. 33 illustrates an embodiment of method performed by a processor to process a two source 2D array merge instruction. For example, a processor as shown in FIG. 21, a pipeline as detailed below, etc. performs this method.

At 3336, the two source 2D array merge instruction is fetched. The two source 2D array merge instruction includes an opcode, and indicates a first source two-dimensional (2D) array and a second source 2D array. In some embodiments, the instruction is fetched from an instruction cache. The opcode of the instruction indicates which operation (e.g., merge two source 2D arrays to generate a result 2D array) to perform.

The fetched instruction is decoded at 3337. For example, the fetched two source 2D array merge instruction is decoded by decode circuitry such as that detailed herein.

Data values associated with the source operands of the decoded instruction are retrieved at 3338. For example, when one or more of the source operands are memory operands, the data from the indicated memory location is retrieved.

At 3339, the decoded instruction is executed by execution circuitry (hardware) such as that detailed herein. For the two source 2D array merge instruction, the execution will cause execution circuitry to merge a plurality of portions of the first 2D array, and a plurality of portions of the second 2D array, to generate a result 2D array. The instruction does not indicate a plurality of values specifying the plurality of portions of the first 2D array and the plurality of portions of the second 2D array.

In some embodiments, the instruction is committed or retired at 3340.

FIG. 34 illustrates an embodiment of method performed by a processor to process a two source 2D array merge instruction using emulation or binary translation. For example, a processor as shown in FIG. 21, a pipeline as detailed below, etc. performs this method.

At 3441, the two source 2D array merge instruction is fetched. The two source 2D array merge instruction includes an opcode, and indicates a first source two-dimensional (2D) array and a second source 2D array. In some embodiments, the instruction is fetched from an instruction cache. The opcode of the instruction indicates which operation (e.g., merge two source 2D arrays to generate a result 2D array) to perform.

The fetched two source 2D array merge instruction, which is of a first instruction set, is translated into one or more instructions of a second instruction set at 3442.

The one or more translated instructions of the second instruction set are decoded at 3443. In some embodiments, the translation and decoding are merged.

Data values associated with the source operands of the decoded instruction are retrieved at 3444. For example, when one or more of the source operands are memory operands, the data from the indicated memory location is retrieved.

At 3445, the decoded instruction(s) of the second instruction set is/are executed by execution circuitry (hardware) such as that detailed herein. For the two source 2D array merge instruction, the execution will cause execution circuitry to merge a plurality of portions of the first 2D array, and a plurality of portions of the second 2D array, to generate a result 2D array. The instruction does not indicate a plurality of values specifying the plurality of portions of the first 2D array and the plurality of portions of the second 2D array.

In some embodiments, the instruction is committed or retired at 3446.

Two Source 2D Array Permute Instructions, Processors, and Methods

FIG. 35 is a block diagram of an embodiment of a processor 3500 that is operative to perform an embodiment of a two source 2D array permute instruction 3501. Aside from the different and/or additional characteristics pertaining to the two source 2D array permute instruction 3501, instead of (or in addition to) the two source 2D array merge instruction 2102 of FIG. 21, the processor 3500, its components, and its operation, may be similar to or the same as what has already been described for the processor 2100 of FIG. 21. To avoid obscuring the description, the different and/or additional characteristics of the processor 3500, its components, and its operation, will primarily be described, without repeating all the characteristics that may optionally be the same or similar to those already been described for the processor 2100 of FIG. 21. [000205] The processor 3500 may be coupled to receive the two source 2D array permute instruction 3501. The processor 3500 may have characteristics, alternatives, and variations previously described for the processor 2100 of FIG. 21 (e.g., be a CPU, a graphics processor, etc., have a CISC, RISC, or VLIW architecture, optionally have the other processor components previously described, etc.).

The two source 2D array permute instruction 3501 may represent a macroinstruction, machine code instruction, or other instruction or control signal of an instruction set of the processor. The two source 2D array permute instruction may have an opcode (e.g., an operation code) 3503. The opcode may prescribe or indicate an operation that is to be performed (e.g., an operation to permute two source 2D arrays according to source permute control elements to generate a result 2D array).

The two source 2D array permute instruction 3501 may explicitly specify (e.g., through one or more fields or sets of bits), or otherwise indicate (e.g., implicitly indicate) a first source matrix, tile or other matrix portion, or other 2D array 3514, and a second source matrix, tile or other matrix portion, or other 2D array 3516. As shown, in some embodiments, the first source 2D array and the second source 2D array may be stored in one or more types of 2D array storage

3512. The types of 2D array storage previously mentioned (e.g., tile registers, vector registers, memory, and combinations thereof) are suitable. The instruction may explicitly specify and/or implicitly indicate 2D array storage locations to indicate the source 2D arrays, as previously described.

The first source 2D array 3514, and the second source 2D array 3516, may be similar to or the same as what has already been described for the first source 2D array 2114, and the second source 2D array 2116, of FIG. 21. For example, each include a 2D array of data elements that are at least logically arranged in multiple rows and multiple columns. The various sizes mentioned elsewhere herein for are suitable. To simplify the illustration, the first and second source 2D arrays only have two rows and two columns, although it to be appreciated that typically there may be more of each (e.g., at least four, eight, or more rows, at least four, eight, or more columns). The first and second source 2D arrays may have a single fixed size, or a selected one of a plurality of possible fixed sizes, or configurable sizes that are configurable in both a number of rows and a number of columns (e.g., via control and/or configuration registers), as previously described.

The two source 2D array permute instruction 3501 may also explicitly specify (e.g., through one or more fields or sets of bits), or otherwise indicate (e.g., implicitly indicate) a plurality of source permute control elements 3548. Examples of the permute control elements include indexes or other permute control elements analogous to the types used by vector shuffle instructions, permute instructions, and the like. Each permute control value may broadly represent a multi-bit value having enough bits to provide enough unique bit values to uniquely identify any data element from the first and second source 2D arrays. In some embodiments, the instruction may indicate a third, additional source matrix, tile or other matrix portion, or other 2D array as a source of the plurality of permute control elements. The third 2D array may also be stored in the one or more types of 2D array storage 3512. In other embodiments, the instruction may indicate one or more packed data, vector, or SIMD data types as a source of the plurality of permute control elements. The packed data, vector, or SIMD data types may be stored in one or more packed data, vector, or SIMD registers (e.g., a single vector register or a plurality of sequential vector registers) or in a vector memory operand. By way of example the ZMM registers disclosed further below are suitable. The use of the 2D array may be favored over the one or more vector registers in cases where too many registers are needed to include a permute control element for each result data element of the result 2D array. By way of example, 64 byte-sized permute control elements fit in a 512-bit vector, twice as many can fit in a 1024-bit vector, and so on. Each 8-bit permute control element may uniquely specify or select any one of 256 different data elements in the first and second source 2D arrays. In some embodiments, the two source 2D array permute instruction may have one of the instruction formats described further below, although other embodiments are not limited to these particular instruction formats.

Referring again to FIG. 35, the processor includes a decode unit, decoder, or decoder circuitry 3508. The decode unit or decoder circuitry may be coupled to receive the two source 2D array permute instruction 3501 (e.g., from an instruction fetch unit or fetch circuitry). The decoder unit or decoder circuitry may be operative to decode the two source 2D array permute instruction into a decoded two source 2D array permute instruction 3501 (e.g., one or more microinstructions, micro-operations, or other operations). Aside from decoding the two source 2D array permute instruction 3501 instead of (or in addition to) the two source 2D array merge instruction 2102, the decode unit or decoder circuitry 3508 may otherwise be the same as or similar to the decode unit or decoder circuitry 2108 of FIG. 21, and may have similar characteristics, variations, and alternatives.

The execution unit or execution circuitry 3511 is coupled with the decode unit or decoder circuitry 3508 (e.g., optionally through one or more intervening components as previously described) to receive the decoded two source 2D array permute instruction 3501 (e.g., one or more operations). The execution unit or execution circuitry is also coupled to receive the first and second source 2D arrays 3514, 3516 (e.g., is coupled with the one or more types of 2D array storage 3512). The execution unit or execution circuitry is also coupled to receive the source permute control elements 3548. The execution unit or execution circuitry may be operative to execute the decoded two source 2D array permute instruction. In some embodiments, the execution unit or execution circuitry 3511 may execute the decoded two source 2D array permute instruction 3501 as specified by the opcode to perform a two source 2D array permute operation to permute data elements of the first source 2D array 3513 and the second source 2D array 3516 according to the source permute control elements 3548 to generate a result 2D array.

In some embodiments, the execution unit or execution circuitry may identify or select a plurality of data elements, from among any data elements of the first source 2D array, and any data elements of the second source 2D array, that are each indexed by, otherwise specified by, or otherwise indicated by a different corresponding one of the plurality of permute control elements. In some embodiments, each of the source permute control elements 3548 may index, specify, or otherwise indicate an individual data element position among any of the data element positions in the first source 2D array and the second source 2D array. The execution unit or execution circuitry may also store the selected plurality of data elements in a plurality of data element positions of a result 2D array 3519 that each correspond to a different one of the plurality of permute control elements. There may be an implicit or otherwise understood correspondence between the permute control elements and the data element positions in the result 2D array. For example, such correspondence may be due to an arrangement or order of the permute control elements and a corresponding arrangement or order of the data element positions in the result 2D array, or according to some other agreed upon convention that the execution unit understands to use. The permute operation may effectively permute the indicated data elements of the first and second source 2D arrays into the order/arrangement of the permute control elements (e.g., linear order in register, 2D arrangement).

As shown in the illustrated simplistic example, the first source 2D array 3514 has two rows and two columns of data elements. Each of the data elements has a corresponding data element position. The data element positions in the first and second source 2D arrays are labeled as A00, A01, A33, B00, B10, B23, and so on. According to this notation, the "A" indicates that the data element position is in the first source 2D array, the "B" indicates that the data element position is in the second source 2D array, the first number indicates the row, and the second number indicates the column. For example, the data element position A01 indicates the data element position in the first source 2D array, in row 0, and in column 1, the data element position B33 indicates the data element position in the second source 2D array, in row 3, and in column 3, and so on.

The first row of the first source 2D array has two data element positions, namely a first data element position A00 in this example storing a value of 77, and a second data element position A01 in this example storing a value of 14. The second row has two data element positions, namely a third data element position A10 in this example storing a value of 8, and a fourth data element position A11 in this example storing a value of 72. The second source 2D array 3516 also has two rows and two columns. The first row has two data element positions, namely a first data element position B00 in this example storing a value of 23, and a second data element position B01 in this example storing a value of 54. The second row has two data element positions, namely a third data element position B10 in this example storing a value of 18, and a fourth data element position B11 in this example storing a value of 41.

In the illustrated example, the permute control elements 3548 include four permute control elements. Each of the four permute control elements may correspond to a different data element position in the result 2D array 3519. As shown, in some embodiments, the four permute control elements may be arranged as a 2D array, and each permute control element may correspond to the data element position in the same row and the same column of the result 2D array. In other embodiments, the four permute control elements may be arranged in a one dimensional (1D) array, list, or vector having the four values. In such embodiments, corresponding positions may be taken modulo the number of columns. For example, the first two permute control elements in the list may respectively correspond to the data element positions in the first two columns of the first row of the result 2D array, and the second two permute control elements may respectively correspond to the data element positions in the first two columns of the second row of the result 2D array. An analogous column-based approach could also be used instead (e.g., where the correspondence is taken modulo the number of rows). In any event, there may be some correspondence of each of the permute control elements to a different one of all data element positions in the result 2D array according to some convention the execution circuitry understands.

In the illustrated example, the permute control elements 3548 have the values A11, B01, B10, and A00. These values are only examples. The first permute control element of A11 specifies or indicates that the value of 72 stored in data element position A11 is to be stored in the data element position of the result 2D array corresponding to the first permute control element. The second permute control element of B01 specifies or indicates that the value of 54 stored in data element position B01 is to be stored in the data element position of the result 2D array corresponding to the second permute control element. The third permute control element of B10 specifies or indicates that the value of 18 stored in data element position B10 is to be stored in the data element position of the result 2D array corresponding to the third permute control element. The fourth permute control element of A00 specifies or indicates that the value of 77 stored in data element position A00 is to be stored in the data element position of the result 2D array corresponding to the fourth permute control element. In this example, the corresponding permute control elements and data element positions in the result 2D array are those having similar 2D array arrangement, although this is not required for other embodiments. As shown, the result 2D array has these four specified or indicated values 72, 54, 18, and 77 in these corresponding data element positions. In other cases, any data element in any data element position in either the first and second source 2D arrays may be stored in zero, one, more than one, or even all result data element of the result 2D array.

The result 2D array 3519 may be stored in a destination storage location. As shown in the illustrated example, the destination storage location may optionally be a third, additional 2D array storage location, and the two source 2D array permute instruction may specify or otherwise indicate the third, additional 2D array storage location. Alternatively, a 2D array storage location used for one of the first and second source 2D arrays may optionally be reused as the destination storage location (e.g., a source/destination storage location may be used). The later approach may offer a potential advantage of a shorter instruction encoding.

Advantageously, the two source 2D array permute instruction may allow permuting the first and second source 2D arrays within the confines of the execution of the single two source 2D array permute instruction, instead of needing to perform anywhere from two to many more instructions to accomplish such a permute. This in turn may help to improve the functioning and functionality of the processor and/or a computer having the processor, such as, for example, providing new functionality available through the execution of a single instruction, reducing the number of instructions, processing time, and power to permute the first and second source 2D arrays. The execution unit or execution circuitry and/or the processor may include specific or particular logic (e.g., transistors, integrated circuitry, or other hardware potentially combined with firmware (e.g., instructions stored in non-volatile memory) and/or software) that is operative to execute the decoded two source 2D array permute instruction. As shown, in some embodiments, the execution unit or execution circuitry may include 2D array permute execution circuitry 3513. As one example, the circuitry 3513 may include multiplexers or other data element selection circuitry, hardwired lines, interconnect, a fully-connected mesh or other data element routing circuitry, or the like.

As mentioned above, in connection with the two source 2D array merge instructions, it may take additional instructions or other overhead to generate the permute control elements 3548. If they are implemented together, which is not required, and if the two source 2D array merge instruction is able to perform the desired permutation (e.g., the two source 2D array merge is able to merge the data in the way that is needed), then there may be advantages to using the two source 2D array merge instruction over the two source 2D array permute instruction. However, there can be many possible ways to permute the data elements of two source 2D arrays, including very irregular or even random ways that may be useful in some instances but would be uncommonly used. Moreover, the number of instructions (e.g., opcodes) that an instruction set can have and that a processor can support is generally limited. Often, due to such limits, such two source 2D array merge instructions may mainly be included to support the most prevalent or widely used ways or patterns of merging 2D arrays. Often, they will not be included to support other ways or patterns of merging 2D arrays, especially for very irregular or uncommonly used patterns or ways of permuting two source 2D arrays, of which there can be many. Such ways of permuting two source 2D arrays tend to be better addressed by the more flexible two source 2D array permute instructions, which have explicit permute control elements to flexibly specify almost any conceivable way of permuting two source 2D arrays, including irregular, uncommonly used, and even random patterns. The two source 2D array permute instructions are therefore useful and offer advantages whether or not they are optionally employed with the two source 2D array merge instructions disclosed elsewhere herein.

FIG. 36 is a block diagram of a first example embodiment of a two source 2D array permute instruction 3601. The two source 2D array permute instruction has an opcode 3603. The opcode may include one or more fields or sets of bits and may indicate the operation that is to be performed (e.g., to permute two source 2D arrays according to source permute control elements to generate a result 2D array). The two source 2D array permute instruction also has a first source 2D array and destination storage location indicator 3626 to specify or otherwise indicate a first storage location that initially stores a first source 2D array and is subsequently to serve as the destination storage location where a result 2D array is to be stored. The two source 2D array permute instruction also has a second source 2D array storage location indicator 3628 to specify or otherwise indicate a second source 2D array storage location storing a second source 2D array. In this embodiment, the two source 2D array permute instruction also has an optional third source 2D array storage location indicator 3634 to specify or otherwise indicate a third source 2D array storage location storing a third source 2D array. The third source 2D array may include a 2D array of permute control elements. The indicators 3626, 3628, 3634 may each represent one or more fields or sets of bits to indicate the storage locations according to various approaches known in the arts. The various types of 2D array storage locations mentioned elsewhere herein are suitable.

FIG. 37 is a block diagram of a second example embodiment of a two source 2D array permute instruction 3701. The two source 2D array permute instruction has an opcode 3703, a first source 2D array and destination storage location indicator 3726, and a second source 2D array storage location indicator 3728. Each of these may be similar to or the same as those mentioned above for FIG. 37, and may have similar characteristics, variations, and alternatives. Instead of having the third source 2D array location indicator 3634, in this embodiment the instruction 3701 has a source vector location indicator 3734 to specify or otherwise indicate a vector register or other vector storage location (e.g., a vector memory operand) where a source permute control elements is to be stored. In embodiments, a single vector register may store a single vector having all the permute control elements. In other embodiments, it may be implicit to use two, three, or more sequential registers (e.g., that sequentially follow the indicated vector register) and two, three, or more vectors may include all the permute control elements.

Regarding FIGS. 36-37, alternate embodiments may include a subset of the illustrated fields and/or may add additional fields and/or may rearrange the fields variously. For example, it is also possible to replace each of the indicator 3626 and/or the indicator 3726 with one indicator for a storage location to store the first source 2D array, and an additional separate indicator for a storage location to serve as the destination storage location. However, using the indicator 3626 and/or the indicator 3726 may help to avoid an additional one or more fields or sets of bits, which may help to achieve a shorter instruction encoding. In some embodiments, the instructions 3601, 3701 may optionally have either a VEX or EVEX encoding or format as described further below, although this is not required. As used herein, a field or set of bits may refer to either a contiguous set of bits or non-contiguous or separated bits that logically represent the indicator, field, or set of bits.

FIGS. 38-39 are block diagrams of several illustrative example embodiments of processors that are operative to perform several illustrative example embodiments of two source 2D array permute instructions. Each of the processors has a decoder unit or decoder circuitry and an execution unit or execution circuitry. The processors, decoder units or decoder circuitry, and execution units or execution circuitry may be similar to or the same as the processor 3500, decoded unit or decoder circuitry 3508, and execution unit or execution circuitry 3511, and may have similar or the same characteristics, variations, and alternatives. The two source 2D array permute instructions may specify (e.g., explicitly specify) or otherwise indicate (e.g., implicitly indicate) storage locations having first and second source 2D arrays. The storage locations may be similar to or the same as the other storage locations for 2D arrays described herein, such as, for example, vector registers, 2D registers (e.g., comprising an overly over physical registers), 2D tile storage, memory locations, and combinations thereof. The processors operate on source 2D arrays to generate result 2D arrays. The result 2D arrays may be stored in a destination storage location. The destination storage location may either be a storage location used for one of the source 2D arrays, or a different storage location indicated by the instruction. The sizes of the source 2D arrays and the result 2D arrays may be similar to or the same as the other sizes for 2D arrays described herein, such as, for example, a single fixed size, a set or group of fixed sizes that can be selected, a flexible or configurable size (e.g., according to configuration data, a palette, data stored in control and/or configuration registers, a configuration stored by a tile configuration instruction of an instruction set).

FIG. 38 is a block diagram of a first example embodiment of a processor 3800 that is operative to perform a first example embodiment of a two source 2D array permute instruction 3801. The processor includes a decoder circuitry 3808 to receive the two source 2D array permute instruction. The two source 2D array permute instruction may have an opcode, and may indicate a first source 2D array 3814, a second source 2D array 3816, and a third source 2D array 3848 of permute control values. The decoder circuitry may decode the two source 2D array permute instruction 3801 into a decoded two source 2D array permute instruction 3807 (e.g., one or more operations). An execution circuitry 3811 of the processor is coupled with the decoder circuitry to receive the decoded two source 2D array permute instruction. The execution circuitry may execute the decoded two source 2D array permute instruction to generate a result 2D array 3819. The execution circuitry may store the result 2D array in a destination storage location.

In this first example embodiment, the first source 2D array 3814 has four rows and four columns of data elements. The second source 2D array 3816 also has four rows and four columns of data elements. Other sizes mentioned herein could be used instead. A value of each of the data elements is included in parenthesis (e.g., (77), (14), (2), and so on). Each of the data elements in each of the first and second source 2D arrays has a corresponding data element position (e.g., A00, A01, A02, A33, B00, B01, B21, and so on). Similarly to before, the "A" indicates the first source 2D array, the "B" indicates the second source 2D array, the first number indicates the row, and the second number indicates the column. Thus, the value of the data element at the data element position B21 is 5, at A23 is 69, and so on.

In this embodiment, the permute control elements are arranged as a third source 2D array 3848 having four rows and four columns of permute control elements. The result 2D array also has four rows and four columns of data element positions. Other sizes mentioned herein could be used instead. In some embodiments, each of the permute control elements corresponds to the data element position in the same row, and in the same column, of the result 2D array. Other conventions could also be used for correspondence if desired. Example values for the permute control elements are shown. Each of the values for the permute control elements specifies or indicates a single data element positions from among any of the data element positions in both the first source 2D array and the second source 2D array.

The execution circuitry 3811 may execute the decoded two source 2D array permute instruction 3801 to select data elements, from among any data elements of the first source 2D array 3814, and any data elements of the second source 2D array 3816, that are each indicated by a different corresponding one of the plurality of permute control elements of the third source 2D array. For example, the execution circuitry may use the top leftmost permute control element in the first row and the first column of the third source 2D array 3848 to select a first data element. Specifically, the top leftmost permute control element in the first row and the first column of the third source 2D array 3848 indicates the data element position A11. The execution circuitry may therefore select the data element of value 72 at the indicated data element position A11. Similarly, the execution circuitry may select the data element of value 37 with the top adjacent permute control element in the first row and second column which indicates data element position B30 storing the data element of value 37, and so on for all the other permute control elements.

The execution circuitry 3811 may then store the selected plurality of data elements in a plurality of data element positions of the result 2D array 3819 that each correspond to a different one of the plurality of permute control elements of the third source 2D array. For example, the execution circuitry may store the data element of value 72 in the top leftmost data element position in the first row and the first column of the result 2D array 3819. This is because the top leftmost data element position in the first row and the first column of the result 2D array corresponds (e.g., in position, is in the same row and same column, etc.) as the top leftmost permute control value in the first row and the first column of the third source 2D array. Similarly, the execution circuitry may store the data element of value 37 in the top adjacent data element position in the first row and second column of the result 2D array 3819 corresponding to the top adjacent permute control element in the top row and second column of the third source 2D array, and so on for all the other data element positions in the result 2D array 3819. FIG. 39 is a block diagram of a second example embodiment of a processor 3900 that is operative to perform a second example embodiment of a two source 2D array permute instruction 3901. The processor includes a decoder circuitry 3908 to receive the two source 2D array permute instruction. The two source 2D array permute instruction may have an opcode, and may indicate a first source 2D array 3914, a second source 2D array 3916, and a source vector 3948 of permute control values. The decoder circuitry may decode the two source 2D array permute instruction 3901 into a decoded two source 2D array permute instruction 3907 (e.g., one or more operations). An execution circuitry 3911 of the processor is coupled with the decoder circuitry to receive the decoded two source 2D array permute instruction. The execution circuitry may execute the decoded two source 2D array permute instruction to generate a result 2D array 3919. The execution circuitry may store the result 2D array in a destination storage location.

This second example embodiment is similar to the first example embodiment of FIG. 38, and may have similar characteristics, variations, and alternatives. For example, the first source 2D array 3914, the second source 2D array 3916, and the result 2D array 3919 may have similar characteristics, variations, and alternatives to those already described for FIG. 38. To avoid obscuring the description, the different and/or additional characteristics will primarily be described without repeating the common characteristics.

One difference is that the permute control elements are provided in the source vector 3948, instead of in the third source 2D array 3848. Instead of the sixteen permute control elements being arranged in four rows and four columns the sixteen permute control elements are arranged in a 1D array, list, or vector. Each of the permute control elements correspond to a different data element position in the result 2D array. For example, the corresponding positions may be mapped modulo the number of columns of the result 2D array. For instance, the first (leftmost) four permute control elements may respectively correspond to the four data element positions in the first row of the result 2D array, the next adjacent set of four permute control elements may respectively correspond to the four data element positions in the second row of the result 2D array, the next adjacent set of four permute control elements may respectively correspond to the four data element positions in the third row of the result 2D array, and the fourth (rightmost) set of four permute control elements may respectively correspond to the four data element positions in the fourth row of the result 2D array. Alternatively, an analogous column-based correspondence, or correspondence in some other way, could optionally be used, if the execution circuitry understands the correspondence.

The use of such a source vector 3948 of permute control elements may be more appropriate in situations where the source vector is able to provide a permute control element for each data element position in the result 2D array. Generally, this tends to be limited to relatively small result 2D arrays. If 8-bit or byte-sized permute control elements are used, for example, a 256-bit register can hold 32 such permute control elements, a 512-bit register can hold 64 such permute control elements, a 1024-bit register can hold 128 such permute control elements, and so on. Another possible approach would be to use multiple source vectors, such as two, three, four, or more vectors (e.g., in two, three, four, or more sequential vector registers).

The execution circuitry 3911 may execute the decoded two source 2D array permute instruction 3901 to select data elements, from among any data elements of the first source 2D array 3914, and any data elements of the second source 2D array 3916, that are each indicated by a different corresponding one of the plurality of permute control elements of the source vector, as previously described. The execution circuitry 3911 may then store the selected plurality of data elements in a plurality of data element positions of the result 2D array 3919 that each correspond to a different one of the plurality of permute control elements of the source vector 3948, as previously described.

Three Source 2D Array Strided Extract Instructions, Processors, and Methods

FIG. 40 is a block diagram of an embodiment of a processor 4000 that is operative to perform an embodiment of a three source 2D array strided extract instruction 4056.

Aside from the different and/or additional characteristics pertaining to the three source 2D array strided extract instruction 4056, instead of (or in addition to) the two source 2D array merge instruction 2102 of FIG. 21, the processor 4000, its components, and its operation, may be similar to or the same as what has already been described for the processor 2100 of FIG. 21. To avoid obscuring the description, the different and/or additional characteristics of the processor 4000, its components, and its operation, will primarily be described, without repeating all the characteristics that may optionally be the same or similar to those already been described for the processor 2100 of FIG. 21.

The processor 4000 may be coupled to receive the three source 2D array strided extract instruction 4056. The processor 4000 may have characteristics, alternatives, and variations previously described for the processor 2100 of FIG. 21 (e.g., be a CPU, a graphics processor, etc., have a CISC, RISC, or VLIW architecture, optionally have the other processor components previously described, etc.).

The three source 2D array strided extract instruction 4056 may represent a macroinstruction, machine code instruction, or other instruction or control signal of an instruction set of the processor. The instruction may have an opcode (e.g., an operation code) 4053. The opcode may prescribe or indicate the operation that is to be performed (e.g., an operation to select a set of data elements, in either rows or columns, of three source 2D arrays, which are separated by a stride of three, for storage to a result 2D array). The three source 2D array strided extract instruction may explicitly specify (e.g., through one or more fields or sets of bits), or otherwise indicate (e.g., implicitly indicate) a first source matrix, tile or other matrix portion, or other 2D array 4014, a second source matrix, tile or other matrix portion, or other 2D array 4015, and a third source matrix, tile or other matrix portion, or other 2D array 4016. As shown, in some embodiments, the first source 2D array, the second source 2D array, and the third source 2D array may be stored in one or more types of 2D array storage 4012. The types of 2D array storage previously mentioned (and combinations thereof) are suitable. The instruction may explicitly specify and/or implicitly indicate 2D array storage locations to indicate the source 2D arrays, as previously described. In some embodiments, the instruction may optionally indicate a single additional value 4055 (e.g., have an immediate to provide the single additional value or indicate a register that is to store the single additional value). In some embodiments, the instruction may have one of the instruction formats described further below, although other embodiments are not limited to these particular instruction formats.

The first source 2D array 4014, the second source 2D array 4015, and the third source 2D array 4016, may be similar to or the same as what has already been described for the first source 2D array 2114, and the second source 2D array 2116, of FIG. 21. For example, each include a 2D array of data elements that are at least logically arranged in multiple rows and multiple columns. The various sizes mentioned elsewhere herein for are suitable. To simplify the illustration, the first and second source 2D arrays only have two rows and two columns, although it to be appreciated that typically there may be more of each. The first and second source 2D arrays may have a single fixed size, or a selectable one of a plurality of possible fixed sizes, or configurable sizes that are configurable in both a number of rows and a number of columns (e.g., via control and/or configuration registers), as previously described.

Referring again to FIG. 40, the processor includes a decode unit, decoder, or decoder circuitry 4008. The decode unit or decoder circuitry may be coupled to receive the three source 2D array strided extract instruction 4056 (e.g., from an instruction fetch unit or fetch circuitry). The decoder unit or decoder circuitry may be operative to decode the instruction into a decoded three source 2D array strided extract instruction 4057 (e.g., one or more microinstructions, micro-operations, or other operations). Aside from decoding the three source 2D array strided extract instruction 4056 instead of (or in addition to) the two source 2D array merge instruction 2102, the decode unit or decoder circuitry 4008 may otherwise be the same as or similar to the decode unit or decoder circuitry 2108 of FIG. 21, and may have similar characteristics, variations, and alternatives.

The execution unit or execution circuitry 4058 is coupled with the decode unit or decoder circuitry 4008 (e.g., optionally through one or more intervening components as previously described) to receive the decoded three source 2D array strided extract instruction 4057 (e.g., one or more operations). The execution unit or execution circuitry is also coupled to receive the first, second, and third source 2D arrays (e.g., is coupled with the one or more types of 2D array storage 4012). The execution unit or execution circuitry may be operative to execute the decoded three source 2D array strided extract instruction 4057.

In some embodiments, the first source 2D array 4014 may have a plurality of one dimensional (1D) arrays of data elements in a first dimension, where each 1D array has a plurality of data elements at data element positions that are separated from one another by a constant stride of three (e.g., measured in data element positions) 4062. The second source 2D array 4015 may also have a plurality of 1D arrays of data elements in the first dimension, where each 1D array has a plurality of data elements at data element positions that are separated from one another by the constant stride of three 4064. Similarly, the third source 2D array 4015 may have a plurality of 1D arrays of data elements in the first dimension, where each 1D array has a plurality of data elements at data element positions that are separated from one another by the constant stride of three 4066.

In various embodiments, the 1D arrays of data elements in the first dimension may be rows of data elements in a row dimension, or columns of data elements in a column dimension, or other sets or partitions of data elements in the first dimension. Adjacent ones of the data elements separated from one another by the stride of three may be separated from one another by two intervening data element positions. For example, when the 1D array is a row of data elements, the data elements from columns 0, 3, 6, 9, 12, 15, and so on until the end of the row, are separated from one another by the stride of three, the data elements from columns 1, 4, 7, 10, 13, 16, and so on, are separated from one another by the stride of three, and the data elements from columns 2, 5, 8, 11, 14, 17, and so on, are separated from one another by the stride of three. Likewise, when the 1D array is a column of data elements, the data elements from rows 0, 3, 6, 9, 12, 15, and so on until the end of the column, are separated from one another by the stride of three, the data elements from rows 1, 4, 7, 10, 13, 16, and so on, are separated from one another by the stride of three, and the data elements from rows 2, 5, 8, 11, 14, 17, and so on, are separated from one another by the stride of three.

Representatively, strides of three may appear in repetitively-arranged three-tuple or triple data. One example of such three-tuple data is red, green, and blue (RGB) color component data. Another example of such three-tuple data is X, Y, and Z three-dimensional space coordinate data. Many other examples of three-tuple data are also known. It is common for a matrix or other 2D array to have a row or column of such data. For example, a row or column may have the following sequence of data elements X0 Y0 Z0 X1 Y1 Z1 X2 Y2 Z2. In such an arrangement, adjacent components of the same type (e.g., adjacent X-components) are separated from one another by two intervening components of a different type (e.g., intervening Y and Z-components). For example, X1 is separated from X0 by intervening Y0 and Z0, and X1 is separated from X2 by intervening Y1 and Z1. The X-components are separated from one another by the stride of three data element positions, the Y-components are separated from one another by the stride of three data element positions, and the Z-components are separated from one another by the stride of three data element positions.

Referring again to FIG. 40, in some embodiments, the execution unit or execution circuitry 4058 may execute the decoded three source 2D array strided extract instruction 4057 to select, for each 1D array of data elements in the first dimension, of each of the first, second, and third source 2D arrays 4014, 4015, 4016, only a plurality of data elements (e.g., all data elements) at a plurality of data element positions (e.g., all data element positions) that are separated by the stride of three. The execution unit or execution circuitry 4058 may store a result 2D array 4060 in a destination storage location. In some embodiments, the result 2D array may include only the selected plurality of data elements (e.g., all the data elements) at data element positions that are separated by the stride of three 4060 for each 1D array of data elements in the first dimension, of each of the first, second, and third source 2D arrays 4014, 4015, 4016. The destination storage location may either be a storage location used for one of the source 2D arrays or a separate storage location, as described elsewhere herein.

In various embodiments, this may include to select and store in the result 2D array, for each 1D array of data elements in the first dimension, of each of the first, second, and third source 2D arrays, only one data element from the first three data element positions, and thereafter only data elements (e.g., all data elements) from data element positions that are separated from one another by the stride of three. As one example, this may include to select, for each row of data elements in the row dimension, of each of the first, second, and third source 2D arrays, only one data element from the first three columns, and thereafter only data elements (e.g., all data elements) from columns that are separated from one another by the stride of three (e.g., only from columns 0, 3, 6, 9, 12, 15, and so on, or alternatively only from columns 1, 4, 7, 10, 13, 16, and so on, or alternatively only from columns 2, 5, 8, 11, 14, 17, and so on). As another example, this may include to select, for each column of data elements in the column dimension, of each of the first, second, and third source 2D arrays, only one data element from the first three rows, and thereafter only data elements (e.g., all data elements) from rows that are separated from one another by the stride of three (e.g., only from rows 0, 3, 6, 9, 12, 15, and so on, or alternatively only from rows 1, 4, 7, 10, 13, 16, and so on, or alternatively only from rows 2, 5, 8, 11, 14, 17, and so on). In some embodiments, the result may include only one of three types of components of three-tuple data, but not the other two types (e.g., only X-components or only Y-components or only Z-components of X, Y, Z three-tuple data).

The selected data elements may be stored in different orders or arrangements in the result 2D array 4060. In some embodiments, data elements sourced from the same source 2D array may be concatenated. For example, all data elements selected for a given 1D array of data elements of the first source 2D array may be concatenated together in a same order as they appear in the given 1D array in a corresponding result 1D array of data elements, all data elements selected for a corresponding (e.g., same positioned) 1D array of data elements of the second source 2D array may be concatenated together in a same order as they appear in the given 1D array of data elements of the second source 2D array in the same corresponding result 1D array of data elements, and all data elements selected for a corresponding (e.g., same positioned) 1D array of data elements of the third source 2D array may be concatenated together in a same order as they appear in the given 1D array of data elements of the third source 2D array in the same corresponding result 1D array of data elements.

In other embodiments, data elements sourced from different source 2D arrays may be interleaved or otherwise comingled with one another. For example, the execution unit may three-way interleave all data elements selected for a given 1D array of data elements of the first source 2D array with all corresponding data elements selected for a corresponding (e.g., same positioned) 1D array of data elements of the second source 2D array with all corresponding data elements selected for a corresponding (e.g., same positioned) 1D array of the third source 2D array, in a result 1D array of data elements. In some embodiments, the execution circuitry 4058 and/or the processor 4000 may be operative to generate and store any of the result 2D arrays shown and described for any of FIGS. 43-54.

In some embodiments, it may be at least predominantly or entirely implicit to the three source 2D array strided extract instruction 4056 (e.g., the type of instruction not just the particular instance of the instruction) and/or the opcode 4053 that the execution circuitry 4058 to execute the decoded instruction is to select, for each 1D array (or in some embodiments for each row) of data elements in the first dimension, of each of the first, second, and third source 2D arrays, only the plurality of data elements at the data element positions separated by the stride of three (in some example embodiments including from at least columns 0 and 3). The type of the instruction and/or its opcode may prescribe, fix, determine, or indicate these portions of the first, second, and third source 2D arrays, and how they are to appear in the result 2D array. In some embodiments, any of the particular 1D arrays or set of strided data element positions shown and described for any of FIGS. 43-54 may be implicit to the instruction and/or its opcode.

As a variation, in other embodiments, it may be at least predominantly or entirely implicit to a combination of both the instruction 4056 (e.g., the type of instruction) and/or its opcode 4053 plus a single additional value 4055 indicated by the instruction 4056 that the execution circuitry 4058 to execute the decoded instruction is to select, for each 1D array (or in some embodiments for each row) of data elements in the first dimension, of each of the first, second, and third source 2D arrays, only the plurality of data elements at the data element positions separated by the stride of three (in some example embodiments including from at least columns 0 and 3). The combination of both the instruction 4056 and/or its opcode 4053 plus a single additional value 4055 may prescribe, fix, determine, or indicate these portions of the first, second, and third source 2D arrays, and how they are to appear in the result 2D array. In some embodiments, any of the particular 1D arrays or set of strided data element positions shown and described for any of FIGS. 43-54 may be implicit to the combination of both the instruction 4056 and/or its opcode 4053 plus a single additional value 4055.

In some such embodiments, the instruction 4056 and/or its opcode 4053 may allow at least two different patterns, ways, or other alternatives, and the single additional value 4055 may specify, select, or otherwise indicate one of the alternatives to be used to generate and store the result 2D array 4060. In some cases, there may be three, four, five, six, seven, eight, nine, ten, or optionally more than ten different alternatives. Each of the alternatives may represent a predetermined pattern, way, option, or possibility for select, for each 1D array of data elements, of each of the first, second, and third source 2D arrays, only a plurality of data elements at a data element positions separated by a stride of three. The single additional value may thus indicate one of multiple different ways of selecting, for each 1D array of data elements, of each of the first, second, and third source 2D arrays, only a plurality of data elements at a data element positions separated by a stride of three that are supported by the instruction 4056 or the opcode 4053. In some such embodiments, the single additional value 4055 may be provided as a single value in an immediate or other field of the instruction. In other such embodiments, the single additional value 4055 may be provided as a single value in a register indicated by the instruction (e.g., a general-purpose register, scalar register, or optionally a packed or vector register).

Advantageously, the instruction 4056 may allow generating the result 2D array 4060 within the confines of the execution of a single instruction, instead of needing to perform anywhere from two to many more instructions to generate it. This in turn may help to improve the functioning and functionality of the processor or a computer itself, such as, for example, allowing new functionality to be available through the execution of a single instruction, reducing the number of instructions and therefor processing time and power to generate the result 2D array, and so on. The execution unit or execution circuitry and/or the processor may include specific or particular logic (e.g., transistors, integrated circuitry, or other hardware potentially combined with firmware (e.g., instructions stored in non-volatile memory) and/or software) that is operative to execute the decoded instruction 4057. As shown, in some embodiments, the execution unit or execution circuitry 2110 may include data element selection and routing circuitry 4059. Such circuitry may include multiplexers to select data elements, hardwired lines to route data elements, a fully-connected mesh, or the like.

FIG. 41 is a block diagram of a first example embodiment of a three source 2D array strided extract instruction 4156. The instruction has an opcode 4153. The opcode may include one or more fields or sets of bits and may indicate the operation that is to be performed. The instruction also has a first source 2D array and destination storage location indicator 4126 to specify or otherwise indicate a first storage location that initially stores a first source 2D array and is subsequently to serve as the destination storage location where a result 2D array is to be stored. The two source 2D array permute instruction also has a second source 2D array storage location indicator 4128 to specify or otherwise indicate a second source 2D array storage location storing a second source 2D array, and a third source 2D array storage location indicator 4134 to specify or otherwise indicate a third source 2D array storage location storing a third source 2D array. The indicators 4126, 4128, 4134 may each represent one or more fields or sets of bits to indicate the storage locations according to various different approaches (e.g., in x86 processors ModRM type addressing, a VEX.vvvv field, and so on). The various different types of storage locations mentioned elsewhere herein are suitable.

In this embodiment, the three source 2D array strided extract instruction 4156 only has the indicators 4153, 4128, 4134. The instruction does not have an immediate. Moreover, other than operands to indicate the first source storage location, the second source storage location, and the third storage location (including potentially implicit memory addressing registers such as segment registers and so on when one of the locations is in memory), the instruction otherwise does not indicate any other operands or any other values in any other registers, memory, or other architecturally-visible storage locations. In particular, the instruction does not indicate an additional source operand or source storage location having per-portion control values to specify data elements to be selected, since such are not used by the instruction. Rather, for this embodiment of the instruction, the data elements to be selected and where they are to be stored in the result 2D array is implicit to the instruction and/or the opcode, as previously described.

Table 3 lists a few specific example embodiments of three source 2D array strided extract instructions where the operations of the instructions (e.g., which data elements are selected and where they are stored in the result) are indicated by and implicit to the instructions themselves and/or their opcodes. Each row represents a different three source 2D array strided extract instruction (e.g., a different type of instruction, not just a different instance of the same instruction). One column lists the instructions opcodes. The opcodes broadly represent different or unique binary values to uniquely identify the different instructions and their operations to the processor. The listed opcodes are merely examples and other opcodes of different values and numbers of bits may instead be used. Also shown alongside the opcodes are mnemonics (text) which are similarly different or unique text values to uniquely identify the different instructions and their operations to a human reader. Notice that each of the opcodes and mnemonics is different. There are also columns for source and destination storage locations. The A1, A2, and A3 may represent different 2D array storage locations as described elsewhere herein. There is also a column for the operation that the opcode indicates that the processor is to perform and that an execution unit or execution circuitry is to execute. The specific operations can be read from the table. In some embodiments, each of these operations may be at least predominantly or entirely implicit to the respective instruction of that row and/or the respective opcode of that row, as previously described. The type of the instruction itself and/or its opcode may prescribe, fix, determine, or indicate this operation. In some embodiments, the instruction of a given row and/or its opcode in that row may only be capable of performing the respective operation of that row and only on the portions of the source 2D arrays mentioned for that operation.

TABLE 3

| OPCODE MNEMONIC | OPERATION |
| --- | --- |
| 0 3Src2DXExtrRowConc SRC1/DST, SRC2, SRC3 | Store result having, for each row, of each of three source arrays, only X data elements from positions starting at first column and separated by a stride of three, with selected data elements from each source array concatenated together |
| 1 3Src2DYExtrRowConc SRC1/DST, SRC2, SRC3 | Store result having, for each row, of each of three source arrays, only Y data elements from positions starting at second column and separated by a stride of three, with selected data elements from each source array concatenated together |
| 10 3Src2DZExtrRowConc SRC1/DST, SRC2, SRC3 | Store result having, for each row, of each of three source arrays, only Z data elements from positions starting at third column and separated by a stride of three, with selected data elements from each source array concatenated together |
| 11 3Src2DXExtrRowInter SRC1/DST, SRC2, SRC3 | Store result having, for each row, of each of three source arrays, only X data elements from positions starting at first column and separated by a stride of three, with selected data elements from source arrays three-way interleaved |
| 100 3Src2DYExtrRowInter SRC1/DST, SRC2, SRC3 | Store result having, for each row, of each of three source arrays, only Y data elements from positions starting at second column and separated by a stride of three, with selected data elements from source arrays three-way interleaved |
| 101 3Src2DZExtrRowInter SRC1/DST, SRC2, SRC3 | Store result having, for each row, of each of three source arrays, only Z data elements from positions starting at third column and separated by a stride of three, with selected data elements from source arrays three-way interleaved |
| 110 3Src2DXExtrColConc SRC1/DST, SRC2, SRC3 | Store result having, for each column, of each of three source arrays, only X data elements from positions starting at first row and separated by a stride of three, with selected data elements from each source array concatenated together |
| 111 3Src2DYExtrColConc SRC1/DST, SRC2, SRC3 | Store result having, for each column, of each of three source arrays, only Y data elements from positions starting at second row and separated by a stride of three, with selected data elements from each source array concatenated together |
| 1000 3Src2DZExtrColConc SRC1/DST, SRC2, SRC3 | Store result having, for each column, of each of three source arrays, only Z data elements from positions starting at third row and separated by a stride of three, with selected data elements from each source array concatenated together |
| 1001 3Src2DXExtrColInter SRC1/DST, SRC2, SRC3 | Store result having, for each column, of each of three source arrays, only X data elements from positions starting at first row and separated by a stride of three, with selected data elements from source arrays three-way interleaved |
| 1010 3Src2DYExtrColInter SRC1/DST, SRC2, SRC3 | Store result having, for each column, of each of three source arrays, only Y data elements from positions starting at second row and separated by a stride of three, with selected data elements from source arrays three-way interleaved |
| 1011 3Src2DZExtrColInter SRC1/DST, SRC2, SRC3 | Store result having, for each column, of each of three source arrays, only Z data elements from positions starting at third row and separated by a stride of three, with selected data elements from source arrays three-way interleaved |

FIG. 42A is a block diagram of a second example embodiment of a three source 2D array strided extract instruction 4256. The instruction has an opcode 4253. The instruction also has a first source 2D array and destination storage location indicator 4226, a second source 2D array storage location indicator 4228, and a third source 2D array storage location indicator 4234, which may be similar to or the same as those of FIG. 41. The instruction also has an immediate 4232 to provide or otherwise indicate a single additional value 4255. The immediate may be similar to those previously described and have the same variations and alternatives.

FIG. 42B is a block diagram of a third example embodiment of a three source 2D array strided extract instruction 4256. The instruction has an opcode 4253, a first source 2D array and destination storage location indicator 4226, a second source 2D array storage location indicator 4228, and a third source 2D array storage location indicator 4234, which may be similar to or the same as those of FIG. 41. The instruction also has an optional third source location indicator 4230 (e.g., a register specifier, field to specify a register, etc.) to indicate a register 4236 storing or having a single additional value 4255. By way of example, the register may be a scalar register, a general purpose register, or a vector register storing the value. The single additional value may be stored or provisioned in the register at run time rather than needing to be done by a compiler or at compile time like the immediate.

FIGS. 42A-42B are just examples of the set of fields that may be included in embodiments of three source 2D array strided extract instructions. Alternate embodiments may include a subset of the illustrated fields and/or may add additional fields and/or may rearrange the fields variously. For example, the instruction may also optionally include one or more fields or sets of bits to specify a size of the source 2D arrays (e.g., an optional first field or set of bits to indicate a number of rows, and an optional second field or set of bits to indicate a number of columns). As another example, the instruction may also optionally include one or more fields or sets of bits to indicate a type of the data elements (e.g., an optional first field or set of bits to indicate a data element size, and an optional second field or set of bits to indicate a data element format such as integer, fixed point, etc.). Each of the fields or indictors may either consist of a contiguous set of bits or may include non-contiguous or separated bits that logically represent the field. In some embodiments, the instructions may have a VEX or EVEX encoding or format as described further below, although this is not required.

In the embodiments of FIGS. 42A-42B, the opcodes 4253 do not predominantly indicate the operation to be performed as a single/particular operation to select data elements and generate a result 2D array. Rather, the opcodes 4253 may indicate a broad operation or class of operations to select data elements and generate the result 2D array, and the broad operation may encompass two or more (or optionally three, four, five, six, seven, eight, nine, ten, or optionally more than ten) alternate ways of selecting data elements and generating the result 2D array. Each of the alternatives may be different in some way from the other alternatives (e.g., at least some different data elements selected and/or some difference in how the selected data elements are arranged in the result 2D array).

In such embodiments, the single additional values 4255 may specify, select, or otherwise indicate one of the alternatives supported by the three source 2D array strided extract instruction 4256 and/or their opcodes 4253. In such embodiments, the data elements to select and they way the selected data elements are stored into the result 2D array may be at least predominantly or entirely implicit to the combination of both the instruction and/or its opcode plus the single additional value, as previously described.

Table 4 lists a few specific example embodiments three source 2D array strided extract instructions where the operations of the instructions (e.g., the data elements selected and how the selected data elements are stored in the result) are indicated by and implicit to a combination of the instruction and/or their opcodes plus a single additional value indicated by the instructions. The instruction may have instruction formats like those described for either of FIGS. 42A-42B. As before, there are columns for opcode (mnemonic), sources and destination, and an operation. Additionally, there is a column listing different values for a single value. In this embodiment, all rows have the same opcode (mnemonic) to indicate that the same opcode (mnemonic) supports all the operations listed in the operations column. In other embodiments, these operations could be apportioned to several different opcodes instead of just one but at least two of the listed operations may be apportioned to the same opcode. The specific listed opcode and mnemonic are merely examples and others could be used instead.

Each row represents a different combination of an opcode (mnemonic) and a different value in the single value column. This is just one way of assigning the values of the single value to the operations, and various other ways could be used instead. Also, there can be more or less different operations and corresponding single values (e.g., as few as two, or optionally many more than the number shown). The operation column lists the operation that the processor is to perform, and that an execution unit or execution circuitry is to execute, for the combination of the opcode (mnemonic) plus the single value for that row. In some embodiments, each of these operations may be at least predominantly or entirely implicit to the combination of the instruction and/or the opcode plus the single value, as previously described.

TABLE 4

| OPCODE/ MNEMONIC | SINGLE VALUE | OPERATION |
|---|---|---|
| 110 3Src2DStrideExtr SRC1/DST, SRC2, SRC3 | 0 | Store result having, for each row, of each of three source arrays, only X data elements from positions starting at first column and separated by a stride of three, with selected data elements from each source array concatenated together |
| 110 3Src2DStrideExtr SRC1/DST, SRC2, SRC3 | 1 | Store result having, for each row, of each of three source arrays, only Y data elements from positions starting at second column and separated by a stride of three, with selected data elements from each source array concatenated together |
| 110 3Src2DStrideExtr SRC1/DST, SRC2, SRC3 | 2 | Store result having, for each row, of each of three source arrays, only Z data elements from positions starting at third column and separated by a stride of three, with selected data elements from each source array concatenated together |
| 110 3Src2DStrideExtr SRC1/DST, SRC2, SRC3 | 3 | Store result having, for each row, of each of three source arrays, only X data elements from positions starting at first column and separated by a stride of three, with selected data elements from source arrays three-way interleaved |
| 110 3Src2DStrideExtr SRC1/DST, SRC2, SRC3 | 4 | Store result having, for each row, of each of three source arrays, only Y data elements from positions starting at second column and separated by a stride of three, with selected data elements from source arrays three-way interleaved |
| 110 3Src2DStrideExtr SRC1/DST, SRC2, SRC3 | 5 | Store result having, for each row, of each of three source arrays, only Z data elements from positions starting at third column and separated by a stride of three, with selected data elements from source arrays three-way interleaved |
| 110 3Src2DStrideExtr SRC1/DST, SRC2, SRC3 | 6 | Store result having, for each column, of each of three source arrays, only X data elements from positions starting at first row and separated by a stride of three, with selected data elements from each source array concatenated together |
| 110 3Src2DStrideExtr SRC1/DST, SRC2, SRC3 | 7 | Store result having, for each column, of each of three source arrays, only Y data elements from positions starting at second row and separated by a stride of three, with selected data elements from each source array concatenated together |
| 110 3Src2DStrideExtr SRC1/DST, SRC2, SRC3 | 8 | Store result having, for each column, of each of three source arrays, only Z data elements from positions starting at third row and separated by a stride of three, with selected data elements from each source array concatenated together |

TABLE 4-continued

| OPCODE/ MNEMONIC | SINGLE VALUE | OPERATION |
|---|---|---|
| 110 3Src2DStrideExtr SRC1/DST, SRC2, SRC3 | 9 | Store result having, for each column, of each of three source arrays, only X data elements from positions starting at first row and separated by a stride of three, with selected data elements from source arrays three-way interleaved |
| 110 3Src2DStrideExtr SRC1/DST, SRC2, SRC3 | 10 | Store result having, for each column, of each of three source arrays, only Y data elements from positions starting at second row and separated by a stride of three, with selected data elements from source arrays three-way interleaved |
| 110 3Src2DStrideExtr SRC1/DST, SRC2, SRC3 | 11 | Store result having, for each column, of each of three source arrays, only Z data elements from positions starting at third row and separated by a stride of three, with selected data elements from source arrays three-way interleaved |

FIGS. 43-54 are block diagrams of several illustrative example embodiments of processors that are operative to perform several illustrative example embodiments of three source 2D array strided extract instructions. Each of the processors has a decoder circuitry to decode the instruction. The instructions each have an opcode and explicitly specify or otherwise indicate storage locations having a first source 2D array, a second source 2D array, and a third source 2D array. The storage locations may be similar to or the same as the other storage locations for 2D arrays described herein, such as, for example, vector registers, 2D registers (e.g., comprising an overly over physical registers), 2D tile storage, memory locations, and combinations thereof. The instructions are decoded into respective decoded instructions (e.g., one or more operations). The processors also have execution circuitry coupled with the decoder circuitry to receive and execute the decoded instruction. In some embodiments, the execution circuitry may select, for each 1D array of data elements in a first dimension, of each of the first, second, and third source 2D arrays, only a plurality of data elements at data element positions separated by a stride of three, and store the selected plurality of data elements in a result 2D array in a destination storage location. The processors, decoder units or decoder circuitry, and execution units or execution circuitry may be similar to or the same as the other ones described herein (e.g., the processor 2100 and/or 4000, decoded unit or decoder circuitry 2108 and/or 4008, and execution unit or execution circuitry 2110 and/or 4058), and may have similar or the same characteristics, variations, and alternatives. The sizes of the source 2D arrays and the result 2D arrays may be similar to or the same as the other sizes for 2D arrays described herein, such as, for example, a single fixed size, a set or group of fixed sizes that can be selected, a flexible or configurable size (e.g., according to configuration data, a palette, data stored in control and/or configuration registers, a configuration stored by a tile configuration instruction of an instruction set). The result 2D arrays may be stored in a destination storage location. The destination storage location may either be a storage location used for one of the source 2D arrays, or a different storage location indicated by the instruction.

Figure 43:
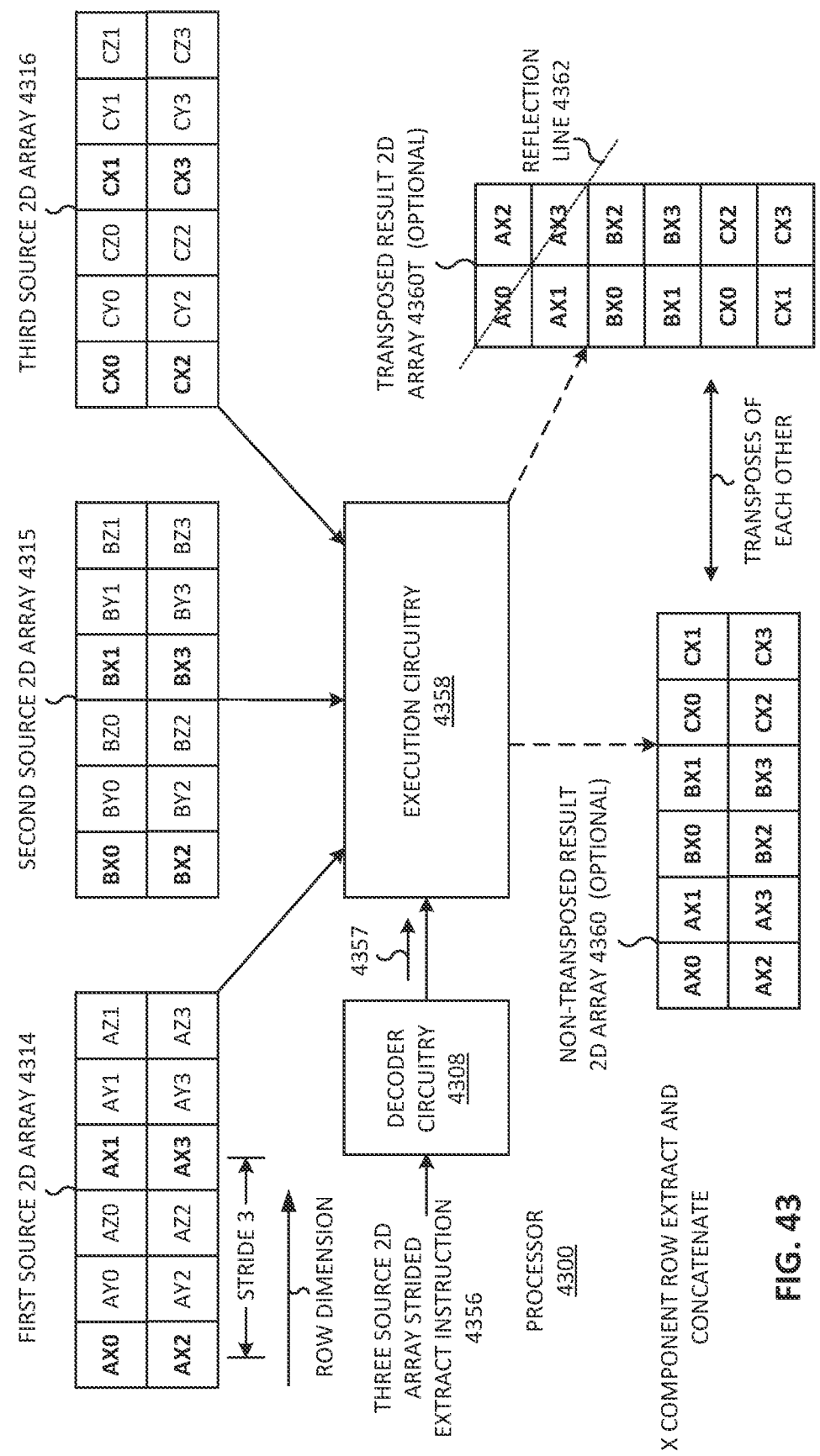

FIG. 43 is a block diagram of a first example embodiment of a processor 4300 that is operative to perform a first example embodiment of a three source 2D array strided extract instruction 4356. A decoder circuitry 4308 may decode the instruction 4356. An execution circuitry 4358 may execute the resulting decoded instruction 4357. In this first example embodiment, the data elements selected are the X components, and they are selected from rows, and the selected data elements are concatenated together. The execution circuitry may select, for each row of data elements in a row dimension (illustrated by an arrow), of each of a first source 2D array 4314, a second source 2D array 4315, and a third source 2D array 4316, only all strided data elements at strided data element positions that are separated by a stride of three data element positions. These strided data elements are shown in bold in the illustration. The execution circuitry may store the selected data elements in either a non-transposed result 2D array 4360 or a transposed result 2D array 4360T. The non-transposed result 2D array 4360 and the non-transposed result 2D array are 2D array transposes of each other (e.g., conceptually reflected across a reflection line 4462). The variant for the transpose result does both an extraction and a transpose operation in the same instruction, which is also true for the other transpose results disclosed herein. In this example embodiment, each result 1D array (e.g., each row in the non-transposed result 2D array or each column in the transposed result 2D array) stores all data elements selected from the corresponding row of the first source 2D array concatenated together in order along with all data elements selected from the corresponding row of the second source 2D array concatenated together in order along with all data elements selected from the corresponding row of the third source 2D array concatenated together in order. The order can be readily seen from the illustration.

Figure 44:
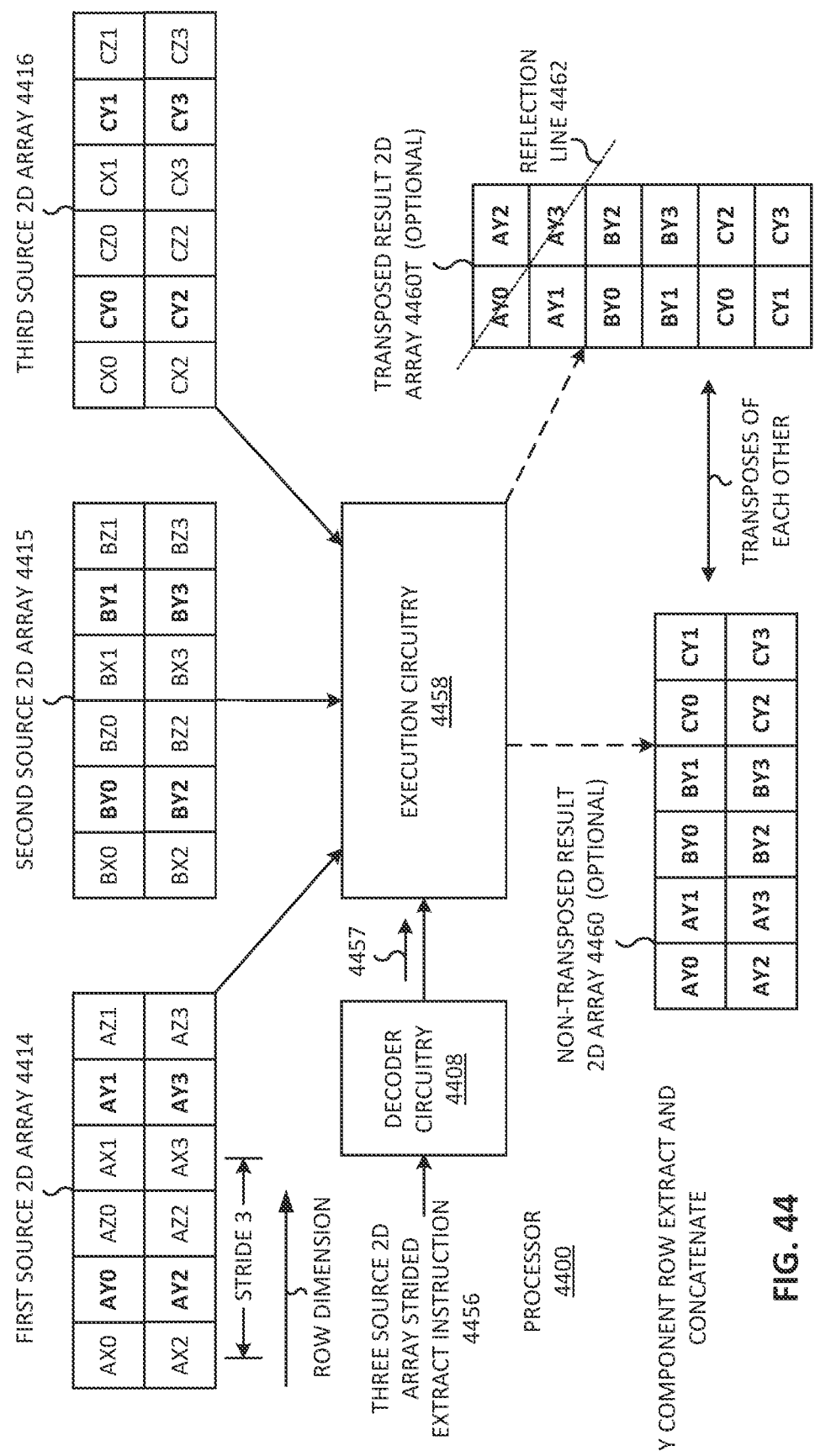

FIG. 44 is a block diagram of a second example embodiment of a processor 4400 that is operative to perform a second example embodiment of a three source 2D array strided extract instruction 4456. A decoder circuitry 4408 may decode the instruction 4456. An execution circuitry 4458 may execute the resulting decoded instruction 4457. In this first example embodiment, the data elements selected are the Y components, and they are selected from rows, and the selected data elements are concatenated together. The execution circuitry may select, for each row of data elements in a row dimension (illustrated by an arrow), of each of a first source 2D array 4414, a second source 2D array 4415, and a third source 2D array 4416, only all strided data elements at strided data element positions that are separated by a stride of three data element positions. These strided data elements are shown in bold in the illustration. The execution circuitry may store the selected data elements in either a non-transposed result 2D array 4460 or a transposed result 2D array 4460T. The non-transposed result 2D array 4460 and the non-transposed result 2D array are 2D array transposes of each other (e.g., conceptually reflected across a reflection line 4462). In this example embodiment, each result 1D array (e.g., each row in the non-transposed result 2D array or each column in the transposed result 2D array)

stores all data elements selected from the corresponding row of the first source 2D array concatenated together in order along with all data elements selected from the corresponding row of the second source 2D array concatenated together in order along with all data elements selected from the corresponding row of the third source 2D array concatenated together in order. The order can be readily seen from the illustration.

Figure 45:
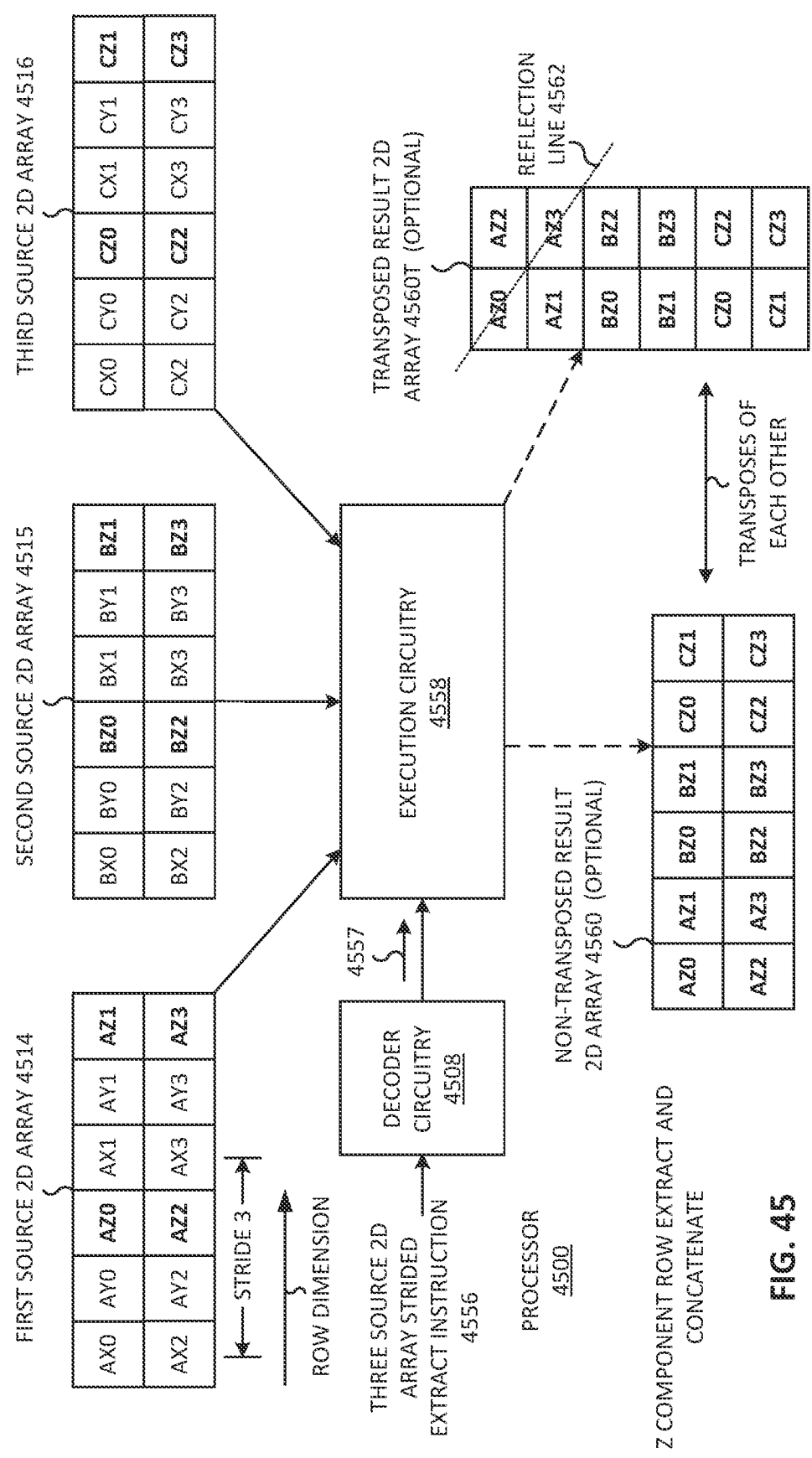

FIG. 45 is a block diagram of a third example embodiment of a processor 4500 that is operative to perform a third example embodiment of a three source 2D array strided extract instruction 4556. A decoder circuitry 4508 may decode the instruction 4556. An execution circuitry 4558 may execute the resulting decoded instruction 4557. In this first example embodiment, the data elements selected are the Z components, and they are selected from rows, and the selected data elements are concatenated together. The execution circuitry may select, for each row of data elements in a row dimension (illustrated by an arrow), of each of a first source 2D array 4514, a second source 2D array 4515, and a third source 2D array 4516, only all strided data elements at strided data element positions that are separated by a stride of three data element positions. These strided data elements are shown in bold in the illustration. The execution circuitry may store the selected data elements in either a non-transposed result 2D array 4560 or a transposed result 2D array 4560T. The non-transposed result 2D array 4560 and the non-transposed result 2D array are 2D array transposes of each other (e.g., conceptually reflected across a reflection line 4462). In this example embodiment, each result 1D array (e.g., each row in the non-transposed result 2D array or each column in the transposed result 2D array) stores all data elements selected from the corresponding row of the first source 2D array concatenated together in order along with all data elements selected from the corresponding row of the second source 2D array concatenated together in order along with all data elements selected from the corresponding row of the third source 2D array concatenated together in order. The order can be readily seen from the illustration.

Figure 46:
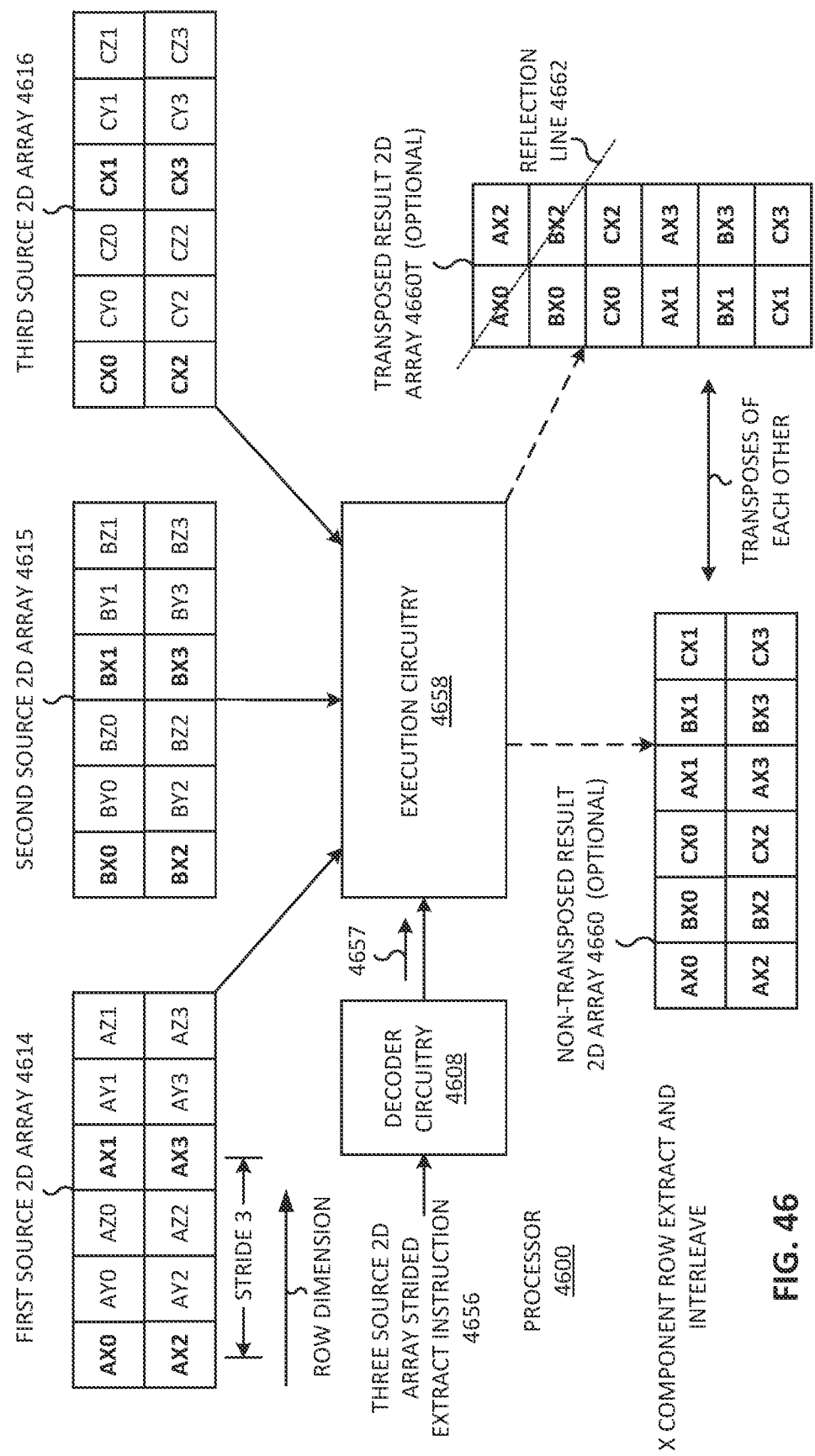

FIG. 46 is a block diagram of a fourth example embodiment of a processor 4600 that is operative to perform a fourth example embodiment of a three source 2D array strided extract instruction 4656. A decoder circuitry 4608 may decode the instruction 4656. An execution circuitry 4658 may execute the resulting decoded instruction 4657. In this first example embodiment, the data elements selected are the X components, and they are selected from rows, and the selected data elements are three-way interleaved. The execution circuitry may select, for each row of data elements in a row dimension (illustrated by an arrow), of each of a first source 2D array 4614, a second source 2D array 4615, and a third source 2D array 4616, only all strided data elements at strided data element positions that are separated by a stride of three data element positions. These strided data elements are shown in bold in the illustration. The execution circuitry may store the selected data elements in either a non-transposed result 2D array 4660 or a transposed result 2D array 4660T. The non-transposed result 2D array 4660 and the non-transposed result 2D array are 2D array transposes of each other (e.g., conceptually reflected across a reflection line 4462). In this example embodiment, each result 1D array (e.g., each row in the non-transposed result 2D array or each column in the transposed result 2D array) stores the selected data elements three-way interleaved in which all data elements selected from the corresponding row of the first source 2D array are stored adjacently next to all corresponding data elements selected from the corresponding row of the second source 2D array which are stored adjacently next to all corresponding data elements selected from the corresponding row of the third source 2D array. The order can be readily seen from the illustration.

Figure 47:
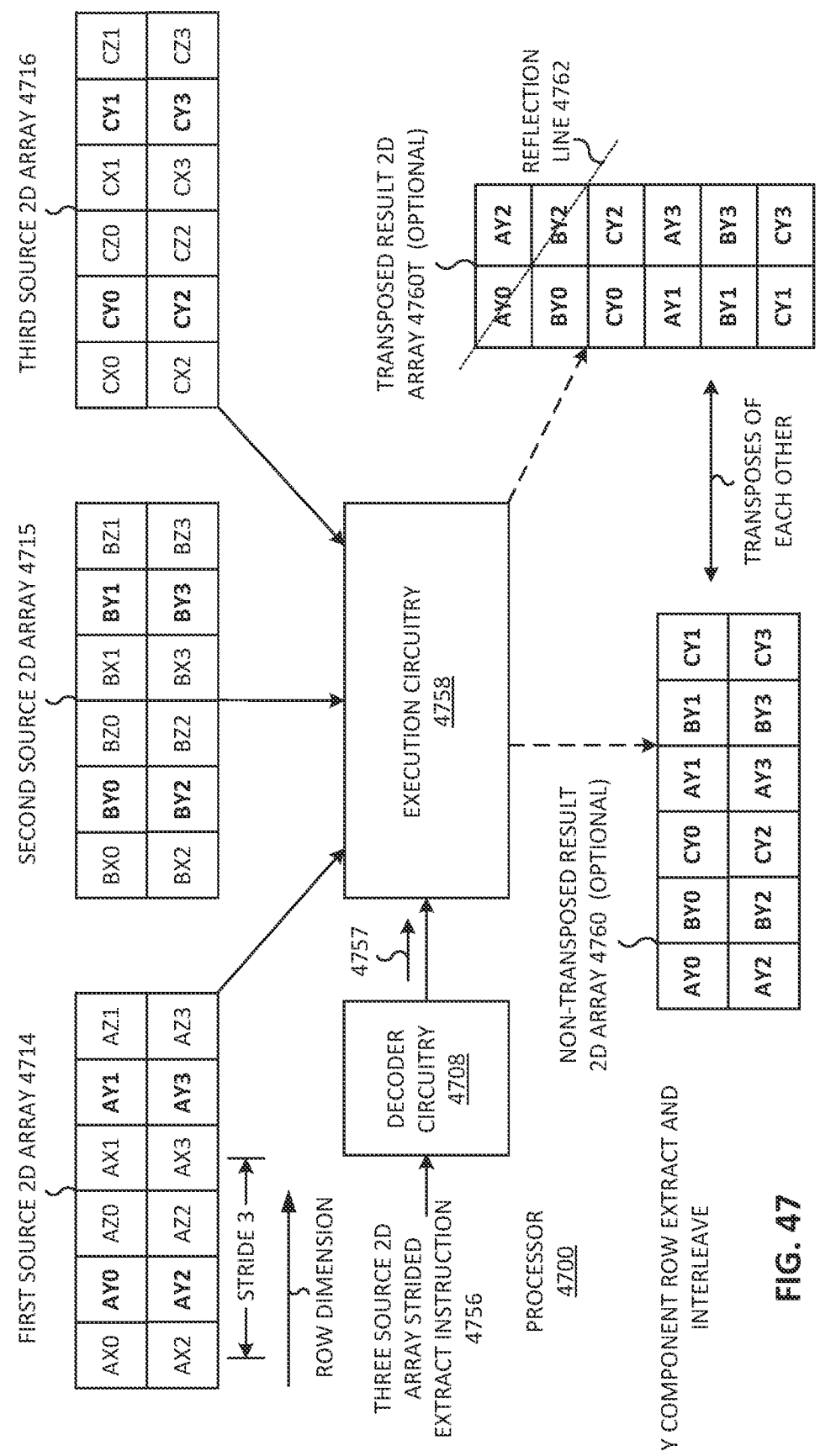

FIG. 47 is a block diagram of a fifth example embodiment of a processor 4700 that is operative to perform a fifth example embodiment of a three source 2D array strided extract instruction 4756. A decoder circuitry 4708 may decode the instruction 4756. An execution circuitry 4758 may execute the resulting decoded instruction 4757. In this first example embodiment, the data elements selected are the Y components, and they are selected from rows, and the selected data elements are three-way interleaved. The execution circuitry may select, for each row of data elements in a row dimension (illustrated by an arrow), of each of a first source 2D array 4714, a second source 2D array 4715, and a third source 2D array 4716, only all strided data elements at strided data element positions that are separated by a stride of three data element positions. These strided data elements are shown in bold in the illustration. The execution circuitry may store the selected data elements in either a non-transposed result 2D array 4760 or a transposed result 2D array 4760T. The non-transposed result 2D array 4760 and the non-transposed result 2D array are 2D array transposes of each other (e.g., conceptually reflected across a reflection line 4462). In this example embodiment, each result 1D array (e.g., each row in the non-transposed result 2D array or each column in the transposed result 2D array) stores the selected data elements three-way interleaved in which all data elements selected from the corresponding row of the first source 2D array are stored adjacently next to all corresponding data elements selected from the corresponding row of the second source 2D array which are stored adjacently next to all corresponding data elements selected from the corresponding row of the third source 2D array. The order can be readily seen from the illustration.

Figure 48:
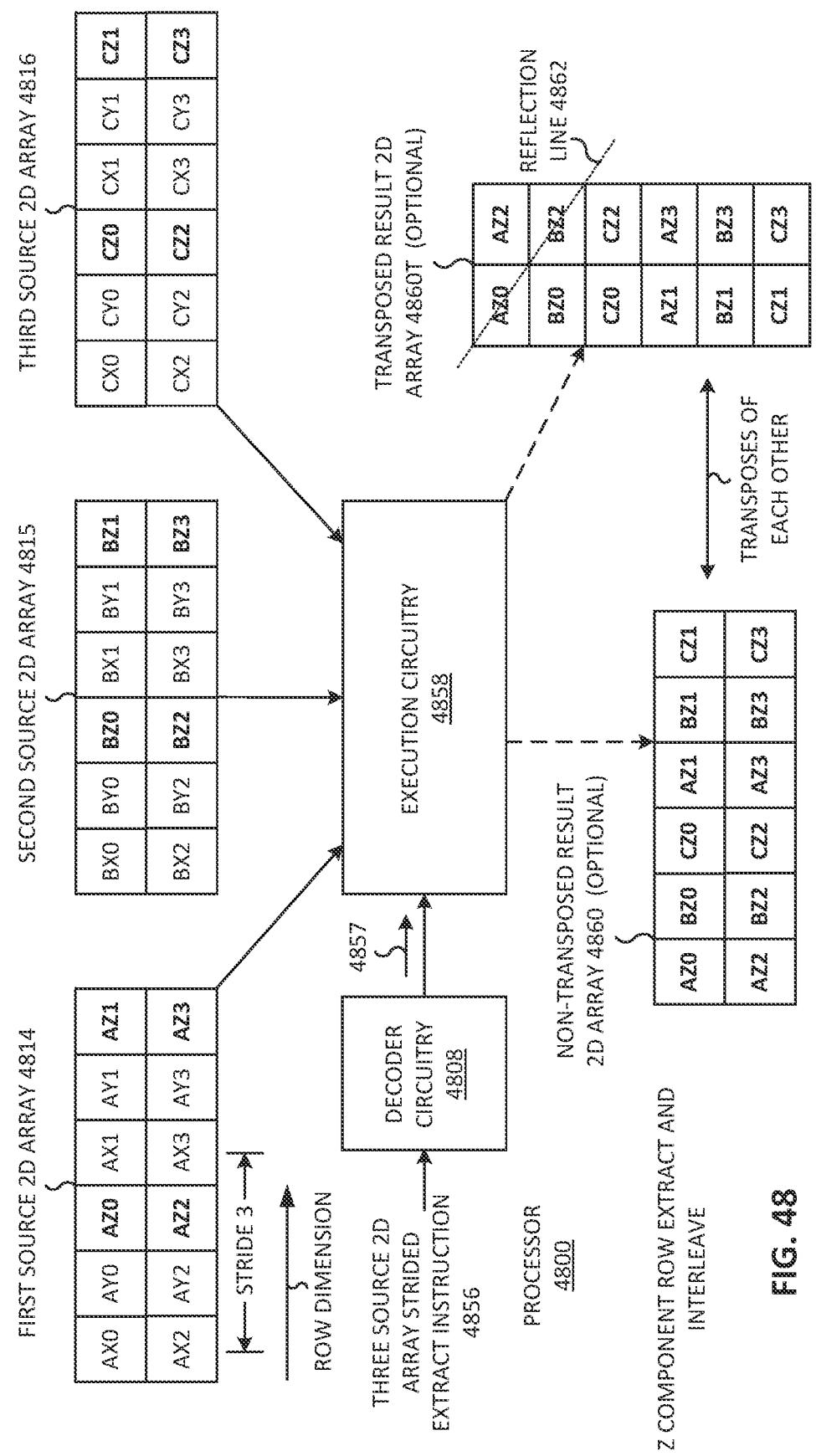

FIG. 48 is a block diagram of a sixth example embodiment of a processor 4800 that is operative to perform a sixth example embodiment of a three source 2D array strided extract instruction 4856. A decoder circuitry 4808 may decode the instruction 4856. An execution circuitry 4858 may execute the resulting decoded instruction 4857. In this first example embodiment, the data elements selected are the Z components, and they are selected from rows, and the selected data elements are three-way interleaved. The execution circuitry may select, for each row of data elements in a row dimension (illustrated by an arrow), of each of a first source 2D array 4814, a second source 2D array 4815, and a third source 2D array 4816, only all strided data elements at strided data element positions that are separated by a stride of three data element positions. These strided data elements are shown in bold in the illustration. The execution circuitry may store the selected data elements in either a non-transposed result 2D array 4860 or a transposed result 2D array 4860T. The non-transposed result 2D array 4860 and the non-transposed result 2D array are 2D array transposes of each other (e.g., conceptually reflected across a reflection line 4462). In this example embodiment, each result 1D array (e.g., each row in the non-transposed result 2D array or each column in the transposed result 2D array) stores the selected data elements three-way interleaved in which all data elements selected from the corresponding row of the first source 2D array are stored adjacently next to all corresponding data elements selected from the corresponding row of the second source 2D array which are stored adjacently next to all corresponding data elements selected from the corresponding row of the third source 2D array. The order can be readily seen from the illustration.

Figure 49:
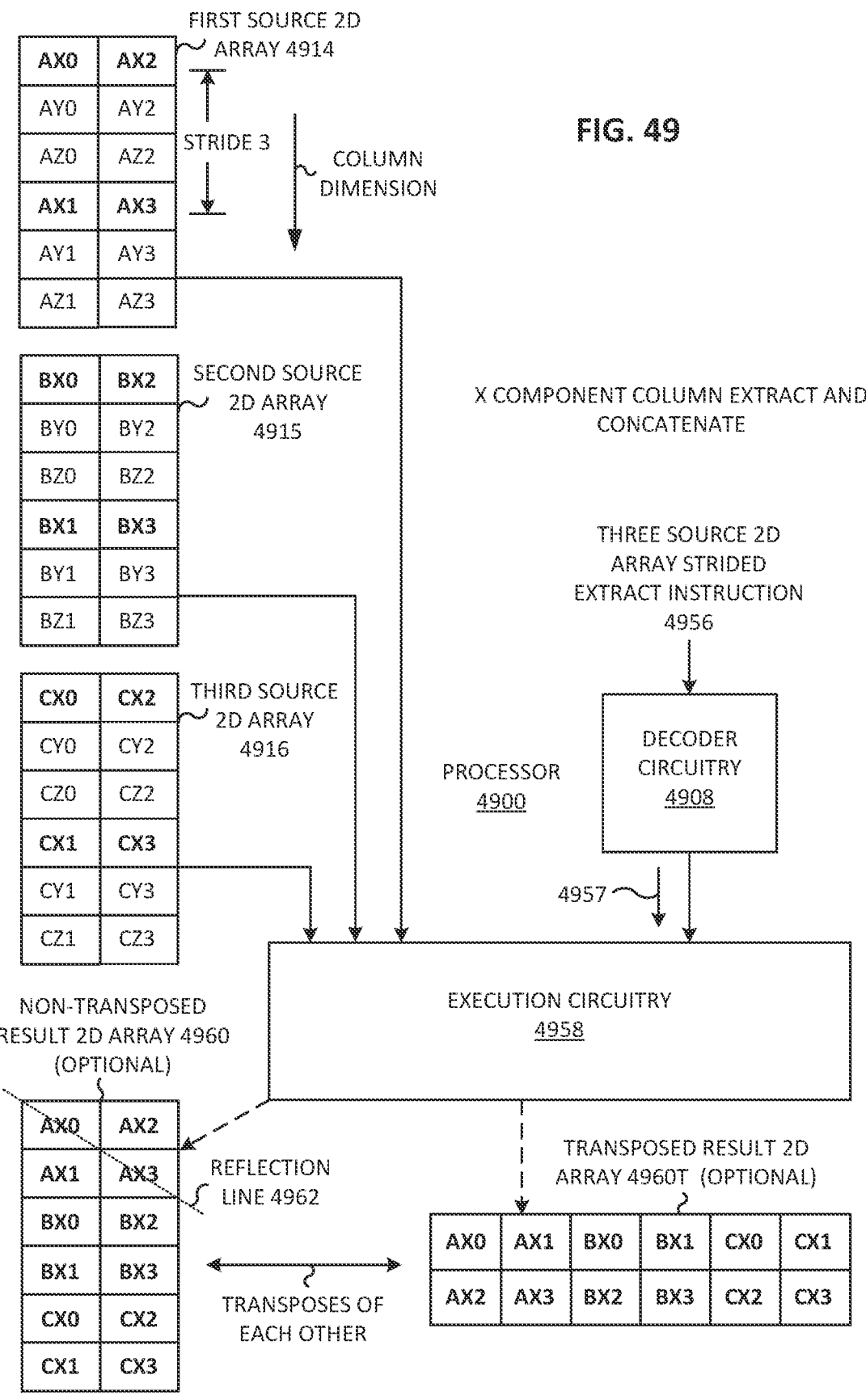

FIG. 49 is a block diagram of a seventh example embodiment of a processor 4900 that is operative to perform a seventh example embodiment of a three source 2D array strided extract instruction 4956. A decoder circuitry 4908 may decode the instruction 4956. An execution circuitry 4958 may execute the resulting decoded instruction 4957. In this first example embodiment, the data elements selected are the X components, and they are selected from columns, and the selected data elements are concatenated together. The execution circuitry may select, for each column of data elements in a column dimension (illustrated by an arrow), of each of a first source 2D array 4914, a second source 2D array 4915, and a third source 2D array 4916, only all strided data elements at strided data element positions that are separated by a stride of three data element positions. These strided data elements are shown in bold in the illustration. The execution circuitry may store the selected data elements in either a non-transposed result 2D array 4960 or a transposed result 2D array 4960T. The non-transposed result 2D array 4960 and the non-transposed result 2D array are 2D array transposes of each other (e.g., conceptually reflected across a reflection line 4462). In this example embodiment, each result 1D array (e.g., each column in the non-transposed result 2D array or each row in the transposed result 2D array) stores all data elements selected from the corresponding column of the first source 2D array concatenated together in order along with all data elements selected from the corresponding column of the second source 2D array concatenated together in order along with all data elements selected from the corresponding column of the third source 2D array concatenated together in order. The order can be readily seen from the illustration.

Figure 50:
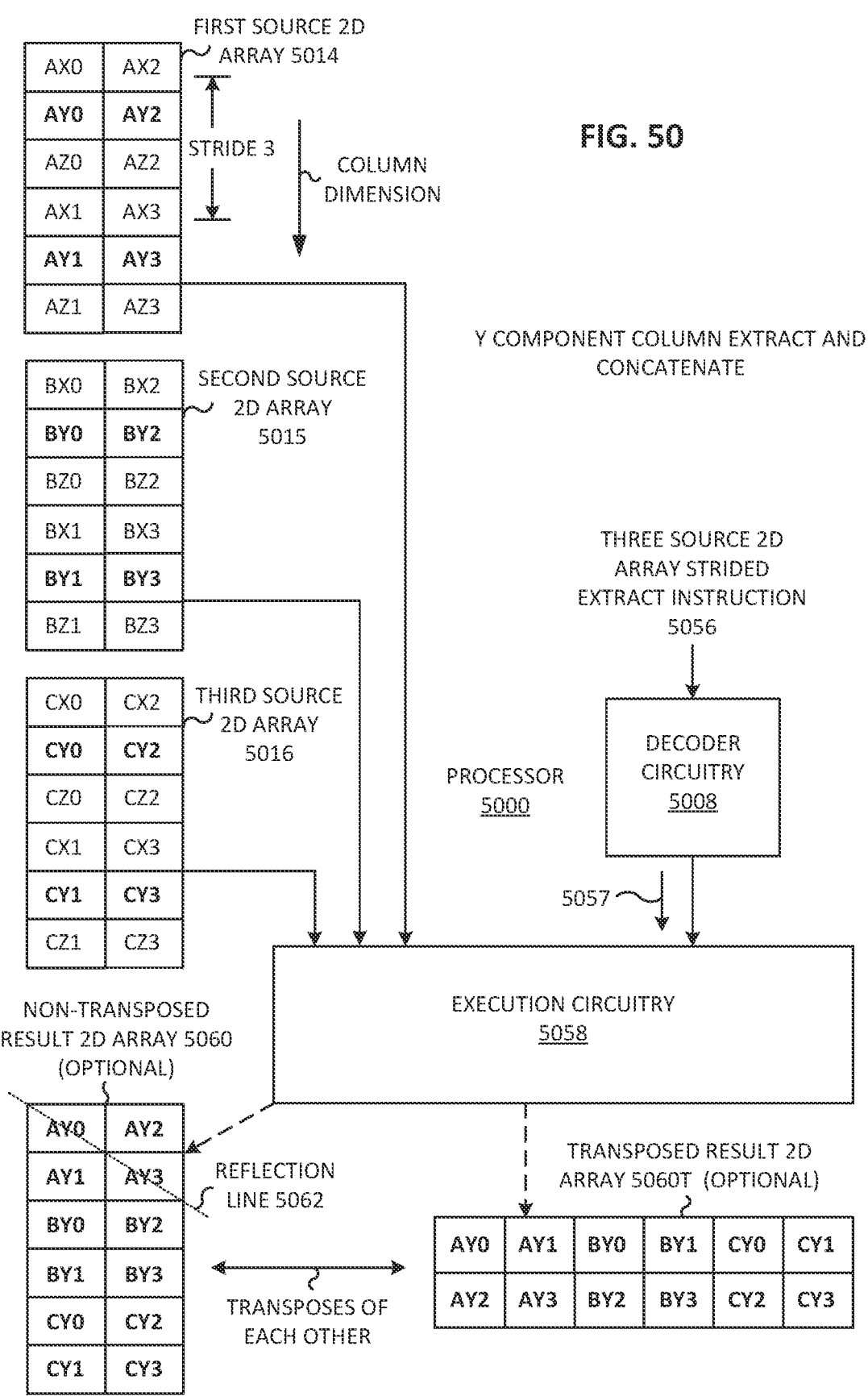

FIG. 50 is a block diagram of a eighth example embodiment of a processor 5000 that is operative to perform a eighth example embodiment of a three source 2D array strided extract instruction 5056. A decoder circuitry 5008 may decode the instruction 5056. An execution circuitry 5058 may execute the resulting decoded instruction 5057. In this first example embodiment, the data elements selected are the Y components, and they are selected from columns, and the selected data elements are concatenated together. The execution circuitry may select, for each column of data elements in a column dimension (illustrated by an arrow), of each of a first source 2D array 5014, a second source 2D array 5015, and a third source 2D array 5016, only all strided data elements at strided data element positions that are separated by a stride of three data element positions. These strided data elements are shown in bold in the illustration. The execution circuitry may store the selected data elements in either a non-transposed result 2D array 5060 or a transposed result 2D array 5060T. The non-transposed result 2D array 5060 and the non-transposed result 2D array are 2D array transposes of each other (e.g., conceptually reflected across a reflection line 4462). In this example embodiment, each result 1D array (e.g., each column in the non-transposed result 2D array or each row in the transposed result 2D array) stores all data elements selected from the corresponding column of the first source 2D array concatenated together in order along with all data elements selected from the corresponding column of the second source 2D array concatenated together in order along with all data elements selected from the corresponding column of the third source 2D array concatenated together in order. The order can be readily seen from the illustration.

Figure 51:
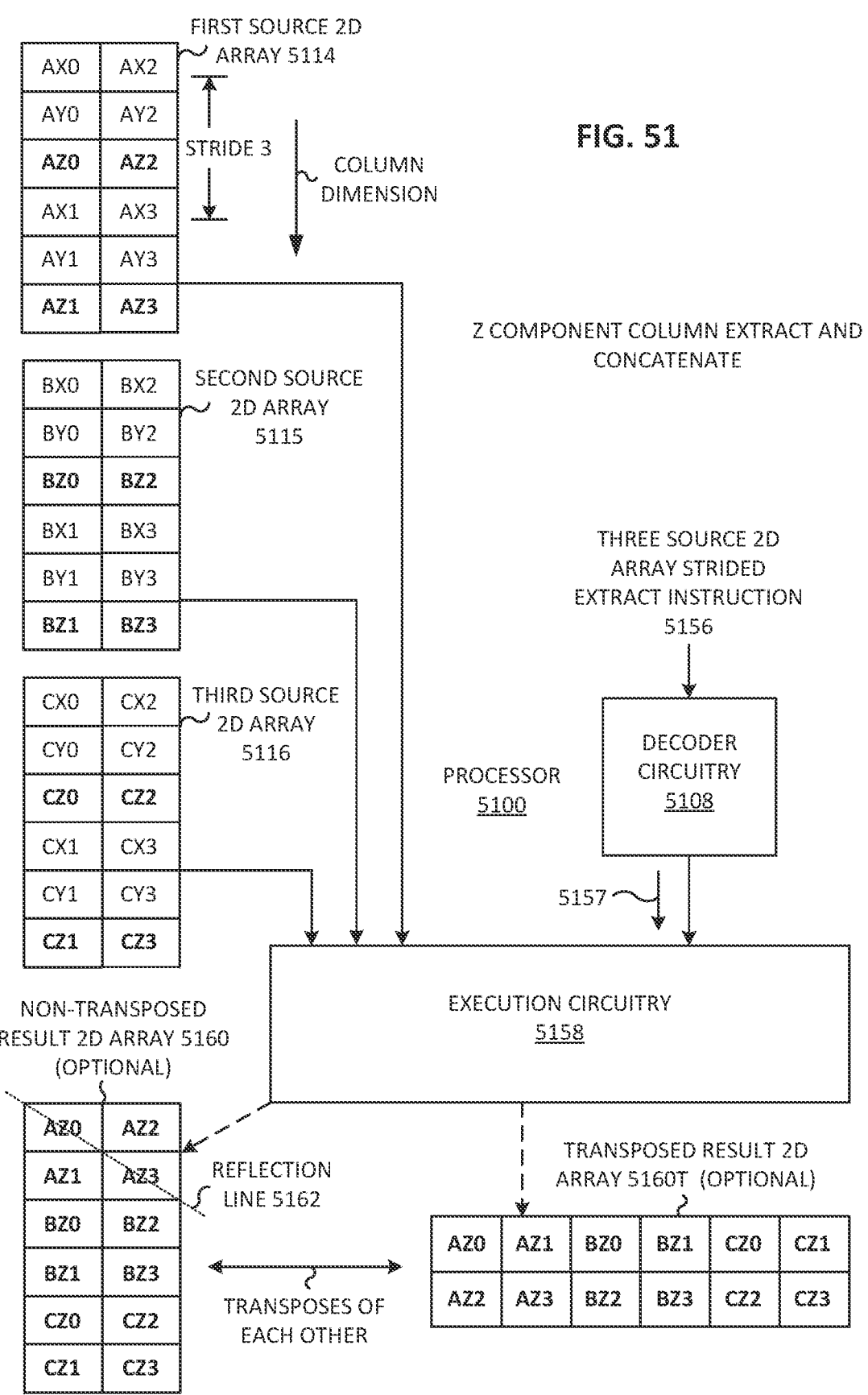

FIG. 51 is a block diagram of a ninth example embodiment of a processor 5100 that is operative to perform a ninth example embodiment of a three source 2D array strided extract instruction 5156. A decoder circuitry 5108 may decode the instruction 5156. An execution circuitry 5158 may execute the resulting decoded instruction 5157. In this first example embodiment, the data elements selected are the Z components, and they are selected from columns, and the selected data elements are concatenated together. The execution circuitry may select, for each column of data elements in a column dimension (illustrated by an arrow), of each of a first source 2D array 5114, a second source 2D array 5115, and a third source 2D array 5116, only all strided data elements at strided data element positions that are separated by a stride of three data element positions. These strided data elements are shown in bold in the illustration. The execution circuitry may store the selected data elements in either a non-transposed result 2D array 5160 or a transposed result 2D array 5160T. The non-transposed result 2D array 5160 and the non-transposed result 2D array are 2D array transposes of each other (e.g., conceptually reflected across a reflection line 4462). In this example embodiment, each result 1D array (e.g., each column in the non-transposed result 2D array or each row in the transposed result 2D array) stores all data elements selected from the corresponding column of the first source 2D array concatenated together in order along with all data elements selected from the corresponding column of the second source 2D array concatenated together in order along with all data elements selected from the corresponding column of the third source 2D array concatenated together in order. The order can be readily seen from the illustration.

Figure 52:
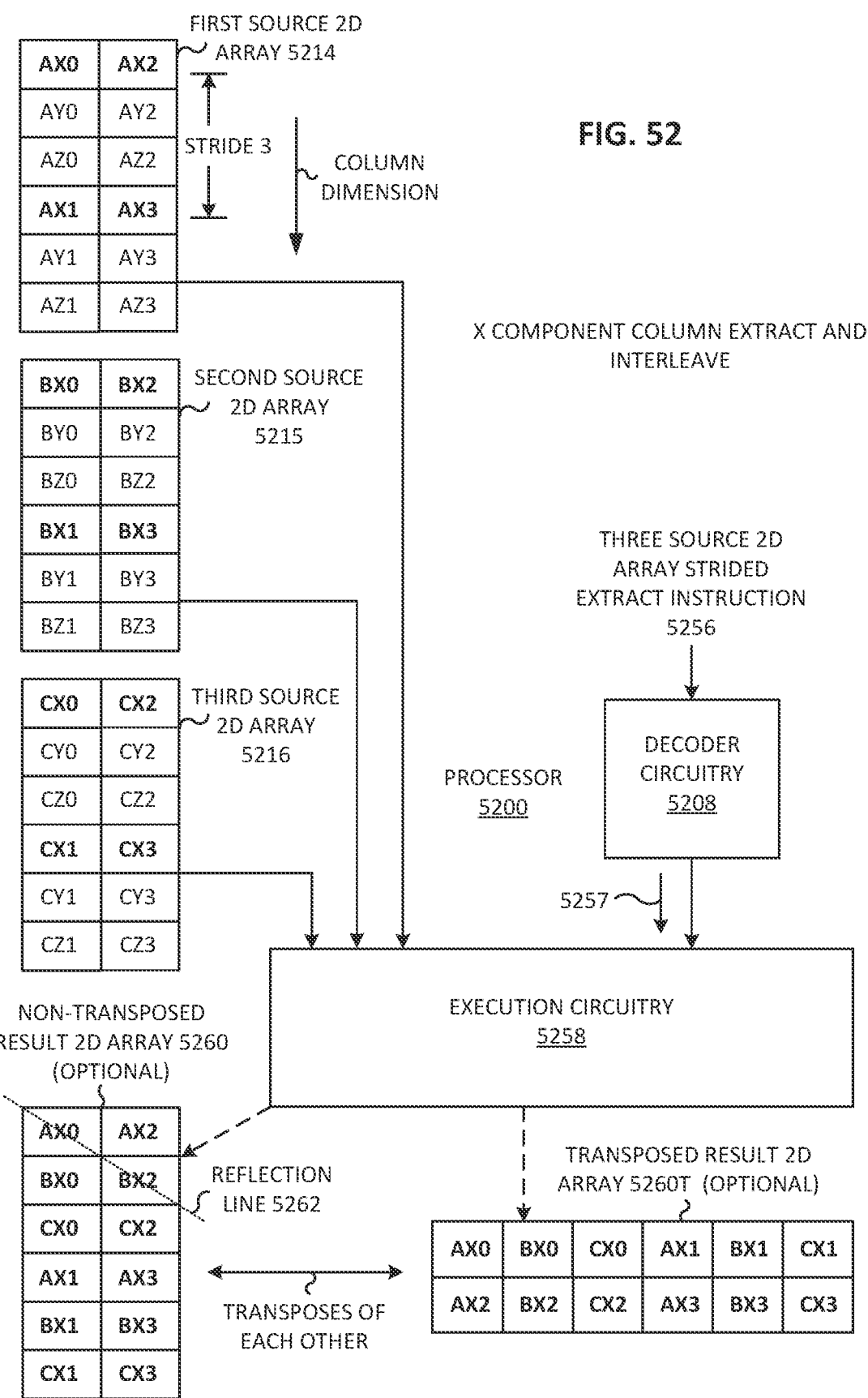

FIG. 52 is a block diagram of a tenth example embodiment of a processor 5200 that is operative to perform a tenth example embodiment of a three source 2D array strided extract instruction 5256. A decoder circuitry 5208 may decode the instruction 5256. An execution circuitry 5258 may execute the resulting decoded instruction 5257. In this first example embodiment, the data elements selected are the X components, and they are selected from columns, and the selected data elements are three-way interleaved. The execution circuitry may select, for each column of data elements in a column dimension (illustrated by an arrow), of each of a first source 2D array 5214, a second source 2D array 5215, and a third source 2D array 5216, only all strided data elements at strided data element positions that are separated by a stride of three data element positions. These strided data elements are shown in bold in the illustration. The execution circuitry may store the selected data elements in either a non-transposed result 2D array 5260 or a transposed result 2D array 5260T. The non-transposed result 2D array 5260 and the non-transposed result 2D array are 2D array transposes of each other (e.g., conceptually reflected across a reflection line 4462). In this example embodiment, each result 1D array (e.g., each column in the non-transposed result 2D array or each row in the transposed result 2D array) stores the selected data elements three-way interleaved in which all data elements selected from the corresponding column of the first source 2D array are stored adjacently next to all corresponding data elements selected from the corresponding column of the second source 2D array which are stored adjacently next to all corresponding data elements selected from the corresponding column of the third source 2D array. The order can be readily seen from the illustration.

Figure 53:
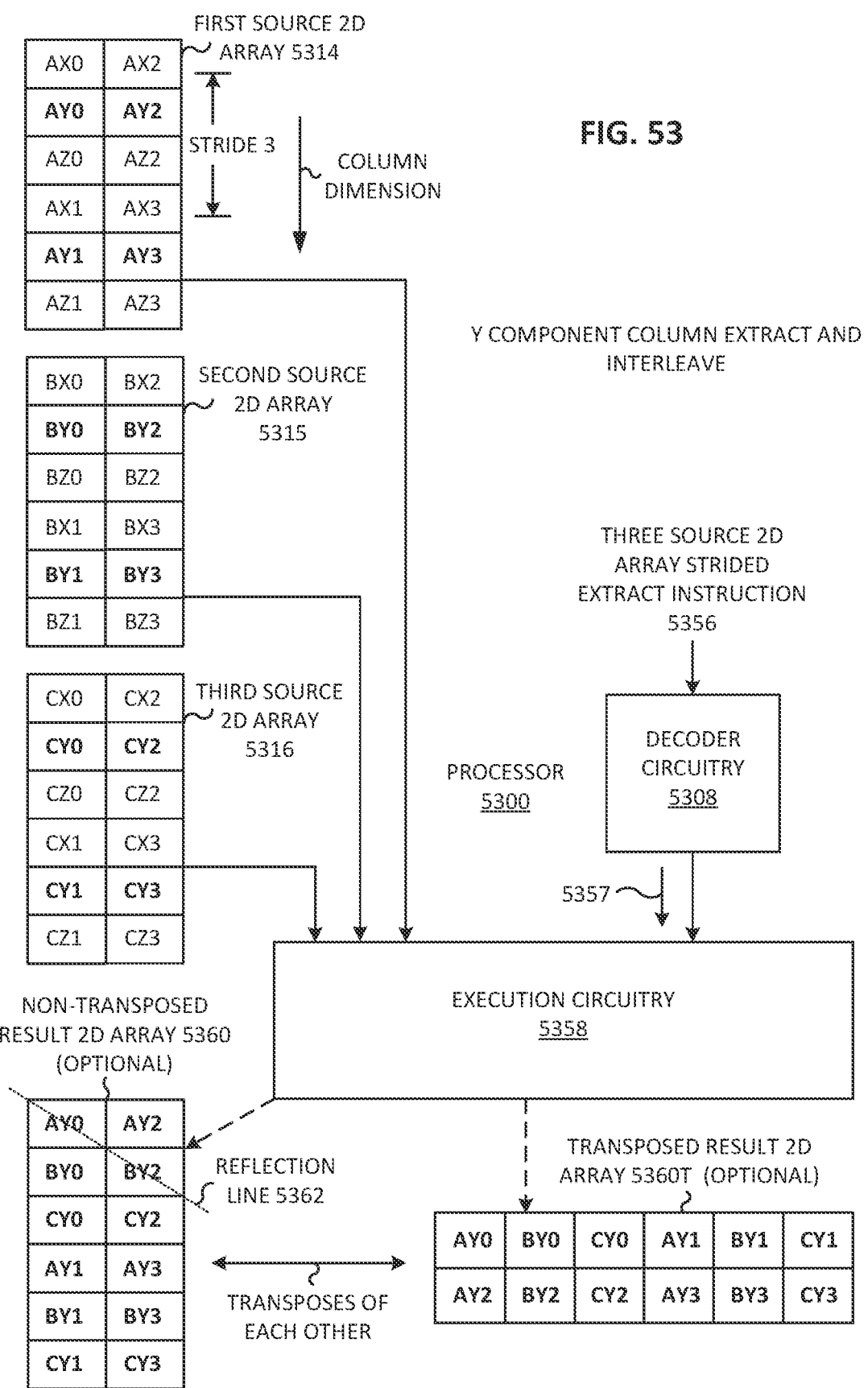

FIG. 53 is a block diagram of a eleventh example embodiment of a processor 5300 that is operative to perform a eleventh example embodiment of a three source 2D array strided extract instruction 5356. A decoder circuitry 5308 may decode the instruction 5356. An execution circuitry 5358 may execute the resulting decoded instruction 5357. In this first example embodiment, the data elements selected are the Y components, and they are selected from columns, and the selected data elements are three-way interleaved. The execution circuitry may select, for each column of data elements in a column dimension (illustrated by an arrow), of each of a first source 2D array 5314, a second source 2D array 5315, and a third source 2D array 5316, only all strided data elements at strided data element positions that are separated by a stride of three data element positions. These strided data elements are shown in bold in the illustration. The execution circuitry may store the selected data elements in either a non-transposed result 2D array 5360 or a transposed result 2D array 5360T. The non-transposed result 2D array 5360 and the non-transposed result 2D array are 2D array transposes of each other (e.g., conceptually reflected across a reflection line 4462). In this example embodiment, each result 1D array (e.g., each column in the non-transposed result 2D array or each row in the transposed result 2D array) stores the selected data elements three-way interleaved in which all data elements selected from the corresponding column of the first source 2D array are stored adjacently next to all corresponding data elements selected from the corresponding column of the second source 2D array which are stored adjacently next to all corresponding data elements selected from the corresponding column of the third source 2D array. The order can be readily seen from the illustration.

Figure 54:
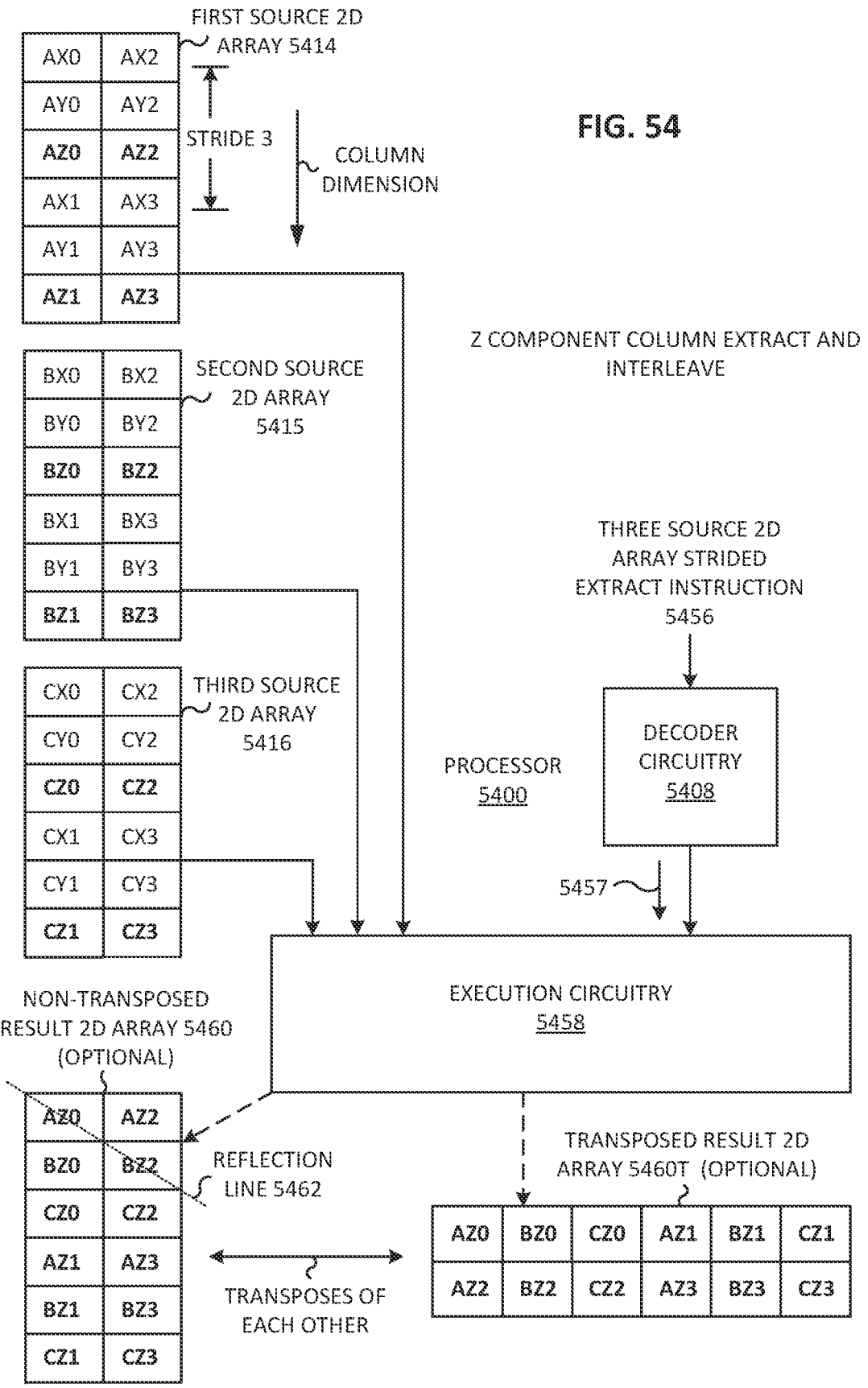

FIG. 54 is a block diagram of a twelfth example embodiment of a processor 5400 that is operative to perform a twelfth example embodiment of a three source 2D array strided extract instruction 5456. A decoder circuitry 5408 may decode the instruction 5456. An execution circuitry 5458 may execute the resulting decoded instruction 5457. In this first example embodiment, the data elements selected are the Z components, and they are selected from columns, and the selected data elements are three-way interleaved. The execution circuitry may select, for each column of data elements in a column dimension (illustrated by an arrow), of each of a first source 2D array 5414, a second source 2D array 5415, and a third source 2D array 5416, only all strided data elements at strided data element positions that are separated by a stride of three data element positions. These strided data elements are shown in bold in the illustration. The execution circuitry may store the selected data elements in either a non-transposed result 2D array 5460 or a transposed result 2D array 5460T. The non-transposed result 2D array 5460 and the non-transposed result 2D array are 2D array transposes of each other (e.g., conceptually reflected across a reflection line 4462). In this example embodiment, each result 1D array (e.g., each column in the non-transposed result 2D array or each row in the transposed result 2D array) stores the selected data elements three-way interleaved in which all data elements selected from the corresponding column of the first source 2D array are stored adjacently next to all corresponding data elements selected from the corresponding column of the second source 2D array which are stored adjacently next to all corresponding data elements selected from the corresponding column of the third source 2D array. The order can be readily seen from the illustration.

In FIGS. 43-54, in some embodiments, the result 2D array may have the same size as the first, second, and third source 2D arrays. In some such embodiments, one third of the data elements of the first source 2D array may be combined with one third of the data elements of the second source 2D array and may be combined with one third of the data elements of the third source 2D array. In some embodiments, only data elements from each row of the same set of strided columns for each of the first, second, and third source 2D arrays may be combined into the result 2D array. In some embodiments, only data elements from each column of the same set of strided rows for each of the first, second, and third source 2D arrays may be combined into the result 2D array. In some embodiments, only one type of component of three-tuple data having three types of components may be combined into the result 2D array.

In FIGS. 43-54, in some embodiments, the instruction may optionally support only either one of the non-transposed and transposed result 2D arrays, or may optionally support both. When both are supported, which one to use may be indicated in various possible ways (e.g., implicit to the opcode, specified by a field of the instruction, selected by an immediate or other single value as described elsewhere herein, etc.).

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 55A illustrates an exemplary AVX instruction format including a VEX prefix 5502, real opcode field 5530, Mod R/M byte 5540, SIB byte 5550, displacement field 5562, and IMM8 5572. FIG. 55B illustrates which fields from FIG. 55A make up a full opcode field 5574 and a base operation field 5542. FIG. 55C illustrates which fields from FIG. 55A make up a register index field 5544.

VEX Prefix (Bytes 0-2) 5502 is encoded in a three-byte form. The first byte is the Format Field 5540 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 5505 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 5515 (VEX byte 1, bits [4:0]-mmmmm) includes content to encode an implied leading opcode byte. W Field 5564 (VEX byte 2, bit [7]-W)—is represented by the notation VEX.W, and provides different functions depending on the instruction. The role of VEX.vvvv 5520 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in 1 s complement form for certain vector shifts; or 3) VEX.vvvv does not encode any operand, the field is reserved and should contain 5511 b. If VEX.L 5568 Size field (VEX byte 2, bit [2]-L)=0, it indicates 128 bit vector; if VEX.L=1, it indicates 256 bit vector. Prefix encoding field 5525 (VEX byte 2, bits [1:0]-pp) provides additional bits for the base operation field.

Real Opcode Field 5530 (Byte 3) is also known as the opcode byte. Part of the opcode is specified in this field.

MOD R/M Field 5540 (Byte 4) includes MOD field 5542 (bits [7-6]), Reg field 5544 (bits [5-3]), and R/M field 5546 (bits [2-0]). The role of Reg field 5544 may include the following: encoding either the destination register operand or a source register operand (the rrr of Rrrr), or be treated as an opcode extension and not used to encode any instruction operand. The role of R/M field 5546 may include the following: encoding the instruction operand that references a memory address, or encoding either the destination register operand or a source register operand.

Scale, Index, Base (SIB)—The content of Scale field 5550 (Byte 5) includes SS5552 (bits [7-6]), which is used for memory address generation. The contents of SIB.xxx 5554 (bits [5-3]) and SIB.bbb 5556 (bits [2-0]) have been previously referred to with regard to the register indexes Xxxx and Bbbb.

The Displacement Field 5562 and the immediate field (IMM8) 5572 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 56A-56B are block diagrams illustrating a generic vector friendly instruction format and instruction templates thereof according to embodiments of the invention. FIG.

56A is a block diagram illustrating a generic vector friendly instruction format and class A instruction templates thereof according to embodiments of the invention; while FIG. 56B is a block diagram illustrating the generic vector friendly instruction format and class B instruction templates thereof according to embodiments of the invention. Specifically, a generic vector friendly instruction format 5600 for which are defined class A and class B instruction templates, both of which include no memory access 5605 instruction templates and memory access 5620 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 56A include: 1) within the no memory access 5605 instruction templates there is shown a no memory access, full round control type operation 5610 instruction template and a no memory access, data transform type operation 5615 instruction template; and 2) within the memory access 5620 instruction templates there is shown a memory access, temporal 5625 instruction template and a memory access, non-temporal 5630 instruction template. The class B instruction templates in FIG. 56B include: 1) within the no memory access 5605 instruction templates there is shown a no memory access, write mask control, partial round control type operation 5612 instruction template and a no memory access, write mask control, vsize type operation 5617 instruction template; and 2) within the memory access 5620 instruction templates there is shown a memory access, write mask control 5627 instruction template.

The generic vector friendly instruction format 5600 includes the following fields listed below in the order illustrated in FIGS. 56A-56B.

Format field 5640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 5642—its content distinguishes different base operations. Register index field 5644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 5646—its content distinguishes occurrences of instructions in the generic vector instruction format that specify memory access from those that do not; that is, between no memory access 5605 instruction templates and memory access 5620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 5650—its content distinguishes which one of a variety of different operations to be performed in addition to the base operation. This field is context specific. In one embodiment of the invention, this field is divided into a class field 5668, an alpha field 5652, and a beta field 5654. The augmentation operation field 5650 allows common groups of operations to be performed in a single instruction rather than 2, 3, or 4 instructions.

Scale field 5660—its content allows for the scaling of the index field's content for memory address generation (e.g., for address generation that uses $2^{scale}$*index+base).

Displacement Field 5662A—its content is used as part of memory address generation (e.g., for address generation that uses $2^{scale}$*index+base+displacement).

Displacement Factor Field 5662B (note that the juxtaposition of displacement field 5662A directly over displacement factor field 5662B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 5674 (described later herein) and the data manipulation field 5654C. The displacement field 5662A and the displacement factor field 5662B are optional in the sense that they are not used for the no memory access 5605 instruction templates and/or different embodiments may implement only one or none of the two.

Data element width field 5664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 5670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 5670 allows for partial vector operations, including loads, stores, arithmetic, logical, etc. While embodiments of the invention are described in which the write mask field's 5670 content selects one of a number of write mask registers that contains the write mask to be used (and thus the write mask field's 5670 content indirectly identifies that masking to be performed), alternative embodiments instead or additional allow the mask write field's 5670 content to directly specify the masking to be performed.

Immediate field 5672—its content allows for the specification of an immediate. This field is optional in the sense that is it not present in an implementation of the generic vector friendly format that does not support immediate and it is not present in instructions that do not use an immediate.

Class field 5668—its content distinguishes between different classes of instructions. With reference to FIGS. 56A-B, the contents of this field select between class A and class B instructions. In FIGS. 56A-B, rounded corner squares are used to indicate a specific value is present in a field (e.g., class A 5668A and class B 5668B for the class field 5668 respectively in FIGS. 56A-B).

Instruction Templates of Class A

In the case of the non-memory access 5605 instruction templates of class A, the alpha field 5652 is interpreted as an RS field 5652A, whose content distinguishes which one of the different augmentation operation types are to be performed (e.g., round 5652A.1 and data transform 5652A.2 are respectively specified for the no memory access, round type operation 5610 and the no memory access, data transform type operation 5615 instruction templates), while beta field 5654 distinguishes which of the operations of the specified type is to be performed. In the no memory access 5605 instruction templates, the scale field 5660, the displacement field 5662A, and the displacement scale filed 5662B are not present.

No-Memory Access Instruction Templates—Full Round Control Type Operation

In the no memory access full round control type operation 5610 instruction template, the beta field 5654 is interpreted as a round control field 5654A, whose content(s) provide static rounding. While in the described embodiments of the invention the round control field 5654A includes a suppress all floating point exceptions (SAE) field 5656 and a round operation control field 5658, alternative embodiments may support may encode both these concepts into the same field or only have one or the other of these concepts/fields (e.g., may have only the round operation control field 5658).

SAE field 5656—its content distinguishes whether or not to disable the exception event reporting; when the SAE field's 5656 content indicates suppression is enabled, a given instruction does not report any kind of floating-point exception flag and does not raise any floating point exception handler.

Round operation control field 5658—its content distinguishes which one of a group of rounding operations to perform (e.g., Round-up, Round-down, Round-towards-zero and Round-to-nearest). Thus, the round operation control field 5658 allows for the changing of the rounding mode on a per instruction basis. In one embodiment of the invention where a processor includes a control register for specifying rounding modes, the round operation control field's 5650 content overrides that register value.

No Memory Access Instruction Templates—Data Transform Type Operation

In the no memory access data transform type operation 5615 instruction template, the beta field 5654 is interpreted as a data transform field 5654B, whose content distinguishes which one of a number of data transforms is to be performed (e.g., no data transform, swizzle, broadcast).

In the case of a memory access 5620 instruction template of class A, the alpha field 5652 is interpreted as an eviction hint field 5652B, whose content distinguishes which one of the eviction hints is to be used (in FIG. 56A, temporal 5652B.1 and non-temporal 5652B.2 are respectively specified for the memory access, temporal 5625 instruction template and the memory access, non-temporal 5630 instruction template), while the beta field 5654 is interpreted as a data manipulation field 5654C, whose content distinguishes which one of a number of data manipulation operations (also known as primitives) is to be performed (e.g., no manipulation; broadcast; up conversion of a source; and down conversion of a destination). The memory access 5620 instruction templates include the scale field 5660, and optionally the displacement field 5662A or the displacement scale field 5662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 5652 is interpreted as a write mask control (Z) field 5652C, whose content distinguishes whether the write masking controlled by the write mask field 5670 should be a merging or a zeroing. In the case of the non-memory access 5605 instruction templates of class B, part of the beta field 5654 is interpreted as an RL field 5657A, whose content distinguishes which one of the different augmentation operation types are to be performed (e.g., round 5657A.1 and vector length (VSIZE) 5657A.2 are respectively specified for the no memory access, write mask control, partial round control type operation 5612 instruction template and the no memory access, write mask control, VSIZE type operation 5617 instruction template), while the rest of the beta field 5654 distinguishes which of the operations of the specified type is to be performed. In the no memory access 5605 instruction templates, the scale field 5660, the displacement field 5662A, and the displacement scale filed 5662B are not present.

In the no memory access, write mask control, partial round control type operation 5610 instruction template, the rest of the beta field 5654 is interpreted as a round operation field 5659A and exception event reporting is disabled (a given instruction does not report any kind of floating-point exception flag and does not raise any floating point exception handler).

Round operation control field 5659A—just as round operation control field 5658, its content distinguishes which one of a group of rounding operations to perform (e.g., Round-up, Round-down, Round-towards-zero and Round-to-nearest). Thus, the round operation control field 5659A allows for the changing of the rounding mode on a per instruction basis. In one embodiment of the invention where a processor includes a control register for specifying rounding modes, the round operation control field's 5650 content overrides that register value.

In the no memory access, write mask control, VSIZE type operation 5617 instruction template, the rest of the beta field 5654 is interpreted as a vector length field 5659B, whose content distinguishes which one of a number of data vector lengths is to be performed on (e.g., 128, 256, or 512 byte).

In the case of a memory access 5620 instruction template of class B, part of the beta field 5654 is interpreted as a broadcast field 5657B, whose content distinguishes whether or not the broadcast type data manipulation operation is to be performed, while the rest of the beta field 5654 is interpreted the vector length field 5659B. The memory access 5620 instruction templates include the scale field 5660, and optionally the displacement field 5662A or the displacement scale field 5662B.

With regard to the generic vector friendly instruction format 5600, a full opcode field 5674 is shown including the format field 5640, the base operation field 5642, and the data element width field 5664. While one embodiment is shown where the full opcode field 5674 includes all of these fields, the full opcode field 5674 includes less than all of these fields in embodiments that do not support all of them. The full opcode field 5674 provides the operation code (opcode).

The augmentation operation field 5650, the data element width field 5664, and the write mask field 5670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 57 is a block diagram illustrating an exemplary specific vector friendly instruction format according to embodiments of the invention. FIG. 57 shows a specific vector friendly instruction format 5700 that is specific in the sense that it specifies the location, size, interpretation, and order of the fields, as well as values for some of those fields. The specific vector friendly instruction format 5700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 56 into which fields from FIG. 57 map are illustrated.

It should be understood that, although embodiments of the invention are described with reference to the specific vector friendly instruction format 5700 in the context of the generic vector friendly instruction format 5600 for illustrative purposes, the invention is not limited to the specific vector friendly instruction format 5700 except where claimed. For example, the generic vector friendly instruction format 5600 contemplates a variety of possible sizes for the various fields, while the specific vector friendly instruction format 5700 is shown as having fields of specific sizes. By way of specific example, while the data element width field 5664 is illustrated as a one bit field in the specific vector friendly instruction format 5700, the invention is not so limited (that is, the generic vector friendly instruction format 5600 contemplates other sizes of the data element width field 5664). The generic vector friendly instruction format 5600 includes the following fields listed below in the order illustrated in FIG. 57A. EVEX Prefix (Bytes 0-3) 5702—is encoded in a four-byte form.

Format Field 5640 (EVEX Byte 0, bits [7:0])—the first byte (EVEX Byte 0) is the format field 5640 and it contains 0x62 (the unique value used for distinguishing the vector friendly instruction format in one embodiment of the invention).

The second-fourth bytes (EVEX Bytes 1-3) include a number of bit fields providing specific capability.

REX field 5705 (EVEX Byte 1, bits [7-5])—consists of a EVEX.R bit field (EVEX Byte 1, bit [7]-R), EVEX.X bit field (EVEX byte 1, bit [6]-X), and 5657BEX byte 1, bit[5]-B). The EVEX.R, EVEX.X, and EVEX.B bit fields provide the same functionality as the corresponding VEX bit fields, and are encoded using 1 s complement form, i.e.

ZMM0 is encoded as 5511B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 5610—this is the first part of the REX' field 5610 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD RIM field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 5715 (EVEX byte 1, bits [3:0]-mmmm)—its content encodes an implied leading opcode byte (0F, 0F 38, or 0F 3).

Data element width field 5664 (EVEX byte 2, bit [7]-W)—is represented by the notation EVEX.W. EVEX.W is used to define the granularity (size) of the datatype (either 32-bit data elements or 64-bit data elements).

EVEX.vvvv 5720 (EVEX Byte 2, bits [6:3]-vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 5511b. Thus, EVEX.vvvv field 5720 encodes the 4 low-order bits of the first source register specifier stored in inverted (1 s complement) form. Depending on the instruction, an extra different EVEX bit field is used to extend the specifier size to 32 registers.

EVEX.0 5668 Class field (EVEX byte 2, bit [2]-U)—If EVEX.U=0, it indicates class A or EVEX.U0; if EVEX.U=1, it indicates class B or EVEX.U1.

Prefix encoding field 5725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 5652 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 5654 (EVEX byte 3, bits [6:4]-SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 5610—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 5670 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware). Real Opcode Field 5730 (Byte 4) is also known as the opcode byte. Part of the opcode is specified in this field.

MOD R/M Field 5740 (Byte 5) includes MOD field 5742, Reg field 5744, and R/M field 5746. As previously described, the MOD field's 5742 content distinguishes between memory access and non-memory access operations. The role of Reg field 5744 can be summarized to two situations: encoding either the destination register operand or a source register operand, or be treated as an opcode extension and not used to encode any instruction operand. The role of R/M field 5746 may include the following: encoding the instruction operand that references a memory address, or encoding either the destination register operand or a source register operand.

Scale, Index, Base (SIB) Byte (Byte 6)—As previously described, the scale field's 5650 content is used for memory address generation. SIB.xxx 5754 and SIB.bbb 5756—the contents of these fields have been previously referred to with regard to the register indexes Xxxx and Bbbb.

Displacement field 5662A (Bytes 7-10)—when MOD field 5742 contains 10, bytes 7-10 are the displacement field 5662A, and it works the same as the legacy 32-bit displacement (disp32) and works at byte granularity.

Displacement factor field 5662B (Byte 7)—when MOD field 5742 contains 01, byte 7 is the displacement factor field 5662B. The location of this field is that same as that of the legacy x86 instruction set 8-bit displacement (disp8), which works at byte granularity. Since disp8 is sign extended, it can only address between −128 and 567 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 5662B is a reinterpretation of disp8; when using displacement factor field 5662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 5662B substitutes the legacy x86 instruction set 8-bit displacement. Thus, the displacement factor field 5662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 5672 operates as previously described.
Full Opcode Field

Figures 57A, 57B, 57C:
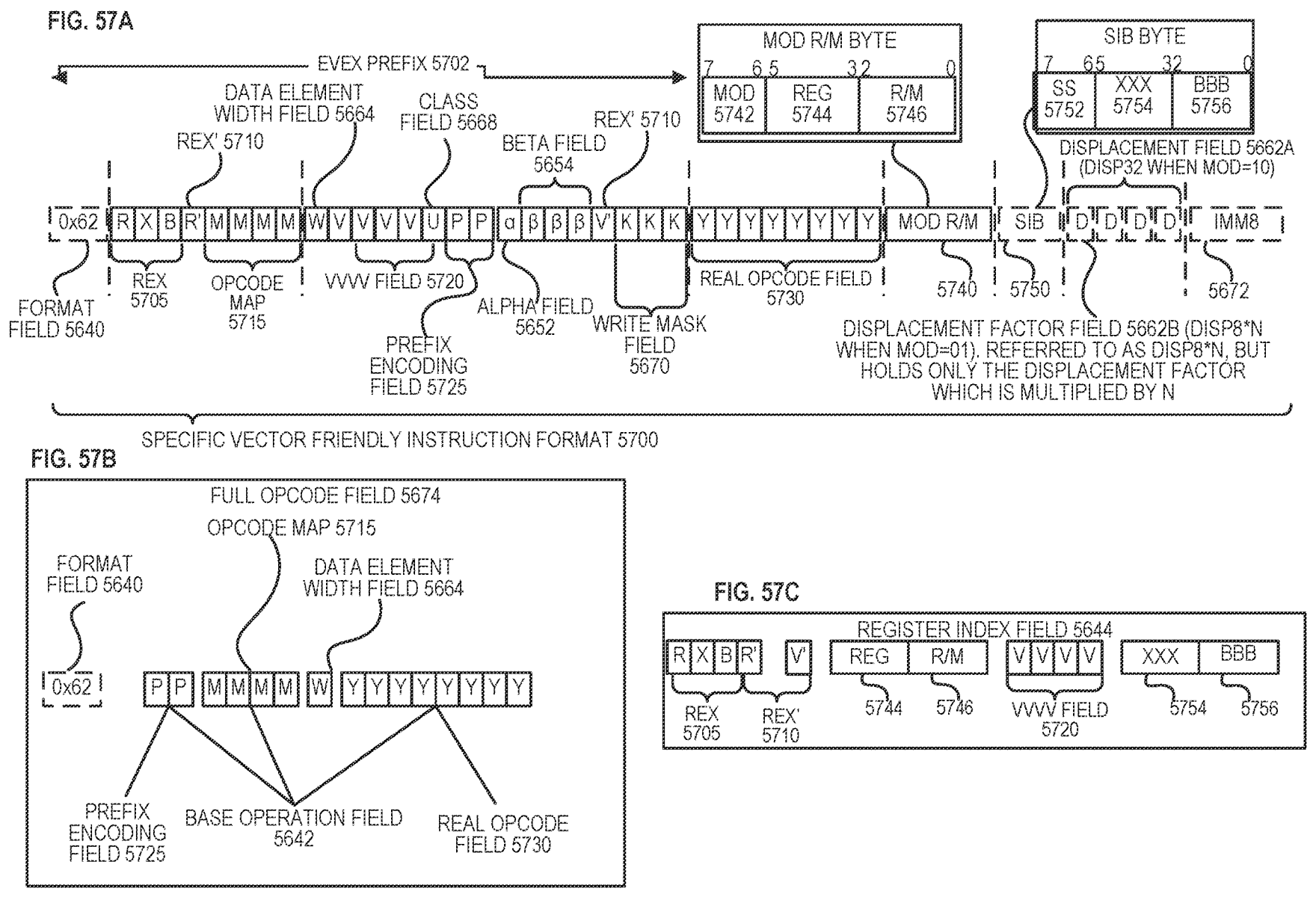
Figure 57D:
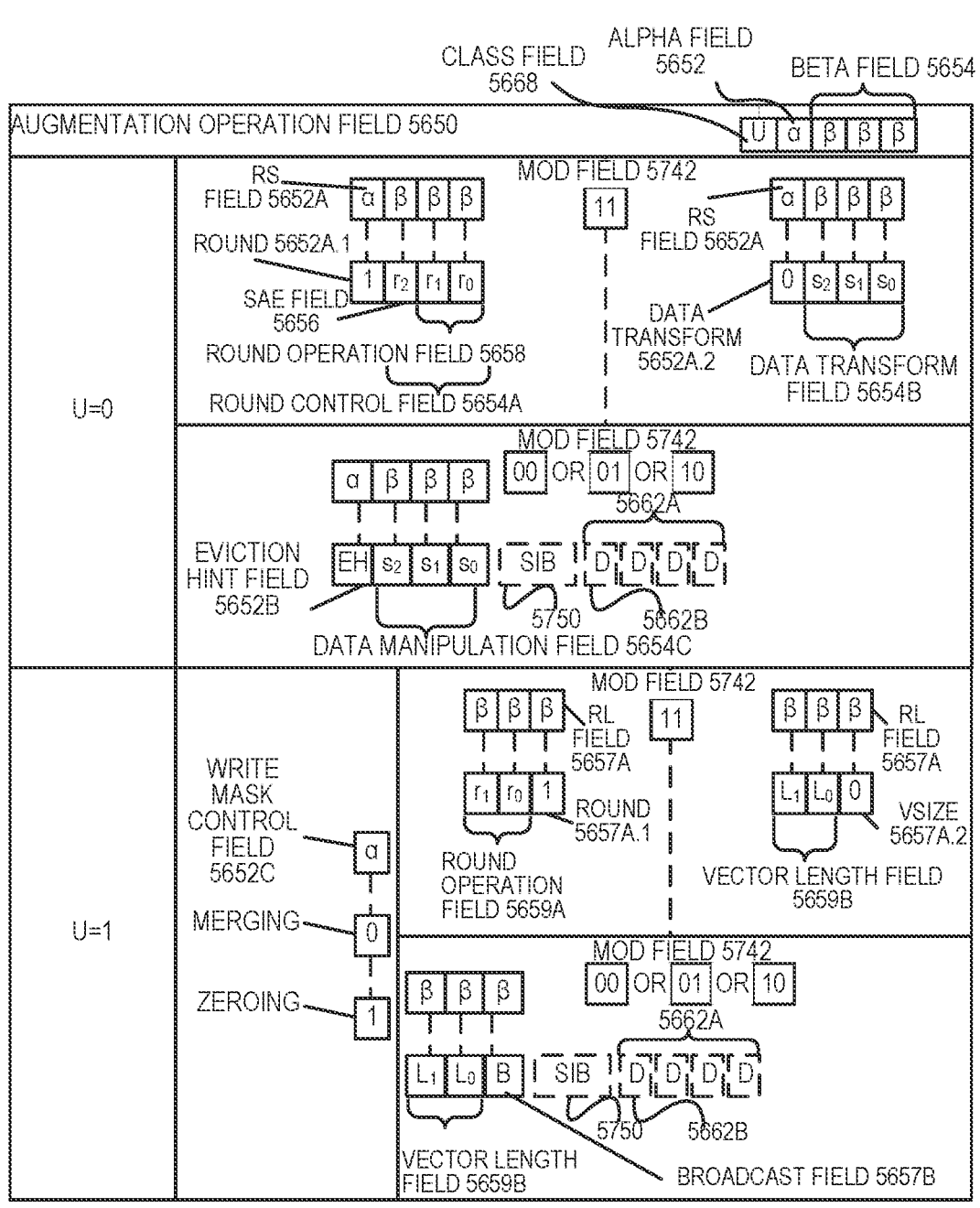

FIG. 57B is a block diagram illustrating the fields of the specific vector friendly instruction format 5700 that make up the full opcode field 5674 according to one embodiment of the invention. Specifically, the full opcode field 5674 includes the format field 5640, the base operation field 5642, and the data element width (W) field 5664. The base operation field 5642 includes the prefix encoding field 5725, the opcode map field 5715, and the real opcode field 5730.
Register Index Field FIG. 57C is a block diagram illustrating the fields of the specific vector friendly instruction format 5700 that make up the register index field 5644 according to one embodiment of the invention. Specifically, the register index field 5644 includes the REX field 5705, the REX' field 5710, the MODR/M.reg field 5744, the MODR/M.r/m field 5746, the VVVV field 5720, xxx field 5754, and the bbb field 5756.
Augmentation Operation Field FIG. 57D is a block diagram illustrating the fields of the specific vector friendly instruction format 5700 that make up the augmentation operation field 5650 according to one embodiment of the invention. When the class (U) field 5668 contains 0, it signifies EVEX.U0 (class A 5668A); when it contains 1, it signifies EVEX.U1 (class B 5668B). When U=0 and the MOD field 5742 contains 11 (signifying a no memory access operation), the alpha field 5652 (EVEX byte 3, bit [7]-EH) is interpreted as the rs field 5652A. When the rs field 5652A contains a 1 (round 5652A.1), the beta field 5654 (EVEX byte 3, bits [6:4]-SSS) is interpreted as the round control field 5654A. The round control field 5654A includes a one bit SAE field 5656 and a two bit round operation field 5658. When the rs field 5652A contains a 0 (data transform 5652A.2), the beta field 5654 (EVEX byte 3, bits [6:4]—SSS) is interpreted as a three bit data transform field 5654B. When U=0 and the MOD field 5742 contains 00, 01, or 10 (signifying a memory access operation), the alpha field 5652 (EVEX byte 3, bit [7]-EH) is interpreted as the eviction hint (EH) field 5652B and the beta field 5654 (EVEX byte 3, bits [6:4]-SSS) is interpreted as a three bit data manipulation field 5654C.

When U=1, the alpha field 5652 (EVEX byte 3, bit [7]-EH) is interpreted as the write mask control (Z) field 5652C. When U=1 and the MOD field 5742 contains 11 (signifying a no memory access operation), part of the beta field 5654 (EVEX byte 3, bit [4]-S$_0$) is interpreted as the RL field 5657A; when it contains a 1 (round 5657A.1) the rest of the beta field 5654 (EVEX byte 3, bit [6-5]-S$_{2-1}$) is interpreted as the round operation field 5659A, while when the RL field 5657A contains a 0 (VSIZE 5657.A2) the rest of the beta field 5654 (EVEX byte 3, bit [6-5]-S$_{2-1}$) is interpreted as the vector length field 5659B (EVEX byte 3, bit [6-5]-L$_{1-0}$). When U=1 and the MOD field 5742 contains 00, 01, or 10 (signifying a memory access operation), the beta field 5654 (EVEX byte 3, bits [6:4]-SSS) is interpreted as the vector length field 5659B (EVEX byte 3, bit [6-5]-L$_{1-0}$) and the broadcast field 5657B (EVEX byte 3, bit [4]-B).

Exemplary Register Architecture

FIG. 58 is a block diagram of a register architecture 5800 according to one embodiment of the invention. In the embodiment illustrated, there are 32 vector registers 5810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 5700 operates on these overlaid register file as illustrated in the below tables.

| Adjustable Vector Length | Class | Operations | Registers |
|---|---|---|---|
| Instruction Templates that do not include the vector length field 5659B | A (FIG. 56A; U = 0) | 5610, 5615, 5625, 5630 | zmm registers (the vector length is 64 byte) |
| | B (FIG. 56B; U = 1) | 5612 | zmm registers (the vector length is 64 byte) |
| Instruction templates that do include the vector length field 5659B | B (FIG. 56B; U = 1) | 5617, 5627 | zmm, ymm, or xmm registers (the vector length is 64 byte, 32 byte, or 16 byte) depending on the vector length field 5659B |

In other words, the vector length field 5659B selects between a maximum length and one or more other shorter lengths, where each such shorter length is half the length of the preceding length; and instructions templates without the vector length field 5659B operate on the maximum vector length. Further, in one embodiment, the class B instruction templates of the specific vector friendly instruction format 5700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 5815—in the embodiment illustrated, there are 8 write mask registers (k0 through k7), each 64 bits in size. In an alternate embodiment, the write mask registers 5815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 5825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 5845, on which is aliased the MMX packed integer flat register file 5850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and out-of-order core block diagram

FIG. 59A is a block diagram illustrating both an exemplary in-order pipeline and an exemplary register renaming, out-of-order issue/execution pipeline according to embodiments of the invention. FIG. 59B is a block diagram illustrating both an exemplary embodiment of an in-order architecture core and an exemplary register renaming, out-of-order issue/execution architecture core to be included in a processor according to embodiments of the invention. The solid lined boxes in FIGS. 59A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 59A, a processor pipeline 5900 includes a fetch stage 5902, a length decode stage 5904, a decode stage 5906, an allocation stage 5908, a renaming stage 5910, a scheduling (also known as a dispatch or issue) stage 5912, a register read/memory read stage 5914, an execute stage 5916, a write back/memory write stage 5918, an exception handling stage 5922, and a commit stage 5924.

FIG. 59B shows processor core 5990 including a front end unit 5930 coupled to an execution engine unit 5950, and both are coupled to a memory unit 5970. The core 5990 may be a reduced instruction set computing (RISC) core, a complex instruction set computing (CISC) core, a very long instruction word (VLIW) core, or a hybrid or alternative core type. As yet another option, the core 5990 may be a special-purpose core, such as, for example, a network or communication core, compression engine, coprocessor core, general purpose computing graphics processing unit (GPGPU) core, graphics core, or the like.

The front end unit 5930 includes a branch prediction unit 5932 coupled to an instruction cache unit 5934, which is coupled to an instruction translation lookaside buffer (TLB) 5936, which is coupled to an instruction fetch unit 5938, which is coupled to a decode unit 5940. The decode unit 5940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 5940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 5990 includes a microcode ROM or other medium that stores microcode for certain macroinstructions (e.g., in decode unit 5940 or otherwise within the front end unit 5930). The decode unit 5940 is coupled to a rename/allocator unit 5952 in the execution engine unit 5950.

The execution engine unit 5950 includes the rename/allocator unit 5952 coupled to a retirement unit 5954 and a set of one or more scheduler unit(s) 5956. The scheduler unit(s) 5956 represents any number of different schedulers, including reservations stations, central instruction window, etc. The scheduler unit(s) 5956 is coupled to the physical register file(s) unit(s) 5958. Each of the physical register file(s) units 5958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 5958 comprises a vector registers unit, a write mask registers unit, and a scalar registers unit. These register units may provide architectural vector registers, vector mask registers, and general purpose registers. The physical register file(s) unit(s) 5958 is overlapped by the retirement unit 5954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 5954 and the physical register file(s) unit(s) 5958 are coupled to the execution cluster(s) 5960. The execution cluster(s) 5960 includes a set of one or more execution units 5962 and a set of one or more memory access units 5964. The execution units 5962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 5956, physical register file(s) unit(s) 5958, and execution cluster(s) 5960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 5964). It should also be understood that where separate pipelines are used, one or more of these pipelines may be out-of-order issue/execution and the rest in-order.

The set of memory access units 5964 is coupled to the memory unit 5970, which includes a data TLB unit 5972 coupled to a data cache unit 5974 coupled to a level 2 (L2) cache unit 5976. In one exemplary embodiment, the memory access units 5964 may include a load unit, a store address unit, and a store data unit, each of which is coupled to the data TLB unit 5972 in the memory unit 5970. The instruction cache unit 5934 is further coupled to a level 2 (L2) cache unit 5976 in the memory unit 5970. The L2 cache unit 5976 is coupled to one or more other levels of cache and eventually to a main memory.

By way of example, the exemplary register renaming, out-of-order issue/execution core architecture may implement the pipeline 5900 as follows: 1) the instruction fetch 5938 performs the fetch and length decoding stages 5902 and 5904; 2) the decode unit 5940 performs the decode stage 5906; 3) the rename/allocator unit 5952 performs the allocation stage 5908 and renaming stage 5910; 4) the scheduler unit(s) 5956 performs the schedule stage 5912; 5) the physical register file(s) unit(s) 5958 and the memory unit 5970 perform the register read/memory read stage 5914; the execution cluster 5960 perform the execute stage 5916; 6) the memory unit 5970 and the physical register file(s) unit(s) 5958 perform the write back/memory write stage 5918; 7) various units may be involved in the exception handling stage 5922; and 8) the retirement unit 5954 and the physical register file(s) unit(s) 5958 perform the commit stage 5924.

The core 5990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 5990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 5934/5974 and a shared L2 cache unit 5976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 60A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 60A is a block diagram of a single processor core, along with its connection to the on-die interconnect network 6002 and with its local subset of the Level 2 (L2) cache 6004, according to embodiments of the invention. In one embodiment, an instruction decoder 6000 supports the x86 instruction set with a packed data instruction set extension. An L1 cache 6006 allows low-latency accesses to cache memory into the scalar and vector units. While in one embodiment (to simplify the design), a scalar unit 6008 and a vector unit 6010 use separate register sets (respectively, scalar registers 16012 and vector registers 6014) and data transferred between them is written to memory and then read back in from a level 1 (L1) cache 6006, alternative embodiments of the invention may use a different approach (e.g., use a single register set or include a communication path that allow data to be transferred between the two register files without being written and read back).

The local subset of the L2 cache 6004 is part of a global L2 cache that is divided into separate local subsets, one per processor core. Each processor core has a direct access path to its own local subset of the L2 cache 6004. Data read by a processor core is stored in its L2 cache subset 6004 and can be accessed quickly, in parallel with other processor cores accessing their own local L2 cache subsets. Data written by a processor core is stored in its own L2 cache subset 6004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 60B is an expanded view of part of the processor core in FIG. 60A according to embodiments of the invention. FIG. 60B includes an L1 data cache 6006A part of the L1 cache 6004, as well as more detail regarding the vector unit 6010 and the vector registers 6014. Specifically, the vector unit 6010 is a 16-wide vector processing unit (VPU) (see the 16-wide ALU 6028), which executes one or more of integer, single-precision float, and double-precision float instructions. The VPU supports swizzling the register inputs with swizzle unit 6020, numeric conversion with numeric convert units 6022A-B, and replication with replication unit 6024 on the memory input. Write mask registers 6026 allow predicating resulting vector writes. Processor with integrated memory controller and graphics FIG. 61 is a block diagram of a processor 6100 that may have more than one core, may have an integrated memory controller, and may have integrated graphics according to embodiments of the invention. The solid lined boxes in FIG. 61 illustrate a processor 6100 with a single core 6102A, a system agent 6110, a set of one or more bus controller units 6116, while the optional addition of the dashed lined boxes illustrates an alternative processor 6100 with multiple cores 6102A-N, a set of one or more integrated memory controller unit(s) 6114 in the system agent unit 6110, and special purpose logic 6108.

Thus, different implementations of the processor 6100 may include: 1) a CPU with the special purpose logic 6108 being integrated graphics and/or scientific (throughput) logic (which may include one or more cores), and the cores 6102A-N being one or more general purpose cores (e.g., general purpose in-order cores, general purpose out-of-order cores, a combination of the two); 2) a coprocessor with the cores 6102A-N being a large number of special purpose cores intended primarily for graphics and/or scientific (throughput); and 3) a coprocessor with the cores 6102A-N being a large number of general purpose in-order cores. Thus, the processor 6100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 6100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 6106, and external memory (not shown) coupled to the set of integrated memory controller units 6114. The set of shared cache units 6106 may include one or more mid-level caches, such as level 2 (L2), level 3 (L3), level 4 (L4), or other levels of cache, a last level cache (LLC), and/or combinations thereof. While in one embodiment a ring based interconnect unit 6112 interconnects the integrated graphics logic 6108, the set of shared cache units 6106, and the system agent unit 6110/integrated memory controller unit(s) 6114, alternative embodiments may use any number of well-known techniques for interconnecting such units. In one embodiment, coherency is maintained between one or more cache units 6106 and cores 6102-A-N.

In some embodiments, one or more of the cores 6102A-N are capable of multi-threading. The system agent 6110 includes those components coordinating and operating cores 6102A-N. The system agent unit 6110 may include for example a power control unit (PCU) and a display unit. The PCU may be or include logic and components needed for regulating the power state of the cores 6102A-N and the integrated graphics logic 6108. The display unit is for driving one or more externally connected displays.

The cores 6102A-N may be homogenous or heterogeneous in terms of architecture instruction set; that is, two or more of the cores 6102A-N may be capable of execution the same instruction set, while others may be capable of executing only a subset of that instruction set or a different instruction set.

Exemplary Computer Architectures

FIGS. 62-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 62, shown is a block diagram of a system 6200 in accordance with one embodiment of the present invention. The system 6200 may include one or more processors 6210, 6215, which are coupled to a controller hub 6220. In one embodiment the controller hub 6220 includes a graphics memory controller hub (GMCH) 6290 and an Input/Output Hub (IOH) 6250 (which may be on separate chips); the GMCH 6290 includes memory and graphics controllers to which are coupled memory 6240 and a coprocessor 6245; the IOH 6250 is couples input/output (I/O) devices 6260 to the GMCH 6290. Alternatively, one or both of the memory and graphics controllers are integrated within the processor (as described herein), the memory 6240 and the coprocessor 6245 are coupled directly to the processor 6210, and the controller hub 6220 in a single chip with the IOH 6250.

The optional nature of additional processors 6215 is denoted in FIG. 62 with broken lines. Each processor 6210, 6215 may include one or more of the processing cores described herein and may be some version of the processor 6100.

The memory 6240 may be, for example, dynamic random access memory (DRAM), phase change memory (PCM), or a combination of the two. For at least one embodiment, the controller hub 6220 communicates with the processor(s) 6210, 6215 via a multi-drop bus, such as a frontside bus (FSB), point-to-point interface such as QuickPath Interconnect (QPI), or similar connection 6295.

In one embodiment, the coprocessor 6245 is a special-purpose processor, such as, for example, a high-throughput MIC processor, a network or communication processor, compression engine, graphics processor, GPGPU, embedded processor, or the like. In one embodiment, controller hub 6220 may include an integrated graphics accelerator.

There can be a variety of differences between the physical resources 6210, 6215 in terms of a spectrum of metrics of merit including architectural, microarchitectural, thermal, power consumption characteristics, and the like.

In one embodiment, the processor 6210 executes instructions that control data processing operations of a general type. Embedded within the instructions may be coprocessor instructions. The processor 6210 recognizes these coprocessor instructions as being of a type that should be executed by the attached coprocessor 6245. Accordingly, the processor 6210 issues these coprocessor instructions (or control signals representing coprocessor instructions) on a coprocessor bus or other interconnect, to coprocessor 6245. Coprocessor(s) 6245 accept and execute the received coprocessor instructions.

Referring now to FIG. 63, shown is a block diagram of a first more specific exemplary system 6300 in accordance with an embodiment of the present invention. As shown in FIG. 63, multiprocessor system 6300 is a point-to-point interconnect system, and includes a first processor 6370 and a second processor 6380 coupled via a point-to-point interconnect 6350. Each of processors 6370 and 6380 may be some version of the processor 6100. In one embodiment of the invention, processors 6370 and 6380 are respectively processors 6210 and 6215, while coprocessor 6338 is coprocessor 6245. In another embodiment, processors 6370 and 6380 are respectively processor 6210 coprocessor 6245.

Processors 6370 and 6380 are shown including integrated memory controller (IMC) units 6372 and 6382, respectively. Processor 6370 also includes as part of its bus controller units point-to-point (P-P) interfaces 6376 and 6378; similarly, second processor 6380 includes P-P interfaces 6386 and 6388. Processors 6370, 6380 may exchange information via a point-to-point (P-P) interface 6350 using P-P interface circuits 6378, 6388. As shown in FIG. 63, IMCs 6372 and 6382 couple the processors to respective memories, namely a memory 6332 and a memory 6334, which may be portions of main memory locally attached to the respective processors.

Processors 6370, 6380 may each exchange information with a chipset 6390 via individual P-P interfaces 6352, 6354 using point to point interface circuits 6376, 6394, 6386, 6398. Chipset 6390 may optionally exchange information with the coprocessor 6338 via a high-performance interface 6339. In one embodiment, the coprocessor 6338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 6390 may be coupled to a first bus 6316 via an interface 6396. In one embodiment, first bus 6316 may be a Peripheral Component Interconnect (PCI) bus, or a bus such as a PCI Express bus or another third generation I/O interconnect bus, although the scope of the present invention is not so limited.

As shown in FIG. 63, various I/O devices 6314 may be coupled to first bus 6316, along with a bus bridge 6318 which couples first bus 6316 to a second bus 6320. In one embodiment, one or more additional processor(s) 6315, such as coprocessors, high-throughput MIC processors, GPGPU's, accelerators (such as, e.g., graphics accelerators or digital signal processing (DSP) units), field programmable gate arrays, or any other processor, are coupled to first bus 6316. In one embodiment, second bus 6320 may be a low pin count (LPC) bus. Various devices may be coupled to a second bus 6320 including, for example, a keyboard and/or mouse 6322, communication devices 6327 and a storage unit 6328 such as a disk drive or other mass storage device which may include instructions/code and data 6330, in one embodiment. Further, an audio I/O 6324 may be coupled to the second bus 6320. Note that other architectures are possible. For example, instead of the point-to-point architecture of FIG. 63, a system may implement a multi-drop bus or other such architecture.

Referring now to FIG. 64, shown is a block diagram of a second more specific exemplary system 6400 in accordance with an embodiment of the present invention. Like elements in FIGS. 63 and 64 bear like reference numerals, and certain aspects of FIG. 63 have been omitted from FIG. 64 in order to avoid obscuring other aspects of FIG. 64.

FIG. 64 illustrates that the processors 6370, 6380 may include integrated memory and I/O control logic ("CL") 6372 and 6382, respectively. Thus, the CL 6372, 6382 include integrated memory controller units and include I/O control logic. FIG. 64 illustrates that not only are the memories 6332, 6334 coupled to the CL 6372, 6382, but also that I/O devices 6414 are also coupled to the control logic 6372, 6382. Legacy I/O devices 6415 are coupled to the chipset 6390.

Referring now to FIG. 65, shown is a block diagram of a SoC 6500 in accordance with an embodiment of the present invention. Similar elements in FIG. 61 bear like reference numerals. Also, dashed lined boxes are optional features on more advanced SoCs. In FIG. 65, an interconnect unit(s) 6502 is coupled to: an application processor 6510 which includes a set of one or more cores 642A-N and shared cache unit(s) 6106; a system agent unit 6110; a bus controller unit(s) 6116; an integrated memory controller unit(s) 6114; a set or one or more coprocessors 6520 which may include integrated graphics logic, an image processor, an audio processor, and a video processor; an static random access memory (SRAM) unit 6530; a direct memory access (DMA) unit 6532; and a display unit 6540 for coupling to one or more external displays. In one embodiment, the coprocessor(s) 6520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 6330 illustrated in FIG. 63, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 66 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 66 shows a program in a high level language 6602 may be compiled using an x86 compiler 6604 to generate x86 binary code 6606 that may be natively executed by a processor with at least one x86 instruction set core 6616. The processor with at least one x86 instruction set core 6616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 6604 represents a compiler that is operable to generate x86 binary code 6606 (e.g., object code) that can, with or without additional linkage processing, be executed on the processor with at least one x86 instruction set core 6616. Similarly, FIG. 66 shows the program in the high level language 6602 may be compiled using an alternative instruction set compiler 6608 to generate alternative instruction set binary code 6610 that may be natively executed by a processor without at least one x86 instruction set core 6614 (e.g., a processor with cores that execute the MIPS instruction set of MIPS Technologies of Sunnyvale, CA and/or that execute the ARM instruction set of ARM Holdings of Sunnyvale, CA). The instruction converter 6612 is used to convert the x86 binary code 6606 into code that may be natively executed by the processor without an x86 instruction set core 6614. This converted code is not likely to be the same as the alternative instruction set binary code 6610 because an instruction converter capable of this is difficult to make; however, the converted code will accomplish the general operation and be made up of instructions from the alternative instruction set.

Thus, the instruction converter 6612 represents software, firmware, hardware, or a combination thereof that, through emulation, simulation or any other process, allows a processor or other electronic device that does not have an x86 instruction set processor or core to execute the x86 binary code 6606.

Components, features, and details described for the processors disclosed herein in embodiments may optionally apply to any of the methods disclosed herein, which in embodiments may optionally be performed by and/or with such processors. The processors described herein in embodiments may optionally be included in any of the systems disclosed herein. The processors disclosed herein in embodiments may optionally have the microarchitectures shown herein. The instructions disclosed herein in embodiments may optionally be performed by the processors disclosed herein. In addition, the instructions disclosed herein may in some embodiments optionally have one of the VEX or EVEX instruction formats disclosed herein, although this is not required.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A processor comprising:
a decoder circuitry to decode an instruction having an opcode, the instruction to indicate a first source two-dimensional (2D) array of data elements arranged in a plurality of rows and a plurality of columns, a second source 2D array of data elements arranged in a plurality of rows and a plurality of columns, and a plurality of permute control elements; and
execution circuitry coupled with the decoder circuitry, the execution circuitry to perform operations corresponding to the instruction, including to:
  select a plurality of single data elements, from among any of the data elements of the first source 2D array of data elements, and any of the data elements of the second source 2D array of data elements, wherein every selected single data element of the selected plurality of single data elements is to be selected by a different corresponding one of the plurality of permute control elements; and
  store the selected plurality of single data elements in a plurality of single data element positions of a result 2D array, each and all of the single data element positions of the result 2D array to correspond to a different one of the plurality of permute control elements.

2. The processor of claim 1, wherein each of the plurality of permute control elements selects no more than a single data element the first source 2D array or the second source 2D array.

3. The processor of claim 1, wherein the plurality of permute control elements includes a same number of permute control elements as a number of the plurality of single data elements positions of the result 2D array.

4. The processor of claim 1, wherein each of the data elements of the first source 2D array of data elements is a single integer data element or a single floating-point data element, and wherein the decoder circuitry is to decode the instruction that is to indicate a third source 2D array of the plurality of permute control elements arranged in a plurality of rows and a plurality of columns, and wherein the result 2D array has a same number of rows as a number of rows of the third source 2D array and the result 2D array has a same number of columns as a number of columns of the third source 2D array.

5. The processor of claim 1, wherein each row of the first source 2D array has a plurality of data elements, wherein each column of the first source 2D array has a plurality of data elements, and wherein the decoder circuitry is to decode the instruction that is to indicate one of a plurality of sequential vector registers that are to store the plurality of permute control elements.

6. The processor of claim 1, wherein the decoder circuitry is to decode the instruction that is to indicate a single vector register that is to store the plurality of permute control elements.

7. The processor of claim 6, wherein the single vector register comprises at least 512-bits and is to store 8-bit permute control elements, and wherein the first and second source 2D arrays together are to have no more than 256 data elements.

8. The processor of claim 1, wherein the decoder circuitry is to decode the instruction that is to indicate a memory location that is to store the plurality of permute control elements.

9. The processor of claim 1, wherein each of the data elements of the first source 2D array of data elements is a single integer value or a single floating-point value, wherein the first source 2D array has at least eight rows and at least eight columns, wherein each of the rows of the first source 2D array has at least eight data elements, wherein each of the columns of the first source 2D array has at least eight data elements, and further comprising a register to store configuration information, the configuration information to configure a number of the rows of the first source 2D array, and a number of the columns of the first source 2D array.

10. The processor of claim 1, further comprising a plurality of physical registers, and wherein one or more of the first and second source 2D arrays are to be stored in a tile register, the tile register comprising an overlay over the physical registers.

11. A method performed by a processor comprising:
decoding an instruction having an opcode, the instruction indicating a first source two-dimensional (2D) array of data elements arranged in a plurality of rows and a plurality of columns, a second source 2D array of data elements arranged in a plurality of rows and a plurality of columns, and a plurality of permute control elements; and
performing operations corresponding to the instruction, including:
  selecting a plurality of single data elements, from among any of the data elements of the first source 2D array of data elements, and any of the data elements of the second source 2D array of data elements, wherein every selected single data element of the selected plurality of single data elements is to be selected by a different corresponding one of the plurality of permute control elements; and
  storing the selected plurality of single data elements in a plurality of single data element positions of a result 2D array, each and all of the single data element positions of the result 2D array to correspond to a different one of the plurality of permute control elements.

12. The method of claim 11, wherein each of the plurality of permute control elements selects no more than a single data element the first source 2D array or the second source 2D array, and wherein the plurality of permute control elements includes a same number of permute control elements as a number of the plurality of single data elements positions of the result 2D array.

13. The method of claim 11, wherein the decoding is by decoder circuitry that is to decode the instruction that is to indicate a third source 2D array that is to store the plurality of permute control elements.

14. The method of claim 11, wherein the decoding is by decoder circuitry that is to decode the instruction that is to indicate one of a plurality of sequential vector registers that are to store the plurality of permute control elements.

15. The method of claim 11, wherein the decoding is by decoder circuitry that is to decode the instruction that is to indicate a single vector register that is to store the plurality of permute control elements.

16. The method of claim 11, further comprising a register to store configuration information, the configuration information to configure a number of row of the first source 2D array, and a number of columns of the first source 2D array.

17. The method of claim 11, wherein the first source 2D array has an array of data elements arranged in at least eight rows and at least eight columns, wherein each row of the first source 2D array has at least eight data elements, wherein each column of the first source 2D array has at least eight data elements.

18. A system comprising:

an interconnect;

a processor coupled with the interconnect, the processor to receive an instruction having an opcode, the instruction to indicate a first source two-dimensional (2D) array of data elements arranged in a plurality of rows and a plurality of columns, a second source 2D array of data elements arranged in a plurality of rows and a plurality of columns, and a plurality of permute control elements, the processor, to perform operations corresponding to the instruction, including to:

select a plurality of single data elements, from among any of the data elements of the first source 2D array of data elements, and any of the data elements of the second source 2D array of data elements, wherein every selected single data element of the selected plurality of single data elements is to be selected by a different corresponding one of the plurality of permute control elements; and store the selected plurality of single data elements in a plurality of single data element positions of a result 2D array, each and all of the single data element positions of the result 2D array to correspond to a different one of the plurality of permute control elements; and a dynamic random access memory (DRAM) coupled with the interconnect.

19. The system of claim 18, further comprising a mass storage device coupled with the processor, wherein each of the plurality of data elements that is selected is a single integer value or a single floating-point value, and wherein the processor comprises decoder circuitry to decode the instruction that is to indicate a third source 2D array that is to store the plurality of permute control elements.

20. The system of claim 18, further comprising a peripheral component interconnect express (PCIe) interface coupled with the processor, and wherein the processor comprises decoder circuitry to decode the instruction that is to indicate a single vector register that is to store the plurality of permute control elements.

\* \* \* \* \*